(12) United States Patent
Ohno

(10) Patent No.: US 8,908,000 B2
(45) Date of Patent: Dec. 9, 2014

(54) LIGHT-EMITTING DEVICE, DRIVING METHOD OF LIGHT-EMITTING DEVICE, LIGHT-EMITTING CHIP, PRINT HEAD AND IMAGE FORMING APPARATUS

(71) Applicant: Fuji Xerox Co., Ltd., Tokyo (JP)

(72) Inventor: Seiji Ohno, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/032,955

(22) Filed: Sep. 20, 2013

(65) Prior Publication Data

US 2014/0023399 A1 Jan. 23, 2014

Related U.S. Application Data

(62) Division of application No. 12/914,788, filed on Oct. 28, 2010, now Pat. No. 8,581,952.

(30) Foreign Application Priority Data

Mar. 23, 2010 (JP) ................... 2010-066166
May 10, 2010 (JP) ................... 2010-108687

(51) Int. Cl.
*B41J 2/435* (2006.01)
*B41J 2/47* (2006.01)
*G03G 15/04* (2006.01)
*B41J 2/45* (2006.01)
*G06K 15/12* (2006.01)
*H05B 37/02* (2006.01)

(52) U.S. Cl.
CPC ...... *H05B 37/0209* (2013.01); *G03G 15/04063* (2013.01); *B41J 2/45* (2013.01); *G06K 15/1247* (2013.01)
USPC ......................................... 347/237; 347/247

(58) Field of Classification Search
CPC ............... B41J 2/447; B41J 2/45; B41J 2/475
USPC .......................................... 347/237, 238, 247
See application file for complete search history.

(56) References Cited

U.S. PATENT DOCUMENTS 6,747,940 B2 * 6/2004 Ohno ............................. 369/121
7,286,259 B2 10/2007 Ohno et al.
(Continued)

FOREIGN PATENT DOCUMENTS

| CN | 1336873 A | 2/2002 |
|---|---|---|
| CN | 1388778 A | 1/2003 |

(Continued)

OTHER PUBLICATIONS

Japanese Office Action dated Oct. 26, 2010 for Japanese patent application No. 2010-108736 and English-language translation.

(Continued)

*Primary Examiner* — Hai C Pham
(74) *Attorney, Agent, or Firm* — Sughrue Mion, PLLC

(57) ABSTRACT

A light-emitting device includes: plural light-emitting chips each having plural light-emitting elements, and each being designated, as a control target for lighting up or not lighting up, by two to Q designation signals (Q is an integer of two or more); and a selection signal generating part that selectively transmits P selection signals (P is an integer of three or more where P>Q) as the designation signals to designate each of the plural light-emitting elements as the control target, the designation signals for each of the plural light-emitting chips including a combination of two to Q selection signals taken from the P selection signals.

7 Claims, 53 Drawing Sheets

(56) References Cited

U.S. PATENT DOCUMENTS

| | | | |
|---|---|---|---|
| 7,330,204 B2 | 2/2008 | Ohno | |
| 8,174,031 B2 | 5/2012 | Kondoh | |
| 8,325,210 B2 * | 12/2012 | Ohno | 347/224 |
| 8,502,849 B2 | 8/2013 | Ohno et al. | |
| 2003/0007063 A1 | 1/2003 | Ohno | |
| 2003/0058329 A1 | 3/2003 | Ohno | |
| 2004/0046976 A1 | 3/2004 | Ohno et al. | |
| 2005/0094691 A1 | 5/2005 | Yamazaki et al. | |
| 2005/0230704 A1 | 10/2005 | Ohno | |
| 2007/0296803 A1 | 12/2007 | Ohno et al. | |
| 2008/0024393 A1 | 1/2008 | Yamazaki et al. | |
| 2008/0136888 A1 | 6/2008 | Yamazaki et al. | |
| 2008/0150849 A1 | 6/2008 | Yamazaki et al. | |
| 2008/0291472 A1 | 11/2008 | Yamazaki et al. | |
| 2008/0303886 A1 | 12/2008 | Yamazaki et al. | |
| 2010/0038671 A1 | 2/2010 | Kondoh | |
| 2010/0045763 A1 | 2/2010 | Tsuchiya | |
| 2010/0045768 A1 | 2/2010 | Arai et al. | |
| 2010/0118100 A1 | 5/2010 | Ohno | |
| 2010/0118108 A1 | 5/2010 | Ohno | |
| 2010/0225728 A1 | 9/2010 | Okazaki | |
| 2011/0069132 A1 | 3/2011 | Ohno | |
| 2011/0274465 A1 | 11/2011 | Ohno | |

FOREIGN PATENT DOCUMENTS

| | | |
|---|---|---|
| CN | 101651146 A | 2/2010 |
| CN | 101654024 A | 2/2010 |
| CN | 102019766 A | 4/2011 |
| EP | 2 184 172 A1 | 5/2010 |
| EP | 2 184 649 A2 | 5/2010 |
| JP | 09-150542 A | 6/1997 |
| JP | 2001-219596 A | 8/2001 |
| JP | 2001219596 A * | 8/2001 ............... B41J 2/44 |
| JP | 2001-253116 A | 9/2001 |
| JP | 2001-260410 A | 9/2001 |
| JP | 2001-270150 A | 10/2001 |
| JP | 2001-301231 A | 10/2001 |
| JP | 2002-111063 A | 4/2002 |
| JP | 2004-181741 A | 7/2004 |
| JP | 2005-96088 A | 4/2005 |
| JP | 2006-88465 A | 4/2006 |
| JP | 2007-268895 A | 10/2007 |
| JP | 2008-126589 A | 6/2008 |
| JP | 2009-101712 A | 5/2009 |
| JP | 2009-190405 A | 8/2009 |
| JP | 2009-262419 A | 11/2009 |
| JP | 2010-45230 A | 2/2010 |
| TW | 200605347 A | 4/2005 |

OTHER PUBLICATIONS

Extended Search Report for patent application No. 101927143.3; mailed Sep. 1, 2011.
Extended European Search Report for European Patent Application No. 10192791.1 dated Jan. 25, 2012.
Japanese Office Action issued Jun. 26, 2012 in related Japanese Patent Application No. 2011-126327.
Chinese Office Action issued Apr. 3, 2014 in Application No. 201010600607.5 corresponding to U.S. Appl. No. 14/032,955.
Chinese Office Action issued May 23, 2014 in Application No. 201010588772.3 corresponding to U.S. Appl. No. 12/915,914.

* cited by examiner

FIG.5

| LIGHT-EMITTING CHIP | φVa | φVb | φVc | φVd | φVe | φVf | φVg | φVh | φVi | φVj |
|---|---|---|---|---|---|---|---|---|---|---|
| C1 | ○ | ○ | | | | | | | | |
| C2 | | ○ | ○ | | | | | | | |
| C3 | | | ○ | ○ | | | | | | |
| C4 | | | | ○ | ○ | | | | | |
| C5 | | | | | ○ | ○ | | | | |
| C6 | | | | | | ○ | ○ | | | |
| C7 | | | | | | | ○ | ○ | | |
| C8 | | | | | | | | ○ | ○ | |
| C9 | | | | | | | | | ○ | ○ |
| C10 | ○ | | | | | | | | | ○ |
| C11 | ○ | | ○ | | | | | | | |
| C12 | | ○ | | ○ | | | | | | |
| C13 | | | ○ | | ○ | | | | | |
| C14 | | | | ○ | | ○ | | | | |
| C15 | | | | | ○ | | ○ | | | |
| C16 | | | | | | ○ | | ○ | | |
| C17 | | | | | | | ○ | | ○ | |
| C18 | | | | | | | | ○ | | ○ |
| C19 | ○ | | | | | | | | ○ | |
| C20 | | ○ | | | | | | | | ○ |
| C21 | ○ | | | ○ | | | | | | |
| C22 | | ○ | | | ○ | | | | | |
| C23 | | | ○ | | | ○ | | | | |
| C24 | | | | ○ | | | ○ | | | |
| C25 | | | | | ○ | | | ○ | | |
| C26 | | | | | | ○ | | | ○ | |
| C27 | | | | | | | ○ | | | ○ |
| C28 | ○ | | | | | | | ○ | | |
| C29 | | ○ | | | | | | | ○ | |
| C30 | | | ○ | | | | | | | ○ |
| C31 | ○ | | | | ○ | | | | | |
| C32 | | ○ | | | | ○ | | | | |
| C33 | | | ○ | | | | ○ | | | |
| C34 | | | | ○ | | | | ○ | | |
| C35 | | | | | ○ | | | | ○ | |
| C36 | | | | | | ○ | | | | ○ |
| C37 | ○ | | | | | | ○ | | | |
| C38 | | ○ | | | | | | ○ | | |
| C39 | | | ○ | | | | | | ○ | |
| C40 | | | | ○ | | | | | | ○ |

FIG.17

| LIGHT-EMITTING CHIP | φVa | φVb | φVc | φVd | φVe | φVf | φVg | φVh | φVi | φVj |
|---|---|---|---|---|---|---|---|---|---|---|
| C1 | E | | W1 | W2 | | | | | | |
| C2 | E | | | | W1 | W2 | | | | |
| C3 | E | | | | | | W1 | W2 | | |
| C4 | E | | | | | | | | W1 | W2 |
| C5 | | E | W1 | W2 | | | | | | |
| C6 | | E | | | W1 | W2 | | | | |
| C7 | | E | | | | | W1 | W2 | | |
| C8 | | E | | | | | | | W1 | W2 |
| C9 | | | E | | W1 | W2 | | | | |
| C10 | | | E | | | | W1 | W2 | | |
| C11 | | | E | | | | | | W1 | W2 |
| C12 | | | | E | W1 | W2 | | | | |
| C13 | | | | E | | | W1 | W2 | | |
| C14 | | | | E | | | | | W1 | W2 |
| C15 | | | | | E | | W1 | W2 | | |
| C16 | | | | | E | | | | W1 | W2 |
| C17 | | | | | | E | W1 | W2 | | |
| C18 | | | | | | E | | | W1 | W2 |
| C19 | | | | | | | E | | W1 | W2 |
| C20 | | | | | | | | E | W1 | W2 |

FIG.38

| LIGHT-EMITTING CHIP | φE1 | | φE2 | | | φW | | | | | | | φI | | | | | |
|---|---|---|---|---|---|---|---|---|---|---|---|---|---|---|---|---|---|---|
| | φEa | φEb | φE21 | φE22 | φE23 | φW1 | φW2 | φW3 | φW4 | φW5 | φW6 | φW7 | φIa1 | φIb1 | φIa2 | φIb2 | φIa3 | φIb3 |
| C1 | O | | O | | | O | | | | | | | O | | | | | |
| C2 | | O | O | | | O | | | | | | | | O | | | | |
| C3 | O | | | O | | O | | | | | | | | | O | | | |
| C4 | | O | | O | | O | | | | | | | | | | O | | |
| C5 | O | | | | O | O | | | | | | | | | | | O | |
| C6 | | O | | | O | O | | | | | | | | | | | | O |
| C7 | O | | O | | | | O | | | | | | O | | | | | |
| C8 | | O | O | | | | O | | | | | | | O | | | | |
| C9 | O | | | O | | | O | | | | | | | | O | | | |
| C10 | | O | | O | | | O | | | | | | | | | O | | |
| C11 | O | | | | O | | O | | | | | | | | | | O | |
| C12 | | O | | | O | | O | | | | | | | | | | | O |
| C13 | O | | O | | | | | O | | | | | O | | | | | |
| C14 | | O | O | | | | | O | | | | | | O | | | | |
| C15 | O | | | O | | | | O | | | | | | | O | | | |
| C16 | | O | | O | | | | O | | | | | | | | O | | |
| C17 | O | | | | O | | | O | | | | | | | | | O | |
| C18 | | O | | | O | | | O | | | | | | | | | | O |
| C19 | O | | O | | | | | | O | | | | O | | | | | |
| C20 | | O | O | | | | | | O | | | | | O | | | | |
| C21 | O | | | O | | | | | O | | | | | | O | | | |
| C22 | | O | | O | | | | | O | | | | | | | O | | |
| C23 | O | | | | O | | | | O | | | | | | | | O | |
| C24 | | O | | | O | | | | O | | | | | | | | | O |
| C25 | O | | O | | | | | | | O | | | O | | | | | |
| C26 | | O | O | | | | | | | O | | | | O | | | | |
| C27 | O | | | O | | | | | | O | | | | | O | | | |
| C28 | | O | | O | | | | | | O | | | | | | O | | |
| C29 | O | | | | O | | | | | O | | | | | | | O | |
| C30 | | O | | | O | | | | | O | | | | | | | | O |
| C31 | O | | O | | | | | | | | O | | O | | | | | |
| C32 | | O | O | | | | | | | | O | | | O | | | | |
| C33 | O | | | O | | | | | | | O | | | | O | | | |
| C34 | | O | | O | | | | | | | O | | | | | O | | |
| C35 | O | | | | O | | | | | | O | | | | | | O | |
| C36 | | O | | | O | | | | | | O | | | | | | | O |
| C37 | O | | O | | | | | | | | | O | O | | | | | |
| C38 | | O | O | | | | | | | | | O | | O | | | | |
| C39 | O | | | O | | | | | | | | O | | | O | | | |
| C40 | | O | | O | | | | | | | | O | | | | O | | |

LIGHT-EMITTING DEVICE, DRIVING METHOD OF LIGHT-EMITTING DEVICE, LIGHT-EMITTING CHIP, PRINT HEAD AND IMAGE FORMING APPARATUS

CROSS REFERENCE TO RELATED APPLICATIONS

This application is a divisional of U.S. patent application Ser. No. 12/914,788, filed Oct. 28, 2010, which claims priority to Japanese Patent Application No. 2010-066166 filed Mar. 23, 2010 and Japanese Patent Application No. 2010-108687 filed May 10, 2010, the contents of all of which are incorporated herein by reference.

BACKGROUND

1. Technical Field

The present invention relates to a light-emitting device, a driving method of a light-emitting device, a light-emitting chip, a print head and an image forming apparatus.

2. Related Art

In an electrophotographic image forming apparatus such as a printer, a copy machine or a facsimile machine, an image is formed on a recording sheet as follows. Firstly, an electrostatic latent image is formed on a uniformly charged photoconductor by causing an optical recording unit to emit light so as to transfer image information onto the photoconductor. Then, the electrostatic latent image is made visible by being developed with toner. Lastly, the toner image is transferred on and fixed to the recording sheet. In addition to an optical-scanning recording unit that performs exposure by laser scanning in the first scanning direction using a laser beam, a recording device using the following LED print head (LPH) has been employed as such an optical recording unit in recent years in response to demand for downsizing the apparatus. This LPH includes a large number of light-emitting diodes (LEDs), serving as light-emitting elements, arrayed in the first scanning direction.

SUMMARY

According to an aspect of the present invention, there is provided a light-emitting device including: plural light-emitting chips each having plural light-emitting elements, and each being designated, as a control target for lighting up or not lighting up, by two to Q designation signals (Q is an integer of two or more); and a selection signal generating part that selectively transmits P selection signals (P is an integer of three or more where P>Q) as the designation signals to designate each of the plural light-emitting elements as the control target, the designation signals for each of the plural light-emitting chips including a combination of two to Q selection signals taken from the P selection signals.

BRIEF DESCRIPTION OF THE DRAWINGS

An Exemplary embodiment of the present invention will be described in detail based on the following figures, wherein:

FIG. 5 is a table illustrating the combinations of selection signals to be transmitted to the respective light-emitting chips;

FIG. 17 is a table illustrating combinations of selection signals to be transmitted to respective light-emitting chips;

FIG. 38 is a diagram illustrating the relationship between the light-emitting chips, and the enable signals, the write signals and the light-up signals to be transmitted;

DETAILED DESCRIPTION

Hereinafter, a description will be given of an exemplary embodiment of the present invention in detail with reference to the accompanying drawings.

First Exemplary Embodiment

Figure 1:
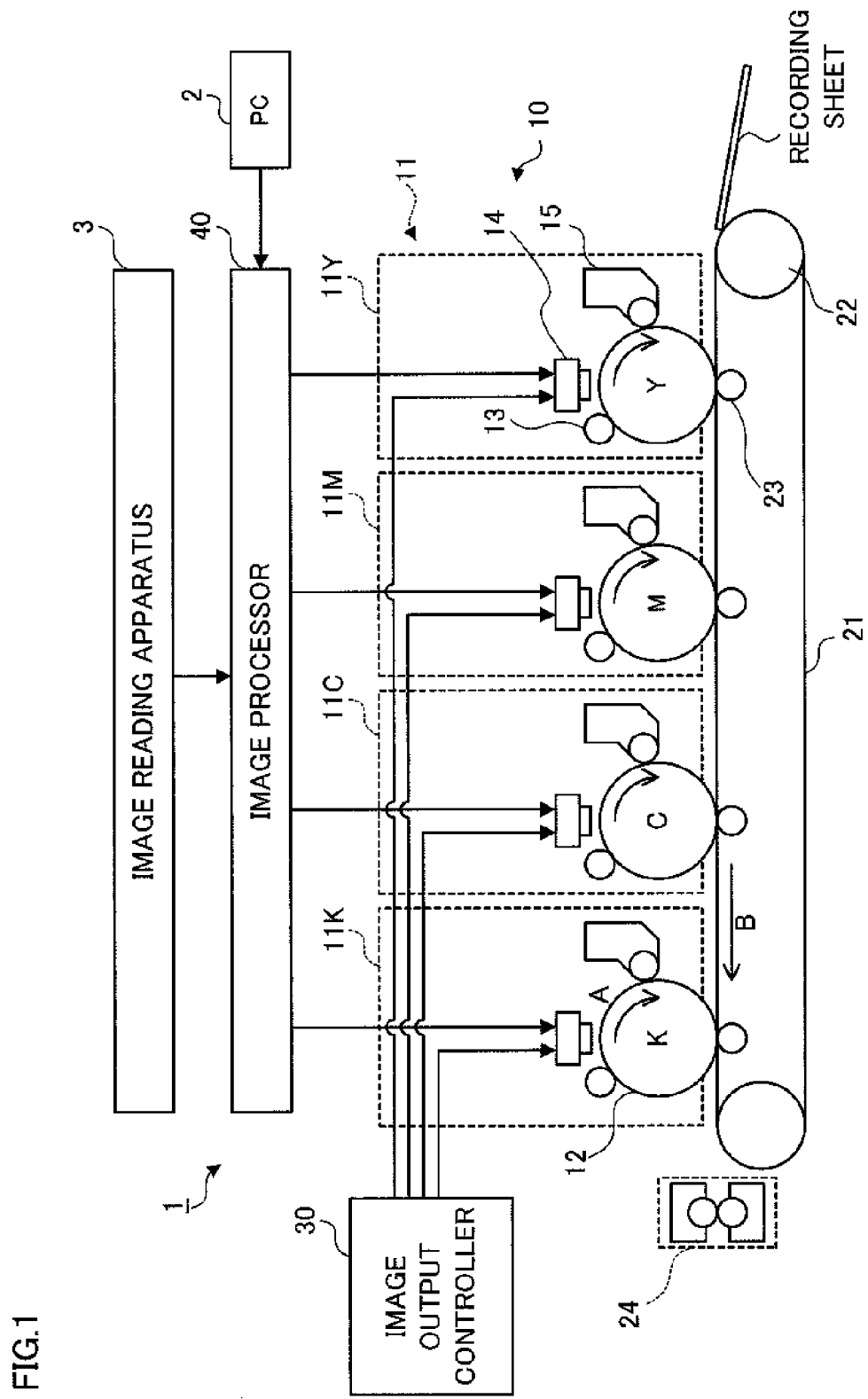
FIG. 1 is a diagram showing an example of an overall configuration of an image forming apparatus to which the first exemplary embodiment is applied.

FIG. 1 is a diagram showing an example of an overall configuration of an image forming apparatus 1 to which the first exemplary embodiment is applied. The image forming apparatus 1 shown in FIG. 1 is what is generally termed as a tandem image forming apparatus. The image forming apparatus 1 includes an image forming process unit 10, an image output controller 30 and an image processor 40. The image forming process unit 10 forms an image in accordance with different color image data. The image output controller 30 controls the image forming process unit 10. The image processor 40, which is connected to devices such as a personal computer (PC) 2 and an image reading apparatus 3, performs predefined image processing on image data received from the above devices.

The image forming process unit 10 includes image forming units 11 formed of plural engines arranged in parallel at intervals set in advance. The image forming units 11 are formed of four image forming units 11Y, 11M, 11C and 11K. Each of the image forming units 11Y, 11M, 11C and 11K includes a photoconductive drum 12, a charging device 13, a print head 14 and a developing device 15. On the photoconductive drum 12, which is an example of an image carrier, an electrostatic latent image is formed, and the photoconductive drum 12 retains a toner image. The charging device 13, as an example of a charging unit, charges the surface of the photoconductive drum 12 at a predetermined potential. The print head 14 exposes the photoconductive drum 12 charged by the charging device 13. The developing device 15, as an example of a developing unit, develops an electrostatic latent image formed by the print head 14. Here, the image forming units 11Y, 11M, 11C and 11K have approximately the same configuration excluding colors of toner put in the developing devices 15. The image forming units 11Y, 11M, 11C and 11K form yellow (Y), magenta (M), cyan (C) and black (K) toner images, respectively.

In addition, the image forming process unit 10 further includes a sheet transport belt 21, a drive roll 22, transfer rolls 23 and a fixing device 24. The sheet transport belt 21 transports a recording sheet as a transferred body so that different color toner images respectively formed on the photoconductive drums 12 of the image forming units 11Y, 11M, 11C and 11K are transferred on the recording sheet by multilayer transfer. The drive roll 22 is a roll that drives the sheet transport belt 21. Each transfer roll 23, as an example of a transfer unit, transfers a toner image formed on the corresponding photoconductive drum 12 onto the recording sheet. The fixing device 24 fixes the toner images on the recording sheet.

In this image forming apparatus 1, the image forming process unit 10 performs an image forming operation on the basis of various kinds of control signals supplied from the image output controller 30. Under the control by the image output controller 30, the image data received from the personal computer (PC) 2 or the image reading apparatus 3 is subjected to image processing by the image processor 40, and then the resultant data is supplied to the corresponding image forming unit 11. Then, for example in the black (K) color image forming unit 11K, the photoconductive drum 12 is charged at a predetermined potential by the charging device 13 while rotating in an arrow A direction, and then is exposed by the print head 14 emitting light on the basis of the image data supplied from the image processor 40. By this operation, the electrostatic latent image for the black (K) color image is formed on the photoconductive drum 12. Thereafter, the electrostatic latent image formed on the photoconductive drum 12 is developed by the developing device 15, and accordingly the black (K) color toner image is formed on the photoconductive drum 12. Similarly, yellow (Y), magenta (M) and cyan (C) color toner images are formed in the image forming units 11Y, 11M and 11C, respectively.

The respective color toner images on the photoconductive drums 12, which are formed in the respective image forming units 11, are electrostatically transferred to the recording sheet supplied with the movement of the sheet transport belt 21 by a transfer electric field applied to the transfer rolls 23, in sequence. Here, the sheet transport belt 21 moves in an arrow B direction. By this operation, a synthetic toner image, which is superimposed color-toner images, is formed on the recording sheet.

Thereafter, the recording sheet on which the synthetic toner image is electrostatically transferred is transported to the fixing device 24. The synthetic toner image on the recording sheet transported to the fixing device 24 is fixed on the recording sheet through fixing processing using heat and pressure by the fixing device 24, and then is outputted from the image forming apparatus 1.

Figure 2:
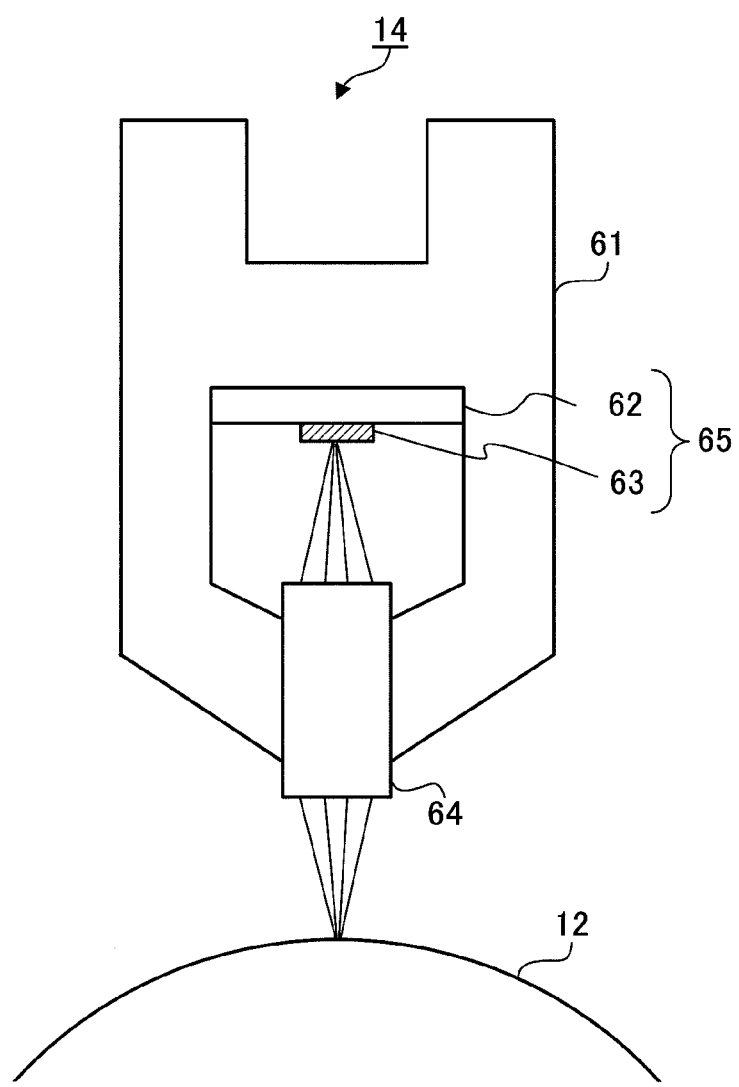
FIG. 2 is a cross-sectional diagram showing a structure of the print head.

FIG. 2 is a cross-sectional diagram showing a structure of the print head 14. The print head 14 includes a housing 61, a light-emitting device 65 and a rod lens array 64. The light-emitting device 65, as an example of an exposure unit, includes a light-emitting portion 63 formed of plural light-emitting elements (light-emitting thyristors in the first exemplary embodiment) that exposes the photoconductive drum 12. The rod lens array 64, as an example of an optical unit, focuses light emitted by the light-emitting portion 63 onto the surface of the photoconductive drum 12.

The light-emitting device 65 also includes a circuit board 62 on which the light-emitting portion 63, a signal generating circuit 110 (see FIG. 3 to be described later) driving the light-emitting portion 63, and the like are mounted.

The housing 61 is made of metal, for example, and supports the circuit board 62 and the rod lens array 64. The housing 61 is set so that the light-emitting points of the light-emitting elements in the light-emitting portions 63 are located on the focal plane of the rod lens array 64. In addition, the rod lens array 64 is arranged along an axial direction of the photoconductive drum 12 (the first scanning direction).

Figure 3:
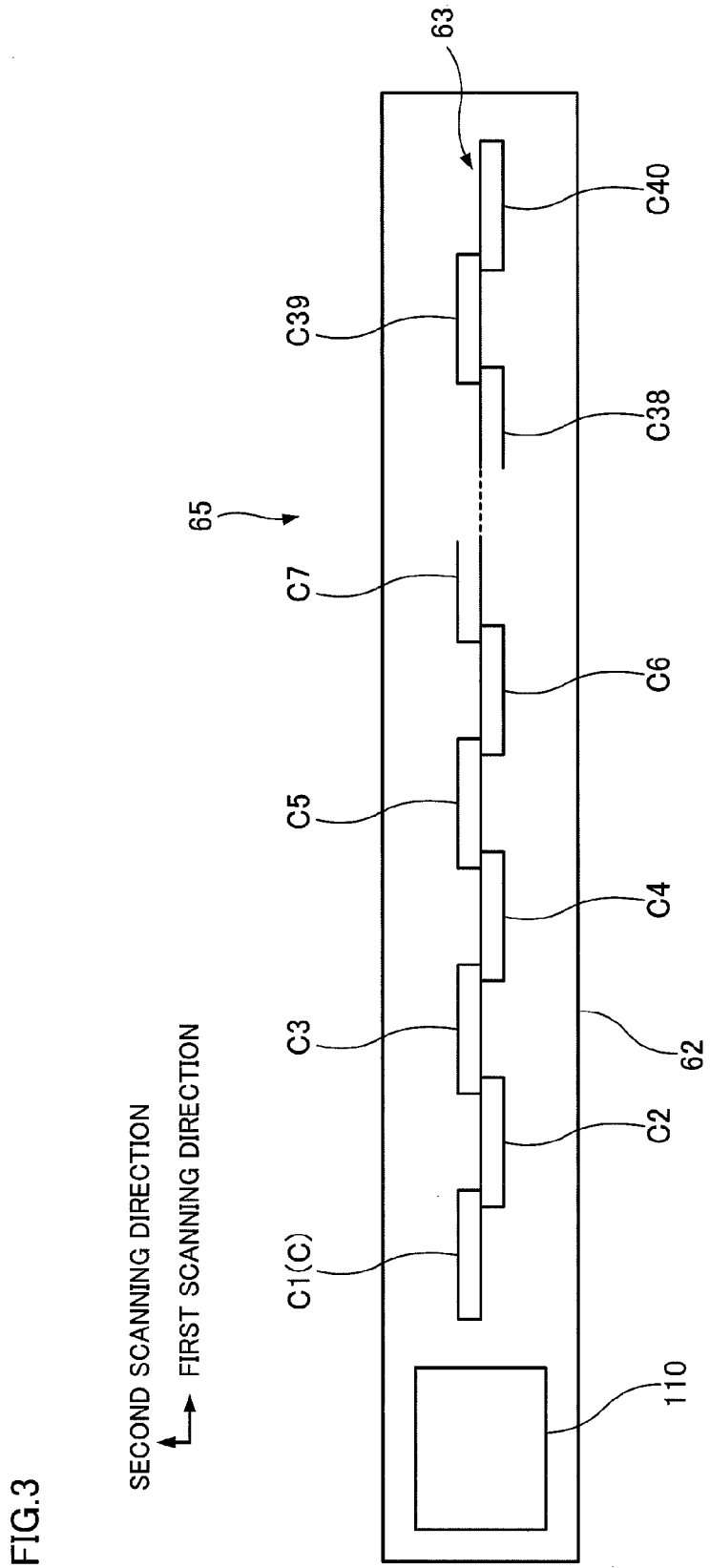
FIG. 3 is a top view of the light-emitting device in the first exemplary embodiment.

FIG. 3 is a top view of the light-emitting device 65 in the first exemplary embodiment.

As FIG. 3 shows, in the light-emitting device 65 according to the first exemplary embodiment, the light-emitting portion 63 is configured with forty light-emitting chips C1 to C40 which are arranged on the circuit board 62 in two lines in the first scanning direction in a staggered manner.

The configurations of the light-emitting chips C1 to C40 may be the same with each other. Thus, the light-emitting chips C1 to C40, when not separately distinguished, are labeled as a light-emitting chip C. Although the number of the light-emitting chips C is forty in total in the first exemplary embodiment, the configuration is not limited to this.

In addition, as described earlier, the light-emitting device 65 has the signal generating circuit 110 that drives the light-emitting portion 63.

FIGS. 4A and 4B are a diagram showing a configuration of a light-emitting chip C, a configuration of a signal generating circuit 110 of the light-emitting device 65 and a wiring configuration on the circuit board 62 according to the first exemplary embodiment. FIG. 4A shows the configuration of the light-emitting chip C, and FIG. 4B shows the configuration of the signal generating circuit 110 of the light-emitting device 65, and the wiring configuration on the circuit board 62. FIG. 4B shows a portion including the light-emitting chips C1 to C10.

First, the configuration of the light-emitting chip C shown in FIG. 4A is described.

The light-emitting chip C includes a light-emitting element array 102 that includes multiple light-emitting elements (light-emitting thyristors L1, L2, L3, . . . , in the first exemplary embodiment) provided in line along the longitudinal side on a rectangular substrate 80 (see FIGS. 7A and 7B described below). The light-emitting chip C also includes input terminals (Vga terminal, φ2 terminal, φW terminal, φE terminal, φ1 terminal and φI terminal) at both ends in the longitudinal direction of the substrate 80, the terminals being multiple bonding pads to receive various kinds of control signals. Note that these input terminals are provided in the order of the Vga terminal, the φ2 terminal, and the φW terminal from one end of the substrate 80, and are provided in the order of the φI terminal, the φ1 terminal, and the φE terminal from the other end of the substrate 80. The light-emitting element array 102 is provided between the φW and φE terminals.

Next, the configuration of the signal generating circuit 110 of the light-emitting device 65 and the wiring configuration on the circuit board 62 are described with reference to FIG. 4B.

As described above, the circuit board 62 of the light-emitting device 65 is mounted with the signal generating circuit 110 and light-emitting chips C (the light-emitting chips C1 to C40), and wiring to connect between the signal generating circuit 110 and the light-emitting chips C1 to C40 is provided.

First, the configuration of the signal generating circuit 110 is described.

Although not shown, the signal generating circuit 110 receives input of image-processed image data and various kinds of control signals from the image output controller 30 and the image processor 40 (see FIG. 1). The signal generating circuit 110 rearranges the image data and corrects amount of light based on these image data and various kinds of control signals.

The signal generating circuit 110 includes a transfer signal generating part 120 as an example of a transfer signal supply unit that transmits a first transfer signal φ1 and a second transfer signal φ2 to the light-emitting chips C (the light-emitting chips C1 to C40) based on various kinds of control signals.

The signal generating circuit 110 further includes a selection signal generating part 160 as an example of a selection signal supply unit that transmits ten selection signals φVa to φVj that select (designate) one of the light-emitting chips C (the light-emitting chips C1 to C40) based on various kinds of control signals. The selection signals φVa to φVj, when not separately distinguished, are labeled as a selection signal φV. To select one light-emitting chip C from the light-emitting chips C (the light-emitting chips C1 to C40) shall be referred to as "to designate one light-emitting chip C."

The signal generating circuit 110 further includes a light-up signal generating part 140 as an example of a light-up signal supply unit that transmits a light-up signal φI to the light-emitting chips C (the light-emitting chips C1 to C40) based on various kinds of control signals.

Next, an arrangement of the light-emitting chips C1 to C40 is described.

In the first exemplary embodiment, odd numbered light-emitting chips C1, C3, C5, . . . , and even numbered C2, C4, C6 light-emitting chips are arranged in line so that the sides of the light-emitting chips provided with respective light-emitting element arrays 102 are opposed to each other. The odd numbered light-emitting chips C1, C3, C5, . . . , and the even numbered light-emitting chips C2, C4, C6 are arranged in a staggered pattern so that the light-emitting elements of respective light-emitting chips C (the light-emitting thyristors L1, L2, L3, . . . , in the first exemplary embodiment) are aligned at predetermined intervals between the light-emitting chips C in the first scanning direction.

The wiring to connect between the signal generating circuit 110 and the light-emitting chips C (the light-emitting chips C1 to C40) is described.

The circuit board 62 includes a power supply line 200a that is connected to a Vsub terminal (see FIGS. 6 and 7) provided to the reverse side of each light-emitting chip C to supply a reference potential Vsub. The circuit board 62 includes a power supply line 200b that is connected to Vga terminal provided to each light-emitting chip C to supply a power supply potential Vga for power supply.

The circuit board 62 also includes a first transfer signal line 201 and a second transfer signal line 202 that are connected from the transfer signal generating part 120 of the signal generating circuit 110 to φ1 and φ2 terminals of the light-emitting chips C (the light-emitting chips C1 to C40) to transmit a first transfer signal φ1 and a second transfer signal φ2, respectively. The first transfer signal φ1 and the second transfer signal φ2 are transmitted to the light-emitting chips C (the light-emitting chips C1 to C40) in common (parallel).

The circuit board 62 includes a light-up signal line 204 that is connected from the light-up signal generating part 140 of the signal generating circuit 110 to φI terminals of the light-emitting chips C (the light-emitting chips C1 to C40) to transmit the light-up signal φI. The light-up signal φI is transmitted to the light-emitting chips C (the light-emitting chips C1 to C40) in common (parallel) via current limitation resistances RI provided to the respective light-emitting chips C (the light-emitting chips C1 to C40).

The circuit board 62 further includes selection signal lines 230 to 239 that are connected from the selection signal generating part 160 of the signal generating circuit 110 to φE and φW terminals of the light-emitting chips C (the light-emitting chips C1 to C40) to transmit selection signals φV (φVa to φVj), respectively.

FIG. 5 is a table illustrating the combinations of two selection signals from φVa to φVj to be transmitted to the respective light-emitting chips C. For each light-emitting chip C, two selection signals φV labeled with ○ are transmitted to the respective φE and φW terminals as a designation signal to uniquely designate one of the light-emitting chips C (the light-emitting chips C1 to C40).

For example, for the light-emitting chip C1, the selection signal line 230 is connected to the φW terminal of the light-emitting chip C1, and the selection signal line 231 is connected to the φE terminal of the light-emitting chip C1 so that the selection signal φVa is transmitted to the φW terminal, and the selection signal φVb is transmitted to the φE terminal. That is, the designation signals for the light-emitting chip C1 are the selection signals φVa and Vb.

Similarly, for the light-emitting chip C2, the selection signal line 231 is connected to the φW terminal of the light-emitting chip C2, and the selection signal line 232 is connected to the φE terminal of the light-emitting chip C2 so that the selection signal φVb is transmitted to the φW terminal, and the selection signal φVc is transmitted to the φE terminal. That is, the designation signals for the light-emitting chip C2 are the selection signals φVb and φVc.

Also for other light-emitting chips C3 to C40, the selection signal lines 230 to 239 are connected to the respective φW and φE terminals of the light-emitting chips C3 to C40 based on FIG. 5.

In the first exemplary embodiment, the φW and φE terminals do not need to be distinguished. For example, for the light-emitting chip C1, the selection signal line 230 may be connected to the φE terminal of the light-emitting chip C1, and the selection signal line 231 may be connected to the φW terminal of the light-emitting chip C1. That is, mutually different selection signals φV may be transmitted to the φW and φE terminals, which are examples of a control terminal.

As shown in FIG. 5, combinations of the selection signal φV transmitted to the respective light-emitting chips C (the light-emitting chips C1 to C40) are all different (unique). Accordingly, by selecting two selection signals φV (φVa to φVj) without repeating the same combination, the respective light-emitting chips C are uniquely designated to be controlled as described below.

In general, the number of combinations $_MC_N$ of N selection signals φV taken from P selection signals φV (P and Q are integers where P>Q) without repeating the same combination is as follows:

$$_PC_Q = \frac{P!}{Q! \times (P-Q)!} \quad \text{[Equation 1]}$$

In the first exemplary embodiment, since 2 selection signals (Q=2) are taken from ten selection signals (P=10) φV (φVa to φVj), $_PC_Q$=45. That is, combination of two selection signals taken from ten selection signals φV (φVa to φVj) may uniquely designate up to forty-five light-emitting chips, which exceeds forty light-emitting chips used in the first exemplary embodiment.

On the other hand, if two selection signals (Q=2) are taken from nine selection signals φV (φVa to φVi), thus $_PC_Q$=36. In this case, forty light-emitting chips C used in the first exemplary embodiment may not be uniquely designated.

As described above, the reference potential Vsub and the power supply potential Vga are transmitted to the respective light-emitting chips C (the light-emitting chips C1 to C40) in common on the circuit board 62.

The transfer signals φ1, φ2, and the light-up signal φI are also transmitted to the respective light-emitting chips C (the light-emitting chips C1 to C40) in common.

On the other hand, the selection signals φV (φVa to φVj) are transmitted to the light-emitting chips C (the light-emitting chips C1 to C40) based on the combinations shown in FIG. 5.

Now, the number of wiring lines is described.

In a case that the present invention is not applied, forty light-up signal lines 204 are needed assuming that forty light-emitting chips C are provided because the light-up signal φI is transmitted to every light-emitting chip C. In addition, the first transfer signal line 201, the second transfer signal line 202, and the power supply lines 200a and 200b are needed. Therefore, the number of wiring lines provided on the light-emitting device 65 is forty-four.

The light-up signal line 204 needs to have a low resistance in order to transmit a current to the light-emitting thyristors L for lighting. Therefore, a wide wire is needed for the light-up signal line 204 to have a low resistance. Thus, in a case where the first exemplary embodiment is not applied, many thick wires need to be provided on the circuit board 62 of the light-emitting device 65, thereby increasing the area of the circuit board 62.

In the first exemplary embodiment, the number of the light-up signal lines 204 is one as shown in FIG. 4B. Furthermore, the first transfer signal line 201, the second transfer signal line 202, and the power supply lines 200a and 200b are needed. In addition, ten selection signal lines 230 to 239 are needed. Therefore, the total number of wiring lines is fifteen in the first exemplary embodiment.

According to the first exemplary embodiment, the number of wiring lines is about ⅓ of that for the case where the first exemplary embodiment is not applied.

Furthermore, in the first exemplary embodiment, the number of wide wires to transmit a current is reduced to one light-up signal line 204. Since a high current is not passed through the selection signal lines 230 to 239 as described below, the selection signal lines 230 to 239 do not need to be thick in order to have a low resistance. For this reason, the first exemplary embodiment does not need to have many wide wires on the circuit board 62, thereby reducing the area of the circuit board 62.

Figure 6:
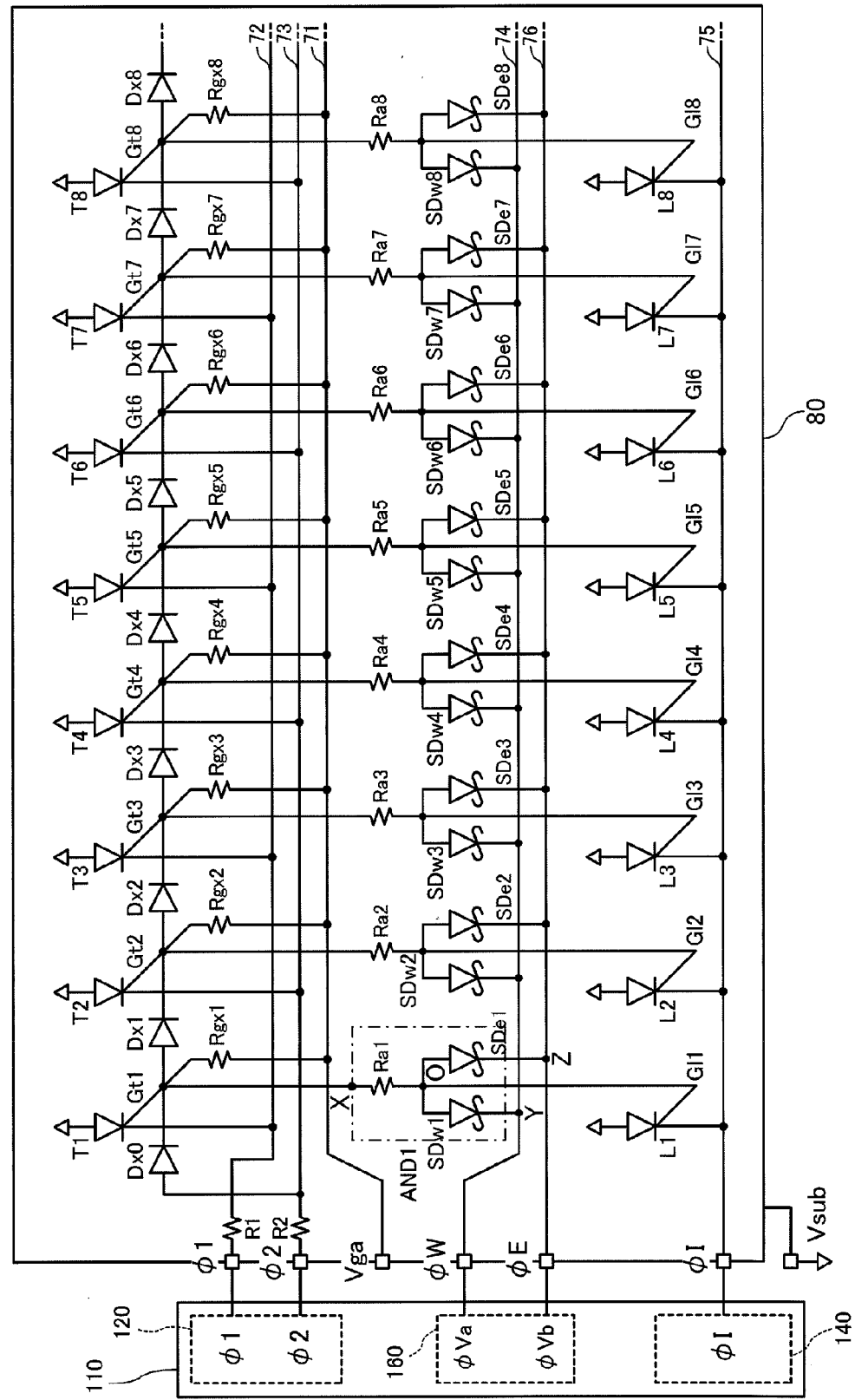
FIG. 6 is an equivalent circuit diagram for illustrating the circuit configuration of the light-emitting chip that is a self-scanning light-emitting device array (SLED) chip according to the first exemplary embodiment.

FIG. 6 is an equivalent circuit diagram for illustrating the circuit configuration of the light-emitting chip C that is a self-scanning light-emitting device array (SLED) chip according to the first exemplary embodiment. In FIG. 6, each device described below except for the input terminals (Vga terminal, φ2 terminal, φW terminal, φE terminal, φ1 terminal and φI terminal) is arranged based on the layout on each light-emitting chip C as described in FIGS. 7A and 7B described later.

Here, the light-emitting chips C are described by using the light-emitting chip C1 as an example. Thus, in FIG. 6, the light-emitting chip C is denoted as the light-emitting chip C1 (C). The configurations of other light-emitting chips C2 to C40 are the same as that of the light-emitting chip C1.

The input terminals (Vga terminal, φ2 terminal, φW terminal, φE terminal, φ1 terminal, φI terminal), although shown at different positions from those in FIG. 4A, are shown at the left end of FIG. 6 for convenience of description.

As described above, the light-emitting chip C1 (C) includes the light-emitting thyristor array (the light-emitting element array 102 (see FIG. 4A)) that includes the light-emitting thyristors L1, L2, L3, . . . , as an example of light-emitting elements, arranged on the substrate 80 (see FIGS. 7A and 7B described below).

Furthermore, the light-emitting chip C1 (C) includes a transfer thyristor array that includes transfer thyristors T1, T2, T3, . . . , arranged in line in a similar manner as the light-emitting thyristor array.

The light-emitting thyristors L1, L2, L3, . . . , when not individually distinguished, are denoted as the light-emitting thyristor L, and the transfer thyristors T1, T2, T3, . . . , when not individually distinguished, are denoted as the transfer thyristor T.

The above-mentioned thyristor (the light-emitting thyristor L, the transfer thyristor T) is a semiconductor device that has three terminals of an anode, a cathode and a gate.

Herein, the anode, cathode and gate terminals of the transfer thyristor T may be referred to as first anode, first cathode and first gate terminals, respectively. Similarly, the anode, cathode and gate terminals of the light-emitting thyristor L may be referred to as second anode, second cathode and second gate terminals, respectively.

As an example of first electrical parts, the light-emitting chip C1 (C) includes coupling diodes Dx1, Dx2, Dx3, . . . , that are located between respective pairs of two adjacent transfer thyristors, taken sequentially from T1, T2, T3, . . . . Between the transfer thyristors T1, T2, T3, . . . , and the light-emitting thyristors L1, L2, L3, . . . , there are provided the Schottky enable diodes SDe1, SDe2, SDe3, . . . , as an example of third electrical parts, the Schottky write diodes SDw1, SDw2, SDw3, . . . , again as an example of the third electrical parts, and connection resistances Ra1, Ra2, Ra3, . . . , each of which is an example of a second electrical part.

The light-emitting chip C1 (C) further includes power supply line resistances Rgx1, Rgx2, Rgx3, . . . .

Similarly to the light-emitting thyristors L, the coupling diodes Dx1, Dx2, Dx3, . . . , the connection resistances Ra1, Ra2, Ra3, . . . , the Schottky enable diodes SDe1, SDe2, SDe3, . . . , the Schottky write diodes SDw1, SDw2, SDw3, . . . , the power supply line resistances Rgx1, Rgx2, Rgx3, when not distinguished, are denoted as a coupling diode Dx, a connection resistance Ra, a Schottky enable diode SDe, a Schottky write diode SDw, a power supply line resistance Rgx, respectively. Although the Schottky enable diode SDe and the Schottky write diode SDw are distinguished herein, it is not necessary to be distinguished.

The number of the light-emitting thyristors L in the light-emitting thyristor array may be a predetermined number. In the first exemplary embodiment, if the number of the light-emitting thyristors L is 128, the number of transfer thyristors T is also 128. Similarly, each number of the connection resistances Ra, the Schottky enable diodes SDe, the Schottky write diodes SDw, and the power supply line resistances Rgx is also 128. However, the number of the coupling diodes Dx is 1 less than that of the transfer thyristors T, i.e., 127.

Note that each number of the transfer thyristors T may be greater than that of the light-emitting thyristors L.

The light-emitting chip C1 (C) includes one start diode Dx0. The light-emitting chip C1 (C) further includes current limitation resistances R1 and R2 to prevent excess current from flowing through a first transfer signal line 72 for transmitting a first transfer signal φ1, and a second transfer signal line 73 for transmitting a second transfer signal φ2 described below.

Note that the light-emitting thyristors L1, L2, L3, . . . , in the light-emitting thyristor array, and the transfer thyristors T1, T2, T3, . . . , in the transfer thyristor array are arranged in an ascending order of the index from the left in FIG. 6. Similarly, the coupling diodes Dx1, Dx2, Dx3, . . . , the connection resistances Ra1, Ra2, Ra3, . . . , the Schottky enable diodes SDe1, SDe2, SDe3, . . . , the Schottky write diodes SDw1, SDw2, SDw3, . . . , and the power supply line resistances Rgx1, Rgx2, Rgx3, . . . , are also arranged in an ascending order of the indices from the left in FIG. 6.

The light-emitting thyristor array and the transfer thyristor array are arranged in the order of the transfer thyristor array, the light-emitting thyristor array from the top to the bottom in FIG. 6.

Next, electrical connection of the elements in the light-emitting chip C1 (C) is described. The anode terminal of each transfer thyristor T and the anode terminal of each light-emitting thyristor L are connected to the substrate 80 of the light-emitting chip C1 (C) (anode common).

These anode terminals are then connected to the power supply line 200a (see FIG. 4B) via Vsub terminal that is a back-side electrode 85 (see FIG. 7B described below) provided on the rear surface of the substrate 80. The reference potential Vsub is supplied to the power supply line 200a.

The cathode terminals of odd-numbered transfer thyristors T1, T3, T5, . . . , are connected to the first transfer signal line 72 along the arrangement of the transfer thyristors T. The first transfer signal line 72 is then connected to the φ1 terminal, which is an input terminal of the first transfer signal φ1, via the current limitation resistance R1. The first transfer signal line 201 (see FIG. 4B) is connected to the φ1 terminal to transmit the first transfer signal φ1.

On the other hand, the cathode terminals of even-numbered transfer thyristors T2, T4, T6, . . . , are connected to the second transfer signal line 73 along the arrangement of transfer thyristors T. The second transfer signal line 73 is then connected to the φ2 terminal, which is an input terminal of the second transfer signal φ2, via the current limitation resistance R2. The second transfer signal line 202 (see FIG. 4B) is connected to the φ2 terminal to transmit the second transfer signal φ2.

The cathode terminal of the light-emitting thyristor L is connected to a light-up signal line 75. The light-up signal line 75 is then connected to the φI terminal that is an input terminal for the light-up signal φI. The light-up signal line 204 (see FIG. 4B) is connected to the φI terminal to transmit the light-up signal φI.

Although not shown in FIG. 6, the current limitation resistance RI is provided between the light-up signal generating part 140 and the φI terminal as shown in FIG. 4B.

Gate terminals Gt1, Gt2, Gt3, . . . , of the transfer thyristors T are connected to the same numbered gate terminals Gl1, Gl2, Gl3, . . . , of the light-emitting thyristors L1, L2, L3, . . . , on one-to-one basis via the connection resistance Ra1, Ra2, Ra3, . . . , respectively.

The gate terminals Gt1, Gt2 Gt3, . . . and the gate terminals Gl1, Gl2, Gl3, when not distinguished, are referred to as a gate terminal Gt and a gate terminal Gl, respectively.

The cathode terminal of the Schottky write diode SDw is connected to a write signal line 74. The write signal line 74 is then connected to the φW terminal to which either one of the selection signals φV (φVa to φVj) is transmitted. The selection signal line 230 (see FIG. 4B) is connected to the φW terminal of the light-emitting chip C1 to transmit the selection signal φVa.

The anode terminal of the Schottky write diode SDw is connected to the gate terminal Gl of the light-emitting thyristor L.

Similarly, the cathode terminal of the Schottky enable diode SDe is connected to an enable signal line 76. The enable signal line 76 is then connected to the φE terminal to which either one of the selection signals φV (φVa to φVj) is transmitted. The selection signal line 231 (see FIG. 4B) is connected to the φE terminal of the light-emitting chip C1 to transmit the selection signal φVb.

The anode terminal of the Schottky enable diode SDe is connected to the gate terminal Gl of the light-emitting thyristor L.

The coupling diodes Dx1, Dx2, Dx3, . . . , are connected between respective pairs of two adjacent gate terminals Gt taken sequentially from the gate terminals Gt1, Gt2, Gt3, . . . , of the transfer thyristors T1, T2, T3, . . . . That is, the coupling diodes Dx1, Dx2, Dx3, . . . , are connected in series so as to be inserted between adjacent gate terminals Gt1 and Gt2, Gt2 and Gt3, Gt3 and Gt4, . . . , respectively. The coupling diode Dx1 is arranged in a direction so that a current flows from the gate terminal Gt1 to the gate terminal Gt2. Other coupling diodes Dx2, Dx3, Dx4, . . . , are also arranged in the same manner.

The gate terminal Gt of the transfer thyristor T is connected to the power supply line 71 via the power supply line resistance Rgx, which is provided to each transfer thyristor T. The power supply line 71 is then connected to Vga terminal. The Vga terminal is connected to the power supply line 200b (see FIG. 4B) to supply the power supply potential Vga.

The gate terminal Gt1 of the transfer thyristor T1, on one side of the transfer thyristor array is connected to the cathode terminal of start diode Dx0. On the other hand, the anode terminal of the start diode Dx0 is connected to the second transfer signal line 73.

Figure 7B:
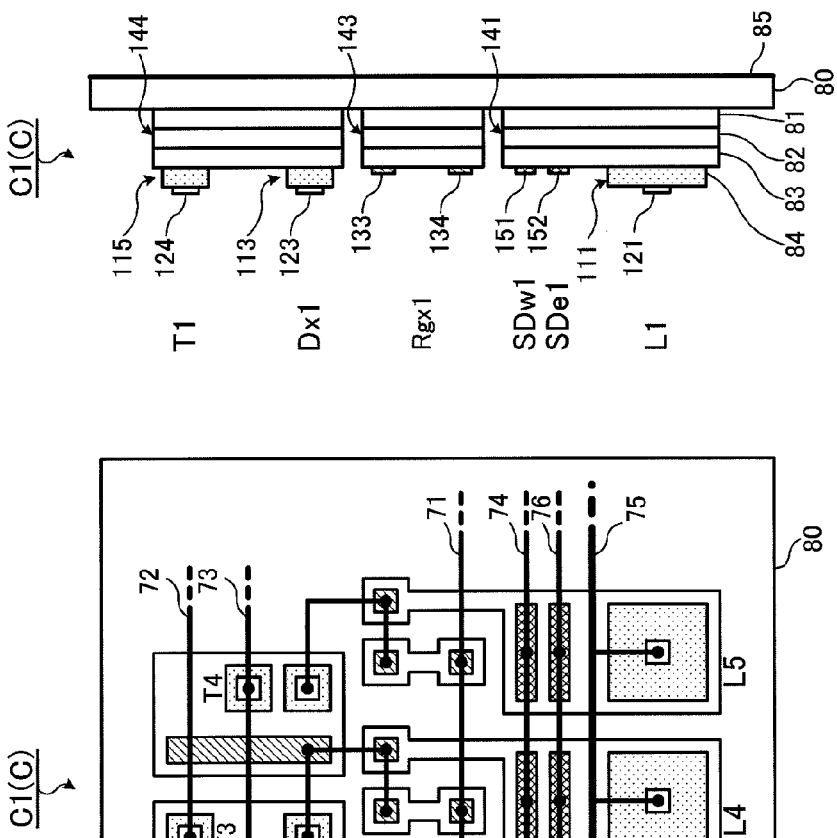
FIGS. 7A and 7B are a layout plan view and a cross-sectional view of the light-emitting chip according to the first exemplary embodiment.
Figure 7A:
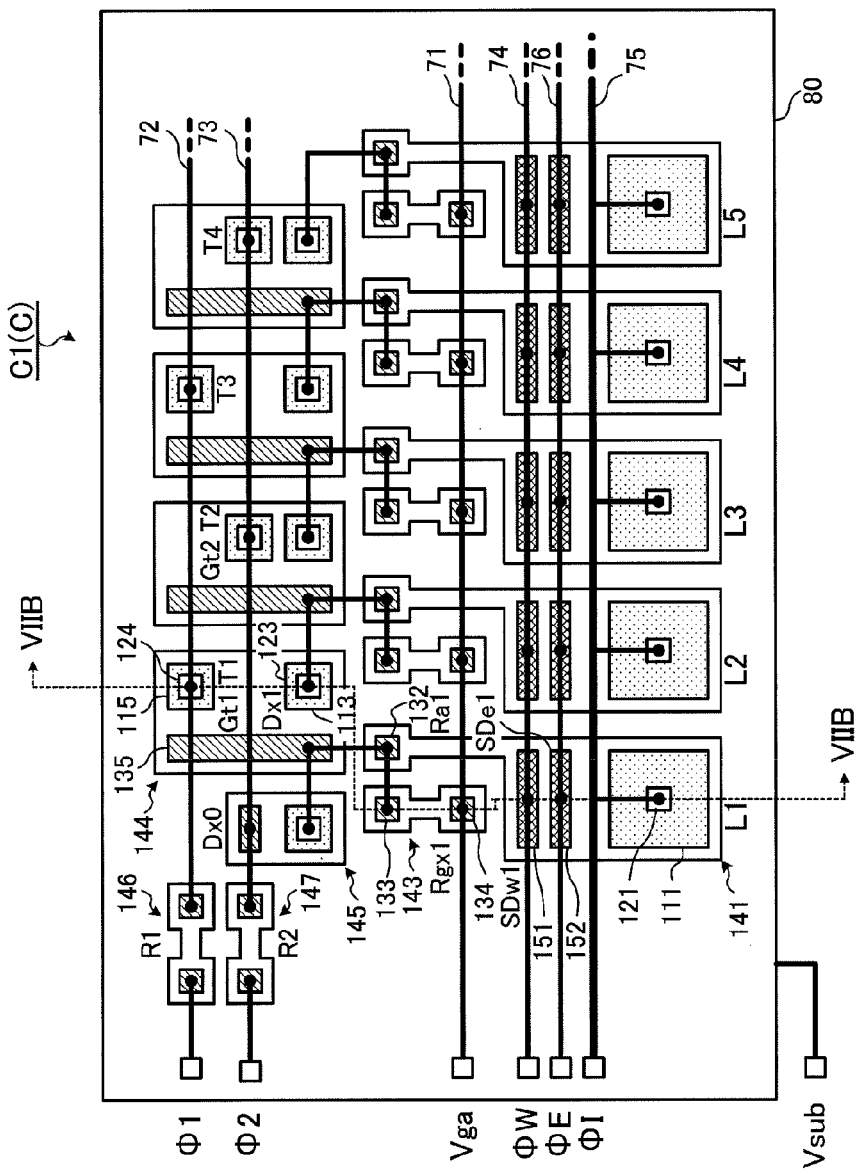

FIGS. 7A and 7B are a layout plan view and a cross-sectional view of the light-emitting chip C according to the first exemplary embodiment. The light-emitting chip C is described using the light-emitting chip C1 as an example. Now, the light-emitting chip C is denoted as the light-emitting chip C1 (C). The configuration of other light-emitting chips C2 to C40 is the same as that of the light-emitting chip C1.

FIG. 7A is a layout plan view of the light-emitting chip C1 (C), and shows the part centered on the light-emitting thyristors L1 to L5 and the transfer thyristors T1 to T4. FIG. 7B is a cross-sectional view taken along the line VIIB-VIIB shown in FIG. 7A. Thus, FIG. 7B shows the cross sections of the light-emitting thyristor L1, the Schottky enable diode SDe1, the Schottky write diode SDw1, the power supply line resistance Rgx1, the coupling diode Dx1, and the transfer thyristor T1 in the order from the bottom to the top of FIG. 7B. In FIGS. 7A and 7B, main elements and terminals are denoted by their names.

In FIG. 7A, wiring lines connecting between the elements are shown by solid lines. In FIG. 7B, wiring lines connecting between the elements are omitted.

As shown in FIG. 7B, the light-emitting chip C1 (C) includes multiple islands (a first island 141, a third island 143, a fourth island 144, a fifth island 145, a sixth island 146, and a seventh island 147) that are separated to each other where the islands are formed in a semiconductor such as GaAs or GaAlAs by stacking a p-type substrate 80, a p-type first semiconductor layer 81, a n-type second semiconductor layer 82, a p-type third semiconductor layer 83, and a n-type fourth semiconductor layer 84 sequentially from lower to upper levels, and continuously etching the surrounding p-type first semiconductor layer 81, the n-type second semiconductor layer 82, the p-type third semiconductor layer 83, and the n-type fourth semiconductor layer 84.

Note that the first exemplary embodiment does not include a second island 142 (see FIGS. 24A and 24B described below), which is included according to the eighth exemplary embodiment described below.

As shown in FIG. 7A, the first island 141 has a rectangular plan view having an extended portion, and includes the light-emitting thyristor L1, the Schottky write diode SDw1, the Schottky enable diode SDe1, and the connection resistance Ra. The third island 143 has a plan view having enlarged ends, and includes the power supply line resistance Rgx. The fourth island 144 has a rectangular plan view, and includes the transfer thyristor T1 and the coupling diode Dx1. The fifth island 145 has a rectangular plan view, and includes the start diode Dx0. The sixth island 146 and the seventh island 147 have a plan view having enlarged ends, and the sixth island 146 includes the current limitation resistance R1, and the seventh island 147 includes the current limitation resistance R2.

In the light-emitting chip C1 (C), islands similar to the first island 141, the third island 143 and the fourth island 144 are formed in parallel. These islands includes the light-emitting thyristors L2, L3, L4, . . . , the power supply line resistances Rgx2, Rgx3, Rgx4, . . . , the transfer thyristors T2, T3, T4, . . . , etc. in a similar manner as the first island 141, the third island 143, and the fourth island 144. Description of these is omitted.

Also, the rear surface of the substrate 80 includes the backside electrode 85 as Vsub terminal.

The first island 141, the third island 143, the fourth island 144, the fifth island 145, the sixth island 146, and the seventh island 147 are further described in detail with reference to FIGS. 7A and 7B.

The light-emitting thyristor L1 included in the first island 141 has an anode terminal of the substrate 80, a cathode terminal of an n-type ohmic electrode 121 formed on a region 111 of the n-type fourth semiconductor layer 84, and a gate terminal G11 of the p-type third semiconductor layer 83 which has been exposed after etching to remove the n-type fourth semiconductor layer 84. Note that the gate terminal G11 is not formed as an electrode. Light is emitted from the surface of the region 111 of the n-type fourth semiconductor layer 84 except the portion of the n-type ohmic electrode 121.

The Schottky write diode SDw1 included in the first island 141 has an anode terminal of the p-type third semiconductor layer 83, and a cathode terminal of a Schottky electrode 151 formed on the p-type third semiconductor layer 83 which has been exposed after etching to remove the n-type fourth semiconductor layer 84.

Similarly, the Schottky enable diode SDe1 included in the first island 141 has an anode terminal of the p-type third semiconductor layer 83, and a cathode terminal of a Schottky electrode 152 formed on the p-type third semiconductor layer 83 which has been exposed after etching to remove the n-type fourth semiconductor layer 84.

The gate terminal G11 of the light-emitting thyristor L1, the anode terminal of the Schottky write diode SDw1, and the anode terminal of the Schottky enable diode SDe1 are the p-type third semiconductor layer 83 of the first island 141 in common.

The p-type third semiconductor layer 83 of the first island 141 has the connection resistance Ra1 at the extended portion in a plan view, and the p-type ohmic electrode 132 is formed at the tip of the extended portion. That is, the connection resistance Ra1 uses the p-type third semiconductor layer 83 between the Schottky electrode 151 and the p-type ohmic electrode 132 as the resistance.

The power supply line resistance Rgx1 included in the third island 143 is formed between two p-type ohmic electrodes 133 and 134 formed on the p-type third semiconductor layer 83. The power supply line resistance Rgx1 uses the p-type third semiconductor layer 83 between two p-type ohmic electrodes 133 and 134 as the resistance.

The transfer thyristor T1 included in the fourth island 144 has an anode terminal of the substrate 80, a cathode terminal of an n-type ohmic electrode 124 formed on a region 115 of the n-type fourth semiconductor layer 84, and a gate terminal Gt1 of a p-type ohmic electrode 135 formed on the p-type third semiconductor layer 83 which has been exposed after etching to remove the n-type fourth semiconductor layer 84.

Similarly, the coupling diode Dx1 included in the fourth island 144 is formed so as to have a cathode terminal of an n-type ohmic electrode 123 provided on a region 113 of the n-type fourth semiconductor layer 84, and an anode terminal of the p-type third semiconductor layer 83. The p-type third semiconductor layer 83 as the anode terminal is connected to the gate terminal Gt1 of the transfer thyristor T1.

The start diode Dx0 included in the fifth island 145 has a cathode terminal of an n-type ohmic electrode (with no reference numeral) formed on a region (with no reference numeral) of the n-type fourth semiconductor layer 84 an anode terminal of a p-type ohmic electrode (with no reference numeral) formed on the p-type third semiconductor layer 83 which has been exposed after removing the n-type fourth semiconductor layer 84.

In a similar manner as the power supply line resistance Rgx1 included in the third island 143, the current limitation resistance R1 included in the sixth island 146 and the current limitation resistance R2 included in the seventh island 147 use the p-type third semiconductor layer 83 as the resistance, which is located between a pair of p-type ohmic electrodes (with no reference numeral) formed on the p-type third semiconductor layer 83 which has been exposed after removing the n-type fourth semiconductor layer 84.

Connection relationship between the elements in FIG. 7A is described.

In the first island 141, the p-type third semiconductor layer 83 of the first island 141, which is the gate terminal G11 of the light-emitting thyristor L1, serves as the anode terminal of the Schottky write diode SDw1, as well as the anode terminal of the Schottky enable diode SDe1 and one terminal of the connection resistance Ra1, thus these terminals are connected to each other.

The p-type ohmic electrode 132, which is the other terminal of the connection resistance Ra1, is connected to the p-type ohmic electrode 135 that is the gate terminal Gt1 of the transfer thyristor T1.

The n-type ohmic electrode 121, which is the cathode terminal of the light-emitting thyristor L1, is connected to the light-up signal line 75. The light-up signal line 75 is connected to φI terminal.

The Schottky electrode 151, which is the cathode terminal of the Schottky write diode SDw1, is connected to the write signal line 74. The write signal line 74 is connected to φW terminal.

The Schottky electrode 152, which is the cathode terminal of the Schottky enable diode SDe1, is connected to the enable signal line 76. The enable signal line 76 is connected to φE terminal.

The p-type ohmic electrode 133, which is one terminal of the power supply line resistance Rgx1 included in the third island 143, is connected to the p-type ohmic electrode 132 that is the other terminal of the connection resistance Ra1 included in the first island 141. The p-type ohmic electrode 134, which is the other terminal of the power supply line resistance Rgx1, is connected to the power supply line 71. The power supply line 71 is connected to the Vga terminal.

The n-type ohmic electrode 124, which is the cathode terminal of the transfer thyristor T1 included in the fourth island 144, is connected to the first transfer signal line 72. The first transfer signal line 72 is connected to φ1 terminal via the current limitation resistance R1 included in the sixth island 146.

The n-type ohmic electrode 123, which is the cathode terminal of the coupling diode Dx1 included in the fourth island 144, is connected to a p-type ohmic electrode (with no reference numeral) that is the gate terminal Gt2 of the transfer thyristor T2 provided adjacent to the n-type ohmic electrode 123.

On the other hand, the p-type ohmic electrode 135, which is the gate terminal Gt1 of the transfer thyristor T1 included in the fourth island 144, is connected to an n-type ohmic electrode (with no reference numeral) formed on the n-type fourth semiconductor layer 84 that is the cathode terminal of the start diode Dx0 included in the fifth island 145.

A p-type ohmic electrode (with no reference numeral) formed on the p-type third semiconductor layer 83, which is the anode terminal of the start diode Dx0 included in the fifth island 145, is connected to an n-type ohmic electrode (with no reference numeral) formed on the n-type fourth semiconductor layer 84, which is the cathode terminal of even numbered n-type transfer thyristors T2, T4, T6, . . . , as well as to φ2 terminal via the current limitation resistance R2 included in the seventh island 147.

Similar connection relationship, although its description is omitted herein, apply to other light-emitting thyristors L, transfer thyristors T, coupling diodes Dx, and the Schottky write diodes SDw, the Schottky enable diodes SDe, connection resistances Ra, and power supply line resistances Rgx.

The circuit configuration of the light-emitting chip C1 (C) shown in FIG. 6 is formed as described above.

Now, operation of the light-emitting device 65 is described.

Figure 4:
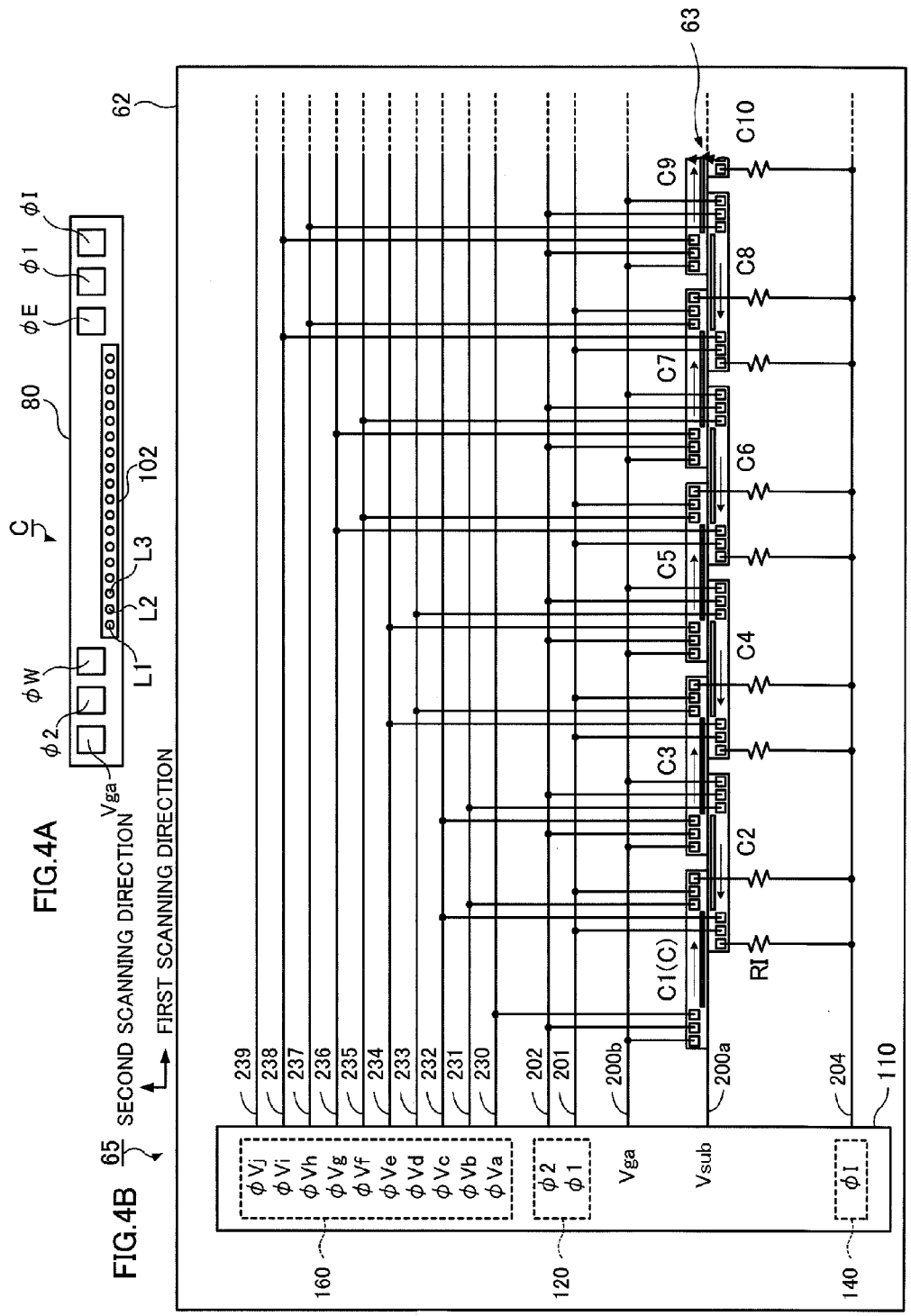
FIGS. 4A and 4B are a diagram showing a configuration of a light-emitting chip, a configuration of a signal generating circuit of a light-emitting device and a wiring configuration on a circuit board according to the first exemplary embodiment.

The light-emitting device 65 includes the light-emitting chips C (the light-emitting chips C1 to C40) (see FIGS. 3 to 4B).

As shown in FIG. 4B, the reference potential Vsub and the power supply potential Vga are supplied to all the light-emitting chips C (the light-emitting chips C1 to C40) on the circuit board 62 in common. The first transfer signal φ1, the second transfer signal φ2, and the light-up signal (pi are transmitted to all the light-emitting chips C in common. Thus, all the light-emitting chips C (the light-emitting chips C1 to C40) are driven in parallel (simultaneously).

As shown in FIG. 5, a combination of two of the selection signals φV (φVa to φVj) is transmitted to uniquely designate one of the light-emitting chips C (the light-emitting chips C1 to C40).

Figure 8:
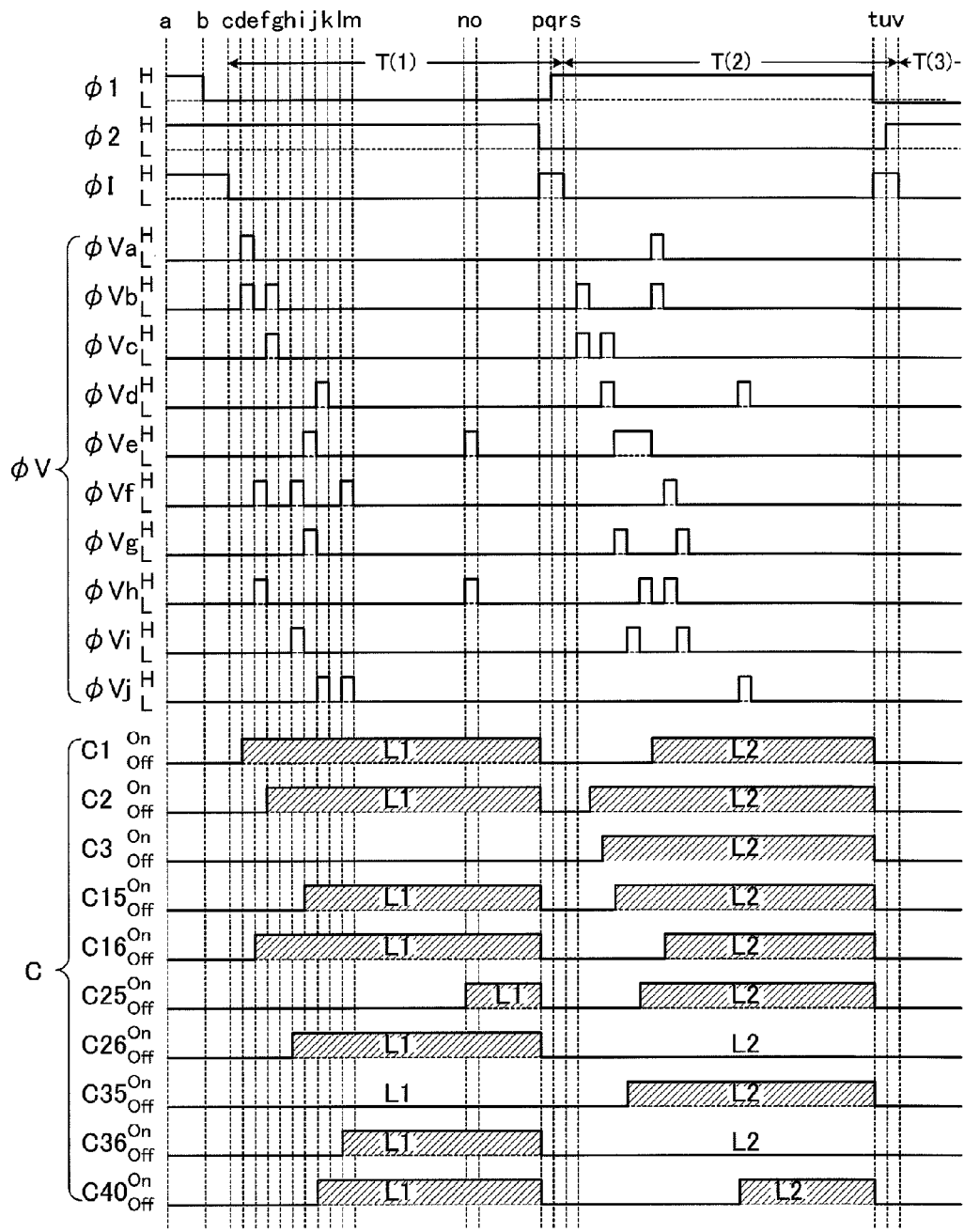
FIG. 8 is a timing chart for illustrating operations of the light-emitting chip according to the first exemplary embodiment.

FIG. 8 is a timing chart for illustrating operations of the light-emitting chip C according to the first exemplary embodiment.

In FIG. 8, the operation of light-emitting chips C1, C2, C3, C15, C16, C25, C26, C35, C36 and C40 selected from the light-emitting chips C (the light-emitting chips C1 to C40) of the light-emitting device 65 is described. The operations of other light-emitting chips C are similar to the above.

FIG. 8 shows the timing chart centered on the operation to control whether or not to light up the light-emitting thyristors L1 and L2 in each light-emitting chip C. In the following, control of whether or not to light up the light-emitting thyristor L is referred to as lighting control.

In FIG. 8, time elapses in alphabetical order from a time point a to a time point v. Lighting control of the light-emitting thyristor L1 of each light-emitting chip C is made during a time interval T(1) from a time point c to a time point r. Lighting control of the light-emitting thyristor L2 of each light-emitting chip C is made during a time interval T(2) from the time point r to the time point v. Lighting control of the light-emitting thyristor L3 of each light-emitting chip C is made during a time interval T(3) from the time point v. In a similar manner, lighting control of the light-emitting thyristor Ln (n≥4) is made.

In the first exemplary embodiment, time intervals T(1), T(2), T(3), . . . , have the same length, and, when not distinguished, are referred to as time interval T.

The length of time interval T may be variable as long as mutual relationship between signals described below is maintained.

The signal waveforms of the first transfer signal φ1, the second transfer signal φ2, and the light-up signal φI are periodic. That is, the first transfer signal φ1 and the second transfer signal φ2 repeat with a period 2×T, which is the sum of T(1) and T(2). The light-up signal φI repeats with a period of T.

On the other hand, each selection signal φV (φVa to φVj) changes according to received image data as described below, and controls whether or not to light up the light-emitting thyristor L of designated light-emitting chip C.

The time interval from the time point a to the time point c is for the light-emitting chip C to start its operation. Signals in this time interval are described in the description of the operation below.

The signal waveforms of the first transfer signal φ1 and the second transfer signal φ2 at time intervals T(1) and T(2) are described.

The first transfer signal φ1 at the start time point c of the time interval T(1) has a low-level electrical potential (hereinafter referred to as "L"), and shifts to a high-level electrical potential (hereinafter referred to as "H") at a time point q, then shifts from "H" to "L" at a time point t, and is maintained at "L" at the time point v, which is the end time point of the time interval T(2).

The second transfer signal φ2 has "H" at the start time point c of the time interval T(1), and shifts from "H" to "L" at a time point p, then shifts from "L" to "H" at a time point u, and is maintained at "H" at the end time point v of the time interval T(2).

Now, comparing the first transfer signal φ1 with the second transfer signal φ2, it is seen that the waveform of the first transfer signal φ1 in the time interval T(1) is that of the second transfer signal φ2 in the time interval T(2). The waveform of the second transfer signal φ2 in the time interval T(1) is that of the first transfer signal φ1 in the time interval T(2).

That is, the first transfer signal φ1 and the second transfer signal φ2 are signal waveforms that repeat with a period of 2×time interval T. The first and second transfer signals φ1 and φ2 alternately repeat "H" and "L" before and after every time interval such as the time interval from the time point p to the time point q when both signals are "L." The first transfer signal φ1 and the second transfer signal φ2 do not share a time interval when both signals are "H" except for the time interval from the time point a to a time point b.

By a pair of transfer signals of the first transfer signal φ1 and the second transfer signal φ2, the transfer thyristors T shown in FIG. 6 are sequentially turned on as described below, and set light-emitting thyristor L, which is control target for lighting up and not lighting up (lighting control).

The signal waveform of the light-up signal φI is described.

The light-up signal φI shifts from "H" to "L" at the start time point c of the time interval T(1), and shifts from "L" to "H" at the time point p. The light-up signal φI is maintained at "H" at the end time point r of the time interval T(1). This signal waveform repeats on and after the time interval T(2).

The light-up signal φI is a signal that supplies the current for lighting (emitting) to the light-emitting thyristor L as described below.

Next, the signal waveform of the selection signal φV is described.

The selection signal φV is a signal that changes according to received image data and controls whether or not to light up the light-emitting thyristor L of the designated light-emitting chip C.

For example, the selection signal φVa is "L" at the start time point c of the time interval T(1), shifts from "L" to "H" at a time point d, and shifts from "H" to "L" at a time point e. The selection signal φVa then is maintained at "L" at the end time point r of the time interval T(1). On the other hand, the selection signal φVb is "L" at the start time point c of the time interval T(1), shifts from "L" to "H" at the time point d, and shifts from "H" to "L" at the time point e. The selection signal φVb then shifts from "L" to "H" at a time point f, and shifts from "H" to "L" at a time point g. The selection signal φVb then is maintained at "L" at the end time point r of the time interval T(1).

The selection signal φV is "L" at the start time point c of the time interval T(1), and is maintained at "L" at the end time point r of the time interval T(1). The selection signal φV has time interval(s) for "H" according to image data in the time interval from the time point c to the time point p when the light-up signal φI is "L."

Before the operation of the light-emitting device 65 and the light-emitting chip C is described, basic operation of the thyristors (transfer thyristors T, the light-emitting thyristors L) is described. The thyristor is a semiconductor device that has three terminals: an anode terminal, a cathode terminal, and a gate terminal.

In the following, as an example, the reference potential Vsub supplied to Vsub terminal, which is an anode terminal of the thyristor, is 0 V ("H"), and the power supply potential Vga supplied to the Vga terminal is −3.3 V ("L") as shown in FIGS. 6 and 7. The thyristor is configured by stacking p-type semiconductor layers and n-type semiconductor layers based on GaAs, GaAlAs, and the like as shown in FIGS. 7A and 7B. The diffusion potential (forward direction potential) Vd of pn junction is assumed to be 1.5 V, and the forward direction potential Vs of Schottky junction (barrier) is assumed to be 0.5 V. These values are used for the following description.

The thyristor in an OFF state where no current flows between the anode and cathode terminals, shifts to an ON state (turns on) when a potential lower than threshold voltage V (greater potential to the negative side) is applied to the cathode terminal. The thyristor, when turned on, shifts to a state (ON state) where a current flows between the anode and cathode terminals. Here, the threshold voltage of the thyristor is the potential of the gate terminal minus the diffusion potential Vd. Thus, if the potential of the gate terminal of the thyristor is −1.5 V, the threshold voltage is −3.0 V. That is, when a voltage lower than −3.0 V is applied to the cathode terminal, the thyristor is turned on.

When the thyristor is in an ON state, the gate terminal has a potential close to that of the anode terminal of the thyristor. Since the anode terminal is assumed to be 0 V ("H") herein, the following description is given under the assumption that the potential of the gate terminal is 0 V ("H"). The cathode terminal of the thyristor in an ON state has the diffusion potential Vd of the pn junction. In this state, the potential of the cathode terminal is −1.5 V.

Once the thyristor is turned on, the thyristor maintains the ON state until the potential of the cathode terminal becomes higher than a certain potential which is required to maintain an ON state (lower potential on the negative side). Since the potential of the cathode terminal of the thyristor in an ON state is −1.5 V, the thyristor shifts to an OFF state (turns off) when a potential higher than −1.5 V is applied to the cathode terminal. For example, when the cathode terminal becomes "H" (0 V), the cathode terminal has the same potential as that of the anode terminal, thus the thyristor is turned off.

On the other hand, as long as a potential lower than −1.5 V is continuously applied to the cathode terminal to supply a current allowing an ON state of the thyristor to be maintained, the thyristor maintains the ON state.

From the above description, the thyristor, once in an ON state, maintains the state where the current flows, and does not shift to an OFF state by the potential of the gate terminal. That is, the thyristor has a function to maintain (store and hold) an ON state.

As described above, the potential continuously applied to the cathode terminal to maintain an ON state of the thyristor (maintenance potential) may be higher (lower in the absolute value) than the potential applied to the cathode terminal to turn on the thyristor.

The light-emitting thyristor L is lighted up (emits light) when turned on, and is not lighted up (emits no light) when turned off. The light-emitting output (luminance) of the light-emitting thyristor L in an ON state is determined by the current flowing between the cathode and anode terminals.

Before the operation of the light-emitting chip C is described, the operation of the Schottky write diode SDw and Schottky enable diode SDe is described.

The Schottky write diode SDw, the Schottky enable diode SDe, and the connection resistance Ra constitute a 3-input AND circuit AND1.

The 3-input AND circuit AND1 is described with the Schottky write diode SDw1, the Schottky enable diode SDe1, and the connection resistance Ra1 enclosed by the dashed dotted line shown in FIG. 6.

In the 3-input AND circuit AND1, one terminal O of the connection resistance Ra1 is connected to the anode terminal of the Schottky write diode SDw1 and the anode terminal of the Schottky enable diode SDe1. Another terminal X of the connection resistance Ra1 is connected to the gate terminal Gt1 of the transfer thyristor T1. A cathode terminal Y of the Schottky write diode SDw1 is connected to the write signal line 74, and a cathode terminal Z of the Schottky enable diode SDe1 is connected to the enable signal line 76. As described above, the write signal line 74 is connected to the φW terminal, and the enable signal line 76 is connected to the φE terminal.

One terminal O of the connection resistance Ra1 is connected to the gate terminal G11 of the light-emitting thyristor L1.

The terminal X, the terminal Y, and the terminal Z serve as an input terminal, and the terminal O serves an output terminal. As described below, when all potentials (signals) of the terminal X, the terminal Y, and the terminal Z become "H" (0 V), the potential (signal) of the terminal O becomes "H" (0 V). Thus, the 3-input AND circuit AND1 serves as an AND circuit with 3 inputs.

Table 1 shows a relationship between the potential (denoted as φW(Y)) of the φW terminal (terminal Y of the 3-input AND circuit AND1), the potential (denoted as φE(Z)) of the φE terminal (terminal Z of the 3-input AND circuit AND1), and the potential (denoted as Gl(O)) of the terminal O when the potential of the other terminal X (denoted as Gt(X)) of the connection resistance Ra1 is "H" (0 V).

That is, when both φW(Y) and φE(Z) are "H" (0 V), the 3-input AND circuit AND1 serves as AND, and Gl(O) is "H" (0 V). However, when either one or both φW(Y) and φE(Z) are "L" (−3.3 V), a voltage is applied to either one or both of the Schottky write diode SDw1 and the Schottky enable diode SDe1 in forward direction (forward bias), then Gl(O) becomes −2.8 V which is "L" (−3.3 V) minus the forward direction potential Vs (−0.5 V) of the Schottky junction.

TABLE 1

|  | Gl (O) | φE (Z) "H" (0 V) | φE (Z) "L" (−3.3 V) |
|---|---|---|---|
| φW (Y) | "H" (0 V) | "H" (0 V) | −2.8 V |
|  | "L" (−3.3 V) | −2.8 V | −2.8 V |

Table 2 shows a relationship between φW(Y), φE(Z) and Gl(O) when the potential of the other terminal X (denoted as Gt(X)) of the connection resistance Ra1 is −1.5 V.

Since Gt(X) is −1.5 V, if both φW(Y) and φE(Z) are "H" (0 V), a potential is applied to both of the Schottky write diode SDw1 and the Schottky enable diode SDe1 in reverse direction (reverse bias). Thus, the condition that both φW(Y) and φE(Z) are "H" (0 V) does not affect to Gl(O), and Gl(O) becomes −1.5 V i.e., the potential Gt(X).

If either one or both of φW(Y) and φE(Z) are "L" (−3.3 V), either one or both of the Schottky write diode SDw1 and the Schottky enable diode SDe1 have a forward bias, thus the Gl(O) becomes −2.8 V which is Gt(X) minus the forward direction potential Vs (−0.5 V) of the Schottky junction.

TABLE 2

|  | Gl(O) | φE(Z) "H"(0 V) | φE(Z) "L"(−3.3 V) |
|---|---|---|---|
| φW(Y) | "H"(0 V) | −1.5 V | −2.8 V |
|  | "L"(−3.3 V) | −2.8 V | −2.8 V |

Table 3 shows a relationship between φW(Y), φE(Z) and Gl(O) when the potential of the other terminal X (denoted as Gt(X)) of the connection resistance Ra1 is −3 V.

That is, since Gt(X) is −3 V, if both φW(Y) and φE(Z) are "H" (0 V), both of the Schottky write diode SDw1 and the Schottky enable diode SDe1 have a reverse bias. Thus, the condition that both φW(Y) and φE(Z) are "H" (0 V) does not affect to Gl(O), and Gl(O) becomes −3 V i.e., the potential Gt(X).

Even if either one or both of the φW(Y) and φE(Z) are changed to "L" (−3.3 V), the difference between the potential Gt(X) and −3.3 V is not greater than the forward direction potential Vs (−0.5 V) of the Schottky junction, so neither of the Schottky write diode SDw1 nor the Schottky enable diode SDe1 has a forward bias, thus the Gl(O) remains at −3 V which is the potential Gt(X).

That is, if the potential (Gt(X)) of the terminal X of the 3-input AND circuit AND1 is less than −2.8 V which is "L" (−3.3 V) minus the forward direction potential Vs (−0.5 V) of the Schottky junction, the potential Gl(O) is the same as the potential Gt(X), and is independent of the change of the potential of φW(Y) and φE(Z).

TABLE 3

|  | Gl(O) | φE(Z) "H"(0 V) | φE(Z) "L"(−3.3 V) |
|---|---|---|---|
| φW(Y) | "H"(0 V) | −3 V | −3 V |
|  | "L"(−3.3 V) | −3 V | −3 V |

Although the 3-input AND circuit AND1 is described here with the Schottky write diode SDw1, Schottky enable diode SDe1, and the connection resistance Ra1; however other AND circuit may be similarly described with other Schottky write diodes SDw, Schottky enable diodes SDe, and connection resistance Ra.

The operations of the light-emitting device 65 are described according to the timing chart shown in FIG. 8 with reference to FIGS. 4A to 6.

(1) Time Point a

The state (initial state) of the light-emitting device 65 at the time point a, at which the reference potential Vsub and the power supply potential Vga are started to be supplied, is described.

<Light-Emitting Device 65>

At the time point a in the timing chart shown in FIG. 8, the potential of the power supply line 200a is set to the reference potential Vsub of "H" (0 V), and the potential of the power supply line 200b is set to the power supply potential Vga of "L" (−3.3 V) (see FIG. 4B). Thus, the Vsub and the Vga terminals of each light-emitting chip C (the light-emitting chips C1 to C40) are set to "H" and "L," respectively (see FIG. 6).

The transfer signal generating part 120 of the signal generating circuit 110 sets both of the first and the second transfer signals φ1 and φ2 to "H." Then, the first transfer signal line 201 and the second transfer signal line 202 are set to "H" (see FIG. 4B). Accordingly, the φ1 and the φ2 terminals of each light-emitting chip C (the light-emitting chips C1 to C40) are set to "H." The potential of the first transfer signal line 72 connected to the φ1 terminal via the current limitation resistance R1 is also set to "H," and the potential of the second transfer signal line 73 connected to the φ1 terminal via the current limitation resistance R2 is also set to "H."

Furthermore, the light-up signal generating part 140 of the signal generating circuit 110 sets the light-up signal φI to "H." Then, the light-up signal line 204 is set to "H" (see FIG. 4B). Accordingly, the φ1 terminal of each light-emitting chip C is set to "H." The light-up signal line 75 connected to the φI terminal is also set to "H" (see FIG. 6).

The signal generating part 160 of the signal generating circuit 110 sets the selection signal φV (φVa to φVj) to "L." Then, the selection signal lines 230 to 239 are set to "L" (see FIG. 4B). Accordingly, the φW and φE terminals of each light-emitting chip C (the light-emitting chips C1 to C40) are set to "L" (see FIG. 6). The write signal line 74 connected to the φW terminal and the enable signal line 76 connected to the φE terminal are also set to "L." (See FIG. 6).

Next, the operation of the light-emitting chips C1, C2, C3, C15, C16, C25, C26, C35, C36 and C40 selected from the light-emitting chips C (the light-emitting chips C1 to C40) is described according to the timing chart shown in FIG. 8 with reference to FIGS. 5 and 6.

Although the potential of each terminal is assumed to change in a step-like manner in FIG. 8 and the following description, the potential of each terminal actually changes gradually. Thus, even while the potential is changing, as long as the below-mentioned conditions are satisfied, the thyristor changes its state to turn-on or turn-off state.

<Light-Emitting Chip C>

Since the anode terminals of the transfer thyristor T and the light-emitting thyristor L are connected to the Vsub terminal, these terminals are set to "H."

On the other hand, respective cathode terminals of odd-numbered transfer thyristors T1, T3, T5, . . . , are connected to the first transfer signal line 72 and are set to "H." Respective cathode terminals of even-numbered transfer thyristors T2, T4, T6, . . . , are connected to the second transfer signal line 73 and are set to "H." That is, both the anode and cathode terminals of the transfer thyristor T are set to "H," thus the transfer thyristor T is in an OFF state.

Similarly, the cathode terminal of the light-emitting thyristor L is connected to the light-up signal line 75 and is set to "H." That is, both the anode and cathode terminals of the light-emitting thyristor L are set to "H," thus the light-emitting thyristor L is in an OFF state.

The gate terminal Gt of the transfer thyristor T is connected to the power supply line 71 via the power supply line resistance Rgx. The power supply line 71 is set at the power supply potential Vga of "L" (−3.3 V). Thus, the potential of the gate terminal Gt is "L" except for the gate terminals Gt1 and Gt2 described below.

The gate terminal Gl of the light-emitting thyristor L is connected to the gate terminal Gt via the connection resistance Ra. Thus, the potential of the gate terminal Gl connected to the gate terminal Gt with the potential "L" (−3.3 V) except for the gate terminals Gt1 and Gt2 via the connection resistance Ra is "L" (−3.3 V), which is the potential of the gate terminal Gt, as described in Table 3.

From the above description, the threshold voltages of the transfer thyristor T and the light-emitting thyristor L except the transfer thyristors T1, T2 and the light-emitting thyristor L1, L2 described below are −4.8 V, which is the potential of respective gate terminals Gt, Gl (−3.3 V) minus the diffusion potential Vd (1.5 V) of the pn junction.

The gate terminal Gt1 at one end of the transfer thyristor array in FIG. 6 is connected to the cathode terminal of the start diode Dx0 as described above. The anode terminal of the start diode Dx0 is connected to the second transfer signal line 73. The second transfer signal line 73 is set to "H." Then, the start diode Dx0 is forward biased with the anode terminal at "L" and the cathode terminal at "H." Accordingly, the potential of the cathode terminal (the gate terminal Gt1) of the start diode Dx0 is set to the value (−1.5 V) which is "H" (0 V) at the anode terminal of the start diode Dx0 minus the diffusion potential Vd (1.5 V) of the start diode Dx0. Therefore, the threshold voltage of transfer thyristor T1 is set to −3 V which is the potential (−1.5 V) of the gate terminal Gt1 minus the diffusion potential Vd (1.5 V).

The potential of the gate terminal Gl1 is set to −2.8 V from Table 2, and the threshold voltage of the light-emitting thyristor L1 is set to −4.3 V.

The gate terminal Gt2 of the transfer thyristor T2 adjacent to the transfer thyristor T1 is connected to the gate terminal Gt1 via the coupling diode Dx1. The potential of the gate terminal Gt2 of the transfer thyristor T2 is set to −3 V which is the potential (−1.5 V) of the gate terminal Gt1 minus the diffusion potential Vd (1.5 V) of the coupling diode Dx1. Therefore, the threshold voltage of the transfer thyristor T2 is set to −4.5 V.

The potential of the gate terminal Gl2 is set to −3 V from Table 3, and the threshold voltage of the light-emitting thyristor L2 is set to −4.5 V.

(2) Time Point b

At the time point b shown in FIG. 8, the first transfer signal φ1 shifts from "H" (0 V) to "L" (−3.3 V). Thereby, the light-emitting device 65 enters an operating state.

<Light-Emitting Chip C>

The transfer thyristor T1 with a threshold voltage of −3 V is turned on. However, since the threshold voltage of odd-numbered transfer thyristors Tn (n≥3) is −4.8 V, thus those transfer thyristors T may not be turned on. On the other hand, the transfer thyristor T2 with a threshold voltage of −4.5 V may not be turned on because the second transfer signal φ2a is "H" (0 V).

When the transfer thyristor T1 is turned on, the potential of the gate terminal Gt1 becomes "H" (0 V) at the anode terminal. The potential of the cathode terminal of the transfer thyristor T1 (the first transfer signal line 72 in FIG. 6) becomes −1.5 V which is "H" (0 V) at the anode terminal of the transfer thyristor T1 minus the diffusion potential Vd (1.5 V) of the pn junction. The potential of the cathode terminal (the gate terminal Gt2) of the coupling diode Dx1 with a forward bias becomes −1.5 V which is "H" (0 V) at the anode terminal (the gate terminal Gt1) minus the diffusion potential Vd (1.5 V). Accordingly, the threshold voltage of the transfer thyristor T2 becomes −3 V.

The potential of the gate terminal Gt3 connected to the gate terminal Gt2 of the transfer thyristor T2 via the coupling diode Dx2 becomes −3 V. Accordingly, the threshold voltage of the transfer thyristor T3 becomes −4.5 V. Since the potential of the gate terminal Gt of the transfer thyristors Tn (n≥4) is at "L" from the power supply potential Vga, the threshold voltage of these transfer thyristors is maintained at −4.8 V.

On the other hand, although the potential of the gate terminal Gt1 becomes "H" (0 V) after the transfer thyristor T1 is turned on, the potential of the gate terminal Gl1 is maintained at −2.8 V as shown in Table 1, and the threshold voltage of the light-emitting thyristor L1 is −4.3 V. On the other hand, when the potential of gate terminal Gt2 becomes −1.5 V, the potential of the gate terminal Gl2 becomes −2.8 V, and the threshold voltage of the light-emitting thyristor L2 becomes −4.3 V as shown in Table 2. Since the potential of the gate terminal Gt3 becomes −3 V, the threshold voltage of the light-emitting thyristor L3 becomes −4.5 V. Other light-emitting thyristors L is maintained at −4.8 V as the threshold voltage.

However, since the light-up signal line 75 is at "H," none of the light-emitting thyristor L shifts to an ON state.

That is, only the transfer thyristor T1 is turned on at the time point b. The transfer thyristor T1 is in an ON state immediately after the time point b (here, referred to a time point when the thyristor is in a steady state after a change is made on e.g., thyristor due to a change of the potential of the signal at the time point b). Other transfer thyristors T and all the light-emitting thyristors L are in an OFF state.

In the following, only the thyristors (the transfer thyristor T, the light-emitting thyristor L) in an ON state are described, and description of the thyristors (the transfer thyristor T, the light-emitting thyristor L) in an OFF state is omitted.

As described above, the gate terminals Gt of the transfer thyristors T are mutually connected to each other via the coupling diodes Dx. Therefore, when the potential of a certain terminal Gt is changed, the potential of other gate terminals Gt connected to the certain gate terminal Gt via the coupling diode Dx with a forward bias is changed. The threshold voltage of the transfer thyristor T having the certain gate terminal Gt is changed. When the threshold voltage becomes higher than "L," the thyristor may be turned on.

More specific description is given. The potential of adjacent gate terminal Gt connected to a certain gate terminal Gt with a potential of "H" (0 V) via one coupling diode Dx with a forward bias becomes −1.5 V, and the threshold voltage of the transfer thyristor T having the adjacent gate terminal Gt becomes −3 V. Since the threshold voltage is higher (its absolute value is smaller) than "L" (−3.3 V), when the cathode terminal becomes "L" (−3.3 V), the transfer thyristor T is turned on.

On the other hand, the potential of another gate terminal Gt connected to a certain gate terminal Gt with a potential of "H" (0 V) via two coupling diodes Dx with a forward bias becomes −3 V, and the threshold voltage of the transfer thyristor T having the another gate terminal Gt becomes −4.5 V. Since the threshold voltage is lower than "L" (−3.3 V), the transfer thyristor may not be turned on, and maintains the OFF state.

(3) Time Point c

At the time point c, the light-up signal ϕI shifts from "H" (0 V) to "L" (−3.3 V).

<Light-Emitting Chip C>

Even if the light-up signal line 75 becomes "L" (−3.3 V), the threshold voltage of the light-emitting thyristors L1 and L2 is −4.3 V, the threshold voltage of the light-emitting thyristor L3 is −4.5 V, and the threshold voltages of the light-emitting thyristor Ln (n≥4) is −4.8 V, thus none of the light-emitting thyristors L is turned on.

Therefore, only transfer thyristor T1 is in an ON state immediately after the time point c.

(4) Time Point d

At the time point d, the selection signals ϕVa and ϕVb shift from "L" (−3.3 V) to "H" (0 V). In the following, a light-emitting chip C to which a selection signal ϕV with a changed potential level is transmitted as a designation signal is described.

The selection signal ϕVa is transmitted to the light-emitting chips C1, C10, C11, C19, C21, C28, C31 and C37 as shown in FIGS. 4 and 5. On the other hand, the selection signal ϕVb is transmitted to the light-emitting chips C1, C2, C12, C20, C22, C29, C32 and C38.

Both selection signal ϕVa and ϕVb are transmitted to only light-emitting chip C1.

Here, the light-emitting chip C1 to which the selection signals ϕVa and ϕVb at "H" (0 V) are transmitted as a designation signal, and the light-emitting chip C2 to which the selection signal ϕVb at "H" (0 V) is transmitted, and the selection signal ϕVc maintained at "L" (−3.3 V) is transmitted are described. The operation of C10, C11, C12, C19, C20, C21, C22, C28, C29, C31, C32, C37 and C38 to which either of the selection signals ϕVa or ϕVb at "H" (0 V) is transmitted, is similar to that of the light-emitting chip C2.

<Light-Emitting Chip C1>

Since the selection signal ϕVa is transmitted to the ϕW terminal and the selection signal ϕVb is transmitted to the ϕE terminal, the ϕW terminal and the ϕE terminal are set to "H" (0 V). Since the potential of the gate terminal Gt1 is "H" (0 V), the potential of the gate terminal Gl1 becomes 0 V according to Table 1, and the threshold voltage of the light-emitting thyristor L1 becomes −1.5 V. Also, since the potential of the gate terminal Gt2 is −1.5 V, the potential of the gate terminal Gl2 becomes −1.5 V according to Table 2 and the threshold voltage of the light-emitting thyristor L2 becomes −3 V. In addition, since the potential of the gate terminal Gt3 is −3 V, the potential of the gate terminal Gl3 is maintained at −3 V according to Table 3, and the threshold voltage of the light-emitting thyristor L3 is maintained at −4.5 V. The threshold voltage of the light-emitting thyristor Ln (n≥4) is maintained at −4.8 V.

Then, since the light-up signal ϕI is "L" (−3.3 V) at the time point c, the light-emitting thyristor L1 with a threshold voltage of −1.5 V is turned on and lighted up (emits light) (denoted as On in FIG. 8). The potential of the light-up signal line 75 becomes −1.5 V which is the diffusion potential Vd of the pn junction.

At this point, although the light-emitting thyristor L2 has a threshold voltage of −3 V, the light-emitting thyristor L1 with a higher threshold voltage has been previously turned on and has set the potential of the light-up signal line 75 to −1.5 V, thus the light-emitting thyristor L2 is not turned on.

Thus, immediately after the time point d, the transfer thyristor T1 is in an ON state, while the light-emitting thyristor L1 is in an ON state to keep lighting (emitting light).

<Light-Emitting Chip C2>

Since the selection signal ϕVb is transmitted to the ϕW terminal, the ϕW terminal is set to "H" (0 V). However, the selection signal ϕVc transmitted to the ϕE terminal is maintained at "L" (−3.3 V). Thus, even if the potential of the gate terminal Gt1 becomes "H" (0 V), the potential of the gate terminal Gl1 is maintained at −2.8 V according to Table 1, thus the threshold voltage of the light-emitting thyristor L1 is maintained at −4.3 V. Similarly, the potential of the gate terminal Gl2 is maintained at −2.8 V according to Table 2, thus the threshold voltage of the light-emitting thyristor L2 is maintained at −4.3 V. In addition, the potential of the gate terminal Gl3 is maintained at −3 V according to Table 3, thus the threshold voltage of the light-emitting thyristor L3 is maintained at −4.5 V.

Thus, although the light-up signal ϕI is "L" (−3.3 V), the light-emitting thyristor L1 is not turned on.

Note that switched ϕW and ϕE terminals will provide the same operation as described above, and it is not necessary to distinguish between the ϕW and ϕE terminals.

Thus, the transfer thyristor T1 is in an ON state immediately after the time point d.

(5) Time Point e

At the time point e, the selection signals ϕVa and ϕVb shift from "H" (0 V) to "L" (−3.3 V), while the selection signals ϕVf and ϕVh shift from "L" (−3.3 V) to "H" (0 V).

<Light-Emitting Chip C1>

Since the selection signal ϕVa at "L" (−3.3 V) is transmitted to the ϕW terminal, and the selection signal ϕVb at "L" (−3.3 V) is transmitted to the ϕE terminal, respective potentials of the gate terminals Gl1 and Gl2 returns to −2.8 V according to Tables 1 and 2, and the threshold voltages of the light-emitting thyristors L1 and L2 are set to −4.3 V. However, since the light-up signal ϕI is maintained at "L" (−3.3 V), the light-emitting thyristor L1 maintains an ON state to keep lighting (emitting light).

Thus, immediately after the time point e, the transfer thyristor T1 is in an ON state, while the light-emitting thyristor L1 is in an ON state to keep lighting (emitting light).
<Light-Emitting Chip C2>

Since the selection signal φVb at "L" (−3.3 V) is transmitted to the φW terminal, the φW terminal returns to "L" (−3.3 V). However, as shown in Tables 1 to 3, the potential of the gate terminal Gl does not change.

Therefore, the transfer thyristor T1 is in an ON state immediately after the time point e.
<Light-Emitting Chip C16>

Since the selection signal φVf is transmitted to the φW terminal and the selection signal φVh is transmitted to the φE terminal, similarly to the light-emitting chip C1 at the time point d, the light-emitting thyristor L1 is turned on and lighted up (emits light).

Immediately after the time point e, the transfer thyristor T1 is in an ON state, while the light-emitting thyristor L1 is in an ON state to keep lighting (emitting light).
<Light-Emitting Device 65>

Immediately after the time point e, the transfer thyristor T1 of each light-emitting chip C (the light-emitting chips C1 to C40) is in an ON state, and the light-emitting thyristor L1 of light-emitting chip C1 and the light-emitting thyristor L1 of the light-emitting chip C16 are in an ON state to keep lighting (emitting light).

As described above, in the light-emitting chips C where the selection signals φV (φVa to φVj) transmitted to both φW and φE terminals are "H" (0 V), the potential of the gate terminal Gl of the light-emitting thyristor L connected to the gate terminal Gt with "H" (0 V) potential of the transfer thyristor T via the connection resistance Ra is set to 0 V, and the threshold voltage of the light-emitting thyristor L is set to −1.5 V. Thus, if the potential of the light-up signal φI is "L" (−3.3 V), the light-emitting thyristor L is turned on and lighted up (emits light).

On the other hand, in the light-emitting chips C where either one of the selection signals φV (φVa to φVj) transmitted to φW and φE terminals is "H" (0 V), even if the potential of the gate terminal Gt is "H" (0 V), the potential of the gate terminal Gl of the light-emitting thyristor L is maintained at −2.8 V, and the threshold voltage of the light-emitting thyristor L is maintained at −4.3 V. Therefore, even if the potential of light-up signal φI is "L" (−3.3 V), the light-emitting thyristor L may not be turned on nor be lighted up (emits no light).

Once the light-emitting thyristor L is turned on and lighted up (emits light), the light-emitting thyristor L is maintained at the ON state and remains lighted up (emits light) even if one of or both of the selection signals φV (φVa to φVj) transmitted to the φW and φE terminals shift from "H" (0 V) to "L" (−3.3 V).

In the following, only such light-emitting chips C that have "H" (0 V) selection signals φV (φVa to φVj) transmitted to both φW and φE terminals are described.
(6) Time Point f At the time point f, the selection signals φVb and φVc shift from "L" (−3.3 V) to "H" (0 V), while the selection signals φVf and φVh shift from "H" (0 V) to "L" (−3.3 V).
<Light-Emitting Chip C2>

Since the selection signal φVb is transmitted to the φW terminal and the selection signal φVc is transmitted to the φE terminal, similarly to the light-emitting chip C1 at the time point d, the light-emitting thyristor L1 is turned on and lighted up (emits light).

Immediately after the time point f, the transfer thyristor T1 is in an ON state, while the light-emitting thyristor L1 is also in an ON state to keep lighting (emitting light).
<Light-Emitting Device 65>

Immediately after the time point f, the transfer thyristor T1 of each light-emitting chip C (the light-emitting chips C1 to C40) is in an ON state, and the light-emitting thyristor L1 of the light-emitting chip C1, the light-emitting thyristor L1 of the light-emitting chip C2, and the light-emitting thyristor L1 of the light-emitting chip C16 are in an ON state to keep lighting (emitting light).
(7) Time Point g At the time point g, the selection signals φVb and φVc shift from "H" (0 V) to "L" (−3.3 V).
<Light-Emitting Chip C2>

Although the selection signal φVb is transmitted to the φW terminal and the selection signal φVc is transmitted to the φE terminal, the light-emitting thyristor L1, which is turned on at the time point f, keeps lighting (emitting light).

Immediately after the time point g, the transfer thyristor T1 is in an ON state, while the light-emitting thyristor L1 is also in an ON state to keep lighting (emitting light).
<Light-Emitting Device 65>

Immediately after the time point g, the transfer thyristor T1 of each the light-emitting chip C (the light-emitting chips C1 to C40) is in an ON state, and the light-emitting thyristor L1 of the light-emitting chip C1, the light-emitting thyristor L1 of the light-emitting chip C2, and the light-emitting thyristor L1 of the light-emitting chip C16 are in an ON state to keep lighting (emitting light).
(8) Time point h At a time point h, the selection signals φVf and φVi shift from "L" (−3.3 V) to "H" (0 V). Although detailed description is omitted, as shown in FIG. 5, the light-emitting thyristor L1 of the light-emitting chip C26 in which the selection signal φVf is transmitted to the φW terminal and the selection signal φVi is transmitted to the φE terminal is then turned on and lighted up (emits light).
(9) Time Point i At a time point i, the selection signals φVe and φVg shift from "L" (−3.3 V) to "H" (0 V), while the selection signals φVf and φVi shift from "H" (0 V) to "L" (−3.3 V). Although detailed description is omitted, as shown in FIG. 5, the light-emitting thyristor L1 of the light-emitting chip C15 in which the selection signal φVe is transmitted to the φW terminal and the selection signal φVg is transmitted to the φE terminal is then turned on and lighted up (emits light). The light-emitting thyristor L1 of the light-emitting chip C26 in which the selection signal φVf is transmitted to the φW terminal and the selection signal φVi is transmitted to the φE terminal maintains the ON state to keep lighting (emitting light).
(10) Time Point j A time point j, the selection signals φVd and φVj shift from "L" (−3.3 V) to "H" (0 V), while the selection signals φVe and φVg shift from "H" (0 V) to "L" (−3.3 V). Although detailed description is omitted, as shown in FIG. 5, the light-emitting thyristor L1 of the light-emitting chip C40 in which the selection signal φVd is transmitted to the φW terminal and the selection signal φVj is transmitted to the φE terminal is then turned on and lighted up (emits light). The light-emitting thyristor L1 of the light-emitting chip C15 in which the selection signal φVe is transmitted to the φW terminal and the selection signal φVg is transmitted to the φE terminal maintains the ON state to keep lighting (emitting light).
(11) Time Point k At a time point k, the selection signals φVd and φVj shift from "H" (0 V) to "L" (−3.3 V). However, the light-emitting thyristor L1 of the light-emitting chip C40 in which the selection signal φVd is transmitted to the φW terminal and the selection signal φVj is transmitted to the φE terminal maintains the ON state to keep lighting (emitting light).
(12) Time Point l The selection signals φVf and φVj shift from "L" (−3.3 V) to "H" (0 V). Although detailed description is omitted, as shown in FIG. 5, the light-emitting thyristor L1 of the light-emitting chip C36 in which the selection signal φVf is transmitted to the φW terminal and the selection signal φVj is transmitted to the φE terminal is then turned on and lighted up (emits light).
(13) Time Point m At a time point m, the selection signals φVf and φVj shift from "H" (0 V) to "L" (−3.3 V). However, the light-emitting thyristor L1 of the light-emitting chip C36 in which the selection signal φVf is transmitted to the φW terminal and the selection signal φVj is transmitted to the φE terminal maintains the ON state to keep lighting (emitting light).
(14) Time Point n At a time point n, the selection signals φVe and φVh shift from "L" (−3.3 V) to "H" (0 V). Although detailed description is omitted, as shown in FIG. 5, the light-emitting thyristor L1 of the light-emitting chip C25 in which the selection signal φVe is transmitted to the φW terminal and the selection signal φVh is transmitted to the φE terminal is then turned on and lighted up (emits light).
(15) Time Point o At a time point o, the selection signals φVe and φVh shift from "H" (0 V) to "L" (−3.3 V). However, the light-emitting thyristor L1 of the light-emitting chip C25 in which the selection signal φVe is transmitted to the φW terminal and the selection signal φVh is transmitted to the φE terminal maintains the ON state to keep lighting (emitting light).
<Light-Emitting Device 65>

Immediately after the time point o, respective light-emitting thyristors L1 of the light-emitting chips C1, C2, C15, C16, C25, C26, C36 and C40 are in an ON state to keep lighting (emitting light).
(16) Time Point p At the time point p, the light-up signal φI shifts from "H" (0 V) to "L" (−3.3 V), while the second transfer signal φ2 shifts from "H" (0 V) to "L" (−3.3 V).
<Light-Emitting Chip C1, C2, C15, C16, C25, C26, C36, C40>

When the light-up signal φI shifts from "H" (0 V) to "L" (−3.3 V), the potential of the cathode terminal of the light-emitting thyristor L1 which has been lighted (emits light) is set to "H" (0 V) which is the potential of the anode terminal. Thus, respective light-emitting thyristors L1 of the light-emitting chips C1, C2, C15, C16, C25, C26, C36 and C40 may not maintain the ON state and turned off simultaneously to extinguish light.

Thus, the lighting time interval of the light-emitting thyristor L1 of the light-emitting chip C1 is from the time point d to the time point p. The lighting time interval of the light-emitting thyristor L1 of the light-emitting chip C2 is from the time point f to the time point p. Like this, the lighting time interval varies with the light-emitting chips C.
<Light-Emitting Device 65>

On the other hand, when the second transfer signal φ2 shifts from "H" V) to "L" (−3.3 V), the transfer thyristors T2 of the light-emitting chips C (the light-emitting chips C1 to C40), which have a threshold voltage of −3 V are turned on. Then, the potential of the gate terminal Gt2 becomes "H" (0 V), the potential of the gate terminal Gt3 becomes −1.5 V, and the potential of the gate terminal Gt4 becomes −3 V. Thereby, the potential of the gate terminal Gl2 becomes −2.8 V as shown in Table 1, the potential of the gate terminal Gl3 becomes −2.8 V as shown in Table 2, and the potential of the gate terminal Gl4 becomes −3 V as shown in Table 3.
(17) Time Point q At the time point q, the first transfer signal φ1 shifts from "L" (−3.3 V) to "H" (0 V).
<Light-Emitting Device 65>

Since the potential of the cathode terminal of each transfer thyristor T1 of respective light-emitting chips C (the light-emitting chips C1 to C40) becomes "H" (0 V) which is the potential of the anode terminal, the transfer thyristor T1 is turned off.

Then, the potential of the gate terminal Gt1 changes toward "L" (−3.3 V). The coupling diode Dx1 then becomes reverse biased and the influence of the potential of the gate terminal Gt2 being "H" (0 V) does not affect to the gate terminal Gt1.
(18) Time Point r At the time point r, the light-up signal φI shifts from "H" (0 V) to "L" (−3.3 V), and a time interval T(2) starts.

After the point, the signal pattern in a time interval of T(1) is repeated although the transfer thyristor T2 acts in place of the transfer thyristor T1. In the time interval T(2), each transfer thyristor T2 of the light-emitting chip C (the light-emitting chips C1 to C40) is in an ON state, thus whether or not to light up the light-emitting thyristor L2 is controlled.

As long as the φW and φE terminals of the light-emitting chips C do not have "H" (0 V) at the same time, the light-emitting thyristor L may keep light-off (turned off). For example, in the time interval T(1), the selection signals φVc and φVd transmitted to the φW and φE terminals of the light-emitting chip C3, respectively are not set to "H" (0 V) at the same time. Therefore, in the time interval T(1), the light-emitting thyristor L1 of the light-emitting chip C3 is not turned on, thus is light-off (turned off). Similarly, the selection signals φVe and φVi transmitted to the φW and φE terminals of the light-emitting chip C35, respectively are not set to "H" (0 V) at the same time, and the light-emitting thyristor L1 of the light-emitting chip C35 is not turned on, thus is light-off (turned off).

In FIG. 8, the selection signal φV (φVa to φVj) is changed from "L" (−3.3 V) to "H" (0 V) for the light-emitting chips C1, C2, C15, C16, C25, C26, C36 and C40, and if a time interval of "H" state is set for the light-up signal φI in the time interval from the time point c to the time point p when the light-up signal φI in the time interval T(1) is "L" for other light-emitting chips C, the light-emitting thyristor L1 may be turned on and lighted up (emits light).

As described above, the lighting time interval of the light-emitting thyristor L of each light-emitting chips C (the light-emitting chips C1 to C40) is the one from the time point (lighting start time point) when the selection signals φV (φVa to φVj) transmitted to the φW and φE terminals both become "H" (0 V) to the time point p. Thus, by considering of the light intensity of the light-emitting thyristor L, a lighting time interval in which the photoconductive drum 12 is exposed may be set. That is, a correction value calculated from the light intensity of the light-emitting thyristor L may be accumulated in a nonvolatile memory provided, for example in the image output controller 30 or the signal generating circuit 110, and a lighting start time point may be set based on the correction value for each light-emitting thyristor L. In this manner, amount of light may be corrected for each light-emitting thyristor L (light quantity correction), and a difference between the light exposures of the photoconductive drum 12 from the light-emitting thyristors L may be suppressed.

In the first exemplary embodiment, each light-emitting chip C (the light-emitting chips C1 to C40) may be uniquely designated, thus a lighting start time point for each light-emitting thyristor L may be calculated.

In the case where multiple lighting start time points are included in the time interval (pulse width) when the selection signal φV is "H," the amount of light may be corrected by averaging the quantity in multiple light exposure.

As described above, in the first exemplary embodiment, the potential Gt(X) of the 3-input AND circuit AND1 is set to "H" (0 V) by sequentially turning each transfer thyristor T to an ON state, while the gate terminal Gl becomes "H" (0 V) when both φW(Y) and φE(Z) become "H" (0 V) so that the threshold voltage of the light-emitting thyristor L is set to −1.5 V (the 3-input AND circuit AND1).

The transfer thyristors T of the respective light-emitting chips C (the light-emitting chips C1 to C40) are driven concurrently, while the light-up signal φI is transmitted to the light-emitting chips C (the light-emitting chips C1 to C40) in common. A combination of either two of the selection signals φV (φVa to φVj) is transmitted in common to each light-emitting chip C (the light-emitting chips C1 to C40) so that the light-emitting chip C (the light-emitting chips C1 to C40), for which the combined two selection signals φV (φVa to φVj) are both "H" (0 V), is turned on and lighted up (emits light).

In the first exemplary embodiment, the number of wiring provided on the circuit board 62 is suppressed by designating each light-emitting chip C (the light-emitting chips C1 to C40) by a combination of either two of the selection signals φV (φVa to φVj).

Second Exemplary Embodiment

The second exemplary embodiment has a different configuration of the light-emitting chip C from that of the first exemplary embodiment.

Figure 9:
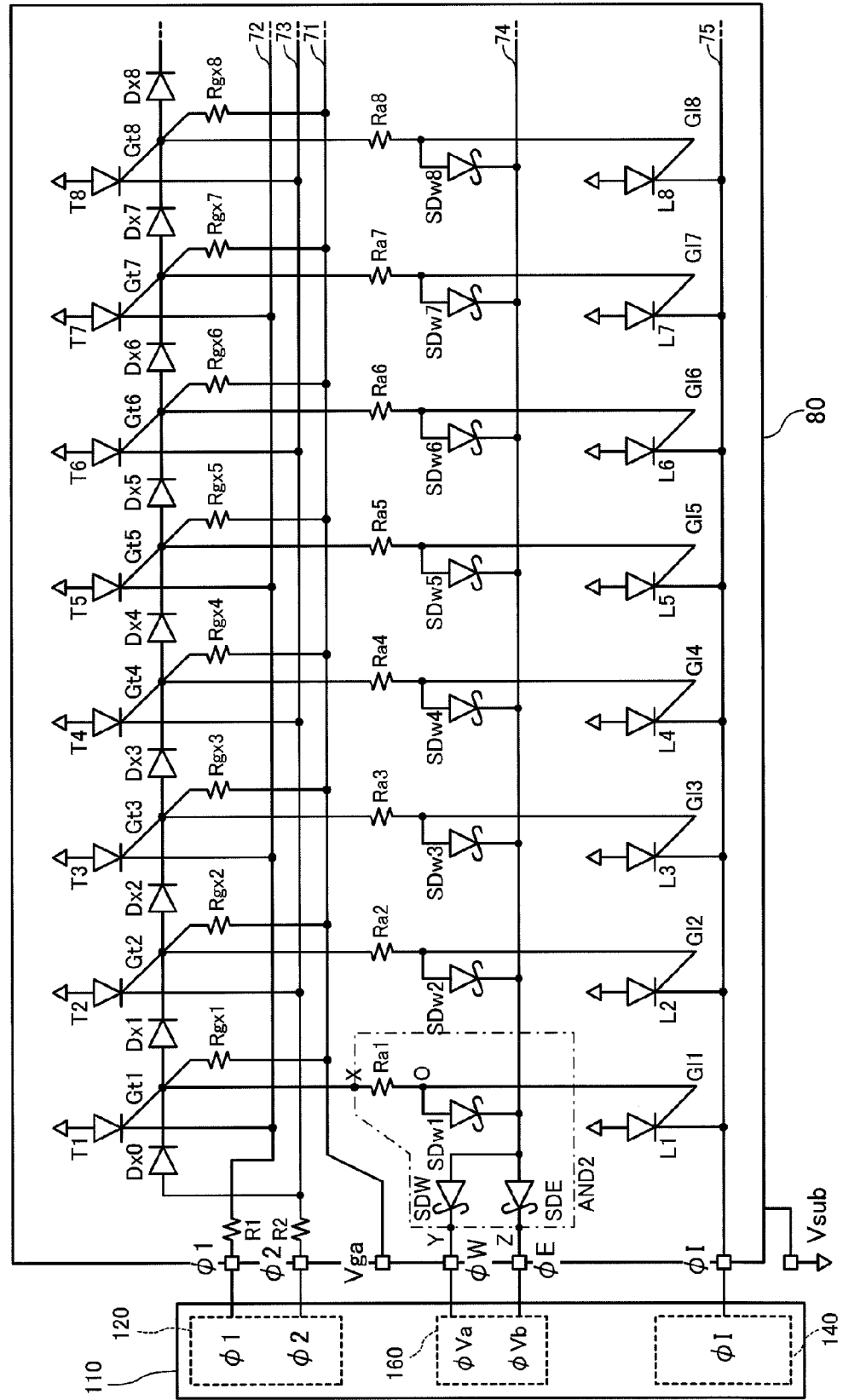
FIG. 9 is an equivalent circuit diagram for illustrating a circuit configuration of the light-emitting chip that is a self-scanning light-emitting device array (SLED) chip according to the second exemplary embodiment.

FIG. 9 is an equivalent circuit diagram for illustrating a circuit configuration of the light-emitting chip C that is a self-scanning light-emitting device array (SLED) chip according to the second exemplary embodiment. Here again, the light-emitting chip C is described using the light-emitting chip C1 as an example. Now, in FIG. 9, the light-emitting chip C is denoted as the light-emitting chip C1 (C). The configuration of other light-emitting chips C2 to C40 is the same as that of the light-emitting chip C1.

In the light-emitting chip C1 (C) according to the second exemplary embodiment, the Schottky enable diode SDe in the light-emitting chip C1 (C) of the first exemplary embodiment shown in FIG. 6 is not provided. Accordingly, the enable signal line 76 is not provided, either.

On the other hand, in the light-emitting chip C1 (C) according to the second exemplary embodiment, the Schottky write diode SDW is provided between the write signal line 74 and the φW terminal. The cathode terminal and the anode terminal of the Schottky write diode SDW are connected to the φW terminal and the write signal line 74, respectively. Also, a Schottky enable diode SDE is provided between the write signal line 74 and the φE terminal. The cathode terminal and the anode terminal of the Schottky enable diode SDE are connected to the φE terminal and the write signal line 74, respectively.

Other configurations are similar to those of the light-emitting chip C1 (C) in the first exemplary embodiment. Thus, similar components to those of the first exemplary embodiment are labeled with the same reference numerals, and detailed description of the similar components is omitted.

In the second exemplary embodiment, the size of the light-emitting chip C may be reduced because the Schottky enable diode SDe and the enable signal line 76 in the light-emitting chip C in the first exemplary embodiment are not provided.

In the second exemplary embodiment, a 3-input AND circuit AND2 includes a connection resistance Ra as an example of the second electrical part, a Schottky write diode SDw as an example of the third electrical part, a Schottky write diode SDW, and a Schottky enable diode SDE.

The 3-input AND circuit AND2 is described with a connection resistance Ra1, a Schottky write diode SDw1, a Schottky write diode SDW, and a Schottky enable diode SDE enclosed by the dashed dotted line shown in FIG. 9.

In the 3-input AND circuit AND2, the anode terminal of the Schottky write diode SDw1 is connected to one terminal O of the connection resistance Ra1. The other terminal X of the connection resistance Ra1 is connected to the gate terminal Gt1 of the transfer thyristor T1. The cathode terminal of the Schottky write diode SDw1 is connected to the anode terminal of the Schottky write diode SDW, and to the anode terminal of the Schottky enable diode SDE. A cathode terminal Y of the Schottky write diode SDW is connected to the φW terminal, and a cathode terminal Z of the Schottky enable diode SDE is connected to the φE terminal.

The terminal X, the terminal Y, and the terminal Z serve as an input terminal, and the terminal O serves an output terminal. As described below, when all the potentials (signals) of the terminal X, the terminal Y, and the terminal Z become "H" (0 V), the potential (signal) of the terminal O becomes "H" (0 V). Thus, the 3-input AND circuit AND2 serves as an AND circuit with 3 inputs.

Table 4 shows a relationship between the potential (denoted as φW(Y)) of the φW terminal (terminal Y of the 3-input AND circuit AND2), the potential (denoted as φE(Z)) of the φE terminal (terminal Z of the 3-input AND circuit AND2), and the potential of terminal O (denoted as Gl(O)) when the potential of the other terminal X (denoted as Gt(X)) of the connection resistance Ra1 is "H" (0 V).

When both φW(Y) and φE(Z) are "H" (0 V), Gl(O) is "H" (0 V). However, when either one or both of φW(Y) and φE(Z) are "L" (−3.3 V), either one or both of the Schottky write diode SDW and the Schottky enable diode SDE, and the Schottky write diode SDw1 are forward biased, thus Gl(O) is set to −2.3 V which is "L" (−3.3 V) minus twice the potential (−1 V) in the forward direction Vs (−0.5 V) of the Schottky junction.

TABLE 4

|  | Gl(O) | φE(Z) | |
| --- | --- | --- | --- |
|  |  | "H"(0 V) | "L"(−3.3 V) |
| φW(Y) | "H"(0 V) | "H"(0 V) | −2.3 V |
|  | "L"(−3.3 V) | −2.3 V | −2.3 V |

Table 5 shows a relationship between φW(Y), φE(Z) and Gl(O) when the potential (Gt(X)) of the other terminal X of the connection resistance Ra1 is −1.5 V.

Since Gt(X) is −1.5 V, if φW(Y) and φE(Z) are both "H" (0 V), all of the Schottky write diode SDW, the Schottky enable diode SDE, and the Schottky write diode SDw1 are reverse biased. For this reason, the influence of the potential of both φW(Y) and φE(Z) being "H" (0 V) does not affect to Gl(O), and Gl(O) is set to −1.5 V, which is the potential Gt(X).

When either one or both of φW(Y) and φE(Z) are "L" (−3.3 V), either one or both of the Schottky write diode SDW and the Schottky enable diode SDE, and the Schottky write diode SDw1 become forward biased, thus Gl(O) is set to −2.3 V which is Gt(X) minus twice the potential (−1 V) in the forward direction Vs (−0.5 V) of the Schottky junction.

TABLE 5

|  |  | φE(Z) | |
| --- | --- | --- | --- |
|  | Gl(O) | "H"(0 V) | "L"(−3.3 V) |
| φW(Y) | "H"(0 V) | −1.5 V | −2.3 V |
|  | "L"(−3.3 V) | −2.3 V | −2.3 V |

Table 6 shows a relationship between φW(Y), φE(Z) and Gl (O) when the potential (Gt(X)) of the other terminal X of the connection resistance Ra1 is −3 V.

That is, since Gt(X) is −3 V, if φW(Y) and φE(Z) are both "H" (0 V), all of the Schottky write diode SDW, Schottky enable diode SDE, and the Schottky write diode SDw1 become reverse biased. For this reason, the influence of the potential of both φW(Y) and φE(Z) being "H" (0 V) does not affect to Gl(O), and the potential Gl(O) is set to −3 V, which is the potential Gt(X).

Even if either one or both of φW(Y) and φE(Z) become "L" (−3.3 V), the difference between the potential Gt(X) and −3.3 V is not greater than twice the potential (−1 V) in the forward direction Vs (−0.5 V) of the Schottky junction, so none of the Schottky write diode SDW, the Schottky enable diode SDE, and the Schottky write diode SDw1 is forward biased, thus the Gl(O) remains at −3 V which is the potential Gt(X).

That is, in the case where the potential (Gt(X)) of the terminal X of the 3-input AND circuit AND2 is lower than −2.3 V which is "L" (−3.3 V) minus twice the potential (−1 V) in the forward direction Vs (−0.5 V) of the Schottky junction, the potential Gl(O) becomes the potential Gt(X). The potential Gl(O) is independent of the change of the potential of φW(Y) or φE(Z).

TABLE 6

|  |  | φE(Z) | |
| --- | --- | --- | --- |
|  | Gl(O) | "H"(0 V) | "L"(−3.3 V) |
| φW(Y) | "H"(0 V) | −3 V | −3 V |
|  | "L"(−3.3 V) | −3 V | −3 V |

Although the 3-input AND circuit AND2 is described here with the Schottky write diode SDW, the Schottky enable diode SDE, and the Schottky write diode SDw1; however other 3-input AND circuits AND2 having the gate terminal as the terminal O may be similarly described. The 3-input AND circuit AND2 having the gate terminal Gl2 as the terminal O includes the connection resistance Ra2, the Schottky write diode SDw2, the Schottky write diode SDW, and the Schottky enable diode SDE.

In Tables 5 and 6, when either one or both of φW(Y) and φE(Z) are "L" (−3.3 V), the potential of the gate terminal Gl is set to −2.3 V. This value is different from −2.8 V shown in Tables 1 and 2 in the first exemplary embodiment. However, the threshold voltage of the light-emitting thyristor L having a potential of −2.3 V at the gate terminal Gl is −3.8 V. Therefore, even if the light-up signal φI is "L" (−3.3 V), the light-emitting thyristor L is not turned on and lighted up (emits light).

That is, the light-emitting device 65 of the second exemplary embodiment may be driven similarly to the light-emitting device 65 of the first exemplary embodiment.

Also in the second exemplary embodiment, the number of wiring provided on the circuit board 62 is suppressed by designating each light-emitting chip C (the light-emitting chips C1 to C40) by a combination of either two of the selection signals φV (φVa to φVj).

Third Exemplary Embodiment

The third exemplary embodiment has a different configuration of the light-emitting chip C from that of the first exemplary embodiment.

Figure 10:
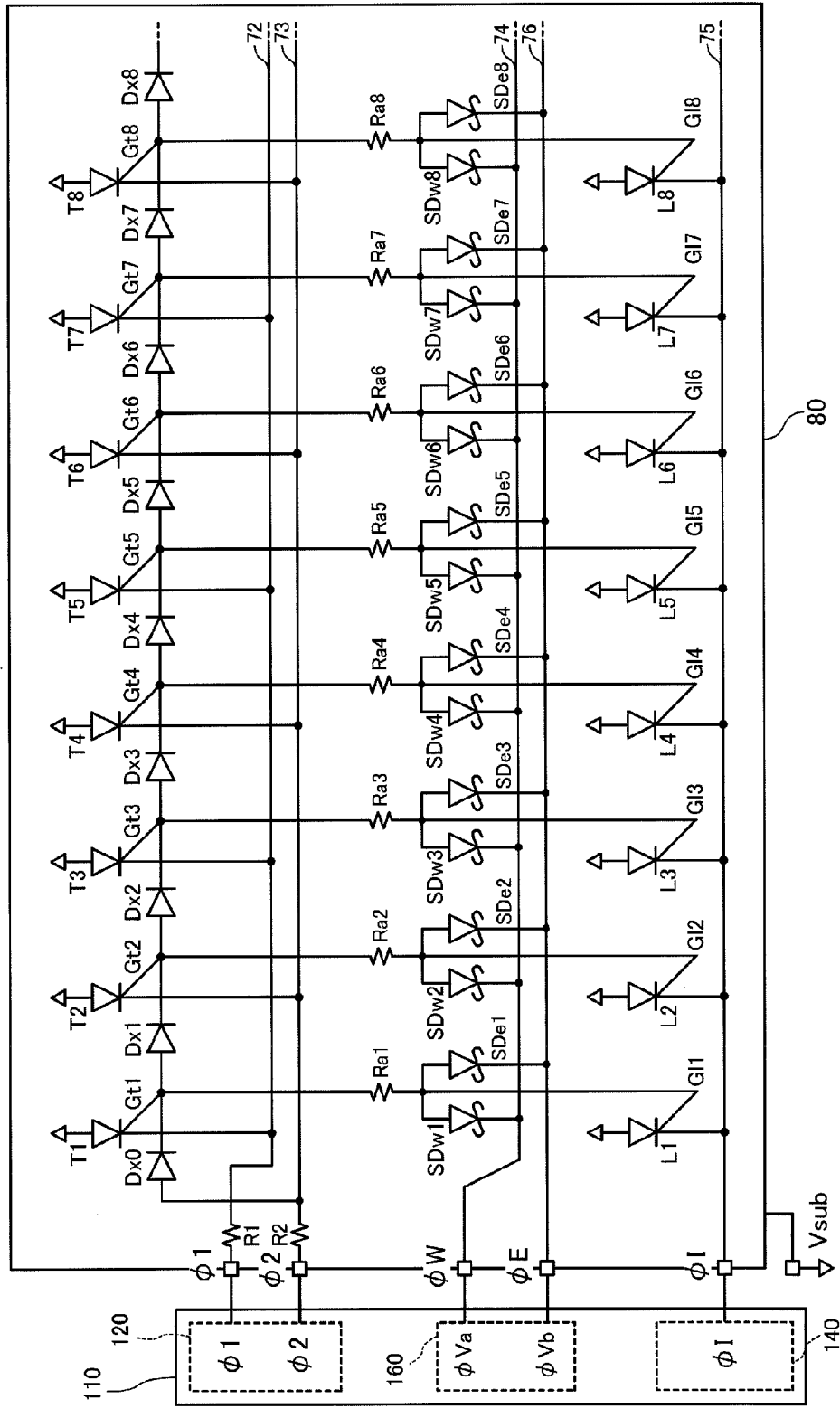
FIG. 10 is an equivalent circuit diagram for illustrating a circuit configuration of the light-emitting chip that is a self-scanning light-emitting device array (SLED) chip according to the third exemplary embodiment.

FIG. 10 is an equivalent circuit diagram for illustrating a circuit configuration of the light-emitting chip C that is a self-scanning light-emitting device array (SLED) chip according to the third exemplary embodiment. Here again, the light-emitting chip C is described using the light-emitting chip C1 as an example. In FIG. 10, the light-emitting chip C is denoted as the light-emitting chip C1 (C). The configuration of other light-emitting chips C2 to C40 is the same as that of the light-emitting chip C1.

In the light-emitting chip C1 (C) according to the third exemplary embodiment, the power supply line resistance Rgx and the power supply line 71 used in the light-emitting chip C1 (C) in the first exemplary embodiment shown in FIG. 6 are not provided. Other configurations are similar to those of the light-emitting chip C1 (C) in the first exemplary embodiment. Thus, similar components to those of the first exemplary embodiment are labeled with the same reference numerals, and detailed description of the similar components is omitted.

In the third exemplary embodiment, the size of the light-emitting chip C may be reduced because the power supply line resistance Rgx and the power supply line 71 used in the light-emitting chip C1 (C) in the first exemplary embodiment are not provided.

In the first exemplary embodiment, the gate terminal Gt is connected to the power supply line 71, from which the potential of "L" (−3.3 V) is supplied, via the power supply line resistance Rgx. Accordingly, except for the gate terminals Gt connected to and affected by the gate terminal Gt of the transfer thyristor T in an ON state via the coupling diode Dx with a forward bias (the gate terminal Gt2 and Gt3 when the transfer thyristor T1 is an ON state), the potential of the gate terminals are set to "L" (−3.3 V).

In the third exemplary embodiment, when the φW and φE terminals are set to "L" (−3.3 V), the potential of the gate terminals Gt except the ones connected to and affected by the gate terminal Gt of the transfer thyristor T in an ON state via the coupling diode Dx with a forward bias becomes −2.8 V because the Schottky write diode SDw and the Schottky enable diode SDe become forward biased. Since the threshold voltage of the transfer thyristor T having a potential of −2.8 V at the gate terminal Gt is −4.3 V, the light-emitting thyristor L is not turned on even if the first transfer signal φ1 or the second transfer signal φ2 become "L" (−3.3 V).

That is, the light-emitting chip C1 (C) of the third exemplary embodiment may be driven in the same manner as the light-emitting chip C1 (C) of the first exemplary embodiment.

Thus, also in the third exemplary embodiment, the number of wiring provided on the circuit board 62 is suppressed by designating each light-emitting chip C (the light-emitting chips C1 to C40) by a combination of either two of the selection signals φV (φVa to φVj).

Fourth Exemplary Embodiment

The fourth exemplary embodiment has a different configuration of the light-emitting chip C from that of the first exemplary embodiment.

Figure 11:
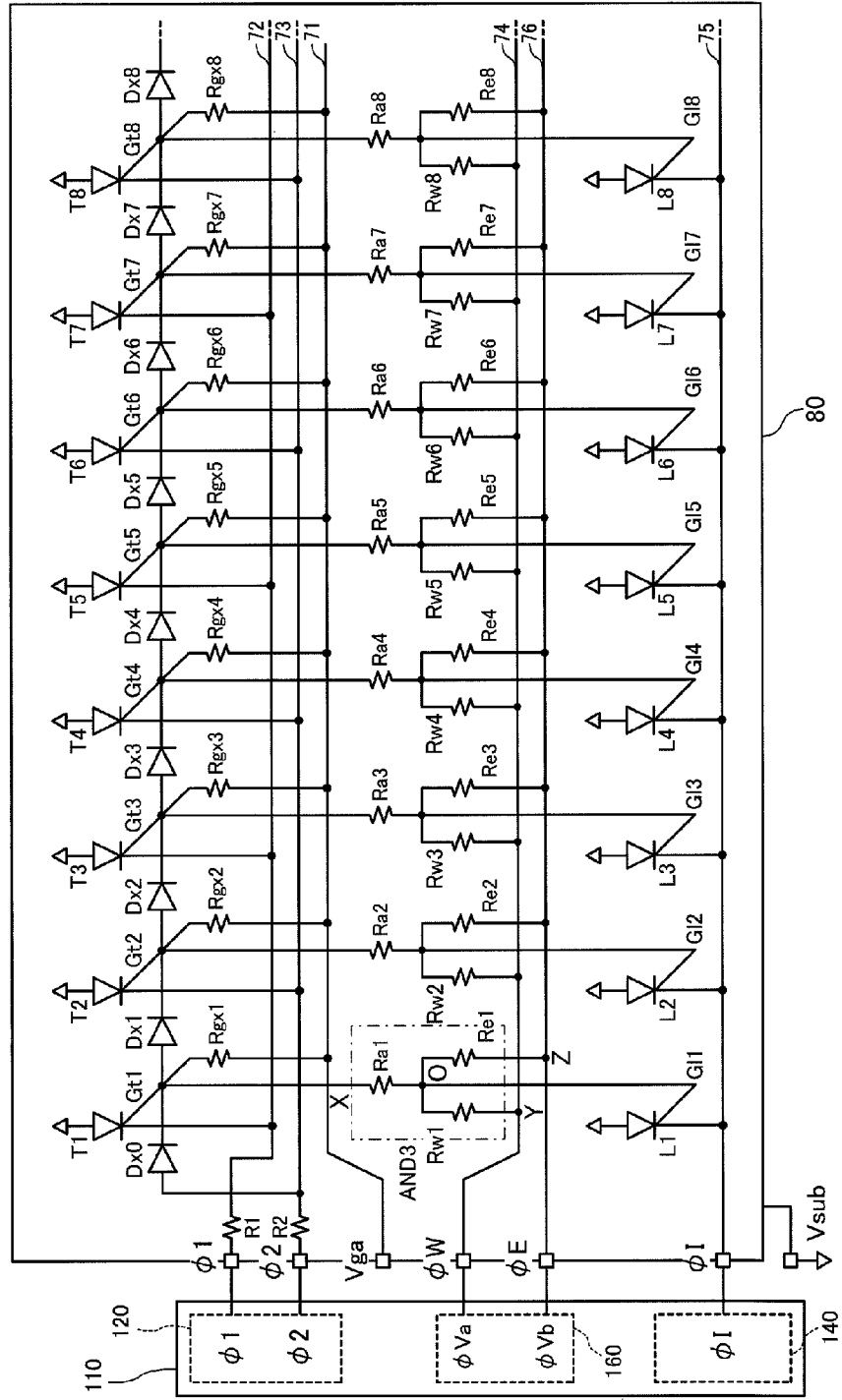
FIG. 11 is an equivalent circuit diagram for illustrating a circuit configuration of the light-emitting chip that is a self-scanning light-emitting device array (SLED) chip according to the fourth exemplary embodiment.

FIG. 11 is an equivalent circuit diagram for illustrating a circuit configuration of the light-emitting chip C that is a self-scanning light-emitting device array (SLED) chip according to the fourth exemplary embodiment. Here again, the light-emitting chip C is described using the light-emitting chip C1 as an example. Now, in FIG. 11, the light-emitting chip C is denoted as the light-emitting chip C1 (C). The configuration of other light-emitting chips C2 to C40 is the same as that of the light-emitting chip C1.

In the light-emitting chip C1 (C) according to the fourth exemplary embodiment, the Schottky write diodes SDw1, SDw2, SDw3, . . . , in the light-emitting chip C1 (C) of the first exemplary embodiment shown in FIG. 6 are replaced by the write resistances Rw1, Rw2, Rw3, . . . , as an example of the third electrical parts, respectively, and the Schottky enable diodes SDe1, SDe2, SDe3, . . . , are replaced by the enable resistances Re1, Re2, Re3, . . . , as an example of the third electrical parts, respectively. The write resistances Rw1, Rw2, Rw3, . . . , when not distinguished, are referred to as a write resistance Rw, and the enable resistances Re1, Re2, Re3, . . . , when not distinguished, are referred to as an enable resistance Re.

Other configurations are similar to those of the light-emitting chip C1 (C) in the first exemplary embodiment. Thus, similar components to those of the first exemplary embodiment are labeled with the same reference numerals, and detailed description of the similar components is omitted.

In the fourth exemplary embodiment, the Schottky write diode SDw and the Schottky enable diode SDe, which are used in the light-emitting chip C1 (C) in the first exemplary embodiment, are not provided, thus process of forming Schottky electrodes (such as components 151, 152 in FIGS. 7A and 7B) is eliminated.

Now, in the fourth exemplary embodiment, a 3-input AND circuit AND3 includes a connection resistance Ra, a write resistance Rw and an enable resistance Re.

The 3-input AND circuit AND3 is described with the connection resistance Ra1, the write resistance Rw1 and the enable resistance Re1 enclosed by the dashed dotted line shown in FIG. 11.

In the 3-input AND circuit AND3, one terminal O of the connection resistance Ra1 is connected to one terminal (no reference numeral) of the write resistance Rw1, and to one terminal (no reference numeral) of the enable resistance Re1. Another terminal X of the connection resistance Ra1 is connected to the gate terminal Gt1 of the transfer thyristor T1. Other terminal Y of the write resistance Rw1 is connected to the write signal line 74, and other terminal Z of the enable resistance Re1 is connected to the enable signal line 76.

The terminal X, the terminal Y, and the terminal Z serve as an input terminal, and the terminal O serves an output terminal. As described below, when all the potentials (signals) of the terminal X, the terminal Y, and the terminal Z become "H" (0 V), the potential (signal) of the terminal O becomes "H" (0 V). Thus, the 3-input AND circuit AND3 serves as an AND circuit with 3 inputs.

Table 7 shows a relationship between the potential (denoted as φW(Y)) of the φW terminal (terminal Y of the 3-input AND circuit AND3), the potential (denoted as φE(Z)) of the φE terminal (terminal Z of the 3-input AND circuit AND3), and the potential of terminal O (denoted as Gl(O)) when the potential of the other terminal X (denoted as Gt(X)) of the connection resistance Ra1 is "H" (0 V).

Here, the relationship is shown in the case where Ra=2× Rw=2×Re where the resistance value of the connection resistance Rw is Rw, the resistance value of the write resistance Rw is Rw, and the resistance value of the enable resistance Re is Re.

When both of φW(Y) and φE(Z) are "H" (0 V), Gl(O) is set to "H" (0 V). However, when either one of φW(Y) or φE(Z) is "L" (−3.3 V), the voltage of −3.3 V is divided by the connection resistance Ra, the write resistance Rw, and the enable resistance Re, thus Gl(O) is set to −1.98 V. In addition, when both of φW(Y) and φE(Z) are "L" (−3.3 V), Gl(O) is set to −2.64 V.

Although tables corresponding to Tables 2 and 3 shown in the first exemplary embodiment are not shown here, those tables may be obtained in a similar manner.

In Table 7, when either one of φW(Y) or φE(Z) is "L" (−3.3 V), Gl(O) is −1.98 V, which is different from −2.8 V shown in Table 1 in the first exemplary embodiment. However, the threshold voltage of the light-emitting thyristor L having a potential of −1.98 V at the gate terminal Gl is −3.48 V. Therefore, even if the light-up signal φI is "L" (−3.3 V), the light-emitting thyristor L is not turned on and lighted up (emits light).

That is, the light-emitting device 65 of the fourth exemplary embodiment may be driven in the same manner as the light-emitting device 65 of the first exemplary embodiment.

TABLE 7

|  |  | φE(Z) | |
|---|---|---|---|
|  | Gl(O) | "H"(0 V) | "L"(−3.3 V) |
| φW(Y) | "H"(0 V) | "H"(0 V) | −1.98 V |
|  | "L"(−3.3 V) | −1.98 V | −2.64 V |

When Ra/Rw and Ra/Re are increased, Gl(O) may be reduced if either one of φW(Y) or φE(Z) is "L" (−3.3 V). However, when Ra is increased, it takes longer time for the gate terminal Gl of the light-emitting thyristor L to discharge electric charge. On the other hand, Re and Rw may not be reduced too much because Re and Rw are limited by the current supply capability of the gate terminal Gt of the transfer thyristor T. Thus, it is preferable to set Ra/Rw and Ra/Re to 1 or more and 5 or less.

Also in the fourth exemplary embodiment, the number of wiring provided on the circuit board 62 is suppressed by designating each light-emitting chip C (the light-emitting chips C1 to C40) by a combination of either two of the selection signals φV (φVa to φVj).

Fifth Exemplary Embodiment

The fifth exemplary embodiment has a different configuration of the signal generating circuit 110 of the light-emitting device 65 and a different wiring configuration on the circuit board 62 from those of the first exemplary embodiment.

Figure 12:
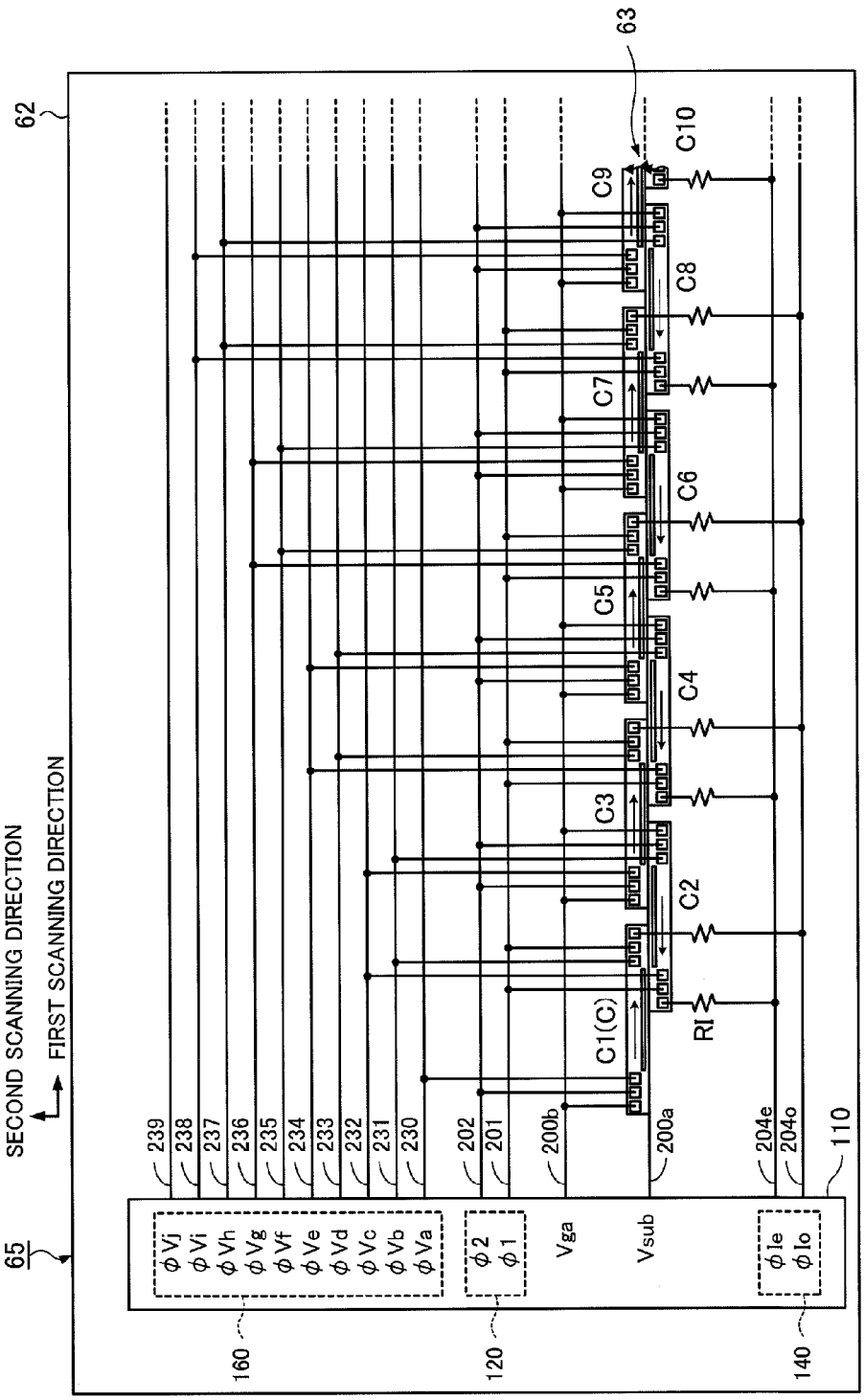
FIG. 12 is a diagram showing the configuration of the signal generating circuit of the light-emitting device and the wiring configuration on the circuit board according to the fifth exemplary embodiment.

FIG. 12 is a diagram showing the configuration of the signal generating circuit 110 of the light-emitting device 65 and the wiring configuration on the circuit board 62 according to the fifth exemplary embodiment. Note that the configuration of the light-emitting chip C is the same as that of the first exemplary embodiment (see FIG. 4A). FIG. 12 shows the portions of the light-emitting chips C1 to C10.

In the following, the components of the fifth exemplary embodiment that are different from those of the first exemplary embodiment are mainly described, and similar components to those of the first exemplary embodiment are labeled with the same reference numerals, and detailed description of the similar components is omitted.

In the fifth exemplary embodiment, the signal generating circuit 110 includes a light-up signal generating part 140 as an example of the light-up signal supply unit that transmits light-up signals φIo and φIe to the light-emitting chip C (the light-emitting chips C1 to C40) based on various kinds of control signals.

The circuit board 62 includes a light-up signal line 224o that is connected from the light-up signal generating part 140 of the signal generating circuit 110 to the φI terminals of the odd numbered light-emitting chips C1, C3, C5, . . . , via respective current limitation resistances RI in order to transmit the light-up signal φIo. The light-up signal φIo is transmitted to the odd numbered light-emitting chips C1, C3, C5, . . . , in common (in parallel).

Similarly, the circuit board 62 includes a light-up signal line 204e to transmit the light-up signal φIe, the light-up signal line 204e being connected to the even numbered light-emitting chips C2, C4, C6, . . . , via respective current limitation resistances RI from the light-up signal generating part 140 of the signal generating circuit 110. The light-up signal φIe is transmitted to the even numbered light-emitting chips C2, C4, C6, . . . , in common (in parallel).

Thus, the number of wiring included in the circuit board 62 of the fifth exemplary embodiment is sixteen, which is one more than the number of wiring, fifteen as in the first exemplary embodiment. Nevertheless, the number of wiring, sixteen in the fifth exemplary embodiment is much smaller than forty-four as in the case where the fifth exemplary embodiment is not applied.

In the fifth exemplary embodiment, the current flowing through each of the light-up signal lines 204e and 204o may be reduced compared with the light-up signal line 204 of the first exemplary embodiment because the light-up signal lines 204e and 204o are provided.

The combinations of the selection signals φVa to φVj to be transmitted to each light-emitting chip C (the light-emitting chips C1 to C40) in the fifth exemplary embodiment are the same as those of the first exemplary embodiment (see FIG. 5).

Furthermore, the circuit configuration of the light-emitting chip C in the fifth exemplary embodiment is the same as that of the first exemplary embodiment (see FIGS. 6 and 7).

Figure 13:
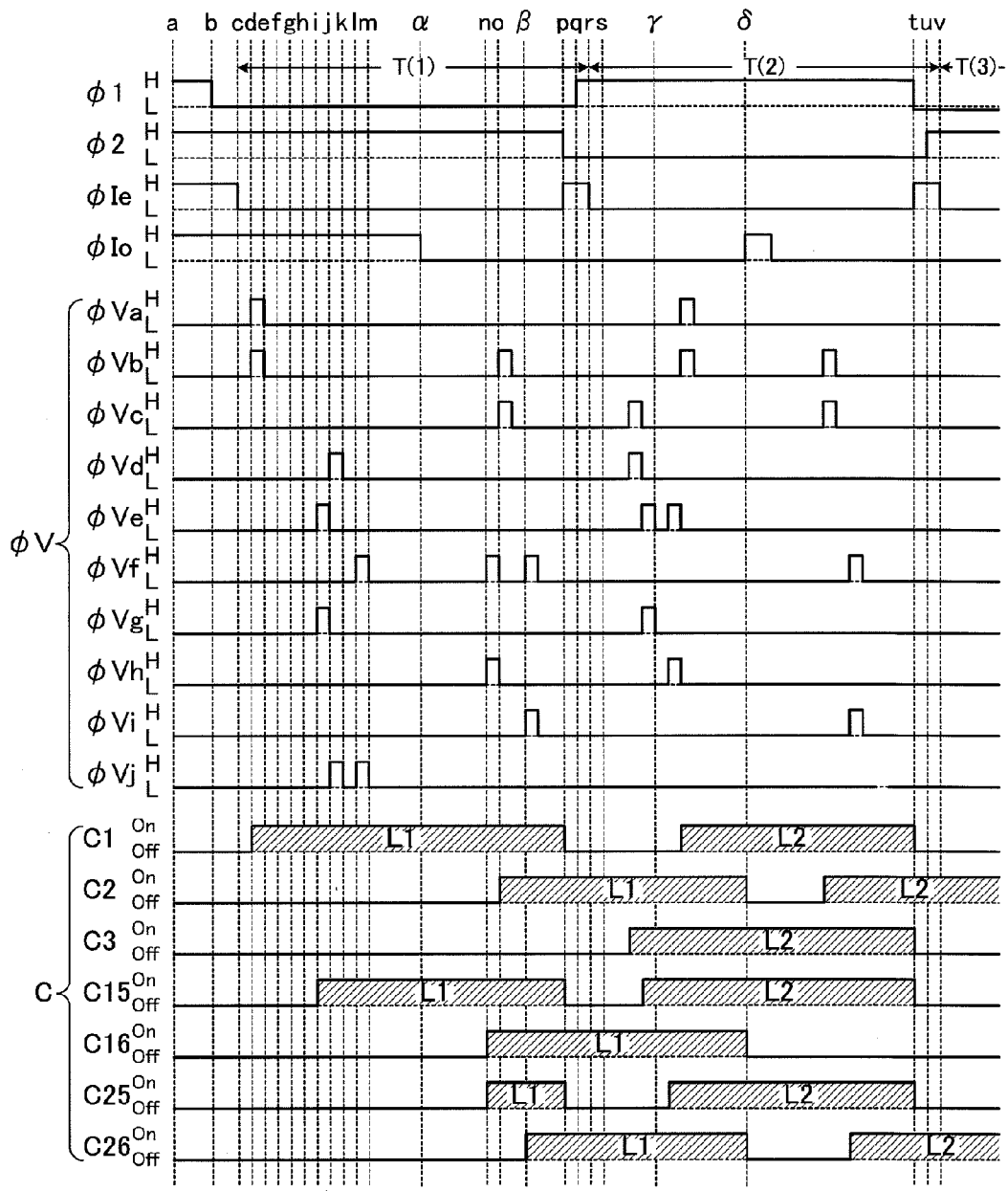
FIG. 13 is a timing chart for illustrating operations of the light-emitting chip according to the fifth exemplary embodiment.

FIG. 13 is a timing chart for illustrating operations of the light-emitting chip C according to the fifth exemplary embodiment.

In FIG. 13, operations of light-emitting chips C1, C2, C3, C15, C16, C25 and C26 selected from the light-emitting chips C (the light-emitting chips C1 to C40) of the light-emitting device 65 are described. The operations of other light-emitting chips C are similar to the above. FIG. 13 shows the timing chart centered on the operation of each light-emitting chip C, which controls whether or not to light up the light-emitting thyristors L1 and L2 in the light-emitting chip C.

In FIG. 13, time elapses in alphabetical order from a time point a to a time point v. The time point a to the time point v in FIG. 13 are the same as the time point a to the time point v in FIG. 8. Furthermore, in FIG. 13, a time point α is newly given between a time point m and a time point n, a time point β is newly given between a time point o and a time point p, and time points γ, δ are newly given between a time point s and a time point t (the time point γ precedes the time point δ on the time axis).

In the fifth exemplary embodiment, lighting control of the light-emitting thyristor L1 of each light-emitting chip C is made during a time interval T(1) from a time point c to a time point r similarly to the first exemplary embodiment. Lighting control of the light-emitting thyristor L2 of each light-emitting chip C is made during a time interval T(2) from the time point r to the time point v. Lighting control of the light-emitting thyristor L3 of each light-emitting chip C is made during a time interval T(3) from the time point v. In a similar manner, lighting control of the light-emitting thyristor Ln (n≥4) is made.

In the following, the portions of the fifth exemplary embodiment that are different from those of the first exemplary embodiment are mainly described.

The signal waveform of the light-up signal φIe is the same as that of the light-up signal φI in the first exemplary embodiment (see FIG. 8). On the other hand, the signal waveform of light-up signal φIo is given by shifting the signal waveform of the light-up signal φIe to a point delayed by half the time interval T on the time axis.

In order to light up (emit light from) the light-emitting thyristor L1 of odd numbered light-emitting chips C1, C3, C15, C25, time intervals of "H" (0 V) for each selection signal φV (φVa to φVj) which designates each of the light-emitting chips C1, C3, C15, C25 needs to be set in the time interval from the time point c to the time point p when the light-up signal φIe is "L" (−3.3 V). This operation is the same as that of the first exemplary embodiment.

On the other hand, in order to light up (emit light from) the light-emitting thyristor L1 of even numbered light-emitting chips C2, C16, C26, timing of shift from "L" (−3.3 V) to "H" (0 V) (lighting start time point) for each selection signal φV (φVa to φVj) which designates each of the light-emitting chips C2, C16, C26 needs to be set in the time interval from the time point α to the time point p when the light-up signal φIo is "L" (−3.3 V). That is, a lighting start time point may not be set in the time interval from the time point p to the time point δ. If a lighting start time point is set in the time interval from the time point p to a time point q, the light-emitting thyristors L1 and L2 are turned on and lighted up (emits light) because the transfer thyristors T1 and T2 are in an ON state. If a lighting start time point is set in the time interval from the time point q to the time point δ (for example, the time point γ), the light-emitting thyristors L2 is lighted up (emits light) because the transfer thyristor T2 is in an ON state.

Odd numbered light-emitting chips C1, C3, C15, C25 in the time interval T(1) are specifically described. As shown in FIG. 13, at a time point d, the light-emitting thyristor L1 of the light-emitting chip C1 is turned on and lighted up (emits light). At a time point i, the light-emitting thyristor L1 of the light-emitting chip C15 is turned on and lighted up (emits light). At the time point n, the light-emitting thyristor L1 of the light-emitting chip C25 is turned on and lighted up (emits light). Since the selection signals φVc and φVd for designating the light-emitting chip C3 do not share a time interval, in which both signals φVc and φVd are "H" (0 V), in the time interval T(1) from the time point c to the time point p, the light-emitting thyristor L1 of the light-emitting chip C3 remains turned off.

The lighting time interval of each light-emitting thyristor L1 of the light-emitting chips C1, C15, C25 is terminated when the light-up signal φIo shifts from "L" (−3.3 V) to "H" (0 V) at the time point p.

Next, even numbered light-emitting chips C2, C16, C26 in the period T(1) are specifically described. As shown in FIG. 13, at the time point o, the light-emitting thyristor L1 of the light-emitting chip C2 is turned on and lighted up (emits light). At the time point n, the light-emitting thyristor L1 of the light-emitting chip C16 is turned on and lighted up (emits light). At the time point β, the light-emitting thyristor L1 of the light-emitting chip C26 is turned on and lighted up (emits light).

The lighting time interval of each light-emitting thyristor L1 of the light-emitting chips C2, C16, C26 is terminated when the light-up signal ϕIe shifts from "L" (−3.3 V) to "H" (0 V) at the time point δ.

Similar operations follow after the time interval T(2).

As described above, also in the fifth exemplary embodiment, the number of wiring provided on the circuit board 62 is suppressed by designating each light-emitting chip C (the light-emitting chips C1 to C40) by a combination of either two of the selection signals ϕV (ϕVa to ϕVj).

Note that the light-up signal ϕIo is given by shifting the light-up signal ϕIe by half the time interval T to the right on the time axis, but the shift time is not limited to half the time interval T, and may be any predetermined time equal to the time interval T or less.

Sixth Exemplary Embodiment

The sixth exemplary embodiment has a different configuration of the signal generating circuit 110 of the light-emitting device 65 and a different wiring configuration on the circuit board 62 from those of the fifth exemplary embodiment.

In the fifth exemplary embodiment, as described in FIG. 13, the lighting start time point of each light-emitting thyristor L1 of even numbered light-emitting chips C2, C16, C26 may be set in the time interval from the time point α to the time point p when the light-up signal ϕIo is "L" (−3.3 V), and may not be set in the time interval from the time point p to the time point δ. That is, possible lighting time interval which may be set for the even numbered light-emitting chips C2, C4, C6, ..., is longer than that of the odd numbered light-emitting chips C1, C3, C5, ....

Figure 14:
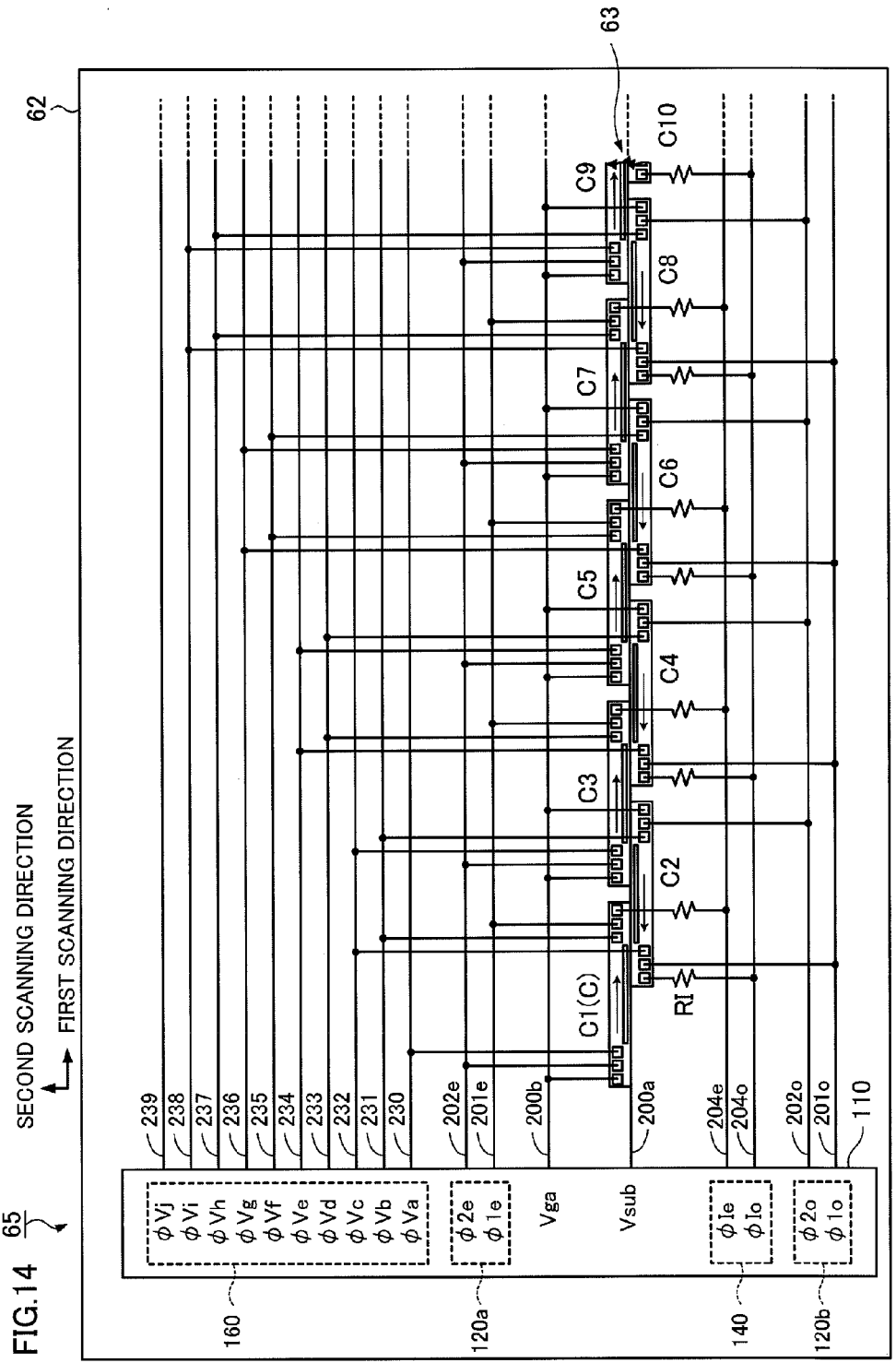
FIG. 14 is a diagram showing the configuration of the signal generating circuit of the light-emitting device and the wiring configuration on the circuit board according to the sixth exemplary embodiment.

In the sixth exemplary embodiment, a first transfer signal ϕ1a and a second transfer signal ϕ2a to be transmitted to the odd numbered light-emitting chips C1, C3, C5, ..., and a first transfer signal ϕ1b and a second transfer signal ϕ2b to be transmitted to the even numbered light-emitting chips C2, C4, C6, ..., are separately provided so that a lighting time interval with the same length may be set for both odd numbered light-emitting chips C1, C3, C5, ..., and even numbered light-emitting chips C2, C4, C6, ..., FIG. 14 is a diagram showing the configuration of the signal generating circuit 110 of the light-emitting device 65 and the wiring configuration on the circuit board 62 according to the sixth exemplary embodiment. Note that the configuration of the light-emitting chip C is the same as that of the first exemplary embodiment (see FIG. 4A). FIG. 14 shows the portions of the light-emitting chips C1 to C10.

In the following, the components of the sixth exemplary embodiment that are different from those of the fifth exemplary embodiment are mainly described, and similar components to those of the fifth exemplary embodiment are labeled with the same reference numerals, and detailed description of the similar components is omitted.

The signal generating circuit 110 includes a transfer signal generating part 120a to transmit a first transfer signal ϕ1e and a second transfer signal ϕ2e to odd numbered light-emitting chips C1, C3, C5, ..., based on various kinds of control signals, and a transfer signal generating part 120b to transmit a first transfer signal ϕ1o and a second transfer signal ϕ2o to even numbered light-emitting chips C2, C4, C6, ....

Although the transfer signal generating part 120a and the transfer signal generating part 120b are separately shown in FIG. 14, these transfer signal generating parts are collectively referred to as a transfer signal generating part 120 as an example of the transfer signal supply unit.

The circuit board 62 includes a first transfer signal line 201e to transmit a first transfer signal ϕ1e from the transfer signal generating part 120a of the signal generating circuit 110 to each ϕ1 terminal of the odd numbered light-emitting chips C1, C3, C5, ..., and a second transfer signal line 202e to transmit a second transfer signal ϕ2e to each ϕ2 terminal of the odd numbered light-emitting chips C1, C3, C5, .... The first transfer signal ϕ1e and the second transfer signal ϕ2e are transmitted to the odd numbered light-emitting chips C1, C3, C5, ..., in common (parallel).

Similarly, the circuit board 62 includes a first transfer signal line 201o to transmit a first transfer signal ϕ1o from the transfer signal generating part 120b of the signal generating circuit 110 to each ϕ1 terminal of the even numbered light-emitting chips C2, C4, C6, ..., and a second transfer signal line 202o to transmit a second transfer signal ϕ2o to each ϕ2 terminal of the even numbered light-emitting chips C2, C4, C6, .... The first transfer signal ϕ1o and the second transfer signal ϕ2o are transmitted to the even numbered light-emitting chips C2, C4, C6, ..., in common (parallel).

Thus, the number of wiring included in the circuit board 62 of the sixth exemplary embodiment is eighteen, which is three more than the number of wiring, fifteen as in the first exemplary embodiment, and is two more than the number of wiring, sixteen as in the fifth exemplary embodiment. Nevertheless, the number of wiring, eighteen in the sixth exemplary embodiment is much smaller than forty-four as in the case where the sixth exemplary embodiment is not applied.

The combinations of the selection signals ϕVa to ϕVj to be transmitted to each light-emitting chip C (the light-emitting chips C1 to C40) in the sixth exemplary embodiment are the same as those of the first exemplary embodiment (see FIG. 5).

Furthermore, the circuit configuration of the light-emitting chip C in the sixth exemplary embodiment is the same as that of the first exemplary embodiment (see FIGS. 6 and 7).

Figure 15:
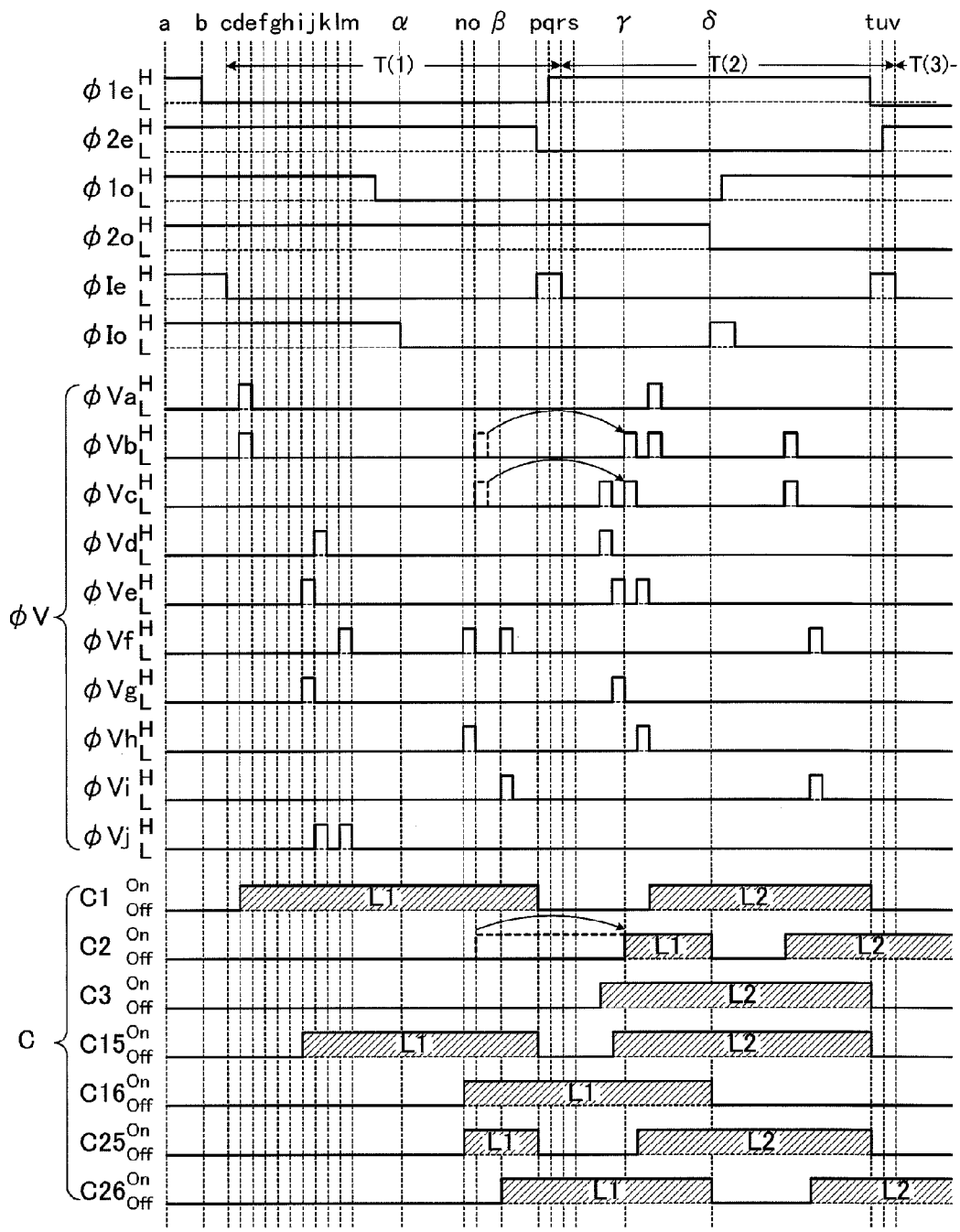
FIG. 15 is a timing chart for illustrating operations of the light-emitting chip according to the sixth exemplary embodiment.

FIG. 15 is a timing chart for illustrating operations of the light-emitting chip C according to the sixth exemplary embodiment.

In FIG. 15, operations of light-emitting chips C1, C2, C3, C15, C16, C25 and C26 selected from the light-emitting chips C (the light-emitting chips C1 to C40) of the light-emitting device 65 are described. The operations of other light-emitting chips C are similar to the above. FIG. 15 shows the timing chart centered on the operation of each light-emitting chip C, which controls whether or not to light up the light-emitting thyristors L1 and L2 in the light-emitting chip C.

In FIG. 15, time elapses in alphabetical order from a time point a to a time point v. The time point a to the time point v in FIG. 15 are the same as the time point a to the time point v in FIG. 8 and FIG. 13. Furthermore, in FIG. 15, a time point α between a time point m and a time point n, a time point β between a time point o and a time point p, and time points γ, δ between a time point s and a time point t (the time point γ precedes the time point δ on the time axis) are given similarly to the fifth exemplary embodiment (see FIG. 13).

In the following, the portions of the sixth exemplary embodiment that are different from those of the fifth exemplary embodiment are mainly described.

The signal waveforms of the first transfer signal ϕ1e and the second transfer signal ϕ2e transmitted to the odd numbered light-emitting chips C1, C3, C5, ..., are the same as those of the first transfer signal ϕ1 and the second transfer signal ϕ2 of the fifth exemplary embodiment. On the other hand, the signal waveforms of the first transfer signal ϕ1o and the second transfer signal ϕ2o transmitted to the even numbered light-emitting chips C2, C4, C6, ..., are given by shifting the signal waveforms of the first transfer signal φ1e and the second transfer signal φ2e by half the time interval T to the right on the time axis.

Similarly to the fifth exemplary embodiment, the signal waveform of the light-up signal φIe transmitted to the odd numbered light-emitting chips C1, C3, C5, . . . , is the same as that of the light-up signal φI of the first exemplary embodiment (see FIG. 8). However, the signal waveform of the light-up signal φIo transmitted to the even numbered light-emitting chips C2, C4, C6, . . . , is given by shifting the signal waveform of the light-up signal φIe by half the time interval T to the right on the time axis.

That is, in the sixth exemplary embodiment, the first transfer signal φ1e, the second transfer signal φ2e, and the light-up signal φIe transmitted to the odd numbered light-emitting chips C1, C3, C5, . . . , and the first transfer signal φ1o, the second transfer signal φ2o, and the light-up signal φIo transmitted to the even numbered light-emitting chips C2, C4, C6, . . . , maintain a mutual relationship (phase relationship) on the time axis with the former signals being shifted to the latter signals on the time axis.

Thereby, a lighting start time point of each light-emitting thyristor L1 of the odd numbered light-emitting chips C1, C3, C5, . . . , may be set when each transfer thyristor T1 of the odd numbered light-emitting chip C1, C3, C5, . . . , is in an ON states, while in the time interval from a time point c to the time point p when the light-up signal φIe is "L" (−3.3 V). A lighting start time point of each light-emitting thyristor L1 of the even numbered light-emitting chips C2, C4, C6, . . . , may be set when each transfer thyristor T1 of the even numbered light-emitting chip C2, C4, C6, . . . , is in an ON states, while in the time interval from the time point α to the time point δ when the light-up signal φIo is "L" (−3.3 V).

Thus, in the sixth exemplary embodiment, a lighting start time point may be set at the time point γ as shown by an arrow for the light-emitting thyristor L1 of the light-emitting chip C2 instead of the time point o as in the fifth exemplary embodiment.

As described above, also in the sixth exemplary embodiment, the number of wiring provided on the circuit board 62 is suppressed by designating each light-emitting chip C (the light-emitting chips C1 to C40) by a combination of either two of the selection signals φV (φVa to φVj).

Note that the light-up signal φIo is given by shifting the light-up signal φIe by half the time interval T to the right on the time axis, but the shift time is not limited to half the time interval T, and may be any predetermined time equal to the time interval T or less.

Seventh Exemplary Embodiment

The seventh exemplary embodiment has a different configuration of the signal generating circuit 110 of the light-emitting device 65 and a different wiring configuration on the circuit board 62 from those of the first exemplary embodiment.

FIGS. 16A and 16B are a diagram showing a configuration of the light-emitting chip C, a configuration of the signal generating circuit 110 of the light-emitting device 65 and a wiring configuration on the circuit board 62 according to the seventh exemplary embodiment. FIG. 16A shows the configuration of the light-emitting chip C, and FIG. 16B shows the configuration of the signal generating circuit 110 of the light-emitting device 65 and the wiring configuration on the circuit board 62. FIG. 16B shows the portions of the light-emitting chips C1 to C10.

In the following, the components of the seventh exemplary embodiment that are different from those of the first exemplary embodiment are mainly described, and similar components to those of the first exemplary embodiment are labeled with the same reference numerals, and detailed description of the similar components is omitted.

First, the configuration of the light-emitting chip C shown in FIG. 16A is described.

The light-emitting chip C includes input terminals (Vga terminal, φ2 terminal, φW1 terminal, φW2 terminal, φE terminal, φ1 terminal, φI1 terminal and φI2 terminal) at both ends in the longitudinal direction of the substrate 80, the terminals being multiple bonding pads to receive various kinds of control signals. The φW terminal of the light-emitting chip C of the first exemplary embodiment corresponds to the φW1 terminal and the φW2 terminal. Also, the φI terminal of the first exemplary embodiment corresponds to the φI1 terminal and the φI2 terminal. Note that these input terminals are provided in the order of the Vga terminal, the φ2 terminal, the φW1 terminal, and the φW2 terminal from one end of the substrate 80, and are provided in the order of the φI2 terminal, the φI1 terminal, the φ1 terminal, and the φE terminal from the other end of the substrate 80. The light-emitting element array 102 is provided between the φW2 and φE terminals.

Next, the configuration of the signal generating circuit 110 of the light-emitting device 65 and the wiring configuration on the circuit board 62 are described with reference to FIG. 16B.

The circuit board 62 of the light-emitting device 65 is mounted with the signal generating circuit 110 and light-emitting chips C (the light-emitting chips C1 to C20), and wiring to connect between the signal generating circuit 110 and the light-emitting chips C1 to C20 is provided. Note that the number of the light-emitting chips C (the light-emitting chips C1 to C40) is forty in the first exemplary embodiment, but is twenty in the seventh exemplary embodiment.

In the seventh exemplary embodiment, the signal generating circuit 110 includes a light-up signal generating part 140 as an example of the light-up signal supply unit that transmits a light-up signals φI to the light-emitting chip C (the light-emitting chips C1 to C20) based on various kinds of control signals.

The circuit board 62 includes a light-up signal line 204 that is connected from the light-up signal generating part 140 of the signal generating circuit 110 to the φI1 terminals and the φI2 terminals of respective light-emitting chips C (the light-emitting chips C1 to C20) via respective current limitation resistances RI in order to transmit the light-up signal φI. The light-up signal (pi is transmitted to the (pH terminals and the φI2 terminals of respective light-emitting chips C (the light-emitting chips C1 to C20) in common (in parallel).

In the first exemplary embodiment, a combination of two selection signals taken from the selection signals φV (φVa to φVj) is transmitted as a designation signal to the φW and φE terminals of each light-emitting chip C (the light-emitting chips C1 to C20). In the seventh exemplary embodiment, a combination of three selection signals taken from the selection signals φV (φVa to φVj) is transmitted as a designation signal to the φW1, φW2 and φE terminals as an example of control terminals of each light-emitting chip C (the light-emitting chips C1 to C20).

FIG. 17 is a table illustrating combinations of three selection signals from φV (φVa to φVj) to be transmitted to respective light-emitting chips C (the light-emitting chips C1 to C20). For each light-emitting chip C, selection signal φV (φVa to φVj) denoted as "E" is transmitted to the φE terminal, the selection signal φV (φVa to φVj) denoted as "W1" is transmitted to the φW1 terminal, and the selection signal φV (φVa to φVj) denoted as "W2" is transmitted to the φW2 terminal.

For example, the selection signals φVa, φVc, φVd are transmitted to the φE, φW1, φW2 terminals, respectively. The selection signals φVa, φVe, φVf are transmitted to the φE, φW1, φW2 terminals of the light-emitting chip C2, respectively. Transmission of selection signals to other light-emitting chips C3 to C20 may be described similarly to the above.

In FIG. 16B, the selection signal lines 230 to 239 connect between the selection signal generating part 160 and the φE, φW1, φW2 terminals of each the light-emitting chip C (light-emitting chips C1 to C20) based on the combinations of selection signals φV (φVa to φVj) shown in FIG. 17.

Here, combinations of the selection signals φV (φVa to φVj) to be transmitted is described. The combinations of the selection signals φV (φVa to φVj) to be transmitted are chosen without redundant combinations so that each light-emitting chip C may be separately (individually) selected (designated).

First, the case where the number of the selection signal lines φV (φV1 to φV2n) is even (2n (n is an integer)) is described. When the first selection signal line φV1 is connected to the φE terminal, the second selection signal line φV2 is not used for connection, (n−1) selection signal lines are connected to φW1 terminals, and the remaining (n−1) selection signal lines are connected to φW2 terminals, (n−1) light-emitting chips C may be designated.

Next, when the first selection signal line φV1 is not used for connection, the second selection signal line φV2 is connected to the φE terminal, (n−1) selection signal lines are connected φW1 terminals, and the remaining (n−1) selection signal lines are connected to φW2 terminals, (n−1) light-emitting chips C may be designated.

Also, when the first, second, and fourth selection signal lines φV1, φV2, φV4 are not used for connection, the third selection signal line φV3 is connected to φE terminals, (n−2) selection signal lines are connected to φW1 terminals, and the remaining (n−2) selection signal lines are connected to φW2 terminals, (n−2) light-emitting chips C may be designated.

Also, when the first, second, and third selection signal lines φV1, φV2, φV3 are not used for connection, the fourth selection signal line φV4 is connected to φE terminals, (n−2) selection signal lines are connected to φW1 terminals, and the remaining (n−2) selection signal lines are connected to φW2 terminals, (n−2) light-emitting chips C may be designated.

By counting the number of combinations in the same manner, two arithmetic series from (n−1) to 1 are formed. Therefore, the number, Q of light-emitting chips C that may be separately designated is given by:

$$Q = 2\sum_{k=1}^{n-1} k = n(n-1)$$ [Equation 2]

For example, with ten (n=5) selection signal lines φV (φV1 to φV10), twenty light-emitting chips C may be designated.

In order to separately designate forty light-emitting chips C, fourteen selection signal lines φV (φV1 to φV14) may be used.

Next, the case where the number of the selection signal lines φV (φV1 to φV2n+1) is odd (2n+1) is described. When first selection signal line φV1 is connected to φE terminals, and n selection signal lines are connected to φW1 terminals, and the remaining n selection signal lines are connected to φW2 terminals, n light-emitting chips C may be separately specified.

Subsequently, the first selection signal line φV1 is not used for connection, and the result is the same as the case of even number (2n) of selection signal lines. Therefore, the number, Q of light-emitting chips C that may be separately specified is given by:

$$Q = n + n(n-1) = n^2$$ [Equation 3]

For example, with eleven (n=5) selection signal lines φV (φV1 to φV11), twenty-five light-emitting chips C may be separately specified.

As described above, each light-emitting chips C in the seventh exemplary embodiment includes the φE terminal, the φW1 terminal, the φW2 terminal, and is specified by a combination of three of the selection signal lines φV. The number of selection signal lines φV may be set according to the number of the light-emitting chips C as described above.

The number of selection signal lines φV may be provided so as to exceed a number needed to select any light-emitting chip C. In this case, some combinations do not correspond to any light-emitting chip C.

In the case where the number of light-emitting chips C is forty in the seventh exemplary embodiment, the wiring provided on the circuit board 62 is, as seen by referring to FIG. 16B, the power supply lines 200a, 200b, the first transfer signal line 201, the second transfer signal line 202, the light-up signal line 204a, 204b, and fourteen selection signal lines corresponding to fourteen selection signals φV, thus the total number of the wiring is twenty. This number is less than forty-four as in the case where the seventh exemplary embodiment is not applied, described above.

Figure 18:
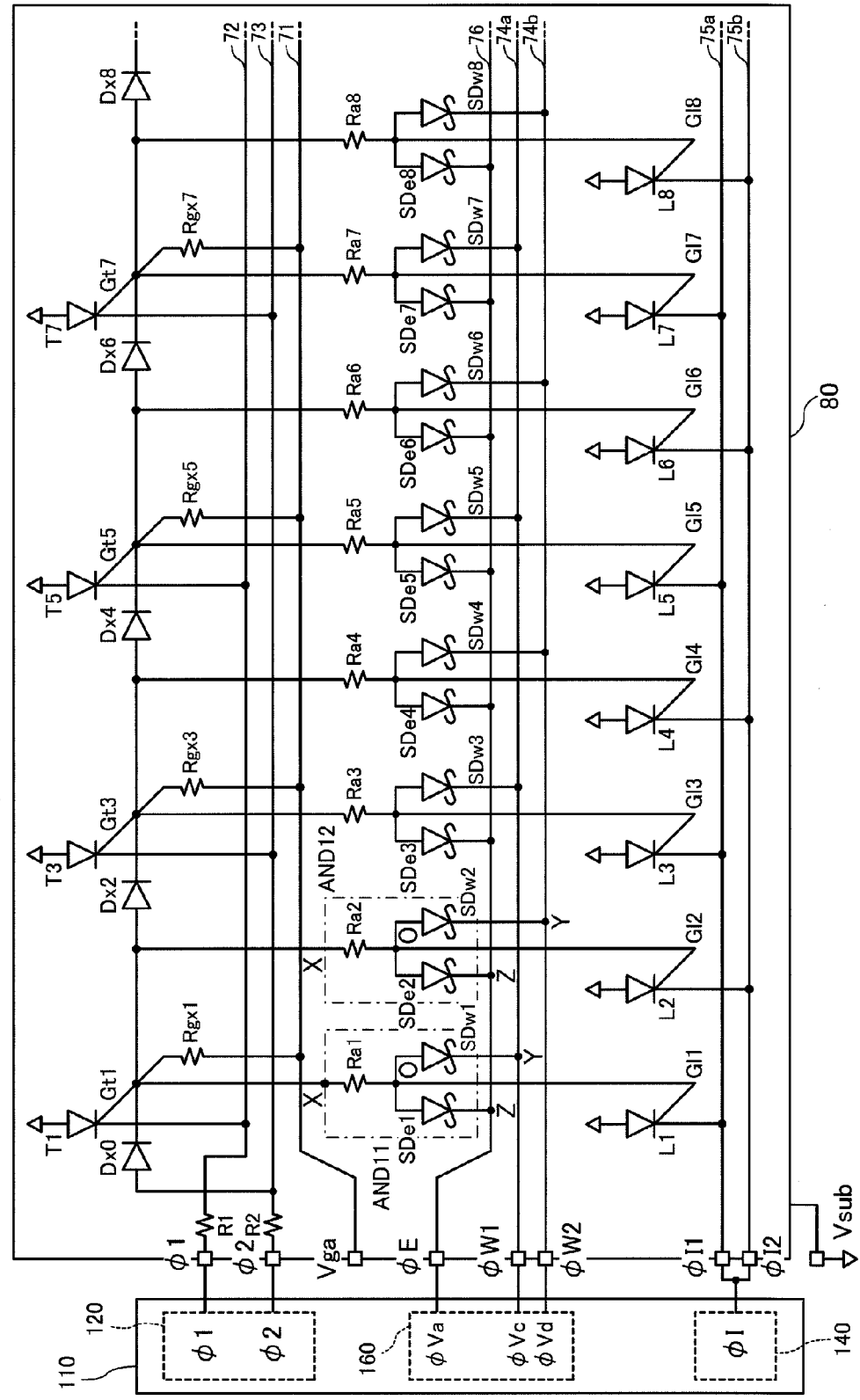
FIG. 18 is an equivalent circuit diagram for illustrating a circuit configuration of the light-emitting chip that is a self-scanning light-emitting device array (SLED) chip according to the seventh exemplary embodiment.

FIG. 18 is an equivalent circuit diagram for illustrating a circuit configuration of the light-emitting chip C that is a self-scanning light-emitting device array (SLED) chip according to the seventh exemplary embodiment. Here, the light-emitting chip C is described using the light-emitting chip C1 as an example. Now, in FIG. 18, the light-emitting chip C is denoted as the light-emitting chip C1 (C). The configuration of other light-emitting chips C2 to C20 is the same as that of the light-emitting chip C1. Similar components to those of the first exemplary embodiment are labeled with the same reference numerals, and detailed description of the similar components is omitted.

The input terminals (Vga terminal, φ2 terminal, φW1 terminal, φW2 terminal, φE terminal, φ1 terminal, (pH terminal, φI2 terminal), although shown at different positions from those in FIG. 16A, are shown at the left end of FIG. 18 for convenience of description.

In the light-emitting chip C1 (C) in the first exemplary embodiment, one light-emitting thyristor L is provided for each transfer thyristor T as shown in FIG. 6. In the seventh exemplary embodiment, two light-emitting thyristors L are provided for each transfer thyristor T as shown in FIG. 18. In the seventh exemplary embodiment, up to two light-emitting thyristors L may be turned on and lighted up (emits light) in parallel per one light-emitting chip C.

That is, the light-emitting chip C1 (C) according to the seventh exemplary embodiment has a configuration resulting from removing even numbered transfer thyristors T2, T4, T6, . . . , odd numbered coupling diode Dx1, Dx3, Dx5, . . . , and even numbered power supply line resistance Rgx2, Rgx4, Rgx6, . . . , from the light-emitting chip C1 (C) of the first exemplary embodiment shown in FIG. 6.

The cathode terminals of the transfer thyristors T1, T5, . . . , which are including alternately selecting a transfer thyristor from odd numbered transfer thyristors T1, T3, T5, T7, . . . , starting with T1, are connected to the first transfer signal line 72, while the cathode terminals of the transfer thyristors T3, T7, . . . , which are including alternately selecting a transfer thyristor from odd numbered transfer thyristors T1, T3, T5, T7, . . . , starting with T3, are connected to the second transfer signal line 73.

In the light-emitting chip C1 (C) in the seventh exemplary embodiment, the write signal line 74 in the first exemplary embodiment shown in FIG. 6 is replaced by separated write signal lines 74a and 74b. The cathode terminals of odd numbered Schottky write diodes SDw1, SDw3, SDw5, . . . , are connected to the write signal line 74a, while the cathode terminals of even numbered Schottky write diodes SDw2, SDw4, SDw6, . . . , are connected to the write signal line 74b. The write signal line 74a is connected to the φW1 terminal to which the selection signal φV (φVc for the light-emitting chip C1) is transmitted. The write signal line 74b is connected to the φW2 terminal to which selection signal φV (φVd for the light-emitting chip C1) is transmitted.

Furthermore, in the light-emitting chip C1 (C) in the seventh exemplary embodiment, the light-up signal line 75 in the first exemplary embodiment shown in FIG. 6 is replaced by separated light-up signal lines 75a and 75b. The cathode terminals of odd numbered light-emitting thyristors L1, L3, L5, . . . , are connected to the light-up signal line 75a, while the cathode terminals of even numbered light-emitting thyristors L2, L4, L6, . . . , are connected to the light-up signal line 75b. The light-up signal line 75a is connected to the (pH terminal, and the light-up signal line 75b is connected to the φI2 terminal. In the seventh exemplary embodiment, as shown in FIG. 16B, the light-up signal φI is transmitted to the φI1 and φI2 terminals in common via respective current limitation resistances RI.

The selection signal φVa is transmitted to the φE terminal of the light-emitting chip C1.

A 3-input AND circuit AND11 whose terminal O is connected to the gate terminal Gl1 of the light-emitting thyristor L1, and a 3-input AND circuit AND12 whose terminal O is connected to the gate terminal Gl2 of the light-emitting thyristor L2 each have a basic configuration similar to that of the 3-input AND circuit AND1 of the first exemplary embodiment shown in FIG. 6. That is, the 3-input AND circuits AND11 and AND12 have the terminal X, the terminal Y, and the terminal Z as an input terminal, and the terminal O as an output terminal.

The terminal X of the 3-input AND circuit AND11 whose terminal O is connected to the gate terminal Gl1 of the light-emitting thyristor L1, is connected to the gate terminal Gt1 of the transfer thyristor T1, and the terminal Y, the terminal Z of the 3-input AND circuit AND11 are connected to the φW1 terminal and the φE terminal, respectively. Thus, when all of the potentials of the gate terminal Gt1, the φW1 terminal, and the φE terminal of the 3-input AND circuit AND11 are set to "H" (0 V), the potential of the gate terminal Gl1 of the light-emitting thyristor L1 is set to "H" (0 V).

The terminal X of the 3-input AND circuit AND12 whose terminal O is connected to the gate terminal Gl2 of the light-emitting thyristor L2, is connected to the gate terminal Gt1 of the transfer thyristor T1, and the terminal Y, the terminal Z of the 3-input AND circuit AND12 are connected to the φW2 terminal and the φE terminal, respectively. Thus, when all of the potentials of the gate terminal Gt1, the φW2 terminal, and the φE terminal of the 3-input AND circuit AND12 are set to "H" (0 V), the potential of the gate terminal Gl2 of the light-emitting thyristor L2 is set to "H" (0 V).

The operations of other odd numbered light-emitting thyristors L3, L5, L7, . . . , are similar to those of the light-emitting thyristor L1, and the operations of other even numbered light-emitting thyristors L2, L4, L6, . . . , are similar to those of the light-emitting thyristor L12.

Figure 19:
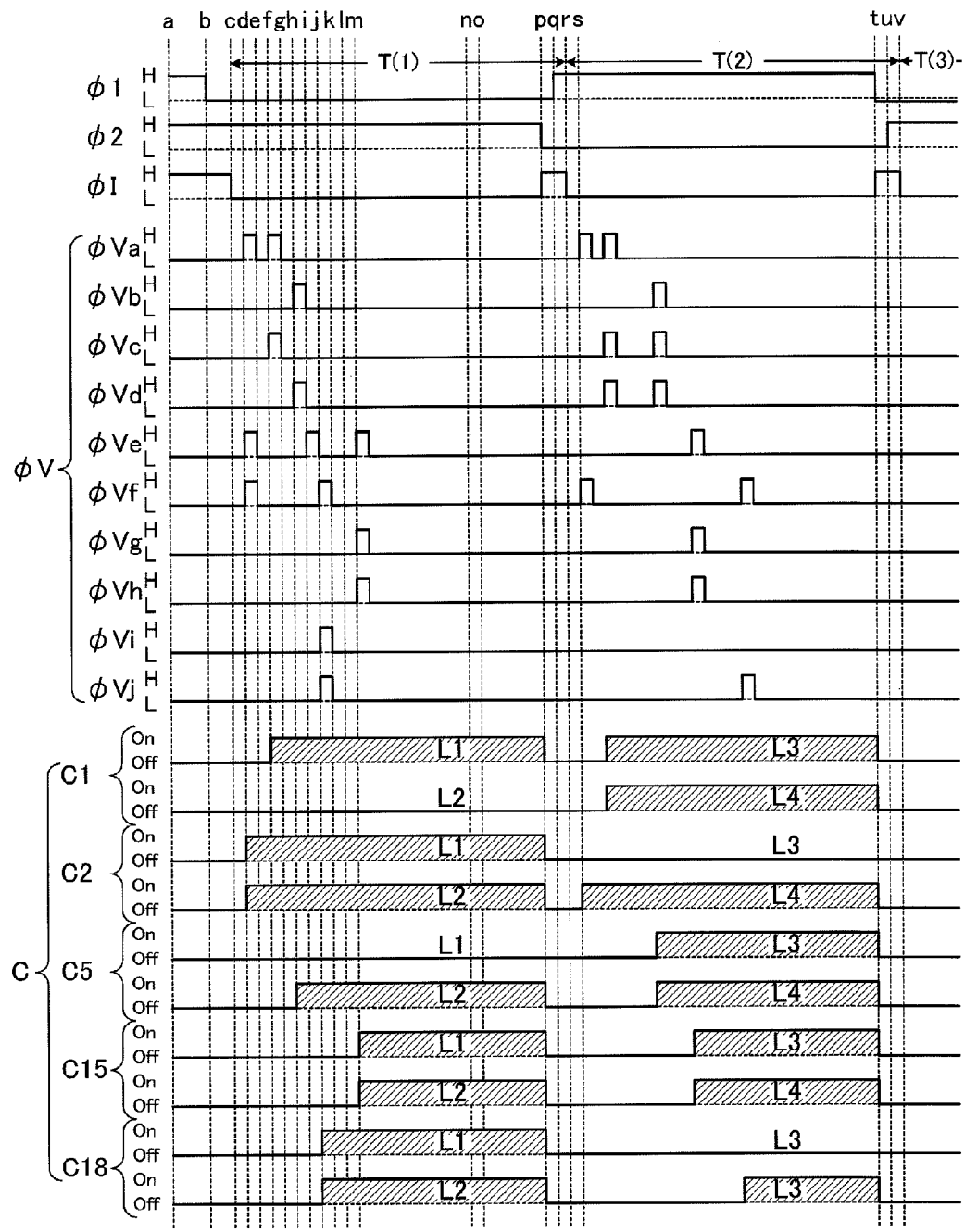
FIG. 19 is a timing chart for illustrating operations of the light-emitting chip according to the seventh exemplary embodiment.

FIG. 19 is a timing chart for illustrating operations of the light-emitting chip C according to the seventh exemplary embodiment.

In FIG. 19, operations of light-emitting chips C1, C2, C5, C15 and C18 selected from the light-emitting chips C (the light-emitting chips C1 to C20) of the light-emitting device 65 are described. The operations of other light-emitting chips C are similar to the above. FIG. 19 shows the timing chart centered on a portion of each light-emitting chip C, which controls whether or not to light up the light-emitting thyristors L1 to L4 in the light-emitting chip C.

In FIG. 19, time elapses in alphabetical order from a time point a to a time point v. The time point a to the time point v in FIG. 19 are the same as the time point a to the time point v in FIG. 8.

In the seventh exemplary embodiment, lighting control of the light-emitting thyristors L1 and L2 of each light-emitting chip C is made during a time interval T(1) from a time point c to a time point r. Lighting control of the light-emitting thyristors L3 and L4 of each light-emitting chip C is made during a time interval T(2) from the time point r to the time point v. Lighting control of the light-emitting thyristors L5 and L6 of each light-emitting chip C1 is made during a time interval T(3) from the time point v. Lighting control of the light-emitting thyristor Ln (n≥7) is made sequentially in a similar manner.

In the following, the portions of the seventh exemplary embodiment that are different from those of the first exemplary embodiment are mainly described.

The signal waveforms of the first transfer signal φ1, the second transfer signal φ2, and the light-up signal φI are the same as that of the first exemplary embodiment.

The signal waveform of the selection signal φV changes according to received image data and controls whether or not to light up the light-emitting thyristor L of specified light-emitting chip C.

Figure 16:
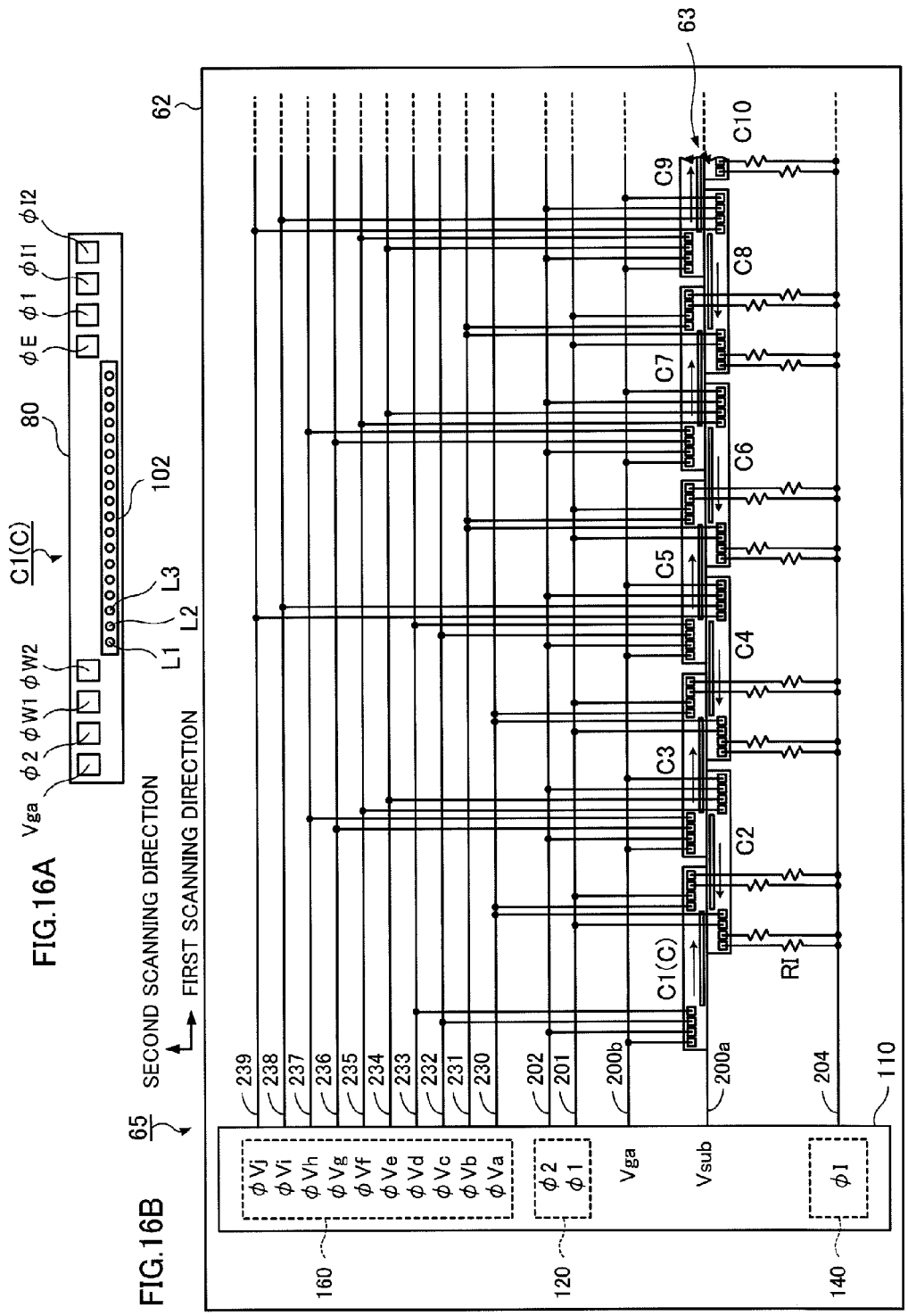
FIGS. 16A and 16B are a diagram showing a configuration of the light-emitting chip, a configuration of the signal generating circuit of the light-emitting device and a wiring configuration on the circuit board according to the seventh exemplary embodiment.

Now, the operations of the light-emitting device 65 are described according to the timing chart shown in FIG. 19 with reference to FIGS. 16 to 18.

As described above, when the gate terminal Gt of the transfer thyristor T connected to the terminal X, the terminal Y connected to φW1 or φW2, the Z terminal connected to φE terminal are all set to "H" (0 V) for the 3-input AND circuits AND11 and AND12, AND condition thereof is satisfied, and the potential of the gate terminal Gl of the light-emitting thyristor L connected to the terminal O is set to "H" (0 V). Accordingly, the threshold voltage is set to −1.5 V, and the light-emitting thyristor L is turned on and lighted up (emits light) if the light-up signal φI is "L" (−3.3 V).

That is, in order for the light-emitting thyristor L to be turned on and lighted up (emits light), the potential of the φE terminal needs to be "H" (0 V).

At the time point c, φI is "L" (−3.3 V). Accordingly, the potential of the light-up signal lines 75a and 75b is set to "L" (−3.3 V).

At a time point d, the selection signals φVa, φVe and φVf shift from "L" (−3.3 V) to "H" (0 V). At the time point d, the transfer thyristor T1 of each light-emitting chip C (the light-emitting chips C1 to C20) of the light-emitting device 65 is in an ON state.

As shown in FIG. 17, the selection signal φVa is transmitted to the φE terminals of the light-emitting chips C1, C2, C3 and C4. Thus, the light-emitting thyristor L is lighted up only for the light-emitting chips C1, C2, C3 and C4.

On the other hand, the selection signal φVe is transmitted to the φW1 terminal of the light-emitting chip C2 only of the light-emitting chips C1, C2, C3 and C4. Thus, in light-emitting chip C2, the potential of the gate terminal Gl1 is set to "H" (0 V), and the threshold voltage of the light-emitting thyristor L1 is set to −1.5 V. Since the light-up signal line 75a, to which the cathode terminal of the light-emitting thyristor L1 is connected, is already "L" (−3.3 V), the light-emitting thyristor L1 is turned on and lighted up (emits light).

When the light-emitting thyristor L1 is turned on and the potential of the cathode terminal becomes −1.5 V, the potential of the light-up signal line 75a also becomes −1.5 V.

At this point, as shown in FIG. 16B, the φI1 terminal and the φI2 terminal of the light-emitting chip C (the light-emitting chips C1 to C20) are connected to the light-up signal line 204 via respective current limitation resistances RI. Thus, even if the potential of the light-up signal line 75a becomes −1.5 V, the light-up signal line 204 is maintained at "L" (−3.3 V), and the light-up signal line 75b is also maintained at "L" (−3.3 V). The above statement is true even if the relationship between the light-up signal lines 75a and 75b is reversed.

Now, the selection signal φVf is transmitted to the φW2 terminal of the light-emitting chip C2 only of the light-emitting chips C1, C2, C3 and C4. Thus, the gate terminal Gl2 is set to "H" (0 V) in the light-emitting chip C2. The threshold voltage of the light-emitting thyristor L2 whose gate terminal Gl2 in the light-emitting chip C2 is set to "H" (0 V) becomes −1.5 V. Since the light-up signal line 75b is already "L" (−3.3 V), the light-emitting thyristor L2 is turned on and lighted up (emits light). When the light-emitting thyristor L2 is turned on and the potential of the cathode terminal becomes −1.5 V, the potential of the light-up signal line 75b also becomes −1.5 V.

That is, in the light-emitting chip C2, the light-emitting thyristors L1 and L2 are lighted up (emits light) in parallel.

In the seventh exemplary embodiment, the light-up signal line 75a to transmit the light-up signal φI to odd numbered light-emitting thyristors L, and the light-up signal line 75b to transmit the light-up signal φI to even numbered light-emitting thyristors L are separately provided so that a pair of an odd numbered light-emitting thyristor L and an even numbered light-emitting thyristor L may be turned on and lighted up (emits light) in parallel. Respective current limitation resistances RI are provided between the light-up signal line 204, and the φI1 terminal to which the light-up signal line 75a is connected and the φI2 terminal to which the light-up signal line 75b is connected, so that even if an odd numbered light-emitting thyristor L or an even numbered light-emitting thyristor L is lighted up (emits light) to set the potential of either one of the light-up signal lines 75a and 75b to −1.5 V, the potential of the other one of the light-up signal lines 75a and 75b may be maintained at "L" (−3.3 V). In this manner, the single light-up signal line 224 is implemented.

As described above, in the seventh exemplary embodiment, two light-emitting thyristors L, i.e., an odd numbered light-emitting thyristor L and the subsequent even numbered light-emitting thyristor L may be turned on in parallel in one light-emitting chip C.

To achieve this, as shown in FIG. 18, the gate terminal Gt of one transfer thyristor T is connected to the gate terminals Gl of two light-emitting thyristors L, i.e., an odd numbered light-emitting thyristor L and the subsequent even numbered light-emitting thyristor L, via respective connection resistances Ra.

Note that one of an odd numbered light-emitting thyristor L and the subsequent even numbered light-emitting thyristor L may be turned on and lighted up (emits light). For example, at a time point f in FIG. 19, the selection signals φVa and φVc shift from "L" (−3.3 V) to "H" (0 V).

As described above, the selection signal φVa is transmitted to the φE terminals of the light-emitting chips C1, C2, C3 and C4. Also in this case, the light-emitting thyristor L is lighted up only for the light-emitting chips C1, C2, C3 and C4. The selection signal φVc is transmitted to the φW1 terminal of the light-emitting chip C1. Thus, the potential of the gate terminal Gl1 of the light-emitting chip C1 becomes "H" (0 V) so that the light-emitting thyristor L1 is turned on and lighted up (emits light). However, φVd transmitted to the φW2 terminal of the light-emitting chip C1 is maintained at "L" (−3.3 V). Therefore, the gate terminal Gl2 of the light-emitting thyristor L2 does not become "H" (0 V), thus the light-emitting thyristor L2 is not lighted up (emits light). Thus, as shown in FIG. 19, at the time point f, the light-emitting thyristor L1 of the light-emitting chip C1 is turned on and lighted up (emits light), but the light-emitting thyristor L2 may keep light-off.

That is, in the seventh exemplary embodiment, each light-emitting chip C is specified by a combination of three of the selection signals φV (φVa to φVj). Target light-emitting thyristor L to be turned on is set by having both selection signals φV at "H" (0 V) transmitted to the φE and φW1 terminals or the φE and φW2 terminals.

Also in the seventh exemplary embodiment, the number of wiring provided on the circuit board 62 is suppressed by specifying each light-emitting chip C (the light-emitting chips C1 to C40) by a combination of either three of the selection signals φV (φVa to φVj).

Eighth Exemplary Embodiment

In the eighth exemplary embodiment, lighting control is made by dividing the light-emitting chips C into groups or classes.

Figure 20:
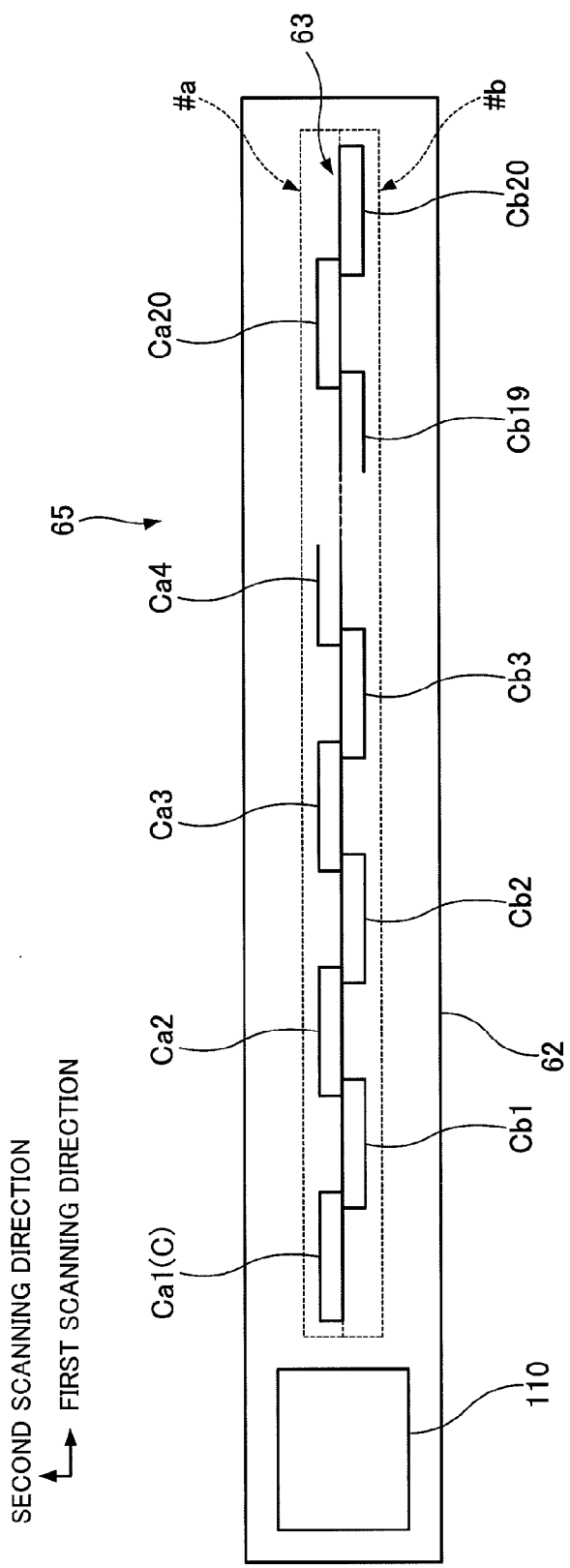
FIG. 20 is a top view of the light-emitting device according to the eighth exemplary embodiment.

FIG. 20 is a top view of the light-emitting device 65 according to the eighth exemplary embodiment.

As shown in FIG. 20, a light-emitting portion 63 in the light-emitting device 65 according to the eighth exemplary embodiment is configured by arranging twenty light-emitting chips Ca1 to Ca20 (a light-emitting chip group #a), and twenty light-emitting chips Cb1 to Cb20 (a light-emitting chip group #b) in two lines in a staggered pattern in the first scanning direction on the circuit board 62. In short, the eighth exemplary embodiment includes two light-emitting chip groups (the light-emitting chip group #a and the light-emitting chip group #b). Here, the light-emitting chip group may be abbreviated to "group." The details of the staggered pattern of the light-emitting chip group #a and the light-emitting chip group #b are described later.

As described above, the light-emitting device 65 is mounted with the signal generating circuit 110 to drive the light-emitting portion 63.

The light-emitting chips Ca1 to Ca20 may have the same configuration as the light-emitting chips Cb1 to Cb20. Thus, the light-emitting chips Ca1 to Ca20 and the light-emitting chips Cb1 to Cb20, when not distinguished, are referred to as a light-emitting chip C.

In the eighth exemplary embodiment, a total of forty light-emitting chips C are used; however the invention is not limited to this case.

FIGS. 21A and 21B are a diagram showing a configuration of the light-emitting chip C, a configuration of the signal generating circuit 110 of the light-emitting device 65 and a wiring configuration on the circuit board 62 according to the eighth exemplary embodiment. FIG. 21A shows the configuration of the light-emitting chip C, and FIG. 21B shows the configuration of the signal generating circuit 110 of the light-emitting device 65 and the wiring configuration on the circuit board 62. In the eighth exemplary embodiment, the light-emitting chips C are divided into two light-emitting chip groups (#a and #b).

First, the configuration of the light-emitting chip C shown in FIG. 21A is described.

The light-emitting chip C includes a light-emitting element array 102 that includes multiple light-emitting elements (light-emitting thyristors L1, L2, L3, . . . , in the eighth exemplary embodiment) provided in line along and near one of the longitudinal sides on a rectangular substrate 80 (see FIGS. 24A and 24B described below). The light-emitting chip C further includes input terminals ($\phi$E terminal, $\phi$1 terminal, Vga terminal, $\phi$2 terminal, $\phi$W terminal and $\phi$I terminal) at both ends in the longitudinal direction of the substrate 80, the input terminals serving as multiple bonding pads to receive various kinds of control signals. Note that these input terminals are provided in the order of the $\phi$E terminal, the $\phi$1 terminal, and the Vga terminal from one end of the substrate 80, and are provided in the order of the $\phi$I terminal, the $\phi$W terminal, and the $\phi$2 terminal from the other end of the substrate 80. The light-emitting element array 102 is provided between the Vga and $\phi$2 terminals.

Next, the configuration of the signal generating circuit 110 of the light-emitting device 65 and the wiring configuration on the circuit board 62 are described with reference to FIG. 21B.

As described above, the circuit board 62 of the light-emitting device 65 is mounted with the signal generating circuit 110 and light-emitting chips C (the light-emitting chips Ca1 to Ca20 and the light-emitting chips Cb1 to Cb20), and wiring to connect between the signal generating circuit 110 and the light-emitting chips Ca1 to Ca20, Cb1 to Cb20 is provided.

First, the configuration of the signal generating circuit 110 is described.

Although not shown, the signal generating circuit 110 receives input of image-processed image data and various kinds of control signals from the image output controller 30 and the image processor 40 (see FIG. 1). The signal generating circuit 110 performs rearrangement of the image data, correction of amount of light, and the like based on these image data and various kinds of control signals.

The signal generating circuit 110 includes a transfer signal generating part 120a that transmits a first transfer signal $\phi$1a and a second transfer signal $\phi$2a to the light-emitting chip group #a (the light-emitting chips Ca1 to Ca20), and a transfer signal generating part 120b that transmits a first transfer signal $\phi$1b and a second transfer signal $\phi$2b to the light-emitting chip group #b (the light-emitting chips Cb1 to Cb20) based on the various kinds of control signals. Note that a pair of the transfer signals may be provided not for each of the light-emitting chip groups, but for plural light-emitting chip groups or all of the light-emitting chip groups, in common. The transfer signals may be not a pair of signals but a single signal, as long as the signal sequentially sets the light-emitting elements in each of the light-emitting chips one by one as a control target for emitting light.

The signal generating circuit 110 further includes an enable signal generating part 130a that transmits an enable signal $\phi$Ea as an example of a selection signal to the light-emitting chip group #a (the light-emitting chips Ca1 to Ca20), and an enable signal generating part 130b that transmits an enable signal $\phi$Eb as an example of the selection signal to the light-emitting chip group #b (the light-emitting chips Cb1 to Cb20) based on the various kinds of control signals.

The signal generating circuit 110 further includes a light-up signal generating part 140a that transmits a light-up signal $\phi$Ia to the light-emitting chip group #a (the light-emitting chips Ca1 to Ca20), and a light-up signal generating part 140b that transmits a light-up signal $\phi$Ib to the light-emitting chip group #b (the light-emitting chips Cb1 to Cb20) based on the various kinds of control signals.

Moreover, the signal generating circuit 110 includes a write signal generating part 150 that transmits write signals $\phi$W1 to $\phi$W20, as an example of the selection signals for respective light-emitting chip classes, based on the various kinds of control signals. Here, the light-emitting chip class includes light-emitting chip classes each including one light-emitting chip C belonging to the light-emitting chip group #a and another light-emitting chip C belonging to the light-emitting chip group #b, and may be abbreviated to "class."

For example, the write signal generating part 150 transmits the write signal $\phi$W1 to a light-emitting chip class #1 of the light-emitting chip Ca1 belonging to the light-emitting chip group #a, and the light-emitting chip Cb1 belonging to the light-emitting chip group #b. The write signal generating part 150 transmits the write signal $\phi$W2 to a light-emitting chip class #2 of the light-emitting chip Ca2 belonging to the light-emitting chip group #a, and the light-emitting chip Cb2 belonging to the light-emitting chip group #b. Similarly, the write signal generating part 150 transmits the write signal $\phi$W20 to a light-emitting chip class #20 of the light-emitting chip Ca20 belonging to the light-emitting chip group #a, and the light-emitting chip Cb20 belonging to the light-emitting chip group #b.

Thus, the light-emitting chip Ca1 uses the enable signal $\phi$Ea and the write signal $\phi$W1 as a designation signal. Similarly, the light-emitting chip Cb1 uses the enable signal $\phi$Eb and the write signal $\phi$W1 as a designation signal. The other light-emitting chips Ca2 to Ca20 and Cb2 to Cb20 receive designation signals similarly.

Although the transfer signal generating part 120a and the transfer signal generating part 120b are separately shown in FIG. 21B as described above, these transfer signal generating parts are collectively referred to as a transfer signal generating part 120 as an example of the transfer signal supply unit.

Similarly, although the enable signal generating part 130a and the enable signal generating part 130b are separately shown, these enable signal generating parts are collectively referred to as an enable signal generating part 130 as an example of the enable signal supply unit.

Similarly, although the light-up signal generating part 140a and the light-up signal generating part 140b are separately shown, these light-up signal generating parts are collectively referred to as a light-up signal generating part 140 as an example of the light-up signal supply unit.

Similarly, the first transfer signal $\phi$1a and the first transfer signal $\phi$1b, when not distinguished, are referred to as the first transfer signal $\phi$1, and the second transfer signal $\phi$2a and the second transfer signal $\phi$2b, when not distinguished, are referred to as the second transfer signal $\phi$2. Similarly, the enable signal $\phi$Ea and the enable $\phi$Eb, when not distinguished, are referred to as the enable signal $\phi$E, the light-up signal $\phi$Ia and the light-up signal $\phi$Ib, when not distinguished, are referred to as the light-up signal $\phi$I, and the write signals $\phi$W1 to $\phi$W20 are collectively referred to as the write signal $\phi$W.

Next, an arrangement of the light-emitting chips Ca1 to Ca20, and the light-emitting chips Cb1 to Cb20 is described.

The light-emitting chips Ca1 to Ca20 belonging to the light-emitting chip group #a are arranged in line at certain intervals in their longitudinal direction. Similarly, the light-emitting chips Cb1 to Cb20 belonging to the light-emitting chip group #b are arranged in line at certain intervals in their longitudinal direction. The light-emitting chips Ca1 to Ca20 belonging to the light-emitting chip group #a and the light-emitting chips Cb1 to Cb20 belonging to the light-emitting chip group #b are arranged in such a staggered pattern that the light-emitting chips Ca1 to Ca20 and Cb1 to Cb20 are opposed to each other and that the light-emitting elements are aligned at predetermined intervals in the first scanning direction.

Wiring to connect between the signal generating circuit 110 and the light-emitting chips C (the light-emitting chips Ca1 to Ca20 and the light-emitting chips Cb1 to Cb20) is described.

The circuit board 62 is provided with a power supply line 200a that is connected to a Vsub terminal provided on the rear surface of the light-emitting chip C (see FIGS. 23 and 24 described below), and provides a reference potential Vsub. The circuit board 62 is also provided with a power supply line 200b that is connected to a Vga terminal provided to each light-emitting chip C and provides a power supply potential Vga for supplying power.

The circuit board 62 includes a first transfer signal line 201a to transmit a first transfer signal $\phi$1a from the transfer signal generating part 120a of the signal generating circuit 110 to the $\phi$1 terminals of the light-emitting chips Ca1 to Ca20 of the light-emitting chip group #a, and a second transfer signal line 202a to transmit a second transfer signal $\phi$2a from the transfer signal generating part 120a of the signal generating circuit 110 to the $\phi$2 terminals of the light-emitting chips Ca1 to Ca20 of the light-emitting chip group #a. The first transfer signal $\phi$1a and the second transfer signal $\phi$2a are transmitted to the light-emitting chips Ca1 to Ca20 of the light-emitting chip group #a in common (parallel).

Similarly, the circuit board 62 includes a first transfer signal line 201b to transmit a first transfer signal $\phi$1b from the transfer signal generating part 120b of the signal generating circuit 110 to the $\phi$1 terminals of the light-emitting chips Cb1 to Cb20 of the light-emitting chip group #b, and a second transfer signal line 202b to transmit a second transfer signal $\phi$2b from the transfer signal generating part 120b of the signal generating circuit 110 to the $\phi$2 terminals of the light-emitting chips Cb1 to Cb20 of the light-emitting chip group #b. The first transfer signal $\phi$1b and the second transfer signal $\phi$2b are transmitted to the light-emitting chips Cb1 to Cb20 of the light-emitting chip group #b in common (parallel).

Moreover, the circuit board 62 includes an enable signal line 203a to transmit the enable signal $\phi$Ea from the enable signal generating part 130a of the signal generating circuit 110 to the $\phi$E terminals of the light-emitting chips Ca1 to Ca20 of the light-emitting chip group #a. The enable signal $\phi$Ea is transmitted to the light-emitting chips Ca1 to Ca20 of the light-emitting chip group #a in common (parallel).

Similarly, the circuit board 62 includes an enable signal line 203b to transmit the enable signal $\phi$Eb from the enable signal generating part 130b of the signal generating circuit 110 to the $\phi$E terminals of the light-emitting chips Cb1 to Cb20 of the light-emitting chip group #b. The enable signal $\phi$Eb is transmitted to the light-emitting chips Cb1 to Cb20 of the light-emitting chip group #b in common (parallel).

The circuit board 62 further includes a light-up signal line 204a to transmit the light-up signal $\phi$Ia from the light-up signal generating part 140a of the signal generating circuit 110 to the $\phi$I terminals of the light-emitting chips Ca1 to Ca20 of the light-emitting chip group #a. The light-up signal $\phi$Ia is transmitted to the light-emitting chips Ca1 to Ca20 of the light-emitting chip group #a in common (parallel) via current limitation resistances RI, respectively, provided for the corresponding light-emitting chips Ca1 to Ca20.

Similarly, the circuit board 62 includes a light-up signal line 204b to transmit the light-up signal $\phi$Ib from the light-up signal generating part 140b of the signal generating circuit 110 to the $\phi$I terminals of the light-emitting chips Cb1 to Cb20 of the light-emitting chip group #b. The light-up signal $\phi$Ib is transmitted to the light-emitting chips Cb1 to Cb20 of the light-emitting chip group #b in common (parallel) via current limitation resistances RI, respectively, provided for the corresponding light-emitting chips Cb1 to Cb20.

Furthermore, the circuit board 62 includes write signal lines 205 to 224 through which the write signals $\phi$W1 to $\phi$W20 are transmitted from the signal generating part 150 of the signal generating circuit 110 to respective light-emitting chip classes each including one light-emitting chip C belonging to the light-emitting chip group #a and another light-emitting chip C belonging to the light-emitting chip group #b.

For example, the write signal line 205 is connected to the $\phi$W terminal of the light-emitting chip Ca1 of the light-emitting chip group #a, and to the $\phi$W terminal of the light-emitting chip Cb1 belonging to the light-emitting chip group #b, and transmits the write signal $\phi$W1 to the light-emitting chip class #1 including the light-emitting chips Ca1 and Cb1. The write signal line 206 is connected to the $\phi$W terminal of the light-emitting chip Ca2 of the light-emitting chip group #a, and to the $\phi$W terminal of the light-emitting chip Cb2 belonging to the light-emitting chip group #b, and transmits the write signal $\phi$W2 to the light-emitting chip class #2 including the light-emitting chips Ca2 and Cb2. In the same manner, the write signal line 224 is connected to the $\phi$W terminal of the light-emitting chip Ca20 of the light-emitting chip group #a, and to the $\phi$W terminal of the light-emitting chip Cb20 belonging to the light-emitting chip group #b, and transmits the write signal $\phi$W20 to the light-emitting chip class #20 including the light-emitting chips Ca20 and Cb20.

As described above, the reference potential Vsub and the power supply potential Vga are transmitted to all of the light-emitting chips C on the circuit board 62 in common.

The transfer signals $\phi$1a, $\phi$2a, the light-up signal $\phi$Ia, and the enable signal $\phi$Ea are transmitted to the light-emitting chip group #a in common. Also, the transfer signals $\phi$1b, $\phi$2b, the light-up signal $\phi$Ib, and the enable signal $\phi$Eb are transmitted to the light-emitting chip group #b in common.

On the other hand, the write signals $\phi$W1 to $\phi$W20 are each transmitted, in common, to the light-emitting chips C in the corresponding one of the light-emitting chip classes #1 to #20 each including one light-emitting chip C belonging to the light-emitting chip group #a, and one light-emitting chip C belonging to the light-emitting chip group #b.

Figure 22:
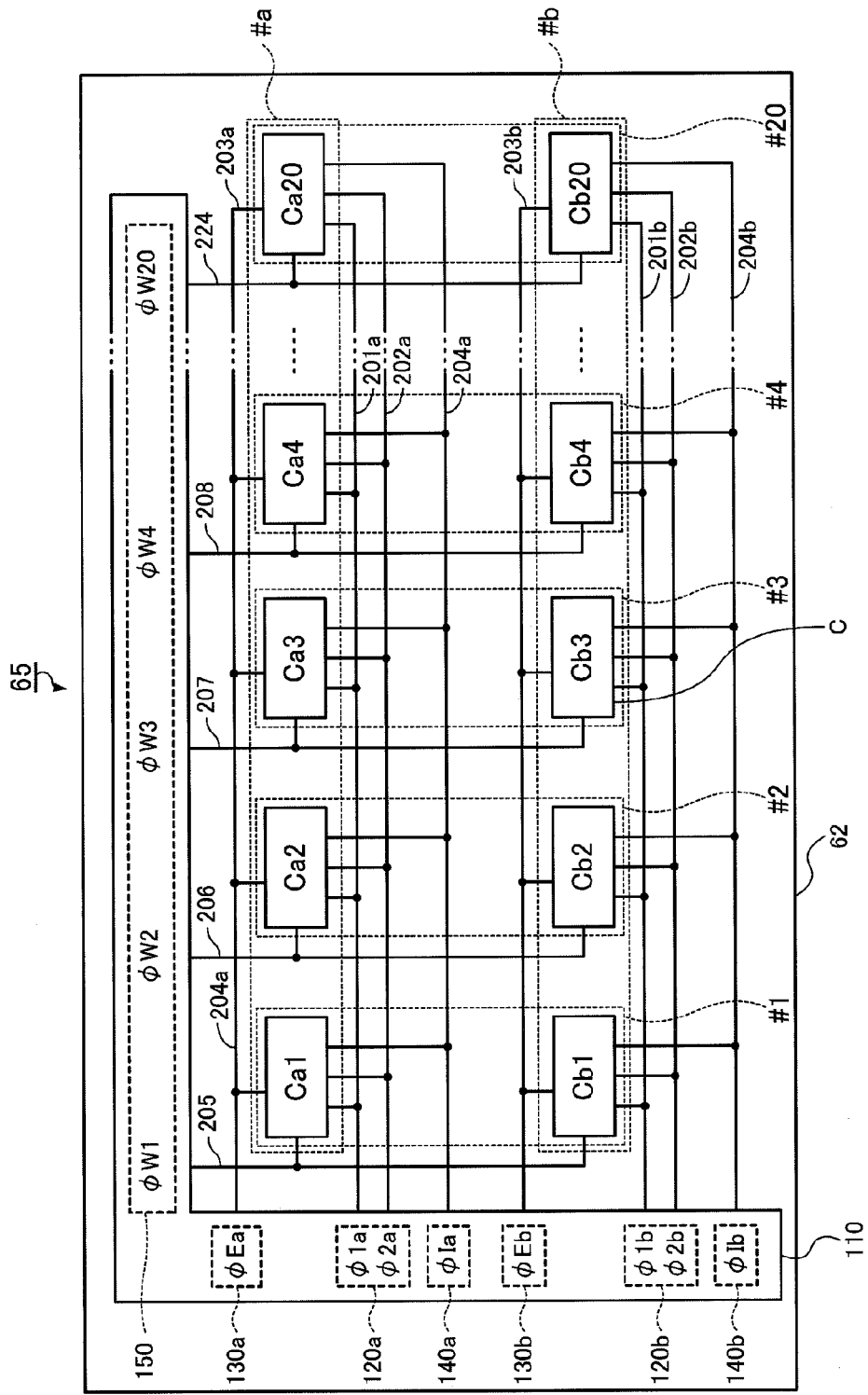
FIG. 22 is a diagram showing the light-emitting chips of the light-emitting device in the eighth exemplary embodiment, being arranged as respective elements in a matrix form.

FIG. 22 is a diagram showing the light-emitting chips C of the light-emitting device 65 in the eighth exemplary embodiment, being arranged as respective elements in a matrix form.

FIG. 22 shows that the light-emitting chips C (the light-emitting chips Ca1 to Ca20 and the light-emitting chips Cb1 to Cb20) are arranged as respective elements in a 2×10 matrix form, and shows only the lines of signal (the transfer signals $\phi$1a, $\phi$2a, $\phi$1b, $\phi$2b, the light-up signals $\phi$Ia, $\phi$Ib, the enable signals $\phi$Ea, $\phi$Eb, and the write signals $\phi$W1 to $\phi$W20) that connect between the above-mentioned signal generating circuit 110 and the light-emitting chips C (the light-emitting chips Ca1 to Ca20 and the light-emitting chips Cb1 to Cb20).

As described above, the transfer signals $\phi$1a, $\phi$2a, the light-up signal $\phi$Ia, and the enable signal $\phi$Ea are transmitted to the light-emitting chip group #a in common. It is easily understood that the transfer signals φ1b, φ2b, the light-up signal φIb, and the enable signal φEb are transmitted to the light-emitting chip group #b in common.

On the other hand, it is easily understood that the write signals φW1 to φW20 are each transmitted, in common, to the light-emitting chips C in the corresponding one of the light-emitting chip classes #1 to #20 each including one light-emitting chip C belonging to the light-emitting chip group #a, and one light-emitting chip C belonging to the light-emitting chip group #b.

Here, the number of wiring lines is described.

Consider a case where the eighth exemplary embodiment is not applied and the light-emitting chips C of the light-emitting device 65 are neither divided into the light-emitting chip groups nor the light-emitting chip classes. In this case, on the assumption that the number of the light-emitting chips C is forty, forty light-up signal lines 204 (corresponding to the light-up signal lines 204a and 204b in FIG. 22) are needed because the light-up signal φI is transmitted to each of the light-emitting chips C. In addition, the first transfer signal line 201 (corresponding to the first transfer signal lines 201a and 201b in FIG. 21B), the second transfer signal line 202 (corresponding to the second transfer signal lines 202a and 202b in FIG. 21B), and the power supply lines 200a and 200b are needed. Therefore, the number of wiring lines provided for the light-emitting device 65 is forty-four.

Also, the light-up signal line 204 needs to have a small resistance because a current is passed through the light-up signal line 204 to the light-emitting thyristor L for lighting. Thus, thick wiring is needed for the light-up signal line 204. Thus, in the case where the eighth exemplary embodiment is not applied, a great number of thick wiring lines would be provided on the circuit board 62 of the light-emitting device 65, thus the area of the circuit board 62 is increased.

Figure 21:
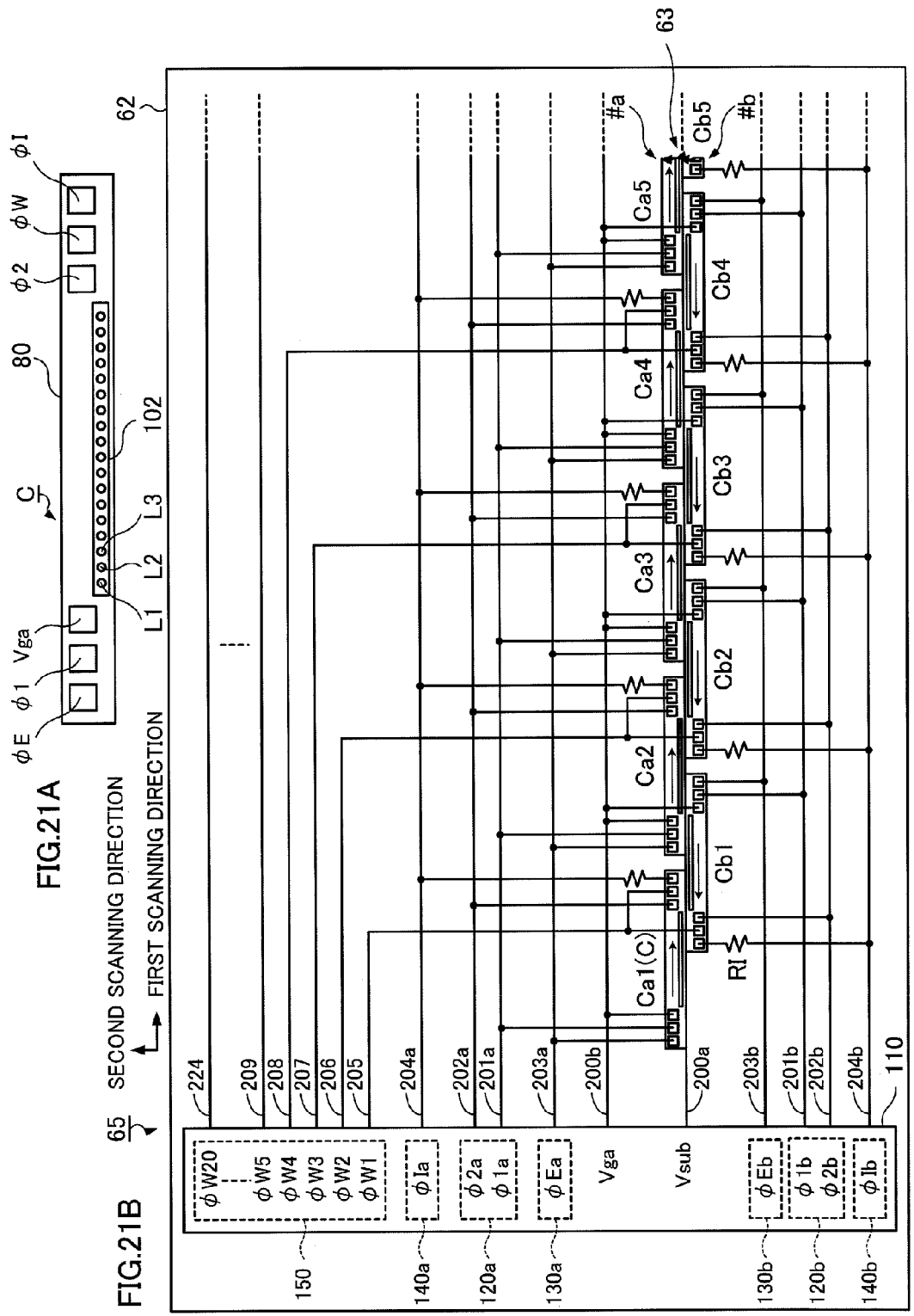
FIGS. 21A and 21B are a diagram showing a configuration of the light-emitting chip, a configuration of the signal generating circuit of the light-emitting device and a wiring configuration on the circuit board according to the eighth exemplary embodiment.

According to the eighth exemplary embodiment, since the number of the light-emitting chip groups is set to two as shown in FIGS. 21 and 22, the number of wiring lines for the light-up signal lines 204a and 204b is two. In addition, the first transfer signal lines 201a and 201b, the second transfer signal lines 202a and 202b, the power supply lines 200a and 200b, the enable signal lines 203a and 203b, and the write signal lines 205 to 224 are needed. Therefore, the number of wiring lines provided for the light-emitting device 65 is thirty in the eighth exemplary embodiment.

According to the eighth exemplary embodiment, the number of wiring lines is about ⅔ of that for the case where the eighth exemplary embodiment is not applied.

In the eighth exemplary embodiment, the number of thick wiring lines to allow current flow is reduced to two light-up signal lines 204a and 204b. As described below, a write thyristor M is designed to set to an ON state to change the threshold voltage of the light-emitting thyristor L, thus large current does not flow through the write signal lines 205 to 224. Therefore, thick wiring lines are not needed for the write signal lines 205 to 224. For this reason, the eighth exemplary embodiment does not need to have many thick wires on the circuit board 62, thereby reducing the area of the circuit board 62.

Figure 23:
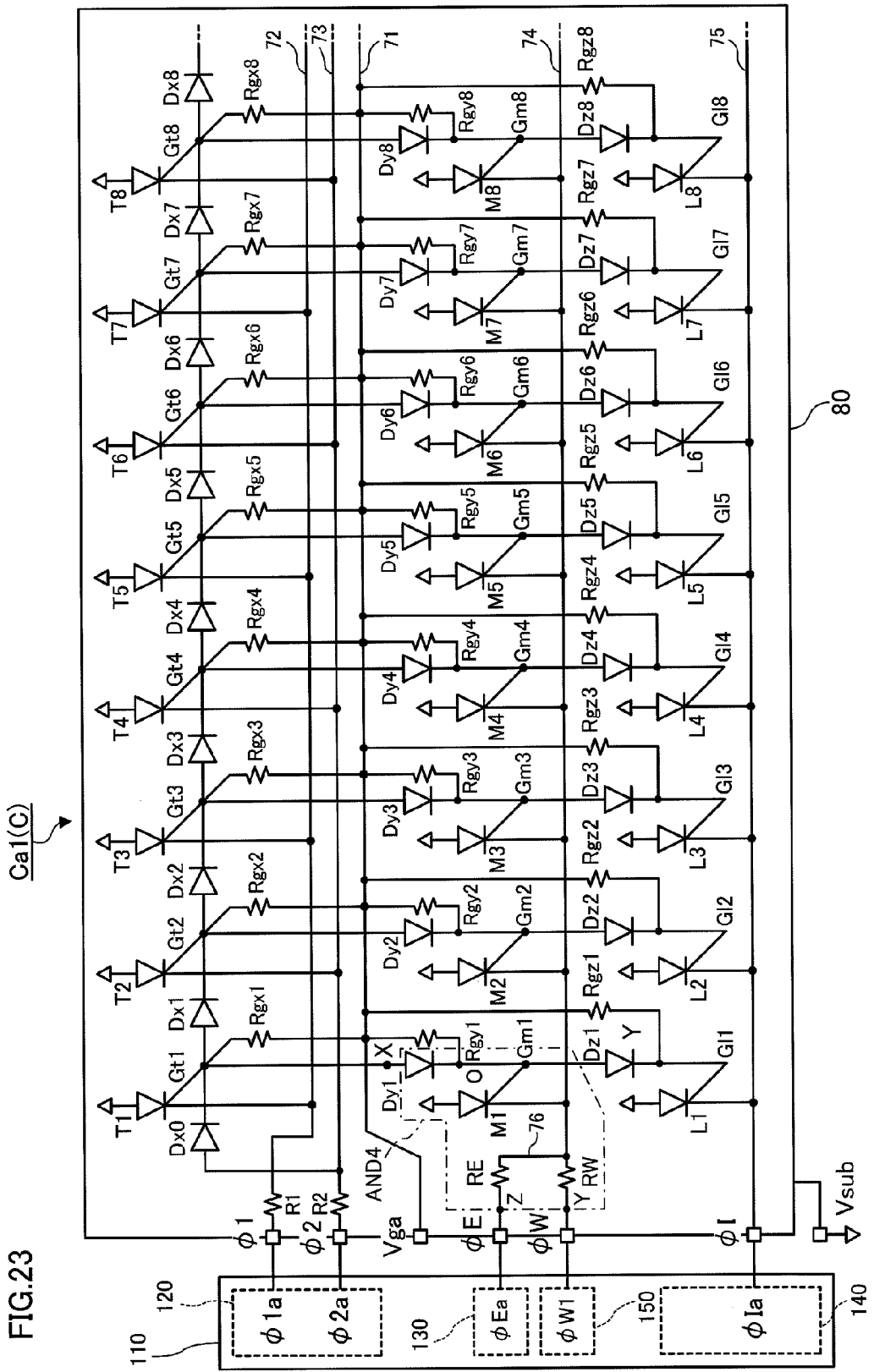
FIG. 23 is an equivalent circuit diagram for illustrating a circuit configuration of the light-emitting chip that is a self-scanning light-emitting device array (SLED) chip according to the eighth exemplary embodiment.

FIG. 23 is an equivalent circuit diagram for illustrating a circuit configuration of the light-emitting chip C that is a self-scanning light-emitting device array (SLED) chip according to the eighth exemplary embodiment. In FIG. 23, each element described below except for the input terminals (Vga terminal, φ1 terminal, φ2 terminal, φE terminal, φW terminal and φI terminal) is arranged based on the layout on each light-emitting chip C as described in FIGS. 24A and 24B described later.

Here, the light-emitting chip C is described using the light-emitting chip Ca1 as an example. Now, in FIG. 23, the light-emitting chip C is denoted as the light-emitting chip Ca1 (C). The configuration of other light-emitting chips C2 to C20, Cb1 to Cb20 are the same as that of the light-emitting chip Ca1.

The input terminals (Vga, φ1, φ2, φE, φW and φI terminals), although shown different from those in FIG. 21A, are shown at the left end of FIG. 23 for convenience of description.

As described above, the light-emitting chip Ca1 (C) includes the light-emitting thyristor array (the light-emitting element array 102 (see FIG. 21A)) that includes the light-emitting thyristors L1, L2, L3, . . . , as an example of the light-emitting elements arranged on the substrate 80 (see FIGS. 24A and 24B described below).

Furthermore, the light-emitting chip Ca1 (C) includes a transfer thyristor array that includes transfer thyristors T1, T2, T3, . . . , arranged in line in a similar manner as the light-emitting thyristor array, and a write thyristor array that includes write thyristors M1, M2, M3, . . . , arranged in line in the similar manner.

Here, the light-emitting thyristors L1, L2, L3, . . . , when not individually distinguished, are referred to as the light-emitting thyristor L. The transfer thyristors T1, T2, T3, . . . , when not individually distinguished, are referred to as the transfer thyristor T, and the write thyristors M1, M2, M3, . . . , when not individually distinguished, are referred to as the write thyristor M.

The above-mentioned write thyristor M is a semiconductor device that has three terminals of an anode, a cathode, and a gate, similar to the light-emitting thyristor L, and the transfer thyristor T described above.

Herein, the anode, cathode, and gate terminals of the write thyristor M may be referred to as a third anode, a third cathode, and a third gate terminals, respectively.

As an example of the first electrical parts, the light-emitting chip Ca1 (C) includes coupling diodes Dx1, Dx2, Dx3, . . . , that are located between respective pairs of two adjacent transfer thyristors, taken sequentially from T1, T2, T3, . . . . There are provided connection diodes Dy1, Dy2, Dy3, . . . , as an example of fourth electrical parts, respectively, between the transfer thyristors T1, T2, T3, . . . , and the write thyristors M1, M2, M3, . . . . Also, there are provided connection diodes Dz1, Dz2, Dz3, . . . , as an example of fifth electrical parts, respectively, between the write thyristors M1, M2, M3, . . . , and the light-emitting thyristors L1, L2, L3, . . . .

The light-emitting chip Ca1 (C) further includes power supply line resistances Rgx1, Rgx2, Rgx3, . . . , power supply line resistances Rgy1, Rgy2, Rgy3, . . . , and power supply line resistances Rgz1, Rgz2, Rgz3, . . . .

Similarly to the light-emitting thyristors L, the coupling diodes Dx1, Dx2, Dx3, . . . , the connection diodes Dy1, Dy2, Dy3, the connection diodes Dz1, Dz2, Dz3, . . . , the power supply line resistances Rgx1 Rgx2, Rgx3, . . . , the power supply line resistances Rgy1, Rgy2, Rgy3, . . . , the power supply line resistances Rgz1, Rgz2, Rgz3, . . . , when not individually distinguished, are referred to as a coupling diode Dx, a connection diode Dy, a connection diode Dz, a power supply line resistance Rgx, a power supply line resistance Rgy and a power supply line resistance Rgz, respectively.

The number of the light-emitting thyristors L in the light-emitting thyristor array may be a predetermined number. In the eighth exemplary embodiment, if the number of the light-emitting thyristors L is 128, the number of transfer thyristors T is also 128. Similarly, each number of the connection diodes Dy, the connection diodes Dz, the power supply line resistances Rgx, the power supply line resistances Rgy and the power supply line resistances Rgz is also 128. However, the number of the coupling diodes Dx is 1 less than that of the transfer thyristors T, i.e., 127.

Note that each number of the transfer thyristors T and the write thyristors M may be greater than that of the light-emitting thyristors L.

The light-emitting chip Ca1 (C) includes one start diode Dx0. The light-emitting chip Ca1 (C) further includes current limitation resistances R1 and R2 to prevent excess current from flowing through a first transfer signal line 72 for transmitting a first transfer signal φ1, and a second transfer signal line 73 for transmitting a second transfer signal φ2 described below. The light-emitting chip Ca1 (C) further includes a write resistance RW as an example of a sixth electrical part, and an enable resistance RE as an example of the sixth electrical part.

Note that the light-emitting thyristors L1, L2, L3, . . . , in the light-emitting thyristor array, the transfer thyristors T1, T2, T3, . . . , in the transfer thyristor array and the write thyristors M1, M2, M3, . . . , in the write thyristor array are arranged in an ascending order of the index from the left in FIG. 23. Furthermore, the coupling diodes Dx1, Dx2, Dx3, . . . , the connection diodes Dy1, Dy2, Dy3, the connection diodes Dz1, Dz2, Dz3, . . . , the power supply line resistances Rgx1 Rgx2, Rgx3, . . . , the power supply line resistances Rgy1, Rgy2, Rgy3, . . . , the power supply line resistances Rgz1, Rgz2, Rgz3, . . . , are also arranged in an ascending order of the indices from the left in FIG. 23.

The light-emitting thyristor array, the transfer thyristor array, and the write thyristor array are arranged in the order of the transfer thyristor array, the write thyristor array, and the light-emitting thyristor array from the top to the bottom in FIG. 23.

Next, electrical connection of the elements in the light-emitting chip Ca1 (C) is described.

The anode terminal of each transfer thyristor T, the anode terminal of each write thyristor M, and the anode terminal of each light-emitting thyristor L are connected to the substrate 80 of the light-emitting chip Ca1 (C) (anode common).

These anode terminals are then connected to the power supply line 200a (see FIG. 21B) via the Vsub terminal that is a back-side electrode 85 (see FIG. 24B described below) provided on the rear surface of the substrate 80. The reference potential Vsub is supplied to the power supply line 200a.

The cathode terminals of odd-numbered transfer thyristors T1, T3, T5, . . . , are connected to the first transfer signal line 72 along the arrangement of the transfer thyristors T. The first transfer signal line 72 is then connected to the φ1 terminal, which is an input terminal of the first transfer signal φ1, via the current limitation resistance R1. The first transfer signal line 201a (see FIG. 21B) is connected to the φ1 terminal to transmit the first transfer signal φ1.

On the other hand, the cathode terminals of even-numbered transfer thyristors T2, T4, T6, . . . , are connected to the second transfer signal line 73 along the arrangement of transfer thyristors T. The second transfer signal line 73 is then connected to the φ2 terminal, which is an input terminal of the second transfer signal φ2, via the current limitation resistance R2. The second transfer signal line 202a (see FIG. 21B) is connected to the φ2 terminal to transmit the second transfer signal φ2a.

For the case of the light-emitting chip C1b, the first transfer signal line 201b (see FIG. 21B) is connected to the φ1 terminal to transmit the first transfer signal φ1b. Similarly, the second transfer signal line 202b (see FIG. 21B) is connected to the φ2 terminal to transmit the second transfer signal φ2b. Thus, in the following description, the first transfer signal is denoted as φ1a (φ1) and the second transfer signal is denoted as φ2a (φ2).

The cathode terminal of the write thyristor M is connected to a write signal line 74. The write signal line 74 is then connected to the φW terminal, which is an input terminal of the write signal φW1 (φW) as an example of a write signal terminal, via the write resistance RW. The write signal line 205 (see FIG. 21B) is connected to the φW terminal to transmit the write signal φW1 (φW).

Also, the write signal line 74 is connected to the enable signal line 76 between the write thyristor M1 and the write resistance RW. The enable signal line 76 is connected to the φE terminal, which is an input terminal of the enable signal φEa (φE) as an example of an enable signal terminal, via the enable resistance RE. The enable signal line 203a (see FIG. 21B) is connected to the φEa terminal to transmit the enable signal φEa (q E).

The φW terminal as an example of the write signal terminal, and the φE terminal as an example of the enable signal terminal are also an example of control terminals.

The cathode terminal of the light-emitting thyristor L is connected to the light-up signal line 75. The light-up signal line 75 is then connected to the φI terminal that is an input terminal of the light-up signal φIa (φI). The light-up signal line 204a (see FIG. 21B) is connected to the φI terminal to transmit the light-up signal φIa (φI).

Although not shown in FIG. 23, the current limitation resistance RI is provided between the light-up signal generating part 140 (140a and 140b) and the φI terminal as shown in FIG. 21B.

Gate terminals Gt1, Gt2, Gt3, . . . , of the transfer thyristors T are connected to the same numbered gate terminals Gm1, Gm2, Gm3, . . . , of the write thyristors M1, M2, m3, . . . , on one-to-one basis via the connection diodes Dy1, Dy2, Dy3, . . . , respectively. That is, the anode terminals of the connection diodes Dy1, Dy2, Dy3, . . . , are connected to the gate terminals Gt1, Gt2, Gt3, . . . , of the transfer thyristors T1, T2, T3, . . . . The cathode terminals of the connection diodes Dy1, Dy2, Dy3, . . . , are connected to the gate terminals Gm1, Gm2, Gm3, . . . , of the write thyristors M1, M2, M3, . . . , On the other hand, the gate terminals Gm1, Gm2, Gm3, . . . , of the write thyristors M1, M2, M3, . . . , are connected to the same numbered gate terminals Gl1, Gl2, Gl3, . . . , of the light-emitting thyristors L1, L2, L3, . . . , on one-to-one basis via the connection diodes Dz1, Dz2, Dz3, . . . , respectively. That is, the anode terminals of the connection diodes Dz1, Dz2, Dz3, . . . , are connected to the gate terminals Gm1, Gm2, Gm3, . . . , of the write thyristors M1, M2, M3, . . . . The cathode terminals of the connection diodes Dz1, Dz2, Dz3, . . . , are connected to the gate terminals Gl1, Gl2, Gl3, . . . , of the light-emitting thyristors L1, L2, L3, . . . , Here, the gate terminals Gt1, Gt2 Gt3, . . . , the gate terminals Gm1, Gm2, Gm3, . . . , and the gate terminals Gl1, Gl2, Gl3, . . . , when not individually distinguished, are referred to as a gate terminal Gt, a gate terminal Gm, and a gate terminal Gl, respectively.

The connection diode Dy is arranged in a direction so that a current flows from the gate terminal Gt of the transfer thyristor T to the gate terminal Gm of the write thyristor M. Similarly, the connection diode Dz is arranged in a direction so that a current flows from the gate terminal Gm of the write thyristor M to the gate terminal Gl of the light-emitting thyristor L.

The coupling diodes Dx1, Dx2, Dx3, . . . , are connected between respective pairs of two adjacent gate terminals Gt taken sequentially from the gate terminals Gt1, Gt2, Gt3, . . . , of the transfer thyristors T1, T2, T3, . . . . That is, the coupling diodes Dx1, Dx2, Dx3, . . . , are connected in series so as to be inserted between adjacent gate terminals Gt1 and Gt2, Gt2 and Gt3, Gt3 and Gt4, . . . , respectively. The coupling diode Dx1 is arranged in a direction so that a current flows from the gate terminal Gt1 to the gate terminal Gt2. Other coupling diodes Dx2, Dx3, Dx4, . . . , are also arranged in the same manner.

The gate terminal Gt of the transfer thyristor T is connected to the power supply line 71 via the power supply line resistance Rgx, which is provided to each transfer thyristor T. The power supply line 71 is then connected to the Vga terminal. The Vga terminal is connected to the power supply line 200*b* (see FIG. 21B) to supply the power supply potential Vga.

The gate terminal Gm of the write thyristor M is connected to the power supply line 71 via the power supply line resistance Rgy, which is provided to each write thyristor M.

The gate terminal Gl of the light-emitting thyristor L is connected to the power supply line 71 via the power supply line resistance Rgz, which is provided to each light-emitting thyristor L.

The gate terminal Gt1 of the transfer thyristor T1, on one side of the transfer thyristor array is connected to the cathode terminal of start diode Dx0. On the other hand, the anode terminal of the start diode Dx0 is connected to the second transfer signal line 73.

Figure 24A:
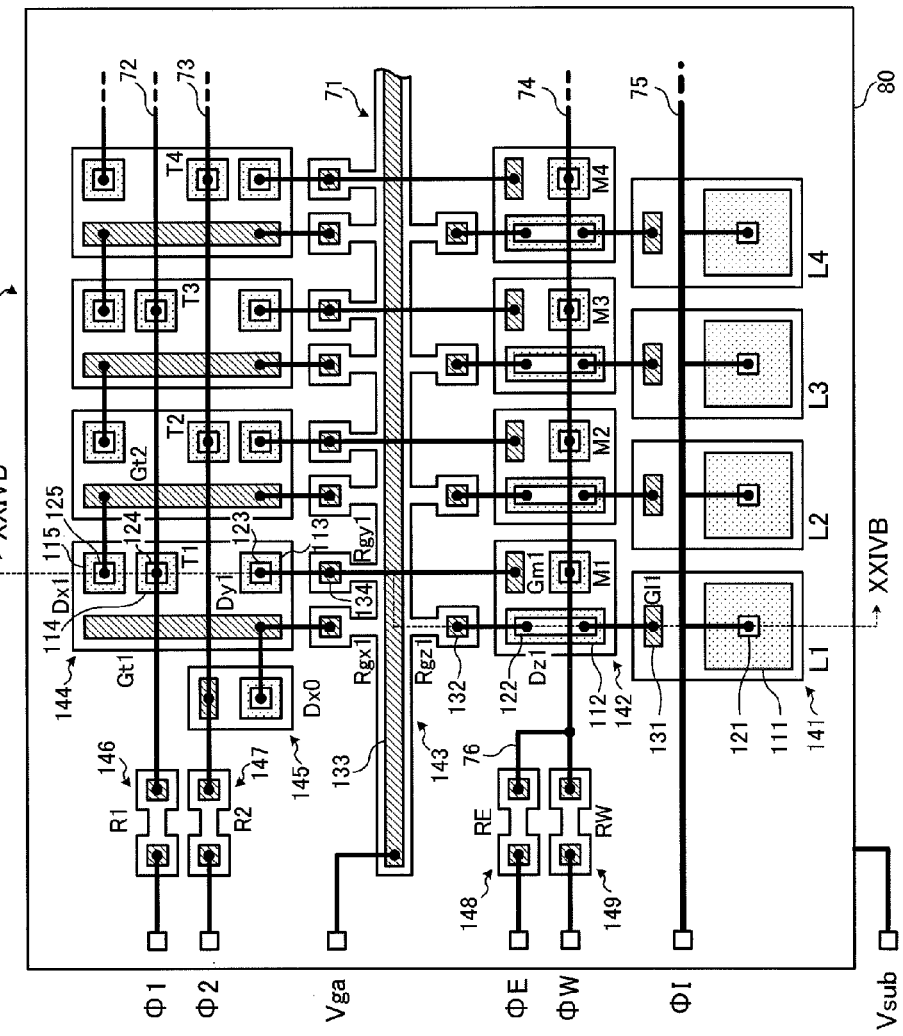
FIGS. 24A and 24B are a layout plan view and a cross-sectional view of the light-emitting chip according to the eighth exemplary embodiment.
Figure 24B:
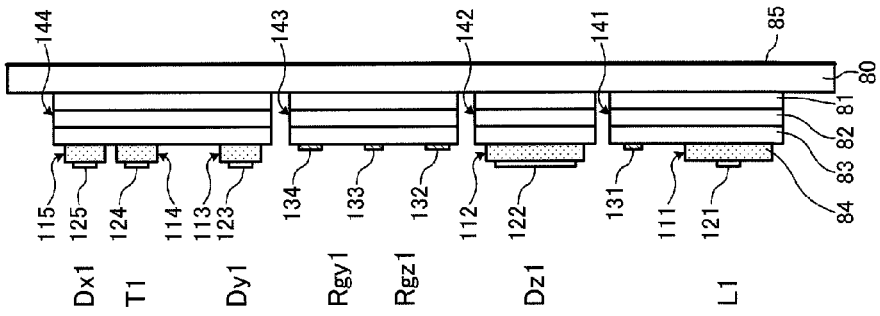

FIGS. 24A and 24B are a layout plan view and a cross-sectional view of the light-emitting chip Ca1 (C) according to the eighth exemplary embodiment. FIG. 24A is a layout plan view of the light-emitting chip C, and shows the part centered on the light-emitting thyristors L1 to L4, the write thyristors M1 to M4, and the transfer thyristors T1 to T4. FIG. 24B is a cross-sectional view taken along the line XXIVB-XXIVB shown in FIG. 24A. Thus, FIG. 24B shows the cross sections of the light-emitting thyristor L1, the connection diode Dz1, the power supply line resistance Rgz1, the power supply line resistance Rgx1, the connection diode Dy1, the transfer thyristor T1, the coupling diode Dx1 in the order from the bottom to the top of FIG. 24B. In FIGS. 24A and 24B, main elements and terminals are denoted by their names.

In FIG. 24A, wiring lines connecting between the elements are shown by solid lines except for the power supply line 71. In FIG. 24B, wiring lines connecting between the elements are omitted.

As shown in FIG. 24B, the light-emitting chip Ca1 (C) includes multiple islands (a first island 141 to a ninth island 149) that are separated to each other where the islands are formed in a semiconductor such as GaAs or GaAlAs by stacking a p-type substrate 80, a p-type first semiconductor layer 81, a n-type second semiconductor layer 82, a p-type third semiconductor layer 83, and a n-type fourth semiconductor layer 84 sequentially from lower to upper levels, and continuously etching the surrounding p-type first semiconductor layer 81, the n-type second semiconductor layer 82, the p-type third semiconductor layer 83, and the n-type fourth semiconductor layer 84.

As shown in FIG. 24A, the light-emitting thyristor L1 is included in the first island 141. The write thyristor M1 and the connection diode Dz1 are included in the second island 142.

The third island 143 includes a trunk extending from side to side in FIG. 24A and multiple branches arising from the trunk as shown in FIG. 24A. The trunk is provided with the power supply line 71, and the branches are provided with the power supply line resistances Rgx, Rgy, and Rgz.

The fourth island 144 includes the transfer thyristor T1, the coupling diode Dx1, and the connection diode Dy1. The fifth island 145 includes the start diode Dx0. The sixth island 146 includes the current limitation resistance R1, the seventh island 147 includes the current limitation resistance R2, the eighth island 148 includes the enable resistance RE, and the ninth island 149 includes the write resistance RW.

In the light-emitting chip Ca1 (C), islands similar to the first island 141, the second island 142 and the fourth island 144 are formed in parallel. These islands includes the light-emitting thyristors L2, L3, L4, . . . , the write thyristors M2, M3, M4, . . . , the transfer thyristors T2, T3, T4, . . . , in a similar manner as the first island 141, the second island 142, and the fourth island 144. Description of these is omitted.

Also, the rear surface of the substrate 80 includes the backside electrode 85 as the Vsub terminal.

The first island 141 to the ninth island 149 are further described in detail with reference to FIGS. 24A and 24B.

The light-emitting thyristor L1 included in the first island 141 has an anode terminal of the substrate 80, a cathode terminal of an n-type ohmic electrode 121 formed on a region 111 of the n-type fourth semiconductor layer 84, and a gate terminal Gl1 of p-type ohmic electrode 131 formed on the p-type third semiconductor layer 83 which has been exposed after etching to remove the n-type fourth semiconductor layer 84. Light is emitted from the surface of the region 111 of the n-type fourth semiconductor layer 84 except the portion of the n-type ohmic electrode 121.

The write thyristor M1 included in the second island 142 has an anode terminal of the substrate 80, a cathode terminal of an n-type ohmic electrode (with no reference numeral) formed on the n-type fourth semiconductor layer 84, and a gate terminal Gm1 of a p-type ohmic electrode (with no reference numeral) on the p-type third semiconductor layer 83 which has been exposed after etching to remove the n-type fourth semiconductor layer 84.

Similarly, the connection diode Dz1 included in the second island 142 is formed so as to have a cathode terminal of an n-type ohmic electrode 122 provided on a region 112 of the n-type fourth semiconductor layer 84, and an anode terminal of the p-type third semiconductor layer 83. The p-type third semiconductor layer 83 as the anode terminal is connected to the gate terminal Gm1 of the write thyristor M1.

The power supply line resistance Rgx, Rgy, Rgz included in the third island 143 is formed between two p-type ohmic electrodes formed on the p-type third semiconductor layer 83. The power supply line resistances Rgx, Rgy, Rgz use the p-type third semiconductor layer 83 between two p-type ohmic electrodes as the resistance. For example, the power supply line resistance Rgz1 is formed between p-type ohmic electrodes 132 and 133 provided on the p-type third semiconductor layer 83. The power supply line resistance Rgy1 is formed between the p-type ohmic electrodes 133 and 134 provided on the p-type third semiconductor layer 83.

The transfer thyristor T1 included in the fourth island 144 has an anode terminal of the substrate 80, a cathode terminal of an n-type ohmic electrode 124 formed on a region 114 of the n-type fourth semiconductor layer 84, and a gate terminal Gt1 of a p-type ohmic electrode (with no reference numeral) formed on the p-type third semiconductor layer 83 which has been exposed after etching to remove the n-type fourth semiconductor layer 84.

Similarly, the connection diode Dy1 included in the fourth island 144 is formed so as to have a cathode terminal of an n-type ohmic electrode 123 provided on a region 113 of the n-type fourth semiconductor layer 84, and an anode terminal of the p-type third semiconductor layer 83. The p-type third semiconductor layer 83 as the anode terminal is connected to the gate terminal Gt1 of the transfer thyristor T1.

Similarly, also the coupling diode Dx1 included in the fourth island 144 is formed so as to have a cathode terminal of an n-type ohmic electrode 125 provided on a region 115 of the n-type fourth semiconductor layer 84, and an anode terminal of the p-type third semiconductor layer 83. The p-type third semiconductor layer 83 as the anode terminal is connected to the gate terminal Gt1 of the transfer thyristor T1.

The start diode Dx0 included in the fifth island 145 has a cathode terminal of an n-type ohmic electrode (with no reference numeral) formed on the n-type fourth semiconductor layer 84 an anode terminal of a p-type ohmic electrode (with no reference numeral) formed on the p-type third semiconductor layer 83 which has been exposed after removing the n-type fourth semiconductor layer 84.

In a similar manner as the power supply line resistances Rgx1, Rgy1, Rgz1, the current limitation resistance R1 included in the sixth island 146, the current limitation resistance R2 included in the seventh island 147, the enable resistance RE included in the eighth island 148, and the write resistance RW included in the ninth island 149 use the p-type third semiconductor layer 83 as the resistance, which is located between a pair of p-type ohmic electrodes (with no reference numeral) formed on the p-type third semiconductor layer 83.

Connection relationship between the elements in FIG. 24A is described.

The p-type ohmic electrode 131, which is the gate terminal Gl1 of the light-emitting thyristor L1 of the first island 141, is connected to n-type ohmic electrode 122 that is the cathode terminal of the connection diode Dz1 of the second island 142. The n-type ohmic electrode 121, which is the cathode terminal of the light-emitting thyristor L1, is connected to light-up signal line 75. The light-up signal line 75 is connected to the φI terminal. Although description is omitted, the light-emitting thyristors L2, L3, L4, . . . , are arranged in the same manner.

The n-type ohmic electrode (with no reference numeral) that is the cathode terminal of the write thyristor M1 of the second island 142 is connected to the write signal line 74.

The write signal line 74 is then connected to the φW terminal via the write resistance RW included in the ninth island 149. The write signal line 74 is connected to the enable signal line 76 between the write resistance RW and the write thyristor M1. The enable signal line 76 is connected to the φE terminal via the enable resistance RE included in the eighth island 148.

The n-type ohmic electrode 122 that is the cathode terminal of the connection diode Dz1 of the second island 142 is connected to the p-type ohmic electrode 132 of the power supply line resistance Rgz1 included in the third island 143.

The p-type ohmic electrode (with no reference numeral) that is the gate terminal Gm1 of the write thyristor M1 of the second island 142 is connected to the p-type ohmic electrode 134 of the power supply line resistance Rgy1 included in the third island 143.

The p-type ohmic electrode 134 of the power supply line resistance Rgy1 included in the third island 143 is connected to the n-type ohmic electrode 123 that is the cathode terminal of the connection diode Dy1 included in the fourth island 144.

A p-type ohmic electrode (with no reference numeral) of the power supply line resistance Rgx1 included in the third island 143 is connected to p-type ohmic electrode (with no reference numeral) that is the gate terminal Gt1 of transfer thyristor T1 included in the fourth island 144.

The n-type ohmic electrode 124 that is the cathode terminal of the transfer thyristor T1 included in the fourth island 144 is connected to the first transfer signal line 72. The first transfer signal line 72 is connected to the φ1 terminal via the current limitation resistance R1 included in the sixth island 146.

The n-type ohmic electrode 125, which is the cathode terminal of the coupling diode Dx1 included in the fourth island 144, is connected to the p-type ohmic electrode (with no reference numeral) that is the gate terminal Gt2 of the transfer thyristor T2 provided adjacent to the n-type ohmic electrode 125.

On the other hand, p-type ohmic electrode (with no reference numeral), which is the gate terminal Gt1 of the transfer thyristor T1 included in the fourth island 144, is connected to n-type ohmic electrode (with no reference numeral) formed on the n-type fourth semiconductor layer 84, which is the cathode terminal of the start diode Dx0 included in the fifth island 145.

A p-type ohmic electrode (with no reference numeral) formed on the p-type third semiconductor layer 83, which is the anode terminal of the start diode Dx0 included in the fifth island 145, is connected to the n-type ohmic electrode (with no reference numeral) formed on the n-type fourth semiconductor layer 84, which is the cathode terminal of even numbered transfer thyristor T, as well as connected to the φ2 terminal via the current limitation resistance R2 included in the seventh island 147.

Although description is omitted here, other light-emitting thyristors L, transfer thyristors T, write thyristors M, coupling diodes Dx, connection diodes Dy, Dz are arranged in the same manner.

In this manner, the circuit configuration of the light-emitting chip Ca1 (C) shown in FIG. 23 is formed.

Next, operations of the light-emitting device 65 are described.

The light-emitting device 65 includes the light-emitting chips Ca1 to Ca20 belonging to the light-emitting chip group #a, and the light-emitting chips Cb1 to Cb20 belonging to the light-emitting chip group #b (see FIGS. 20 to 22).

As shown in FIG. 21B, the reference potential Vsub and the power supply potential Vga are supplied to all of the light-emitting chips C (the light-emitting chips Ca1 to Ca20 and the light-emitting chips Cb1 to Cb20) on the circuit board 62 in common.

As described above, the first transfer signal φ1a, the second transfer signal φ2a, the light-up signal φIa, and the enabling signal φEa are transmitted to the light-emitting chips Ca1 to Ca20 of the light-emitting chip group #a in common. Thus, the light-emitting chips Ca1 to Ca20 of the light-emitting chip group #a are driven in parallel.

Similarly, as described above, the first transfer signal φ1b, the second transfer signal φ2b, the light-up signal φIb, and the enable signal φEb are transmitted to the light-emitting chips Cb1 to Cb20 of the light-emitting chip group #b in common. Thus, the light-emitting chips Cb1 to Cb20 of the light-emitting chip group #b are driven in parallel.

On the other hand, the write signals φW1 to φW20 (φW) are each transmitted, in common, to the light-emitting chips C in the corresponding one of the light-emitting chip classes #1 to #20 each including one light-emitting chip C belonging to the light-emitting chip group #a, and one light-emitting chip C belonging to the light-emitting chip group #b. For example, the write signal φW1 is transmitted to the light-emitting chip class #1 including the light-emitting chip Ca1 of the light-emitting chip group #a and the light-emitting chip Cb1 of the light-emitting chip group #b in common. Also, twenty write signals φW1 to φW20 are transmitted in parallel at the same timing. Thus, the light-emitting chip classes #1 to #20 are driven in parallel.

Timing of transmission of the respective write signals φW1 to φW20 may be shifted from each other as describe later.

Since the light-emitting chips Ca2 to Ca20 of the light-emitting chip group #a are driven in parallel to the light-emitting chip Ca1, and the light-emitting chips Cb2 to Cb20 of the light-emitting chip group #b are driven in parallel to the light-emitting chip Cb1, it suffices to describe the operations of the light-emitting chips Ca1 and Cb1 belonging to the light-emitting chip class #1. Similarly, since the light-emitting chip classes #2 to #20 are driven in parallel to the light-emitting chip class #1, it suffices to describe the light-emitting chip class #1 to which the light-emitting chips Ca1 and Cb1 belong.

Figure 25:
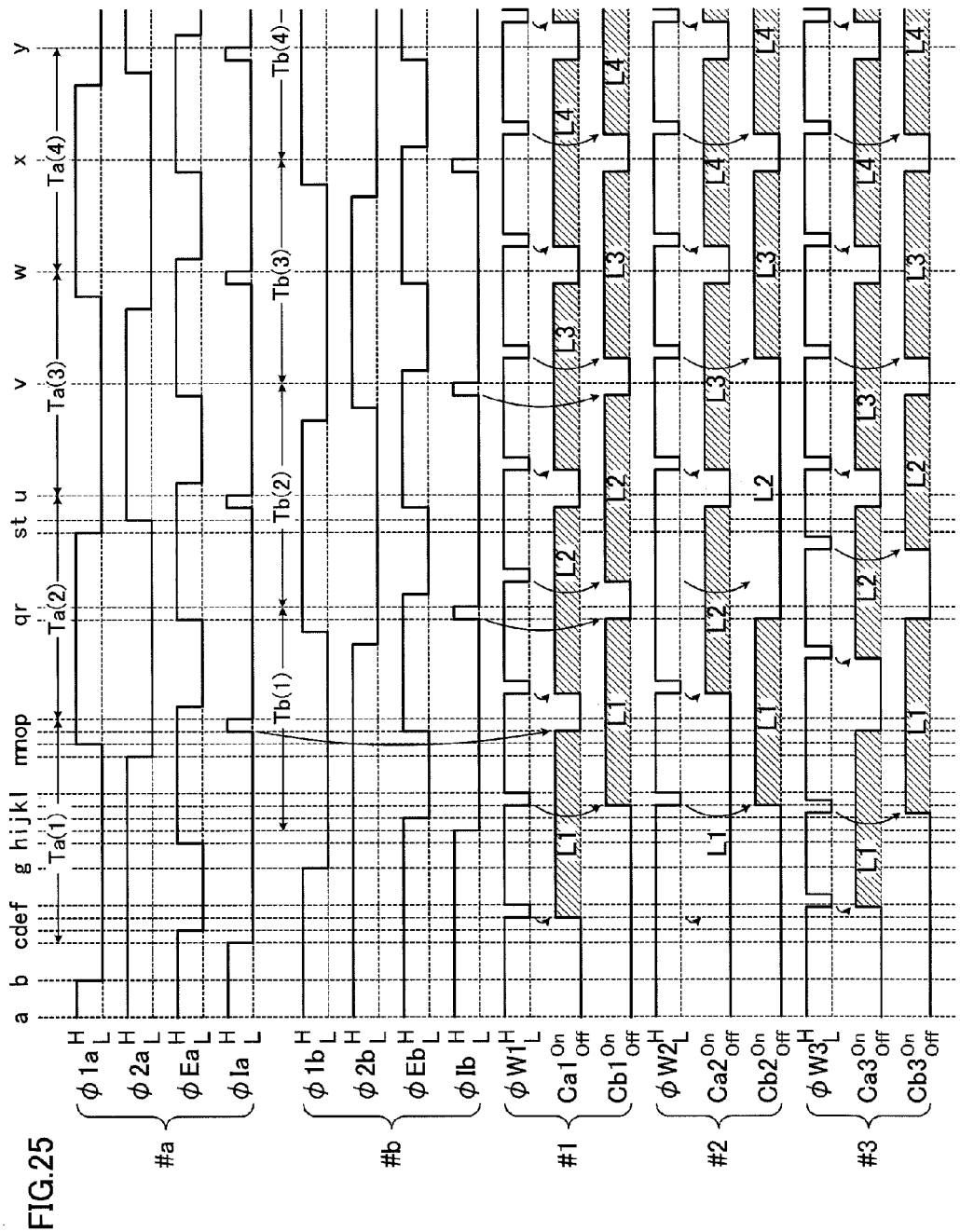
FIG. 25 is a timing chart for illustrating operations of the light-emitting chip according to the eighth exemplary embodiment.

FIG. 25 is a timing chart for illustrating operations of the light-emitting chip C according to the eighth exemplary embodiment.

FIG. 25 shows a timing chart illustrating operations of the light-emitting chip class #2 (the light-emitting chips Ca2 and Cb2) and the light-emitting chip class #3 (the light-emitting chips Ca3 and Cb3) in addition to the light-emitting chip class #1 (the light-emitting chips Ca1 and Cb1). FIG. 25 shows the timing chart of the operation to control whether or not to light up the light-emitting thyristors L1 to L4 in each light-emitting chip C. In the following, control of whether or not to light up the light-emitting thyristor L is referred to as lighting control.

For the light-emitting chip class #1 (the light-emitting chips Ca1 and Cb1), all the light-emitting thyristors L1 to L4 are controlled to be lighted up. For the light-emitting chip class #2 (the light-emitting chips Ca2 and Cb2), the light-emitting thyristors L2, L3, L4 of the light-emitting chip Ca2, and the light-emitting thyristors L1, L3, L4 of the light-emitting chip Cb2 are controlled to be lighted up. The light-emitting thyristor L1 of the light-emitting chip Ca2 and the light-emitting thyristor L2 of the light-emitting chip Cb2 are controlled to keep light-off. For the light-emitting chip class #3 (the light-emitting chips Ca3 and Cb3), all the light-emitting thyristors L1 to L4 are controlled to be lighted up, and the transmission timing of the write signal φW3 is shifted from that of the write signal φW1.

In the following, as described above, operations of the light-emitting chips Ca1 and Cb1 are mainly described.

In FIG. 25, time elapses in alphabetical order from a time point a to a time point y. Lighting control of the light-emitting thyristor L1 of the light-emitting chip Ca1 of the light-emitting chip group #a is made during a time interval Ta(1) from a time point c to a time point p. Lighting control of the light-emitting thyristor L2 of the light-emitting chip Ca1 of the light-emitting chip group #a is made during a time interval Ta(2) from the time point p to a time point u. Lighting control of the light-emitting thyristor L3 of the light-emitting chip Ca1 of the light-emitting chip group #a is made during a time interval Ta(3) from the time point u to a time point w. Lighting control of the light-emitting thyristor L4 of the light-emitting chip Ca1 of the light-emitting chip group #a is made during a time interval Ta(4) from the time point w to the time point y. In a similar manner, lighting control of the light-emitting thyristor Ln (n≥5) is made subsequently.

On the other hand, lighting control of the light-emitting thyristor L1 of the light-emitting chip Cb1 of the light-emitting chip group #b is made during a time interval Tb(1) from a time point i to a time point r. Lighting control of the light-emitting thyristor L2 of the light-emitting chip Cb1 of the light-emitting chip group #b is made during a time interval Tb(2) from the time point r to a time point v. Lighting control of the light-emitting thyristor L3 of the light-emitting chip Cb1 of the light-emitting chip group #b is made during a time interval Tb(3) from the time point v to a time point x. In a similar manner, lighting control of the light-emitting thyristor Ln (n≥4) is made subsequently.

In the eighth exemplary embodiment, time intervals Ta(1), Ta(2), Ta(3), . . . , have the same length, and, when not individually distinguished, are referred to as time interval T.

The time intervals Ta(1), Ta(2), Ta(3), . . . , in which the light-emitting chips Ca1 to Ca20 of the light-emitting chip group #a are controlled, and the time intervals Tb(1), Tb(2), Tb(3), . . . , in which the light-emitting chips Cb1 to Cb20 of the light-emitting chip group #b are controlled are shifted from each other by half the time interval T (180 degrees in terms of phase). That is, time interval Tb(1) starts half the time interval T after the time interval Ta(1) starts.

Thus, operation of signals in time intervals Ta(1), Ta(2), Ta(3), . . . , in which the light-emitting chip Ca1 of the light-emitting chip group #a is controlled is described below.

The length of time interval T may be variable as long as mutual relationship between signals described below is maintained.

All signal waveforms in time intervals Ta(1), Ta(2), Ta(3), . . . , are periodic except for the write signals φW (φW1 to φW20) that change according to received image data.

Thus, operation of signals in time interval Ta(1) from the time point c to the time point p is described below. The time interval from the time point a to the time point c is for the light-emitting chip Ca1 (C) to start its operation. Signals in this time interval are described in the description of the operation below.

The signal waveforms of the first transfer signal φ1a, the second transfer signal φ2a, the enable signal φEa and the light-up signal φIa in time interval Ta(1) are described.

The first transfer signal φ1a has a low-level electrical potential (hereinafter referred to as "L") at the time point c, and shifts from "L" to a high-level electrical potential (hereinafter referred to as "H") at a time point n, and is maintained at "L" at the time point p.

The second transfer signal φ2a is "H" at the time point c, shifts from "H" to "L" at a time point m, and is maintained at "L" at the time point p.

Now, comparing the first transfer signal φ1a with the second transfer signal φ2a, it is seen that the waveform of the first transfer signal φ1a in the time interval Ta(1) is that of the second transfer signal φ2a in the time interval Ta(2). The waveform of the second transfer signal φ2a in the time interval Ta(1) is that of the first transfer signal φ1a in the time interval Ta(2).

That is, the first transfer signal φ1a and the second transfer signal φ2a are signal waveforms that repeat with a period of twice the time interval T (2T). The first and second transfer signals φ1a and φ2a alternately repeat "H" and "L" before and after every time interval such as the time interval from the time point m to the time point n when both signals are "L." The first transfer signal φ1a and the second transfer signal φ2a do not share a time interval when both signals are "H" except for the time interval from the time point a to a time point b.

By a pair of transfer signals of the first transfer signal φ1a and the second transfer signal φ2a, the transfer thyristors T shown in FIG. 23 are sequentially turned on as described below, and set light-emitting thyristor L, which is a control target for lighting up or not lighting up (lighting control).

The enable signal φEa is "H" at the time point c, shifts from "H" to "L" at a time point d, and shifts from "L" to "H" at a time point h. The enable signal φEa is maintained at "H" at the time point p.

The enable signal φEa sets the light-emitting thyristor L in light enabled state, which is a control target for lighting up or not lighting up (lighting control) as described below.

The light-up signal φIa shifts from "H" to "L" at the time point c, and shifts from "L" to "H" at a time point o. The light-up signal φIa is maintained at "H" at the time point p.

The light-up signal φIa is a signal for supplying a current for lighting (emitting light) to the light-emitting thyristor L as described below.

The write signal φW1 is "H" at the time point c, shifts from "H" to "L" at the time point e, and shifts from "L" to "H" at a time point f. The write signal φW1 further shifts from "H" to "L" at the time point k, and shifts from "L" to "H" at a time point l. That is, the write signal φW1 has two time intervals when the write signal φW1 is "L" in Ta(1).

When the relationship between the write signal φW1 and the enable signal φEa is seen, the write signal φW1 is "L" in the time interval of from the time point e to the time point f, which is included in the time interval from the time point d to the time point h when the enable signal φEa is "L."

On the other hand, the relationship between the write signal φW1 and the enable signal φEb whose phase is shifted by 180 degrees from that of the enable signal φEa, is seen, the write signal φW1 is "L" in the time interval from a time point k to the time point l, which is included in the time interval from a time point j to the time point o when the enable signal φEb is "L" in time interval Tb(1).

That is, the first interval (from a time point e to the time point f) when the write signal φW1 is "L" for the first time in the time interval Ta(1) is for signaling that the light-emitting thyristor L1 of the light-emitting chip Ca1 changes its state to a light-on state, and the time interval (from the time point k to the time point l) when the write signal φW1 becomes "L" later is for signaling that the light-emitting thyristor L1 of the light-emitting chip Cb1 changes its state to a light-on state.

Thus, the time interval (from the time point d to the time point h) when the enable signal φEa is "L" is set so as not to overlap with the time interval (from the time point k to the time point l) when the write signal φW1 is "L" for shifting the state of the light-emitting thyristor L1 of the light-emitting chip Cb1 to a light-on state. Similarly, the time interval (from the time point j to the time point o) when the enable signal φEb is "L" is set so as not to overlap with the time interval (from the time point e to the time point f) when the write signal φW1 is "L" for shifting the state of the light-emitting thyristor L1 of the light-emitting chip Ca1 to a light-on state.

As described above, the light-emitting thyristor L changes its state to a light-on state, when both of the enable signal φE and the write signal φW are at "L." Assuming that "0" represents "H," "1" represents "L" of the enable signal φE and the write signal φW, the light-emitting thyristor L changes its state to light-on state when the logical product (AND) of the enable signal φE and the write signal φW is "1." Thus, the waveforms of the enable signal φE and the write signal φW are so created in FIG. 25 that shift of the enable signal φE from "H" to "L" occurs earlier than that of the write signal φW; however, shift of the write signal φW from "H" to "L" may occur earlier than that of the enable signal φE.

Basic operation of the write thyristor M is similar to that of the thyristors described above (the transfer thyristor T, the light-emitting thyristor L).

A 3-input AND circuit AND4 includes the write thyristor M, the connection diode Dy, the write resistance RW, and the enable resistance RE.

Here, the 3-input AND circuit AND4 is described with the write thyristor M1, the connection diode Dy1, the write resistance RW, and the enable resistance RE that are enclosed by the dashed dotted line shown in FIG. 23.

In the 3-input AND circuit AND42, the terminal O that is the cathode terminal of the connection diode Dy1 is connected to the gate terminal of the write thyristor M1, and to the gate terminal Gl1 of the light-emitting thyristor L1 via the connection diode Dz1. The terminal X that is the anode terminal of the connection diode Dy1 is connected to the gate terminal Gt1 of the transfer thyristor T1. The cathode terminal of the write thyristor M1 is connected to the terminal Y (φW terminal) via the write resistance RW. Similarly, the cathode terminal of the write thyristor M1 is connected to the terminal Z (φE terminal) via the enable resistance RW.

The terminal X, the terminal Y, and the terminal Z serve as an input terminal, and the terminal O serves an output terminal. When the potential (signal) of the terminal X is set to "H" (0 V), and the potential (signal) of both terminals Y and Z is set to "L" (−3.3 V), the potential (signal) of the terminal O is set to "H" (0 V). Thus, the 3-input AND circuit AND4 serves as an AND circuit with 3 inputs.

Now, the operations of the light-emitting device 65 are described according to the timing chart shown in FIG. 25 with reference to FIGS. 21 and 23.

(1) Time Point a

The state (initial state) of the light-emitting device 65 at the time point a, at which the reference potential Vsub and the power supply potential Vga are started to be supplied, is described.

<Light-Emitting Device 65>

At the time point a in the timing chart shown in FIG. 25, the potential of the power supply line 200a is set to the reference potential Vsub of "H" (0 V), and the potential of the power supply line 200b is set to the power supply potential Vga of "L" (−3.3 V) (see FIG. 21B). Thus, the respective Vsub and Vga terminals of the light-emitting chips C (the light-emitting chips Ca1 to Ca20 and the light-emitting chips Cb1 to Cb20) are set to "H" and "L" (see FIG. 23), respectively.

The transfer signal generating part 120a of the signal generating circuit 110 sets both of the first and the second transfer signals φ1a and φ2a to "H," and the transfer signal generating part 120b sets both of the first and the second transfer signals φ1b and φ2b to "H." Then, the first transfer signal lines 201a, 201b and the second transfer signal lines 202a, 202b are set to "H" (see FIG. 21B). Accordingly, the respective φ1 and φ2 terminals of the light-emitting chips C (the light-emitting chips Ca1 to Ca20 and the light-emitting chips Cb1 to Cb20) are set to "H." The potential of the first transfer signal line 72 connected to the φ1 terminal via the current limitation resistance R1 is also set to "H," and the potential of the second transfer signal line 73 connected to the φ1 terminal via the current limitation resistance R2 is also set to "H" (see FIG. 23).

Furthermore, the enable signal generating part 130a of the signal generating circuit 110 sets the enable signal φEa to "H," and the enable signal generating part 130b sets the enable signal φEb to "H." Then, the enable signal lines 203a and 203b are set to "H" (see FIG. 21B). Accordingly, the φE terminal of the light-emitting chips C is set to "H" (see FIG. 23).

Also the light-up signal generating part 140a of the signal generating circuit 110 sets the light-up signal φIa to "H," and the light-up signal generating part 140b sets the light-up signal φIb to "H." Then, the light-up signal lines 204a and 204b are set to "H" (see FIG. 21B). Accordingly, the φI terminal of the light-emitting chip C is set to "H." The light-up signal line 75 connected to the φI terminal is also set to "H" (see FIG. 23).

The write signal generating part 150 of the signal generating circuit 110 sets the write signals φW1 to φW20 to "H." Then, the write signal lines 205 to 224 are set to "H" (see FIG. 21B). Accordingly, the φW terminal of the light-emitting chip C is set to "H" (see FIG. 23).

The φW terminal of the light-emitting chip C is connected to the write signal line 74 via the write resistance RW. The φE terminal of the light-emitting chip C is connected to the enable signal line 76 via the enable resistance RE, and is connected to the write signal line 74. Since both φW and φE terminals of the light-emitting chip C are set to "H" as described above, the write signal line 74 is also set to "H" (see FIG. 23).

Now, operations of the light-emitting chips C (the light-emitting chips Ca1 to Ca20 and the light-emitting chips Cb1 to Cb20) are described centered on the light-emitting chips Ca1 and Cb1 belonging to the light-emitting chip class #1 according to the timing chart shown in FIG. 25 with reference to FIG. 23.

Although the potential of each terminal is assumed to change in a step-like manner in FIG. 25 and the following description, the potential of each terminal actually changes gradually. Thus, even while the potential is changing, as long as the below-mentioned conditions are satisfied, the thyristor changes its state to turn-on or turn-off state.

<Light-Emitting Chip Ca1>

Since the anode terminals of the transfer thyristors T, the write thyristors M and the light-emitting thyristors L are connected to the Vsub terminal, these terminals are set to "H."

On the other hand, respective cathode terminals of odd-numbered transfer thyristors T1, T3, T5, . . . , are connected to the first transfer signal line 72 and are set to "H." Respective cathode terminals of even-numbered transfer thyristors T2, T4, T6, . . . , are connected to the second transfer signal line 73 and are set to "H." That is, both the anode and cathode terminals of the transfer thyristor T are set to "H," thus the transfer thyristor T is in an OFF state.

Similarly, the cathode terminal of the write thyristor M is connected to the write signal line 74 as described above, and is set to "H." Thus, both the anode and cathode terminals of the write thyristor M are set to "H," thus the write thyristor M is in an OFF state.

Furthermore, the cathode terminal of the light-emitting thyristor L is connected to the light-up signal line 75 and is set to "H." Thus, both the anode and cathode terminals of the light-emitting thyristor L are set to "H," thus the light-emitting thyristor L is in an OFF state.

The gate terminal Gt of the transfer thyristor T is connected to the power supply line 71 via the power supply line resistance Rgx. The power supply line 71 is set at the power supply potential Vga of "L" (−3.3 V). Thus, the potential of the gate terminal Gt is "L" except for the gate terminals Gt1 and Gt2 described below.

The gate terminal Gm of the write thyristor M is connected to the power supply line 71 via the power supply line resistance Rgy. Thus, the potential of the gate terminal Gm is "L" except for the gate terminals Gm1 described below.

Also, the gate terminal Gl of the light-emitting thyristor L is connected to the power supply line 71 via the power supply line resistance Rgz. Thus, the potential of the gate terminal Gl is "L."

From the above description, the threshold voltages of the transfer thyristor T, the write thyristor M, and the light-emitting thyristor L except the transfer thyristors T1, T2 and the write thyristor M1 described below are −4.8 V, which is the potential of respective gate terminals Gt, Gm, Gl (−3.3 V) minus the diffusion potential Vd (1.5 V) of the pn junction.

The gate terminal Gt1 at one end of the transfer thyristor array in FIG. 23 is connected to the cathode terminal of the start diode Dx0 as described above. The anode terminal of the start diode Dx0 is connected to the second transfer signal line 73. The second transfer signal line 73 is set to "H." Then, the anode terminal is set to "L" and the cathode terminal is set to "H" so that a voltage is applied in the forward direction (forward bias) in the start diode Dx0. Accordingly, the potential of the cathode terminal (the gate terminal GM of the start diode Dx0 is set to the value (−1.5 V) which is "H" (0 V) at the anode terminal of the start diode Dx0 minus the diffusion potential Vd (1.5 V) of the start diode Dx0. Therefore, the threshold voltage of transfer thyristor T1 is set to −3 V which is the potential (−1.5 V) of the gate terminal Gt1 minus the diffusion potential Vd (1.5 V).

The gate terminal Gt2 of the transfer thyristor T2 adjacent to the transfer thyristor T1 is connected to the gate terminal Gt1 via the coupling diode Dx1. The potential of the gate terminal Gt2 of the transfer thyristor T2 is set to −3 V which is the potential (−1.5 V) of the gate terminal Gt1 minus the diffusion potential Vd (1.5 V) of the coupling diode Dx1. Therefore, the threshold voltage of the transfer thyristor T2 is set to −4.5 V.

The threshold voltage of the transfer thyristor Tn (n≥3) is −4.8 V as described above.

On the other hand, since the gate terminal Gm1 of the write thyristor M1 is connected to the gate terminal Gt1 via the connection diode Dy1, the potential of the gate terminal Gm1 of the write thyristor M1 is set to −3 V which is the potential (−1.5 V) of the gate terminal Gt1 minus the diffusion potential Vd (1.5 V) of the connection diode Dy1. Therefore, the threshold voltage of the write thyristor M1 is set to −4.5 V.

The threshold voltage of the write thyristor Mn (n≥2) is −4.8 V as described above.

Also, the threshold voltage of the light-emitting thyristor L is −4.8 V as described above.

<Light-Emitting Chip Cb1>

Since the initial state of the light-emitting chip Cb1 is the same as that of the light-emitting chip Ca1, its description is omitted.

(2) Time Point b

At the time point b shown in FIG. 25, the first transfer signal φ1a transmitted to the light-emitting chip group #a shifts from "H" (0 V) to "L" (−3.3 V). Thereby, the light-emitting device 65 enters an operating state.

<Light-Emitting Chip Ca1>

The transfer thyristor T1 with a threshold voltage of −3 V is turned on. However, since the threshold voltage of odd-numbered transfer thyristors Tn (n≥3) is −4.8 V, thus those transfer thyristors T may not change their states to an ON state. On the other hand, the transfer thyristor T2 with a threshold voltage of −4.5 V may not be turned on because the second transfer signal φ2a is "H" (0 V).

When the transfer thyristor T1 is turned on, the potential of the gate terminal Gt1 becomes "H" (0 V) at the anode terminal. The potential of the cathode terminal of the transfer thyristor T1 (the first transfer signal line 72 in FIG. 23) becomes −1.5 V which is "H" (0 V) at the anode terminal of the transfer thyristor T1 minus the diffusion potential Vd (1.5 V) of the pn junction. Then, the coupling diode Dx1 with a potential of −3 V at the cathode terminal (gate terminal Gt2) has is forward biased because the anode terminal (the gate terminal GM of the coupling diode Dx1 becomes "H" (0 V). Thus, the potential of the cathode terminal (the gate terminal Gt2) of the coupling diode Dx1 becomes −1.5 V which is "H" (0 V) at the anode terminal (the gate terminal GM minus the diffusion potential Vd (1.5 V). Accordingly, the threshold voltage of the transfer thyristor T2 becomes −3 V.

The potential of the gate terminal Gt3 connected to the gate terminal Gt2 of the transfer thyristor T2 via the coupling diode Dx2 becomes −3 V. Accordingly, the threshold voltage of the transfer thyristor T3 becomes −4.5 V. Since the potential of the gate terminal Gt of the transfer thyristors Tn (n≥4) is at "L" of the power supply potential Vga, the threshold voltage of these transfer thyristors is maintained at −4.8 V.

On the other hand, the transfer thyristor T1 is turned on, and the potential of the anode terminal (gate terminal Gt1) of the connection diode Dy1 becomes "H" (0 V). Then, the connection diode Dy1 having a potential of −3 V at the cathode terminal (gate terminal Gm1) is forward biased. Thus, the potential of the cathode terminal (the gate terminal Gm1) of the connection diode Dy1 becomes −1.5 V which is "H" (0 V) at the anode terminal (the gate terminal GM minus the diffusion potential Vd (1.5 V) of the pn junction. Accordingly, the threshold voltage of the write thyristor M1 becomes −3 V.

The potential of the gate terminal Gm2 of the write thyristor M2 becomes −3 V, and the threshold voltage of the write thyristor M2 becomes −4.5 V. The threshold voltage of the write thyristor Mn (n≥3) is maintained at −4.8 V.

However, since the write signal line 74 is "H," none of the write thyristors M changes its state to an ON state.

The cathode terminal (the gate terminal Gm1) of the connection diode Dy1 is the anode terminal (the gate terminal Gm1) of the connection diode Dz1. Therefore, the potential of the anode terminal (the gate terminal Gm1) of the connection diode Dz1 becomes −1.5 V. Then, the connection diode Dz1 is forward biased because the potential of the cathode terminal (the gate terminal Gl1) is previously set at −3.3 V. Thus, the potential of the cathode terminal (the gate terminal Gl1) of the connection diode Dz1 becomes −3 V which the potential (−1.5 V) of the anode terminal (the gate terminal Gm1) minus the diffusion potential Vd (1.5 V) of the pn junction. Accordingly, the threshold voltage of the light-emitting thyristor L1 becomes −4.5 V.

On the other hand, even if the potential of the gate terminal Gm2 becomes −3 V, the threshold voltage of the light-emitting thyristor L2 is maintained at −4.8 V. Similarly, the threshold voltage of the light-emitting thyristor Ln (n≥3) is maintained at −4.8 V.

Since the light-up signal line 75 is "H," none of the light-emitting thyristors L changes its state to an ON state.

That is, only the transfer thyristor T1 is turned on at the time point b. The transfer thyristor T1 is in an ON state immediately after the time point b (here, referred to a time point when the thyristor is in a steady state after a change is made on e.g., thyristor due to a change of the potential of the signal at the time point b). Other transfer thyristors T, and all the write thyristors M and the light-emitting thyristors L are in an OFF state.

In the following, only the thyristors (the transfer thyristor T, the write thyristor M, the light-emitting thyristor L) in an ON state are described, and description of the thyristors (the transfer thyristor T, the write thyristor M, the light-emitting thyristor L) in an OFF state is omitted.

<Light-Emitting Chip Cb1>

Since the signal transmitted to the light-emitting chip group #b to which the light-emitting chip Cb1 belongs does not change, the initial state of the light-emitting chip Cb1 is maintained.

As described above, the gate terminals (the gate terminals Gt, Gm, Gl) of the thyristors (the transfer thyristors T, the write thyristors M, the light-emitting thyristors L) are mutually connected to each other via the diodes (the coupling diodes Dx, the connection diodes Dy, Dz). Thus, when the potential of a certain gate terminal is changed, the potential of other gate terminal connected to the certain gate terminal via a diode with a forward bias is changed. The threshold voltage of the thyristor which has the certain gate terminal is changed. When the threshold voltage becomes higher than "L," the thyristor is turned on.

More specific description is given. The potential of another gate terminal connected to the certain gate terminal with changed potential of "H" (0 V) via the diode with a forward bias becomes −1.5 V, and the threshold voltage of the thyristor having another gate terminal becomes −3 V. Since the threshold voltage is higher (its absolute value is smaller) than "L" (−3.3 V), the thyristor is turned on.

On the other hand, the potential of still another gate terminal connected to the certain gate terminal with the changed potential of "H" (0 V) via two diodes with a forward bias becomes −3 V, and the threshold voltage of the thyristor having another gate terminal becomes −4.5 V. Since the threshold voltage is lower than "L" (−3.3 V), the thyristor may not be turned on but remains at an OFF state.

In the following, the description is focused on the thyristors (the transfer thyristors T, the write thyristors M and the light-emitting thyristors L) whose threshold voltages are changed so that the thyristors may be turned on. The description of the thyristors that are changed in another way is omitted.

(3) Time Point c

At the time point c, the light-up signal φIa transmitted to the light-emitting chip group #a shifts from "H" (0 V) to "L" (−3.3 V).

<Light-Emitting Chip Ca1>

Even if the light-up signal line 75 becomes "L" (−3.3 V), the threshold voltage of the light-emitting thyristors L1 is −4.3 V, the threshold voltages of the light-emitting thyristor Ln (n≥2) is −4.8 V, thus none of the light-emitting thyristors L is turned on.

Therefore, only the transfer thyristor T1 is in an ON state immediately after the time point c.

<Light-Emitting Chip Cb1>

Since the signal transmitted to the light-emitting chip group #b to which the light-emitting chip Cb1 belongs does not change, the initial state of the light-emitting chip Cb1 is maintained.

(4) Time Point d

At the time point d, the enable signal φEa transmitted to the light-emitting chip group #a shifts from "H" (0 V) to "L" (−3.3 V).

<Light-Emitting Chip Ca1>

The write signal φW1 is "H." Therefore, the write signal line 74 has a potential determined after the potential difference between the φE and φW terminals is divided by the enable resistance RE and the write resistance RW. For example, if RE=RW, the potential of the write signal line 74 is set to −1.65 V. In the following, the description is given assuming that RE=RW.

Since the threshold voltage of the write thyristor M1 is −3 V at this point, the write thyristor M1 may not be turned on. Since the threshold voltage of the write thyristor M2 is −4.5 V, and the threshold voltage of the write thyristor Mn (n≥3) is −4.8 V, these write thyristors may not be turned on.

Therefore, the transfer thyristor T1 is in an ON state immediately after the time point d.

<Light-Emitting Chip Cb1>

Since the signal transmitted to the light-emitting chip group #b to which the light-emitting chip Cb1 belongs does not change, the initial state of the light-emitting chip Cb1 is maintained.

(5) Time Point e

At the time point e, the write signal φW1 transmitted to the light-emitting chip class #1, to which the light-emitting chip Ca1 of the light-emitting chip group #a and the light-emitting chip Cb1 of the light-emitting chip group #b belong, shifts from "H" (0 V) to "L" (−3.3 V).

<Light-Emitting Chip Ca1>

As described above, the enable signal φEa of the light-emitting chip Ca1 has shifted to "L" at the time point d. Since both the enable signal φEa and write signal φW1 are set to "L," the potential of the write signal line 74 shifts from −1.65 V to "L" (−3.3 V).

Then, the write thyristor M1 with a threshold voltage of −3 V is turned on. On the other hand, the threshold voltage of the write thyristor M2 is −4.5 V, and the threshold voltage of the write thyristor Mn (n≥3) is −4.8 V, these write thyristors may not be turned on.

When the write thyristor M1 is turned on, the gate terminal Gm1 is set to "H" (0 V). The potential of the cathode terminal (the write signal line 74 in FIG. 23) then shifts from −3.3 V to −1.5 V.

Accordingly, the anode terminal (the gate terminal Gm1) of the connection diode Dz1 becomes "H" (0 V). Then, the connection diode Dz1 is forward biased because of the potential of the cathode terminal (the gate terminal Gt2) is previously set at −4.5 V. Thus, the cathode terminal (the gate terminal Gl2) of the connection diode Dz1 becomes −1.5 V, and the threshold voltage of light-emitting thyristor L1 becomes −3 V.

Note that the threshold voltage of the light-emitting thyristor Ln (n≥2) is maintained at −4.8 V.

The potential of the light-up signal line 75 has shifted to "L" (−3.3 V) at the time point c. Then, at the timing of the shift of the write signal φW1 from "H" (0 V) to "L" (−3.3 V), the light-emitting thyristor L1 is turned on and lighted up (emits light). Since the threshold voltage of the light-emitting thyristors Ln (n≥2) is −4.8 V, these light-emitting thyristors may not be turned on.

Thus, the transfer thyristor T1, the write thyristor M1, and the light-emitting thyristor L1 are in an ON state immediately after the time point e.

<Light-Emitting Chip Cb1>

The write signal φW1 shifts from "H" (0 V) to "L" (−3.3 V). However, the enable signal φEb is maintained at the initial state of "H." Thus, the potential of the write signal line 74 of the light-emitting chip Cb1 is set to −1.65 V if RE=RW.

At this point, the threshold voltage of the write thyristor M1 is −4.5 V, and the threshold voltage of the write thyristors Mn (n≥2) is −4.8 V. Therefore, none of the write thyristors M may not be turned on.

(6) Time Point f

At the time point f, the write signal φW1 transmitted to the light-emitting chip class #1, to which the light-emitting chip Ca1 of the light-emitting chip group #a and the light-emitting chip Cb1 of the light-emitting chip group #b belong, shifts from "L" (−3.3 V) to "H" (0 V).

<Light-Emitting Chip Ca1>

As described above, the enable signal φEa is maintained at "L" after the time point d. Thus, the potential of the write signal line 74 starts to shift to −1.65 V. On the other hand, the write thyristor M1 connected to the write signal line 74 is an ON state. In order to maintain the ON state of the write thyristor M1, the potential of the write signal line 74 only needs to be −1.5 V or less. Since the potential of −1.65 V is lower than −1.5 V, the write thyristor M1 maintains the ON state subsequently. The potential of the write signal line 74 is maintained at −1.5 V by the write thyristor M1 in an ON state.

Thus, the transfer thyristor T1, the write thyristor M1, and the light-emitting thyristor L1 are in an ON state immediately after the time point f.

<Light-Emitting Chip Cb1>

When the write signal φW1 shifts from "L" (−3.3 V) to "H" (0 V), the potential of the write signal line 74 of the light-emitting chip Cb1 returns to "H" (0 V) from −1.65 V.

(7) Time Point g

At a time point g, the first transfer signal φ1b transmitted to the light-emitting chip group #b shifts from "H" (0 V) to "L" (−3.3 V).

<Light-Emitting Chip Ca1>

Since the signal transmitted to the light-emitting chip group #a, to which the light-emitting chip Ca1 belongs, is not changed, the state immediately after the time point f is maintained.

<Light-Emitting Chip Cb1>

The operation of the light-emitting chip Cb1 is similar to that of the light-emitting chip Ca1 at the time point b. That is, the transfer thyristor T1 is turned on. Accordingly, the potential of the first transfer signal line 72 is set to −1.5 V. Furthermore, the threshold voltage of the transfer thyristor T2 and the threshold voltage of the write thyristor M1 both become −3 V.

That is, the light-emitting chip Cb1 operates at a timing shifted from that of the light-emitting chip Ca1 (shifted phase relationship by 180 degrees).

(8) Time Point h

At the time point h, the enable signal φEa transmitted to the light-emitting chip group #a shifts from "L" (−3.3 V) to "H" (0 V).

<Light-Emitting Chip Ca1>

Since the write signal φW1 has shifted from "L" to "H" at the time point f, the potential of the write signal line 74 shifts to "H."

Then, the write thyristors M1 previously in an ON state has a potential of "H" at both cathode and anode terminals, thus is turned off. Accordingly, the potential of the gate terminal Gm1 returns to −1.5 V.

The transfer thyristor T1 and the light-emitting thyristor L1 are in an ON state immediately after the time point h.

<Light-Emitting Chip Cb1>

Since the signal transmitted to the light-emitting chip group #b, to which the light-emitting chip Cb1 belongs, is not changed, the state immediately after the time point g is maintained.

(9) Time Point i

At the time point i, the light-up signal φIb transmitted to the light-emitting chip group #b shifts from "H" (0 V) to "L" (−3.3 V).

<Light-Emitting Chip Ca1>

Since the signal transmitted to the light-emitting chip group #a to which the light-emitting chip Ca1 belongs, is not changed, the state immediately after the time point h is maintained.

<Light-Emitting Chip Cb1>

Since the operation of the light-emitting chip Cb1 is similar to that of the light-emitting chip Ca1 at the time point c, detailed description is omitted.

Immediately after the time point i, the transfer thyristor T1 is in an ON state.

Here, it is assumed that the phases of the operations of the light-emitting chip Cb1 at the time point c and the time point i are shifted by 180 degrees from each other with respect to the time interval T.

(10) Time Point j

At the time point j, the enable signal φEb transmitted to the light-emitting chip group #b shifts from "H" (0 V) to "L" (−3.3 V).

<Light-Emitting Chip Ca1>

Since the signal transmitted to the light-emitting chip group #a, to which the light-emitting chip Ca1 belongs, is not changed, the state immediately after the time point h is maintained.

<Light-Emitting Chip Cb1>

Since the operation of the light-emitting chip Cb1 is similar to that of the light-emitting chip Ca1 at the time point d, detailed description is omitted.

At the time point j, the potential of the write signal line 74 is set to −1.65 V if RE=RW.

Immediately after the time point j, the transfer thyristor T1 is in an ON state.

(11) Time Point k

At the time point k, the write signal φW1 transmitted to the light-emitting chip class #1, to which the light-emitting chip Ca1 of the light-emitting chip group #a and the light-emitting chip Cb1 of the light-emitting chip group #b belong, shifts from "H" (0 V) to "L" (−3.3 V).

<Light-Emitting Chip Ca1>

The potential of the write signal line 74 of the light-emitting chip Ca1 has shifted to "H" at the time point h.

Thus, when the write signal φW1 shifts to "L," the potential of the write signal line 74 becomes −1.65 V similarly to the case at the time point d.

However, since the threshold voltage of the write thyristors M1 is −4.5 V, and the threshold voltages of the write thyristors Mn (n≥2) are −4.8 V, none of the write thyristors M is turned on.

Immediately after the time point k, the transfer thyristor T1 is in an ON state, thus the light-emitting thyristor L1 is in an ON state to keep lighting (emitting light).

<Light-Emitting Chip Cb1>

The enable signal φEb of the light-emitting chip Cb1 has shifted to "L" at the time point j. Thus, the potential of the write signal line 74 shifts from −1.65 V to "L" (−3.3 V) after both of the enable signal φEb and the write signal φW1 become "L." Then, the write thyristor M1 having a threshold voltage of −3 V is turned on in a similar manner to the light-emitting chip Ca1 at the time point e.

When the write thyristor M1 is turned on, the gate terminal Gm1 is set to "H" (0 V). The threshold voltage of the light-emitting thyristor L1 is set to −3 V.

Since the potential of the light-up signal line 75 has shifted to "L" (−3.3 V) at the time point i, the light-emitting thyristor L1 is turned on and lighted up (emits light) at the timing of the shift of the write signal φW1 from "H" (0 V) to "L" (−3.3 V).

Immediately after the time point k, the transfer thyristor T1 and the write thyristor M1 are in an ON state, and the light-emitting thyristor L1 is in an ON state to keep lighting (emitting light).

(12) Time Point l

At the time point l, the write signal φW1 transmitted to the light-emitting chip class #1, to which the light-emitting chip Ca1 of the light-emitting chip group #a and the light-emitting chip Cb1 of the light-emitting chip group #b belong, shifts from "L" (−3.3 V) to "H" (0 V).

<Light-Emitting Chip Ca1>

The potential of the write signal line 74, previously set to −1.65 V at the time point k, returns to "H."

Immediately after the time point l, the transfer thyristor T1 is in an ON state and the light-emitting thyristor L1 is an ON state to keep lighting (emitting light).

<Light-Emitting Chip Cb1>

The potential of the write signal line 74 starts to shift to −1.65 V in a similar manner to the operation of the light-emitting chip Ca1 at the time point f. However, since the potential of −1.65 V is lower than that (−1.5 V) of the cathode terminal of the write thyristor M1 in an ON state, the write thyristor M1 maintains the ON state subsequently. The potential of the write signal line 74 is maintained at −1.5 V by the write thyristor M1 in an ON state.

Immediately after the time point f, the transfer thyristor T1 and the write thyristor M1 are in an ON state and the light-emitting thyristor L1 is in an ON state to keep lighting (emitting light).

(13) Time Point m

At the time point m, the second transfer signal φ2a transmitted to the light-emitting chip group #a shifts from "H" (0 V) to "L" (−3.3 V).

<Light-Emitting Chip Ca1>

The transfer thyristor T2 having a threshold voltage of −3 V is turned on. However, the threshold voltage of even numbered transfer thyristors Tn (n≥4) is −4.8 V, thus may not be turned on.

When the transfer thyristor T2 is turned on, the gate terminal Gt2 is set to "H" (0 V). Then, the potential of the gate terminal Gt3 connected to the gate terminal Gt2 of the transfer thyristor T2 via the coupling diode Dx2 is set to −1.5 V. Accordingly, the threshold voltage of the transfer thyristor T3 is set to −3 V.

The cathode terminal (the second transfer signal line 73 in FIG. 23) is set to −1.5 V which is "H" (0 V) at the anode terminal minus the diffusion potential Vd (1.5 V) of the pn junction.

On the other hand, when the transfer thyristor T2 is turned on to set the gate terminal Gt2 to "H," the potential of the gate terminal Gm1 is set to −1.5 V via the connection diode Dy2. Accordingly, the threshold voltage of the write thyristor M2 becomes −3 V. However, since the potential of the write signal line 74 is "H," the write thyristor M2 is not turned on.

Furthermore, the potential of the gate terminal Gl2 is set to −3 V via the connection diode Dz2. Accordingly, the threshold voltage of the light-emitting thyristor L2 is set to −4.5 V. Since the potential of light-up signal line 75 is set to be −1.5 V by the light-emitting thyristor L1 in an ON state at this point, the light-emitting thyristor L2 is not turned on.

That is, only the transfer thyristor T2 may be turned on at the time point m.

Immediately after the time point m, the transfer thyristor T1 and the transfer thyristor T2 are in an ON state and the light-emitting thyristor L1 is in an ON state to keep lighting (emitting light).

<Light-Emitting Chip Cb1>

Since the signal transmitted to the light-emitting chip group #b, to which the light-emitting chip Cb1 belongs, is not changed, the state immediately after the time point l is maintained.

(14) Time Point n

At the time point n, the first transfer signal φ1a transmitted to the light-emitting chip group #a shifts from "L" (−3.3 V) to "H" (0 V).

<Light-Emitting Chip Ca1>

Since both the cathode and anode terminals of the transfer thyristor T1 in an ON state are set to "H," the transfer thyristor T1 is turned off. Accordingly, the gate terminal Gt1 shifts from "H" to "L" (−3.3 V), and the threshold voltage of the transfer thyristor T1 becomes −4.8 V. Also, the coupling diode Dx1 is reverse biased because the anode terminal (the gate terminal Gt1) becomes "L" and the cathode terminal (the gate terminal Gt2) becomes "H."

Similarly, the anode terminal (the gate terminal Gt1) of the connection diode Dy1 becomes "L" (−3.3 V). Then, the connection diode Dy1 is reverse biased because the potential of the cathode terminal (the gate terminal Gm1) is previously set at −1.5 V. Accordingly, the cathode terminal (the gate terminal Gm1) of the connection diode Dy1 starts to shift to "L."

When the cathode terminal (the gate terminal Gm1) shifts to "L," the connection diode Dz1 is reverse biased because the cathode terminal (the gate terminal Gl1) is "H" due to the light-emitting thyristor L1 in an ON state. Thus, the gate terminal Gm1 of the write thyristor M1 becomes "L," and the threshold voltage thereof becomes −4.8 V.

Immediately after the time point n, the transfer thyristor T2 is in an ON state, and the light-emitting thyristor L1 is in an ON state to keep lighting (emitting light).

Note that the gate terminal connected to a certain gate terminal at "H" (0 V) via a diode with a reverse bias is not affected by the "H" (0 V), and the threshold voltage of the relevant thyristor is not increased (its absolute value is not decreased).

<Light-Emitting Chip Cb1>

Since the signal transmitted to the light-emitting chip group #b, to which the light-emitting chip Cb1 belongs, is not changed, the state at the time point l is maintained.

(15) Time Point o

At the time point o, the light-up signal φIa transmitted to the light-emitting chip group #a shifts from "L" (−3.3 V) to "H" (0 V). The enable signal φEb transmitted to the light-emitting chip group #b shifts from "L" (−3.3 V) to "H" (0 V).

<Light-Emitting Chip Ca1>

When the light-up signal φIa shifts from "L" (−3.3 V) to "H" (0 V), the cathode and anode terminals of the light-emitting thyristor L1 previously in an ON state are both set to "H," and the light-emitting thyristor L1 is turned off, and unlighted (does not emit light). Accordingly, the gate terminal Gl1 starts to shifts to "L." The threshold voltage of the light-emitting thyristor L1 becomes −4.8 V.

That is, the light-emitting thyristor L1 of light-emitting chip Ca1 is lighted up (emits light) (turned on) at the timing of the shift of the write signal φW1 from "H" to "L" at the time point e, and lights off (turns off) at the timing of the shift of the light-up signal φIa from "L" to "H" at the time point o. The time interval from the time point e to the time point o corresponds to the lighting (emitting) time interval of the light-emitting thyristor L1 of the light-emitting chip Ca1.

Immediately after the time point o, the transfer thyristor T2 is in an ON state.

<Light-Emitting Chip Cb1>

When the enable signal φEb transmitted to the light-emitting chip group #b shifts from "L" (−3.3 V) to "H" (0 V), the potential of the write signal line 74 shifts to "H" similar to the operation of the light-emitting chip Ca1 at the time point h.

Immediately after the time point o, the transfer thyristor T1 and the light-emitting thyristor L1 are in an ON state, and the light-emitting thyristor L1 keeps lighting (emitting light).

In the eighth exemplary embodiment, although the light-up signal φIa transmitted to the light-emitting chip group #a shifts from "L" to "H," and the enable signal φEb transmitted to the light-emitting chip group #b shifts from "L" to "H" in the time point o, these shifts are not required to be made simultaneously, but one shift may be made before the other shift.

(16) Time Point p

At the time point p, the light-up signal φIa transmitted to the light-emitting chip group #a shifts from "H" (0 V) to "L" (−3.3 V).

<Light-Emitting Chip Ca1>

At the time point p, time interval Ta(2) of lighting control for the light-emitting thyristor L2 starts.

Since the first transfer signal φ1a and the second transfer signal φ2a repeat with respective periods of Ta(1) and Ta(2), although the waveforms of these signals are different, the light-emitting chip Ca1 repeats its operation with a cyclic period of Ta(1), which is from the time point c to the time point p. Thus, for time interval of Ta(2), description of the operation of the light-emitting chip Ca1 is omitted except for the first transfer signal φ1a, the second transfer signal φ2a, and the transfer thyristor T related to these signals.

The transfer thyristor T2 is in an ON state at the time point p.

<Light-Emitting Chip Cb1>

Since the signal transmitted to the light-emitting chip group #b, to which the light-emitting chip Cb1 belongs, is not changed, the state at the time point o is maintained.

(17) Time Point q

At a time point q, the enable signal φEa transmitted to the light-emitting chip group #a shifts from "L" (−3.3 V) to "H" (0 V). Also, the light-up signal φIb transmitted to the light-emitting chip group #b shifts from "L" (−3.3 V) to "H" (0 V).

<Light-Emitting Chip Ca1>

Since the operation is similar to the one at the time point h, its description is omitted.

Immediately after the time point q, the transfer thyristor T2 and the light-emitting thyristor L2 are in an ON state, and the light-emitting thyristor L2 keeps lighting (emitting light).

<Light-Emitting Chip Cb1>

Similarly to the operation of the light-emitting chip Ca1 at the time point o, when the light-up signal φIb shifts from "L" (−3.3 V) to "H" (0 V), the cathode and anode terminals of the light-emitting thyristor L1 previously in an ON state are both set to "H," and the light-emitting thyristor L1 shifts to an OFF state and lights off. Accordingly, the gate terminal Gl1 shifts to "L." The threshold voltage of the light-emitting thyristor L1 becomes −4.8 V.

That is, the light-emitting thyristor L1 of the light-emitting chip Cb1 is lighted up (emits light) (turned on) at the timing of the shift of the write signal φW1 from "H" to "L" at the time point k, and lights off (turns off) at the timing of the shift of the light-up signal φIb from "L" to "H" at the time point q. The time interval from the time point k to the time point q corresponds to the lighting (emitting) time interval of the light-emitting thyristor L1 of the light-emitting chip Cb1.

Immediately after the time point q, the transfer thyristor T2 is in an ON state.

(18) Time Point r

At the time point r, time interval Tb(1) in which control is performed for the light-emitting thyristor L1 of the light-emitting chip group #b is terminated.

(19) Time Point s

At a time point s, the first transfer signal φ1a transmitted, to the light-emitting chip group #a to which the light-emitting chip Ca1 belongs, shifts from "H" (0 V) to "L" (−3.3 V).

<Light-Emitting Chip Ca1>

The transfer thyristor T3 with a threshold voltage of −3 V is turned on. Accordingly, the gate terminal Gt3 becomes "H" (0 V). The potential of the gate terminal Gt4 becomes −1.5 V. Accordingly, the threshold voltage of the transfer thyristor T4 becomes −3 V. Accordingly, the threshold voltage of the write thyristor M4 becomes −3 V, and the threshold voltage of the light-emitting thyristor L4 becomes −4.5 V.

Immediately after the time point s, the transfer thyristors T2, T3 are in an ON state, and the light-emitting thyristor L2 is in an ON state to keep lighting (emitting light).

<Light-Emitting Chip Cb1>

Since the signal transmitted to the light-emitting chip group #b, to which the light-emitting chip Cb1 belongs, is not changed, the state is not changed.

Immediately after the time point s, the transfer thyristor T2 and the write thyristor M2 are in an ON state, and the light-emitting thyristor L2 is in an ON state to keep lighting (emitting light).

(20) Time Point t

At a time point t, the second transfer signal φ2a transmitted to the light-emitting chip group #a, to which the light-emitting chip Ca1 belongs, shifts from "L" (−3.3 V) to "H" (0 V).

<Light-Emitting Chip Ca1>

Since both the cathode and anode terminals of the transfer thyristor T2 in an ON state are set to "H," the transfer thyristor T2 is turned off. Then, the gate terminal Gt2 of the transfer thyristor T2 shifts to "L." The gate terminal Gm2 of the write thyristor M2 as well as the gate terminal Gl2 of the light-emitting thyristor L2 shift to "H." The threshold voltages of the transfer thyristor T2 and the write thyristor M2 are set to −4.8 V.

Immediately after the time point t, the transfer thyristor T3 is in an ON state, and the light-emitting thyristor L2 is in an ON state to keep lighting (emitting light).

<Light-Emitting Chip Cb1>

Since the signal transmitted to the light-emitting chip group #b, to which the light-emitting chip Cb1 belongs, is not changed, the state is not changed.

Immediately after the time point t, the transfer thyristor T2 and the write thyristor M2 are in an ON state, and the light-emitting thyristor L2 is in an ON state to keep lighting (emitting light).

(21) Others

At the time point u, time interval Ta(2) in which control is performed for the light-emitting thyristor L2 of the light-emitting chip group #a is terminated. At the time point v, time interval Tb(2) in which control is performed for the light-emitting thyristor L2 of the light-emitting chip group #b is terminated. At the time point w, time interval Ta(3) in which control is performed for the light-emitting thyristor L3 of the light-emitting chip group #a is terminated. At the time point x, time interval Tb(3) in which control is performed for the light-emitting thyristor L3 of the light-emitting chip group #b is terminated. At the time point y, time interval Ta(4) in which control is performed for the light-emitting thyristor L4 of the light-emitting chip group #a is terminated. Similarly hereafter, lighting control for all of the light-emitting thyristors L of the light-emitting chip C is performed.

The operations of the light-emitting chip C described above are summarized below.

First, the operations of the transfer thyristor T are described.

In the light-emitting chip C in the eighth exemplary embodiment, ON state of the transfer thyristor T is sequentially shifted by two phase transfer signals (the first transfer signal φ1 and the second transfer signal φ2).

That is, by setting one of the two phase transfer signals to "L" (−3.3 V), the transfer thyristor T, in which one transfer signal is transmitted to the cathode terminal, becomes an ON state, and the gate terminal Gt of the transfer thyristor T is set to "H" (0 V). The potential of another gate terminal Gt of adjacent transfer thyristor T connected to the gate terminal Gt, which has been set to "H" (0 V), via the coupling diode Dx with a forward bias is set to −1.5 V. Accordingly, the adjacent transfer thyristor T has an increased threshold voltage (from −4.5 V to −3 V in the eighth exemplary embodiment), and becomes an ON state at the timing when the other transfer signal shifts to "L" (−3.3 V).

In short, the two phase transfer signals (the first transfer signal φ1 and the second transfer signal φ2) are transmitted in such a manner that two phases of the signals are shifted from each other to share "L" (−3.3 V) interval (time interval from the time point m to the time point n in FIG. 25) so that the transfer thyristor T is sequentially set to an ON state.

When the transfer thyristor T is in an ON state and the gate terminal Gt is set to "H" (0 V), the potential of the gate terminal Gm of the write thyristor M connected to the gate terminal Gt via the connection diode Dy is set to −1.5 V, and the threshold voltage of the write thyristor M is set to −3 V.

When both of the enable signal φE (φEa or φEb) and the write signals φW (φW1 to φW20) are "L," the potential of the write signal line 74 is set to "L" (−3.3 V), and the write thyristor M is turned on.

When the write thyristor M is in an ON state, the gate terminal Gm of the write thyristor M is set to "H" (0 V), the potential of the gate terminal Gl connected to the gate terminal Gm via the connection diode Dz is set to −1.5 V, and the threshold voltage of the light-emitting thyristor L is set to −3 V.

If the light-up signal φI (φIa or φIb) is set to "L" (−3.3 V) before both of the enable signal φE (φEa or φEb) and the write signal φW (φW1 to φW20) become "L" (−3.3 V), at the timing when both of the enable signal φE (φEa or φEb) and the write signal φW (φW1 to φW20) become "L," the light-emitting thyristor L is turned, and lighted up (emits light).

In this manner, a lighting time interval when the light-emitting thyristor L is light-on (emitting light) is given by a time interval from the timing (the time point) when both of the enable signal φE (the enable signal φEa or φEb) and the write signal φW (the write signals φW1 to φW20) become "L" to another time point when the light-up signal φI (φIa or φIb) shifts from "L" to "H" (from the time point e to the time point o in FIG. 25).

On the other hand, a state when either one of the enable signal φE (the enable signal φEa or φEb) and the write signal φW (the write signals φW1 to φW20) is "L" is a half-selection state, and neither of the write thyristor M and the light-emitting thyristor L is turned on.

That is, in a light-emitting chip C for which the enable signal φE is "L," the light-emitting thyristor L is lighted up (emits light) when the write signal φW shifts from "H" to "L."

On the other hand, if the enable signal φE is "H," even if the write signal φW shifts from "H" to "L," the light-emitting thyristor L is prevented from lighting on (being made to emit light).

In the eighth exemplary embodiment, for the light-emitting chip classes each including the light-emitting chips C in the light-emitting chip group #a and the light-emitting chip group #b, when the light-emitting thyristors L of respective light-emitting chips C are to be turned on and lighted up (emits light) together, two time intervals of "L" (time intervals from the time point e to the time point f, and from the time point k to the time point l in FIG. 25) are set to the write signals φW (the write signals φW1 to φW20) which are transmitted in common. That is, the preceding time interval of "L" sets start of lighting for the light-emitting chips C of the light-emitting chip group #a, and the following time interval of "L" sets start of lighting for the light-emitting chips C of the light-emitting chip group #b.

In the eighth exemplary embodiment, the transfer signals (the first transfer signals φ1a, φ1b and the second transfer signals φ2a, φ2b), the enable signals φE (φEa and φEb), and the light-up signals φI (φIa to φIb) that are transmitted to respective groups of the light-emitting chip group #a and light-emitting chip group #b, have respective phases per group shifted from each other by 180 degrees. With this approach, the length (margin) of time interval in which two time intervals of "L" may be set in the write signals φW (φW1 to φW20) is maximized.

That is, since the respective phases are shifted by 180 degrees, two time intervals of "L" may be set in the write signals φW in such a manner that one time interval is set in the first half of time interval T, and the other time interval is set in the second half of time interval T.

The enable signals φE (φEa and φEb) and the write signals φW (φW1 to φW20) select a light-emitting thyristor L as a target for lighting up by setting respective signals to be "L," and the light-emitting thyristor L selected as a target for lighting up by both of the enable signals φE (φEa and φEb) and the write signals φW (φW1 to φW20) is lighted up.

Thus, in order to allow such selection, one "L" time interval of the enable signal φEa transmitted to the light-emitting chips C of light-emitting chip group #a, and another "L" time interval of the write signals φW (φW1 to φW20) transmitted to the light-emitting chips C may be overlapped each other. Similar discussion may be applied to the enable signal φEb.

On the other hand, for the enable signals φE (φEa and φEb), one "L" time interval of the enable signal φEa transmitted to the light-emitting chip C in the light-emitting chip group #a, which belongs to the same light-emitting chip class, and another "L" time interval of the write signals φW (φW1 to φW20) transmitted to the light-emitting chip C in the light-emitting chip group #b, which belongs to the same light-emitting chip class may not be overlapped each other. Similar discussion may be applied to the enable signal φEb. The above approach is used to avoid lighting on a light-emitting thyristor L which is not intended to be lighted up.

Next, the operation of the light-emitting chips Ca2 and Cb2 belonging to the light-emitting chip group #2, and the operation of the light-emitting chips Ca3 and Cb3 belonging to the light-emitting chip group #3 are described. As described above, the light-emitting chips Ca2, Ca3 operate in parallel with the light-emitting chip Ca1, and similarly to the light-emitting chips Ca1, Cb1. The light-emitting chips Cb2, Cb3 operate in parallel with the light-emitting chip Cb1, and similarly to the light-emitting chip Cb1.

Now, a case where some of the light-emitting thyristors L are not lighted up in the light-emitting chips Ca2 and Cb2 belonging to the light-emitting chip class #2 is described. For the light-emitting chips Ca3 and Cb3 belonging to the light-emitting chip class #3, a method for changing "L" time interval of the write signal φW to adjust an amount of light is described.

As described above, for the light-emitting chip class #2, the light-emitting thyristor L2, L3, L4 of the light-emitting chip Ca2 are controlled to be lighted up, and the light-emitting thyristor L1, L3, L4 of the light-emitting chip Cb2 are controlled to be lighted up. The light-emitting thyristor L1 of the light-emitting chip Ca2 and the light-emitting thyristor L2 of the light-emitting chip Cb2 remain unlighted.

When the light-emitting thyristor L1 of the light-emitting chip Ca2 remains unlighted (is not lighted up), in order to light on the light-emitting thyristor L1 of the light-emitting chip class #1, it is necessary only to maintain the write signal φW2 at "H" in the time interval from the time point e to the time point f in which the write signal φW1 is set to "L."

Accordingly, at the time point e, the write signal line 74 of the light-emitting chip Ca2 is maintained at −1.65 V, and the write thyristor M1 may not be turned on. Thus, the threshold voltage of the light-emitting thyristor L1 is also maintained at −4.5 V, so the light-emitting thyristor L1 may not be turned on and lighted up (emits light).

Similar discussion may be applied to the light-emitting thyristor L2 of the light-emitting chip Cb2.

On the other hand, the luminosity of the light-emitting thyristor L may vary between the light-emitting chips C, and between the light-emitting thyristors L due to e.g. variations in manufacturing conditions. Thus, the an amount of light of the light-emitting thyristor L is corrected (an amount of light correction). There are two methods of correcting an amount of light: one method is to adjust the current passing through the light-emitting thyristor L; the other method is to adjust lighting time interval of the light-emitting thyristor L.

As described above, the lighting time interval is between the time point when the write signal φW shifts to "L" to turn on the light-emitting thyristor L and another time point when the light-up signal φI shifts from "L" to "H" to turn off (light off) the light-emitting thyristor L. The eighth exemplary embodiment utilizes a method of adjusting a light start time point to correct an amount of light.

As shown in FIG. 25, the light-emitting thyristor L1 of the light-emitting chip Ca1 is turned on and lighted up (emits light) by setting the write signal φW1 to "L" at the time point e. On the other hand, the light-emitting thyristor L1 of the light-emitting chip Ca3 is turned on and lighted up (emits light) by setting the write signal φW1 to "L" between the time point e and the time point f.

That is, the lighting time interval of the light-emitting thyristor L1 of the light-emitting chip Ca3 is shorter than that of the light-emitting thyristor L1 of the light-emitting chip Ca1.

In this manner, the length of the lighting time interval may be increased or decreased by adjusting the time point when the write signal φW shifts to "L." In the eighth exemplary embodiment, the light-emitting chips C are divided into two light-emitting chip groups #a and #b, thus two time points when the write signal φW shifts to "L" may be provided for groups #a and #b in the first half time interval of T and the second half time interval of T, respectively.

(Correction of Amount of Light)

Next, correction of amount of light is further described.

Figure 26:
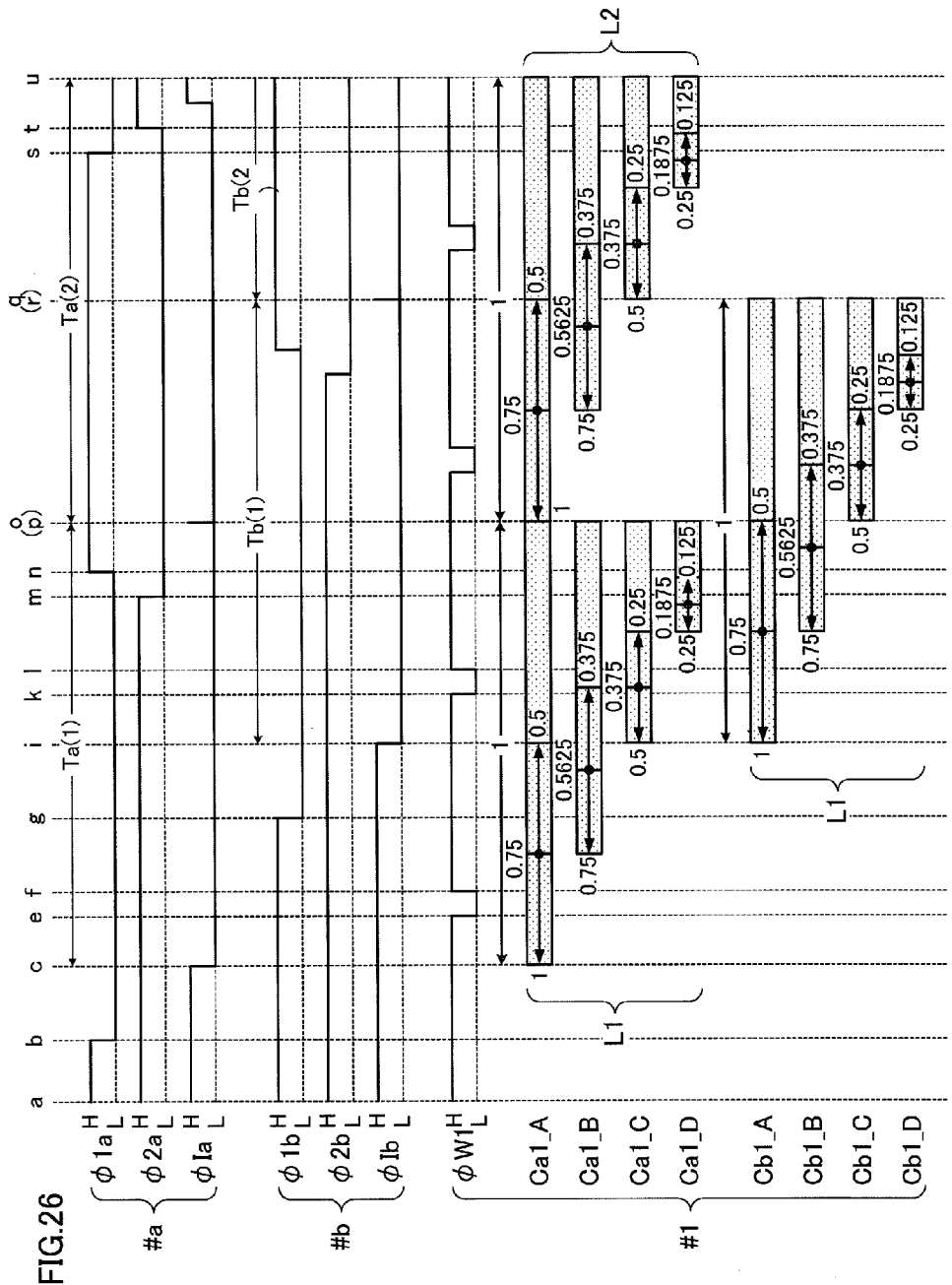
FIG. 26 is a timing chart for illustrating a method of correction of amount of light.

FIG. 26 is a timing chart for illustrating a method of correction of amount of light. FIG. 26 shows a portion taken from FIG. 25.

When correction of amount of light is performs by adjusting lighting time intervals, the lighting time intervals of respective light-emitting thyristors L are evaluated based on the lighting time interval of the light-emitting thyristor L with the least luminosity so that all the light-emitting thyristors L emit the same amount of light. These values of lighting time intervals are recorded as correction data in a non-volatile memory provided in e.g. the image output controller 30 of the image forming apparatus 1. A lighting time interval is set for each light-emitting thyristor L based on the correction data and the image data read from the non-volatile memory.

In the image forming apparatus 1, density correction is also performed to uniformly increase or decrease the luminosity of the light-emitting portion 63.

In FIG. 26, from the time point a to the time point u are the same as those in FIG. 25. Since the enable signal φEa and φEb are not described, the time points d, h, and j are omitted. Since the time interval when the light-up signal φIa is "H" (time interval from the time point o to the time point p), and another time interval when the light-up signal φIb is "H" (time interval from the time point q to the time point r) are so small in FIG. 25 that the time point and the time point p are shown on the same location, and so are the time point q and the time point r in FIG. 26.

In the eighth exemplary embodiment, common write signal φW1 is transmitted to the light-emitting chips Ca1 and Cb1 belonging to the light-emitting chip class #1 in common. When both of the light-emitting thyristor L1 of the light-emitting chip Ca1 and the light-emitting thyristor L1 of the light-emitting chip Cb1 are to be lighted up, two "L" time intervals are set to the write signal φW1 in the time interval Ta(1) (see FIG. 25).

When both of the enable signal φEa and the write signal φW1 are set to "L," the light-emitting thyristor L1 of the light-emitting chip Ca1 starts to light on (emit light), and when both of the enable signal φEb and the write signal φW1 are set to "L," the light-emitting thyristor L1 of the light-emitting chip Cb1 starts to light on (emit light).

Thus, correction of amount of light for the light-emitting thyristor L is performed by adjusting respective "L" time intervals of the enable signals φEa and φEb, and the two "L" time intervals of the write signal φW1. However, if the time point when both of the enable signal φEa and the write signal φW1 are set to "L" coincides with the time point when both of the enable signal φEb and the write signal φW1 are set to "L," respective lighting time intervals for the light-emitting thyristor L1 of the light-emitting chip Ca1, and the light-emitting thyristor L1 of the light-emitting chip Cb1 may not be independently controlled. In the write signal φW1, two "L" time intervals are set in the time sequence for respective light-emitting thyristors L of the light-emitting chip Ca1 and the light-emitting chip Cb1. Thus, if those two "L" time intervals are overlapped with each other in the write signal φW1, it means that two "L" time intervals may not be set in the time sequence.

In the following, a range in which the two "L" time intervals are not overlapped with each other in the write signal φW1, in other words, a range in which correction of amount of light may be performed is described. Since the "L" time intervals of the enable signal φEa and φEb vary according to the "L" time interval of the write signal φW1, thus their description is omitted.

As described above, the start time point of the lighting time interval of the light-emitting thyristor L is the timing when the write signal φW1 shifts from "H" to "L." The end time point of the lighting time interval is the time point when the light-up signal φI (φIa or φIb) shifts from "L" to "H." It is assumed that the end time point of the lighting time interval is not changed for the correction of amount of light.

For the light-emitting thyristor L1 of the light-emitting chip Ca1, the longest lighting time interval (which is assumed to be 1 here) is the time interval between the time point c when the light-up signal φIa shifts from "H" to "L" and the time point o when the light-up signal φIa shifts from "L" to "H." Thus, the lighting time interval may be adjusted by shifting the time point e between the time point c and the time point o where the time point e is the start time point of the first "L" time interval between the two "L" time intervals of the write signal φW1 in the time interval Ta(1).

On the other hand, for the light-emitting thyristor L1 of the light-emitting chip Cb1, the longest lighting time interval (which is assumed to be 1 here) is the time interval between the time point i when the light-up signal φIb shifts from "H" to "L" and the time point q when the light-up signal φIb shifts from "L" to "H. Thus, the lighting time interval may be adjusted by shifting the time point k between the time point i and the time point q where the time point k is the start time point of the second "L" time interval between the two "L" time intervals of the write signal φW1 in the time interval Ta(1).

However, the time interval from the time point c to the time point o when the lighting time interval of the light-emitting thyristor L1 of the light-emitting chip Ca1 may be adjusted, and the time interval from the time point i to the time point q when the lighting time interval of the light-emitting thyristor L1 of the light-emitting chip Cb1 may be adjusted are partially overlapped with each other for a portion of the time interval (from the time point i to the time point o). Thus, in the portion of the time interval, those two "L" time intervals of the write signal φW1 need not to be overlapped.

The four diagrams (Ca1_A, Ca1_B, Ca1_C and Ca1_D) shown in FIG. 26 illustrate the case where the start time point of the lighting time interval is adjusted for the light-emitting thyristor L1 of the light-emitting chip Ca1. Similarly, the four diagrams (Cb1_A, Cb1_B, Cb1_C and Cb1_D) shown in FIG. 26 illustrate the case where the start time point of the lighting time interval is adjusted for the light-emitting thyristor L1 of the light-emitting chip Cb1.

Ca1_A and Cb1_A show the case where the reference lighting time interval is 3/4. Ca1_B and Cb1_B show the case where the reference lighting time interval is 1/2. Ca1_C and Cb1_C show the case where the reference lighting time interval is 3/8. Ca1_D and Cb1_D show the case where the reference lighting time interval is 3/16. Each diagram also shows a range of the lighting time interval where correction of amount of light may be performed in a range of ±30% with respect to the reference lighting time interval. The reference lighting time interval is a lighting time interval calculated from the median of the luminosities of respective measured light-emitting thyristors L. That is, a light-emitting thyristor L having a luminosity equal to the median may expose the photoconductive drum 12 by lighting for the reference lighting time interval with predetermined amount of light. A light-emitting thyristor L having a luminosity less than the median is used for a time interval longer than the reference lighting time interval, and a light-emitting thyristor L having a luminosity mire than the median is used for a time interval shorter than the reference lighting time interval, so that the amount of light for each light-emitting thyristor L is corrected to be within a predetermined range.

The case of Ca1_A and Cb1_A where the reference lighting time interval is 3/4 is considered. An adjustable range of the time point e when the write signal φW1 first shifts from "H" to "L" (lighting time interval adjustable range) is the range shown by the arrow in the diagram of Ca1_A. Similarly, an adjustable range of the time point k when the write signal φW1 later shifts from "H" to "L" is the range shown by the arrow in the diagram of Cb1_A.

That is, in the cases of Ca1_A and Cb1_A where the reference lighting time interval is 3/4, in order to prevent the range shown by the arrow from overlapping, the lighting time interval needs to be adjusted in a range of 0.5 to 1. In the case where the reference lighting time interval is 3/4 (0.75), correction of amount of light may be performed in a range of ±30% with respect to the reference lighting time interval of 0.75. If the variation in luminosity is in this range, respective lighting time intervals for light-emitting thyristors L1, L2, L3 etc. of the light-emitting chip Ca1, and light-emitting thyristors L1, L2, L3 etc. of the light-emitting chip Cb1 may be individually adjusted.

In the cases of Ca1_B and Cb1_B where the reference lighting time interval is 1/2, correction of amount of light may be performed in a range of ±30% by adjusting the lighting time interval in a range of 0.375 to 0.75. Similarly, in the cases of Ca1_C and Cb1_C where the reference lighting time interval is ⅜, the lighting time interval may be adjusted in a range of 0.5 to 0.25. In the cases of Ca1_D and Cb1_D where the reference lighting time interval is 3/16, correction of amount of light may be performed in a range of ±30% by adjusting the lighting time interval in a range of 0.125 to 0.25.

The condition that the range of amount of light correction is ±30% means that a set of light-emitting thyristors L having a variation in luminosities thereof in a range of ±30% may be used.

As described above, since the signals for the light-emitting chip group #a and the light-emitting chip group #b have respective phases shifted from each other by 180 degrees, correction of amount of light may be performed over a wide range of variation in luminosities even with using the write signal φW in common.

Ninth Exemplary Embodiment

According to the eighth exemplary embodiment, the light-emitting chips C are divided into two light-emitting chip groups (#a and #b); however the number of light-emitting chip groups is not limited to two. According to the ninth exemplary embodiment, the light-emitting chips C are divided into four light-emitting chip groups (#a, #b, #c and #d).

Figure 27:
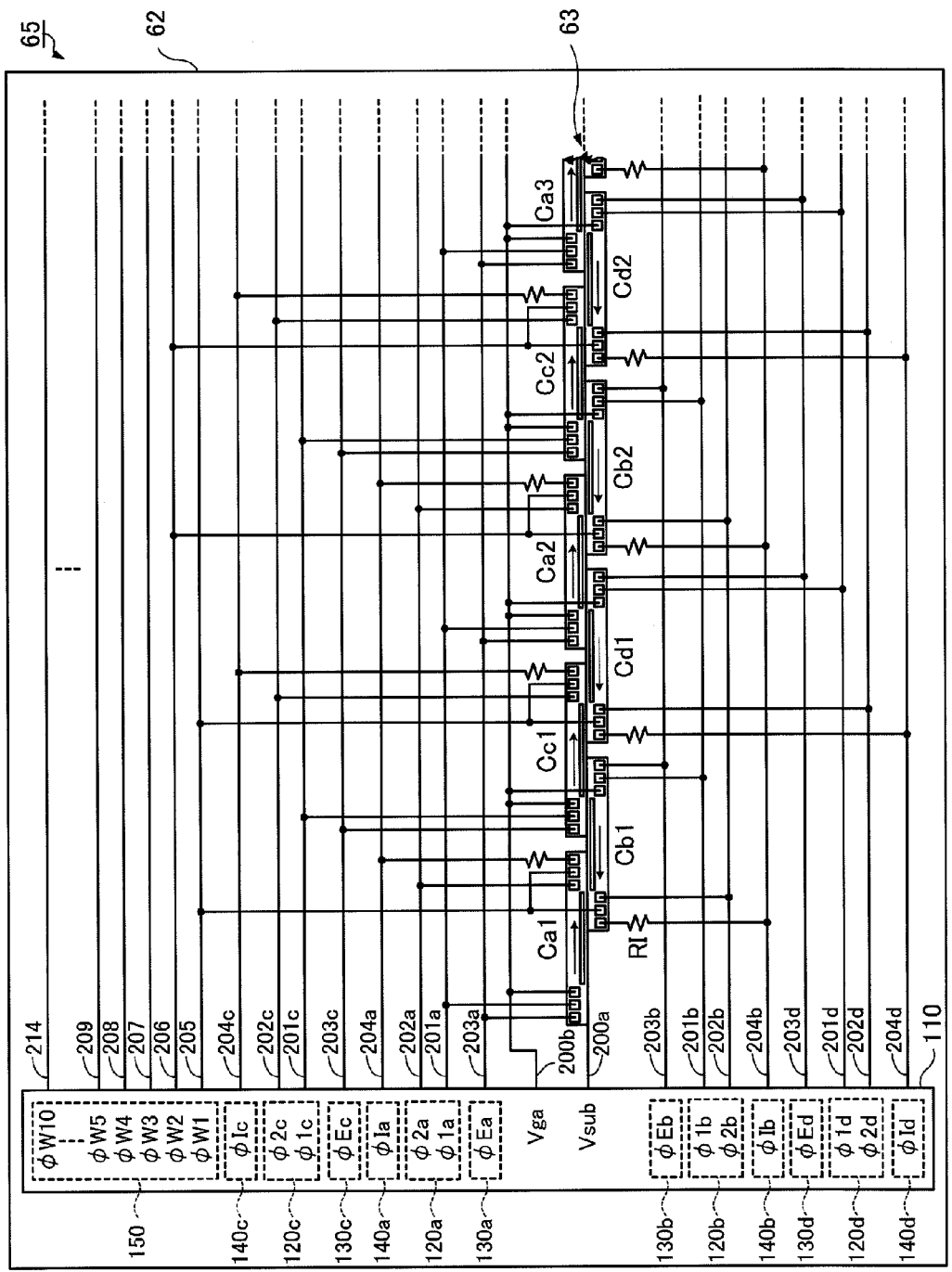
FIG. 27 is a diagram showing a configuration of the signal generating circuit of the light-emitting device and a wiring configuration on the circuit board according to the ninth exemplary embodiment.

FIG. 27 is a diagram showing a configuration of the signal generating circuit 110 of the light-emitting device 65 and a wiring configuration on the circuit board 62 according to the ninth exemplary embodiment.

There are forty light-emitting chips C, that are divided into a light-emitting chip group #a (light-emitting chips Ca1 to Ca10), a light-emitting chip group #b (light-emitting chips Cb1 to Cb10), a light-emitting chip group #c (light-emitting chips Cc1 to Cc10), and a light-emitting chip group #d (light-emitting chips Cd1 to Cd10). The configuration of the light-emitting chip C is the same as that shown in FIGS. 21A, 23, 24A and 24B.

The signal generating circuit 110 and the light-emitting chips C (the light-emitting chips Ca1 to Ca10, the light-emitting chips Cb1 to Cb10, the light-emitting chips Cc1 to Cc10, and the light-emitting chips Cd1 to Cd10) are mounted on the circuit board 62 of the light-emitting device 65. Wiring that connects between the signal generating circuit 110 and the light-emitting chips C is provided.

The signal generating circuit 110 includes a transfer signal generating part 120a that transmits a first transfer signal φ1a and a second transfer signal φ2a to the light-emitting chip group #a, a transfer signal generating part 120b that transmits a first transfer signal φ1b and a second transfer signal φ2b to the light-emitting chip group #b, a transfer signal generating part 120c that transmits a first transfer signal φ1c and a second transfer signal φ2c to the light-emitting chip group #c, and a transfer signal generating part 120d that transmits a first transfer signal φ1d and a second transfer signal φ2d to the light-emitting chip group #d based on various kinds of control signals.

The signal generating circuit 110 includes an enable signal generating part 130a that transmits an enable signal φEa to the light-emitting chip group #a, an enable signal generating part 130b that transmits an enable signal φEb to the light-emitting chip group #b, an enable signal generating part 130c that transmits an enable signal φEc to the light-emitting chip group #c, and an enable signal generating part 130d that transmits an enable signal φEd to the light-emitting chip group #d based on various kinds of control signals.

The signal generating circuit 110 further includes a light-up signal generating part 140a that transmits a light-up signal φIa to the light-emitting chip group #a, a light-up signal generating part 140b that transmits a light-up signal φIb to the light-emitting chip group #b, a light-up signal generating part 140c that transmits a light-up signal φIc to the light-emitting chip group #c, and a light-up signal generating part 140d that transmits a light-up signal φId to the light-emitting chip group #d based on various kinds of control signals.

The signal generating circuit 110 includes a write signal generating part 150 that forms ten classes of light-emitting chip C, each set including four light-emitting chips C from the light-emitting chip groups #a, #b, #c and #d, respectively and transmits the write signals φW1 to φW10 to the classes, respectively based on various kinds of control signals.

For example, the write signal generating part 150 transmits the write signal φW1 to a light-emitting chip class #1 including a light-emitting chip Ca1 belonging to the light-emitting chip group #a, a light-emitting chip Cb1 belonging to the light-emitting chip group #b, a light-emitting chip Cc1 belonging to the light-emitting chip group #c, and a light-emitting chip Cd1 belonging to the light-emitting chip group #d. The write signal generating part 150 transmits the write signal φW2 to a light-emitting chip class #2 including a light-emitting chip Ca2 belonging to the light-emitting chip group #a, a light-emitting chip Cb2 belonging to the light-emitting chip group #b, a light-emitting chip Cc2 belonging to the light-emitting chip group #c, and a light-emitting chip Cd2 belonging to the light-emitting chip group #d. In a similar manner, the write signal generating part 150 transmits the write signal φW10 to a light-emitting chip class #10 including a light-emitting chip Ca10 belonging to the light-emitting chip group #a, a light-emitting chip Cb10 belonging to the light-emitting chip group #b, a light-emitting chip Cc10 belonging to the light-emitting chip group #c, and a light-emitting chip Cd10 belonging to the light-emitting chip group #d.

Next, an arrangement of the light-emitting chip group #a (the light-emitting chips Ca1 to Ca10), the light-emitting chip group #b (the light-emitting chips Cb1 to Cb10), the light-emitting chip group #c (the light-emitting chips Cc1 to Cc10), and the light-emitting chip group #d (the light-emitting chips Cd1 to Cd10) is described.

The light-emitting chips Ca1 to Ca10 belonging to the light-emitting chip group #a, and the light-emitting chips Cc1 to Cc10 belonging to the light-emitting chip group #c are arranged alternately in line with a space in-between along the longitudinal direction of the light-emitting chip C. Being opposed to this arrangement, the light-emitting chips Cb1 to Cb10 belonging to the light-emitting chip group #b, and the light-emitting chips Cd1 to Cd10 belonging to the light-emitting chip group #d are arranged alternately in line with a space in-between along the longitudinal direction of the light-emitting chip C.

Next, the wiring that connects between the signal generating circuit 110 and the light-emitting chips C (the light-emitting chips Ca1 to Ca10, the light-emitting chips Cb1 to Cb10, the light-emitting chips Cc1 to Cc10, the light-emitting chips Cd1 to Cd10) has the same configuration as that of the eighth exemplary embodiment, thus similar components to those of the eighth exemplary embodiment are labeled with the same reference numerals, and detailed description of the similar components is omitted.

The reference potential Vsub and the power supply potential Vga are supplied to all of the light-emitting chips C on the circuit board 62 in common. The transfer signal φ1a, φ2a, the light-up signal φIa, and the enable signal φEa are transmitted to the light-emitting chip group #a in common.

The transfer signal φ1b, φ2b, the light-up signal φIb, and the enable signal φEb are transmitted to the light-emitting chip group #b in common. The transfer signal φ1c, φ2c, the light-up signal φIc, and the enable signal φEc are transmitted to the light-emitting chip group #c in common. The transfer signal φ1d, φ2d, the light-up signal φId, and the enable signal φEd are transmitted to the light-emitting chip group #d in common.

On the other hand, the write signals φW1 to φW10 are transmitted to the light-emitting chip classes #1 to #10, respectively on one-to-one basis, each light-emitting chip class including four light-emitting chips C from the light-emitting chip group #a, #b, #c and #d, respectively.

Figure 28:
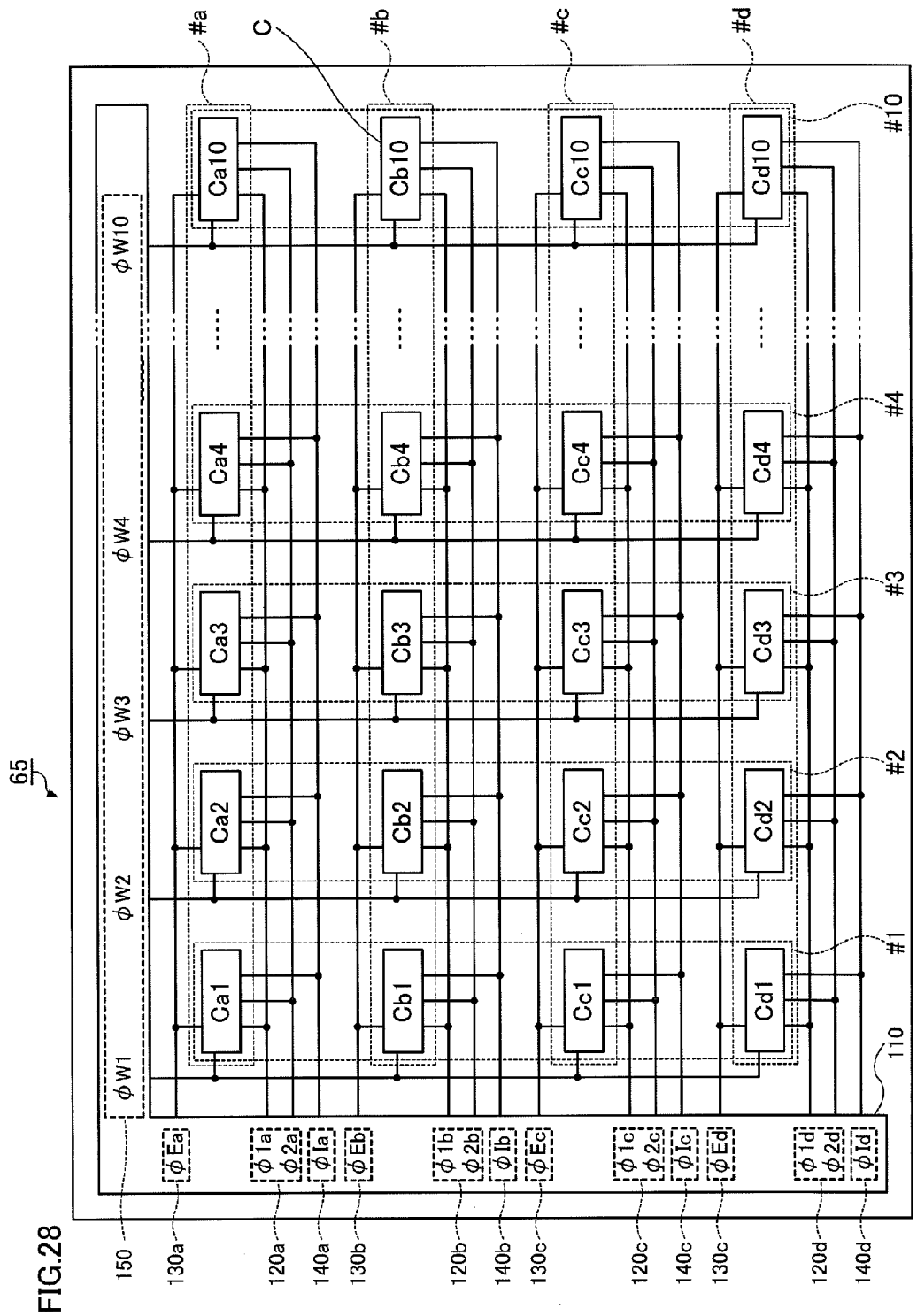
FIG. 28 is a diagram showing the light-emitting chips of the light-emitting device according to the ninth exemplary embodiment, being arranged as respective elements in a matrix form.

FIG. 28 is a diagram showing the light-emitting chips C of the light-emitting device 65 according to the ninth exemplary embodiment, being arranged as respective elements in a matrix form.

The diagram shows the light-emitting chips C arranged as respective elements in a 4×10 matrix form, and only the lines for the above-mentioned signals (the transfer signal φ1, φ2, the light-up signal φI, the enable signal φE, the write signal φW) that connect between the signal generating circuit 110 and the light-emitting chips C. The relationship between the signals transmitted from the signal generating circuit 110 and the light-emitting chips C may be easily seen from the diagram.

Here, the number of wiring lines is described in FIG. 27.

Since the number of the light-emitting chip groups is set to four in the ninth exemplary embodiment, the number of wiring lines is four for the light-up signal lines 204a, 204b, 204c, 204d. In addition to the first transfer signal lines 201a, 201b, 201c, 201d, the second transfer signal lines 202a, 202b, 202c, 202d, and the power supply lines 200a, 200b, 200c, 200d, the enable signal lines 203a, 203b, 203c, 203d, and the write signal lines 205 to 224 (ten lines) are needed. Therefore, the number of wiring lines is twenty-eight. This number is less than thirty as in the eighth exemplary embodiment.

In the ninth exemplary embodiment, the number of the light-up signals lines 204 that are required to have a small resistance, is four instead of two as in the eighth exemplary embodiment.

Figure 29:
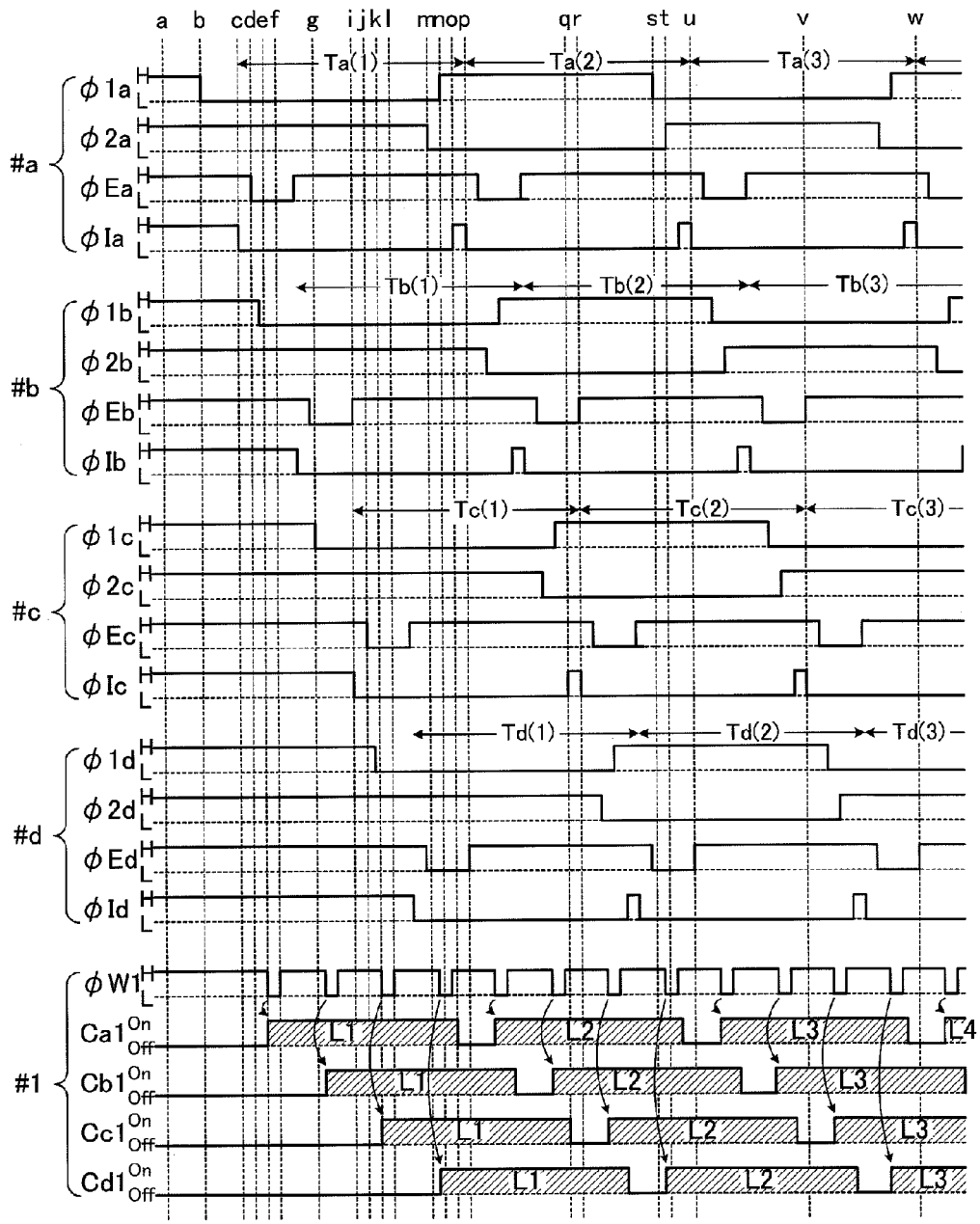
FIG. 29 is a timing chart for illustrating operations of the light-emitting chip in the ninth exemplary embodiment.

FIG. 29 is a timing chart for illustrating operations of the light-emitting chip C in the ninth exemplary embodiment.

FIG. 29 shows a timing chart for illustrating operations of the light-emitting chip class #1 (the light-emitting chips Ca1, Cb1, Cc1 and Cd1). Here, respective light-emitting thyristors L1, L2, L3 and L4 of the light-emitting chips Ca1, Cb1, Cc1 and Cd1 are assumed to be lighted up (emits light).

From a time point a to a time point w are the same as those shown in the timing chart of FIG. 25. A time point h is omitted because the time interval of the enable signal φE is different from that of the eighth exemplary embodiment.

In the ninth exemplary embodiment, the lighting control signals for the light-emitting thyristors L of the light-emitting chip group #b, #c and #d are given by sequentially shifting those for the light-emitting thyristors L of the light-emitting chip group #a (the first transfer signal φ1a, the second transfer signal φ2a, the enable signal φEa and the light-up signal φIa) by ¼ of the time interval T (90 degrees in phase) for lighting control of one light-emitting thyristor L.

In the ninth exemplary embodiment, the enable signals φE (φEa, φEb, φEc and φEd) are set so that respective "L" time intervals are not overlapped to each other.

For the write signal φW1, an "L" time interval is provided for every ¼ of time interval Ta(1).

Since operations of the light-emitting chip class #1 (the light-emitting chips Ca1, Cb1, Cc1 and Cd1) are similar to those described in the eighth exemplary embodiment, detailed description is omitted.

As described above, in the case where the light-emitting chips C are divided into 4 light-emitting chip groups (#a, #b, #c and #d), the lighting control signals (the first transfer signal φ1, the second transfer signal φ2, the enable signal φE and the light-up signal φI) for the light-emitting thyristors L of each light-emitting chip group (#a, #b, #c and #d) may be transmitted with a phase sequentially shifted by ¼ of the time interval T (90 degrees in phase) for lighting control of one light-emitting thyristor L.

When correction of amount of light is performed similarly to the above-mentioned case when the light-emitting chips C are divided into 2 light-emitting chip groups (#a and #b), density correction is possible in a range of ±15%.

The light-emitting chips C may be divided into M light-emitting chip groups where M is more than four, for example.

Figure 30:
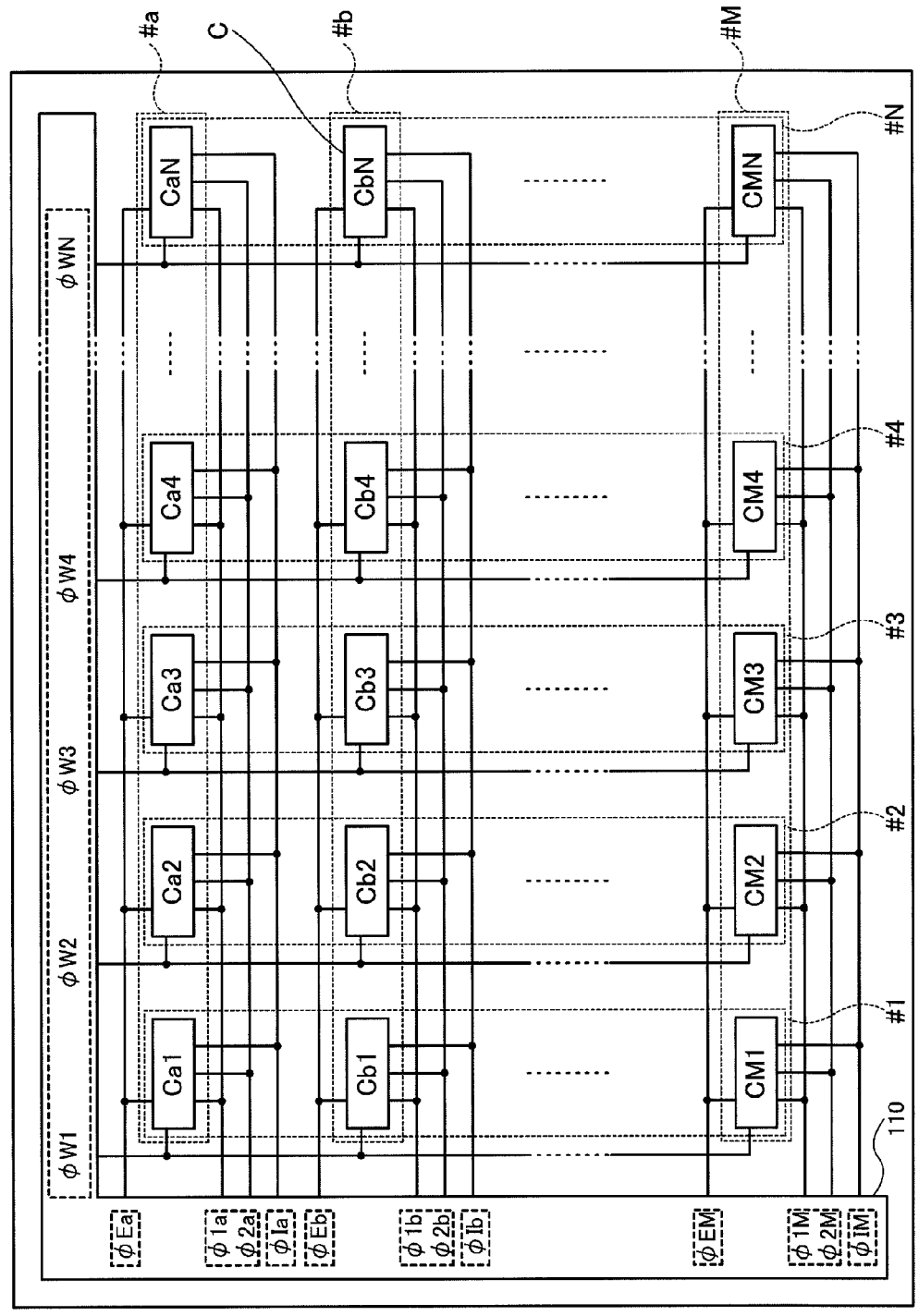
FIG. 30 is a diagram showing the light-emitting chips of the light-emitting device divided into M light-emitting chip groups, the light-emitting chips being arranged as respective elements in a matrix form.

FIG. 30 is a diagram showing the light-emitting chips C of the light-emitting device 65 divided into M light-emitting chip groups (#a to #M), the light-emitting chips C being arranged as respective elements in a matrix form.

In FIG. 30, the light-emitting chips C are divided into M light-emitting chip groups (#a to #M) (where M is the number of the light-emitting chip groups), the light-emitting chips C being arranged as respective elements in an M×N matrix form, and only the lines of the above-mentioned signals (the transfer signal φ1, φ2, the light-up signal φI, the enable signal φE and the write signals φW1 to φWN) that connect between the signal generating circuit 110 and the light-emitting chips C (the light-emitting chips Ca1 to CaN, Cb1 to CbN.

Also in this case, the lighting control signals for the light-emitting thyristors L of the light-emitting chip group #b, #c, #d may be given by sequentially shifting those for the light-emitting thyristors L of the light-emitting chip group #a (the first transfer signal φ1a, the second transfer signal φ2a, the enable signal φEa and the light-up signal φIa) by 1/M of the time interval T (360/M degrees in phase) for lighting control of one light-emitting thyristor L.

For each of the write signals φW1 to φWN, "L" time interval may be set for every T/M time period. As described above, when the light-emitting thyristor L is not lighted up according to image data, the write signals φW1 to φWN may be maintained at "H" without setting them to "L." The enable signals φE (φEa, φEb, . . . , φEM) may be set so that respective "L" time intervals are overlapped with the "L" time intervals of the write signals φW1 to φWN corresponding to the light-emitting thyristor L to be lighted, and are not overlapped with the "L" time intervals of the write signals φW1 to φWN not corresponding to the light-emitting thyristor L to be lighted.

The number of wiring lines in the case where M×N light-emitting chips C are divided into M light-emitting chip groups is described. The light-up signal line 204, the first transfer signal line 201, the second transfer signal line 202, and the enable signal line 203 each include M wiring lines, the write signal line includes N wiring lines, and the power supply lines 200a, 200b are provided. Therefore, the number of wiring lines is 4×M+N+2.

On the other hand, in the case where the ninth exemplary embodiment is not applied, the light-up signal lines 204 includes M×N wiring lines because one light-up signal line 204 is provided for each light-emitting chip C, are the first transfer signal line 201, the second transfer signal line 202, and the power supply lines 200a, 200b are provided, thus the number of wiring lines is m×N+4.

Therefore, the number of wiring lines may be reduced by (M×N+4)−(4×M+N+2) by applying the ninth exemplary embodiment. The number of the light-up signal line 204 for supplying current to the light-emitting thyristor L is improved from M×N to M, thus may be reduced by M×N−M.

Tenth Exemplary Embodiment

In the tenth exemplary embodiment, the configuration of the light-emitting chip C is changed from that of the eighth exemplary embodiment.

Figure 31:
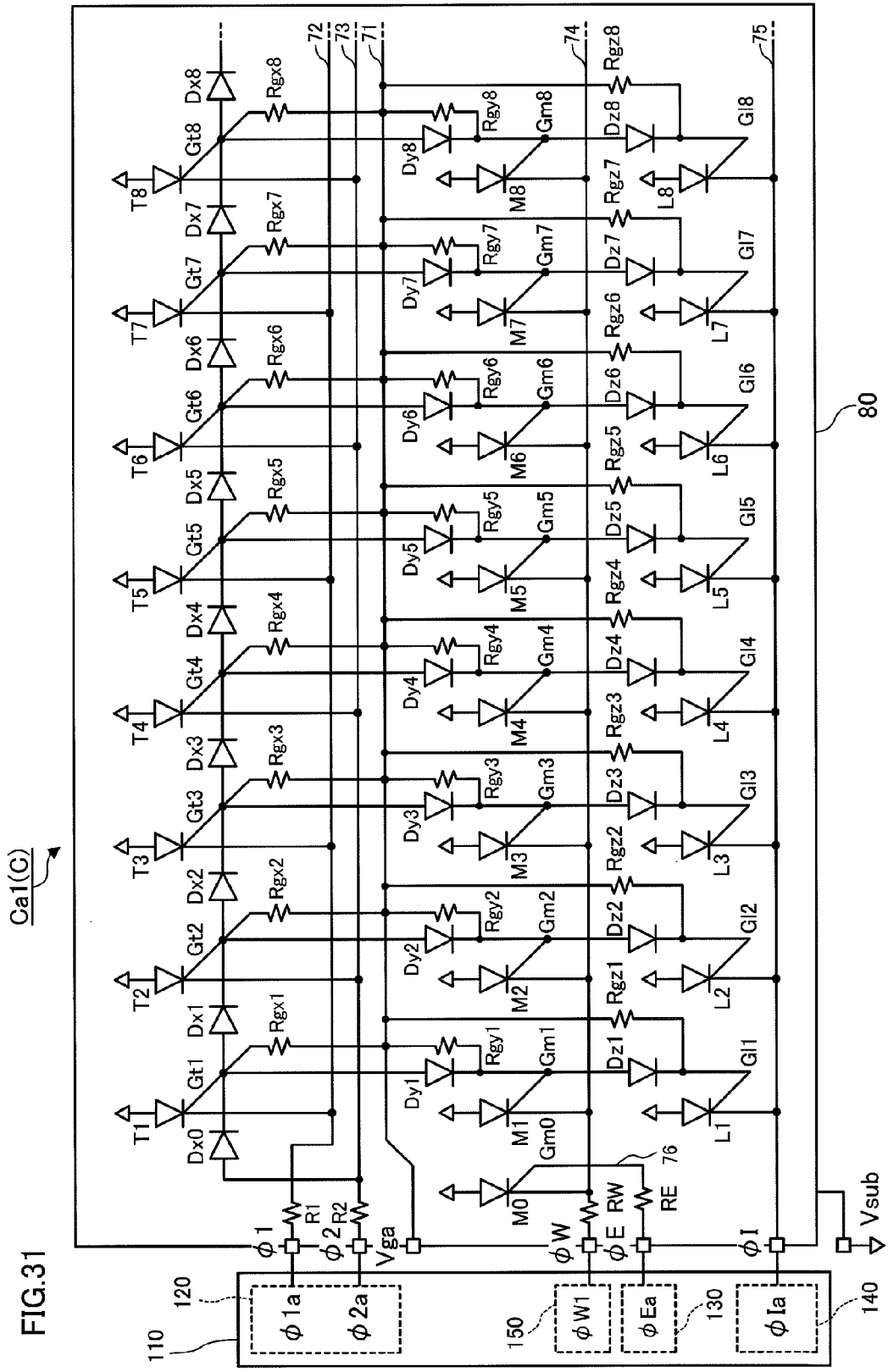
FIG. 31 is an equivalent circuit diagram for illustrating a circuit configuration of light-emitting chips according to the tenth exemplary embodiment.

FIG. 31 is an equivalent circuit diagram for illustrating a circuit configuration of light-emitting chips C (light-emitting chips Ca1 to Ca20 and light-emitting chips Cb1 to Cb20) according to the tenth exemplary embodiment.

In the tenth exemplary embodiment, a write enable thyristor M0 is provided in parallel to the write thyristor M1 between the write thyristor M1 and the write resistance RW in the eighth exemplary embodiment shown in FIG. 23. A gate terminal Gm0 of the write enable thyristor M0 is connected to an enable signal line 76, and connected to φE terminal via an enable resistance RE. Other configurations are similar to those of the eighth exemplary embodiment shown in FIG. 23. Thus, similar components to those of the eighth exemplary embodiment are labeled with the same reference numerals, and detailed description of the similar components is omitted except for the write enable thyristor M0.

Herein, the anode, cathode, and gate terminals of the write enable thyristor M0 may be referred to as a fourth anode, a fourth cathode, and a fourth gate terminals, respectively.

Now, operations of the write enable thyristor M0 in the light-emitting chips Ca1 and Cb1 are described by the timing chart shown in FIG. 25 with reference to FIG. 31. The timing chart is the same as that of the eighth exemplary embodiment.
<Light-Emitting Chip Ca1>

At the time point a, the potential of the φE terminal in FIG. 31 is "H" (0 V). Since the φE terminal is connected to the gate terminal Gm0 of the write enable thyristor M0, the threshold voltage of the write enable thyristor M0 is −1.5 V.

Next, when the enable signal φEa shifts from "H" (0 V) to "L" (−3.3 V) at a time point d, the potential of the gate terminal Gm0 of the write enable thyristor M0 becomes −3.3 V, and the threshold voltage of the write enable thyristor M0 becomes −4.8 V.

At a time point e, the write signal φW1 transmitted to the light-emitting chip class #1 (the light-emitting chip Ca1 belonging to the light-emitting chip group #a, and the light-emitting chip Cb1 belonging to the light-emitting chip group #b) shifts from "H" (0 V) to "L" (−3.3 V). At this point, the threshold voltage of the write enable thyristor M0 is −4.8 V, thus the write enable thyristor M0 may not be turned on. Thus, as described in the eighth exemplary embodiment, the write thyristor M1 having a threshold voltage of −3 V is turned on. Accordingly, the threshold voltage of the light-emitting thyristor L1 is set to −3 V, and the light-emitting thyristor L1 is turned on and lighted up (emits light).

When the write signal φW1 shifts from "L" to "H" at a time point f, both the anode and cathode terminals of the write thyristor M1 become "H," thus the write thyristor M1 is turned off. The threshold voltage of the write thyristor M1 becomes −3 V. However, the light-emitting thyristor L1 is maintained at an ON state and keeps lighting (emitting light).

Next, when the enable signal φEa shifts from "L" to "H" at the time point h, the potential of the gate terminal Gm0 of the write enable thyristor M0 becomes 0 V, and the threshold voltage of the write enable thyristor M0 returns to −1.5 V. The light-emitting thyristor L1 is again maintained at an ON state and keeps lighting (emitting light).

Later, when the write signal φW1 shifts from "H" to "L" (−3.3 V) at a time point k, the write enable thyristor M0 having a threshold voltage of −1.5 V is turned on to set the potential of the write signal line 74 to −1.5 V. At this point, the write thyristor M1 having a threshold voltage of −3 V may not be turned on because the write enable thyristor M0 having a threshold voltage of −1.5 V higher than −3 V is turned on first. The light-emitting thyristor L1 is again maintained at an ON state and keeps lighting (emitting light).

When the write signal φW1 shifts from "L" to "H" (0 V) at a time point l, both the anode and cathode terminals are set to "H," thus the write enable thyristor M0 is turned off. The light-emitting thyristor L1 is again maintained at an ON state and keeps lighting (emitting light).
<Light-Emitting Chip Cb1>

At the time point a, similarly to the light-emitting chip Ca1, the potential of the φEb terminal is "H" (0 V), thus the threshold voltage of the write enable thyristor M0 is −1.5 V.

When the write signal φW1 transmitted to the light-emitting chip class #1 (the light-emitting chip Ca1 belonging to the light-emitting chip group #a and the light-emitting chip Cb1 belonging to the light-emitting chip group #b) shifts from "H" (0 V) to "L" (−3.3 V) at the time point e, the write enable thyristor M0 having a threshold voltage of −1.5 V is turned on to set the potential of the write signal line 74 to −1.5 V. The write thyristor M1 having a threshold voltage of −3 V may not be turned on. Thus, the threshold voltage of the light-emitting thyristor L1 is maintained at −4.5 V and the light-emitting thyristor L1 may not be turned on.

When the write signal φW1 shifts from "L" to "H" at the time point f, the write enable thyristor M0 is turned off.

On the other hand, when the enable signal φEb shifts from "H" to "L" at a time point j, the threshold voltage of the write enable thyristor M0 is set to −4.8 V.

Even if the write signal φW1 shifts from "H" to "L" at the time point k, the write enable thyristor M0 is not turned on. Thus, the write thyristor M1 having a threshold voltage of −3 V is turned on.

Accordingly, the threshold voltage of the light-emitting thyristor L1 shifts to −3 V, and the light-emitting thyristor L1 is turned on and lighted up (emits light).

When the write signal φW1 shifts from "L" to "H" at the time point l, the write thyristor M1 is turned off. However, the light-emitting thyristor L1 maintains an ON state and keeps lighting (emitting light).

As described above, while the enable signal φE maintains "H," the threshold voltage of the write enable thyristor M0 is set to −1.5 V and the write enable thyristor M0 is turned on when the write signal φW shifts from "H" to "L." The write signal line 74 is then set to −1.5 V. Thus, the write thyristor M having a threshold voltage of −3 V may not be turned on, and the light-emitting thyristor L is not lighted up (emits light). That is, when the enable signal φE is "H," the light-emitting thyristor L is prevented from being lighted up (being made to emit light) even if the write signal φW shifts from "H" to "L."

On the other hand, when the enable signal φE is set to "L," the threshold voltage of the write enable thyristor M0 is set to −4.8 V, and the write enable thyristor M0 is not turned on even if the write signal φW shifts from "H" to "L." Thus, the write thyristor M having a threshold voltage of −3 V is turned on, and the light-emitting thyristor L is lighted up (emits light). That is, for the light-emitting chip C having an enable signal φE of "L," the light-emitting thyristor L is enabled to be lighted up (emits light) by a shift of the write signal φW from "H" to "L." The enable signal φE sets the light-emitting thyristor L in a half-selection state.

As described above, when the enable signal φE is "L" and the write signal φW is "L" in the light-emitting chip C, the write thyristor M is turned on. Accordingly, the light-emitting thyristor L is turned on and lighted up (emits light). If either one of the enable signal φE or the write signal φW is "H," the write thyristor M may not be turned on, and the light-emitting thyristor L is prevented from being turned on. This relationship is the same as the one between the enable signal φE and the write signal φW in the eighth exemplary embodiment.

Eleventh Exemplary Embodiment

In the eleventh exemplary embodiment, the configuration of the light-emitting chip C is changed from that of the eighth exemplary embodiment.

Figure 32:
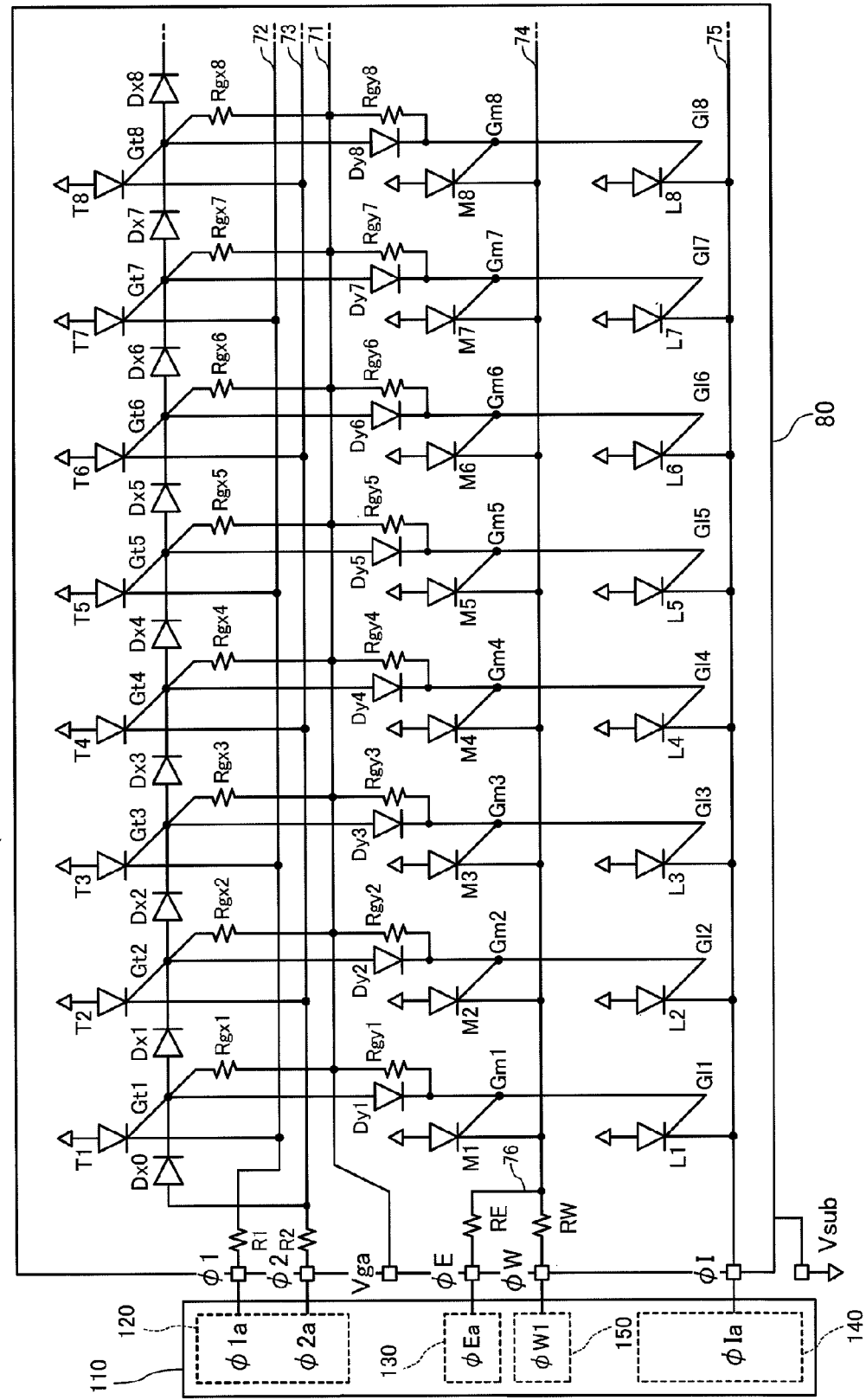
FIG. 32 is an equivalent circuit diagram for illustrating a circuit configuration of light-emitting chips according to the eleventh exemplary embodiment.

FIG. 32 is an equivalent circuit diagram for illustrating a circuit configuration of light-emitting chips C (light-emitting chips Ca1 to Ca20 and light-emitting chips Cb1 to Cb20) according to the eleventh exemplary embodiment.

In the eleventh exemplary embodiment, the connection diode Dz and the power supply line resistance Rgz provided between the gate terminal Gm of the write thyristor M and the gate terminal Gl of the light-emitting thyristor L in the eighth exemplary embodiment shown in FIG. 23 are removed and the gate terminal Gl and the gate terminal Gm are made in common.

Other configurations are similar to those of the eighth exemplary embodiment. Thus, similar components are labeled with the same reference numerals, and detailed description of the similar components is omitted.

Operations of the light-emitting chips Ca1 and Cb1 according to the eleventh exemplary embodiment are described with reference to the timing chart of FIG. 25. In the eleventh exemplary embodiment, "L" of the light-up signal φI (φIa, φIb) is changed to "Le" (−3 V<"Le"≤−1.5 V) in the timing chart shown in FIG. 25.

<Light-Emitting Chip Ca1>

At the time point a, the threshold voltage of the write thyristor M1 is set to −3 V as described in the eighth exemplary embodiment. In the eleventh exemplary embodiment, since the gate terminal Gm1 of the write thyristor M1 and the gate terminal Gl1 of the light-emitting thyristor L1 are directly connected to each other, the threshold voltage of the light-emitting thyristor L1 becomes −3 V.

At a time point c, the light-up signal φIa shifts from "H" to "Le" (−3 V<"Le"≤−1.5 V). However, the light-emitting thyristor L1 may not be turned on because the threshold voltage thereof is −3 V.

As described in the eighth exemplary embodiment, the light-emitting thyristor L1 may be turned on and lighted up (emits light) only when the write signal φW1 shifts from "H" to "L."

Next, at the time point e, the write signal φW1 shifts from "H" to "L." Then, the write thyristor M1 having a threshold voltage of −3 V is turned on. Then, the potential of the gate terminal Gm1 of the write thyristor M1 becomes "H" (0 V). Since the gate terminal Gm1 of the write thyristor M1 is virtually the gate terminal Gl1 of the light-emitting thyristor L1, the threshold voltage of light-emitting thyristor L1 becomes −1.5 V. Then, the light-emitting thyristor L1 is turned on and lighted up (emits light) because the light-up signal φIa is "Le" (−3 V<"Le"≤−1.5 V).

That is, since the connection diode Dz and the power supply line resistance Rgz provided between the gate terminal Gm of the write thyristor M and the gate terminal Gl of the light-emitting thyristor L have been removed in the eleventh exemplary embodiment, the threshold voltage of the light-emitting thyristor L shifts to a higher level. For this reason, "L" of the light-up signal φI (φIa and φIb) has been changed to "Le" (−3 V<"Le"≤−1.5 V).

Other operations are similar to those of the eighth exemplary embodiment, thus detailed description is omitted.

In the eleventh exemplary embodiment, in order to drive the light-emitting device 65, three potentials of "H," "L" and "Le" are required. In the eleventh exemplary embodiment, however, the connection diode Dz and the power supply line resistance Rgz are not required, thus the dimension (size) of the substrate 80 of the light-emitting chips C may be reduced.

Twelfth Exemplary Embodiment

In the twelfth exemplary embodiment, the configuration of the light-emitting chip C is changed from that of the eleventh exemplary embodiment.

Figure 33:
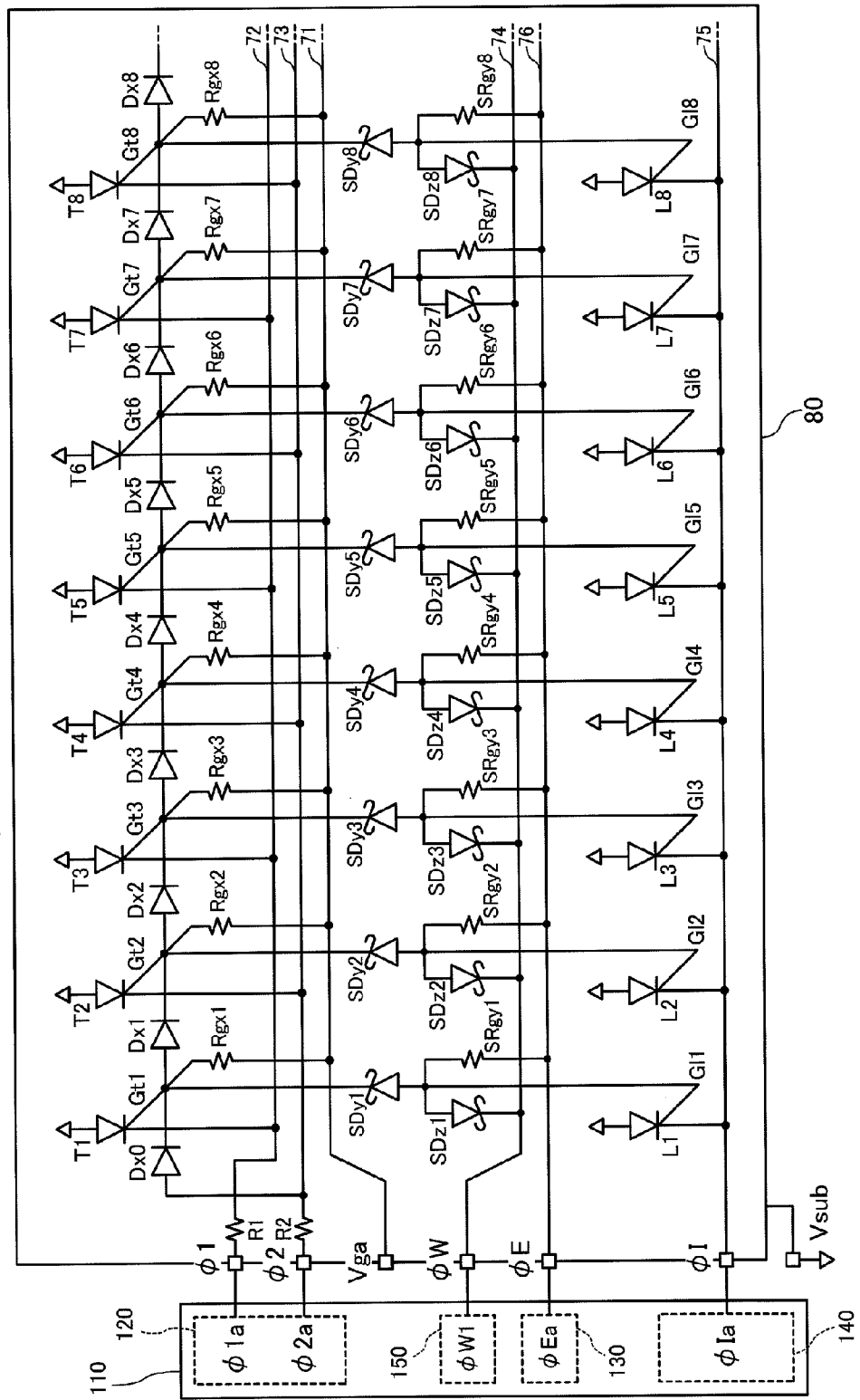
FIG. 33 is an equivalent circuit diagram for illustrating a circuit configuration of light-emitting chips according to the twelfth exemplary embodiment.

FIG. 33 is an equivalent circuit diagram for illustrating a circuit configuration of light-emitting chips C (light-emitting chips Ca1 to Ca20 and light-emitting chips Cb1 to Cb20) according to the twelfth exemplary embodiment.

In the eleventh exemplary embodiment, a pn junction diode is used for the connection diode Dy and the write thyristor M is used.

The twelfth exemplary embodiment is configured by replacing the connection diodes Dy1, Dy2, Dy3, . . . , of the eighth exemplary embodiment with Schottky connection diodes SDy1, SDy2, SDy3, . . . , as well as the write thyristors M1, M2, M3, . . . , of the eighth exemplary embodiment with Schottky connection diodes SDz1, SDz2, SDz3, . . . , that serve as diode logic. The configuration of the light-emitting chip C is changed accordingly.

Here, the light-emitting chip C is described using the light-emitting chip Ca1 as an example, similarly to the eighth exemplary embodiment. Similar components to those of the eighth exemplary embodiment are labeled with the same reference numerals, and detailed description of the similar components is omitted.

In the light-emitting chip Ca1 (C), the light-emitting thyristor array, the transfer thyristor array, the coupling diode Dx, the power supply line resistance Rgx, the start diode Dx0, the current limitation resistance R1, and the current limitation resistance R2 are similar to those of the eighth exemplary embodiment.

The light-emitting chip Ca1 (C) includes Schottky connection diodes SDy1, SDy2, SDy3, . . . , each of which is an example of the second electrical part, between the light-emitting thyristors L1, L2, L3, . . . , and the transfer thyristors T1, T2, T3, . . . , respectively. The light-emitting chip Ca1 (C) further includes Schottky connection diodes SDz1, SDz2, SDz3, . . . , as an example of the third electrical parts.

The light-emitting chip Ca1 (C) further includes write resistances SRgy1, SRgy2, SRgy3, . . . , as an example of the third electrical parts.

The light-emitting chip Ca1 (C) includes one start diode Dx0.

The Schottky connection diodes SDy1, SDy2, SDy3, . . . , the Schottky connection diodes SDz1, SDz2, SDz3, . . . , and the write resistances SRgy1, SRgy2, SRgy3, . . . , when not individually distinguished, are referred to as a Schottky connection diode SDy, a Schottky connection diode SDz and a write resistances SRgy, respectively.

That is, the second electrical part may be the connection resistance Ra in the first exemplary embodiment, or may be the Schottky connection diode SDy in the twelfth exemplary embodiment. Also, the third electrical part may be the Schottky write diode SDw, the Schottky enable diode SDe in the first exemplary embodiment, or may be the write resistance Rw, the enable resistance Re in the fourth exemplary embodiment, or may be the Schottky connection diode SDz, the write resistance SRgy in the twelfth exemplary embodiment.

Next, electrical connection between the elements in the light-emitting chip Ca1 (C) is described.

Since the transfer thyristor T, the coupling diode Dx, the start diode Dx0, the current limitation resistance R1, and the current limitation resistance R2 are similar to those in the eighth exemplary embodiment, detailed description of these components is omitted.

The cathode terminals of the light-emitting thyristors L1, L2, L3, . . . , are connected to the light-up signal line 75. The light-up signal line 75 is connected to the φI terminal that is the input terminal of the light-up signal φIa (φI). The light-up signal line 204a (see FIG. 21B) is connected to the φI terminal, and the light-up signal φIa (φI) is transmitted to the φI terminal.

The gate terminals Gt of the transfer thyristors T are connected to the gate terminals Gl of the light-emitting thyristors L on a one-to-one basis via respective Schottky connection diodes SDy. The cathode terminal of the Schottky connection diode SDy is connected to the gate terminal Gt of the transfer thyristor T, and the anode terminal of the Schottky connection diode SDy is connected to the gate terminal Gl of the light-emitting thyristor L.

The gate terminals Gl of the light-emitting thyristors L are connected to the enable signal line 76 via respective write resistances SRgy.

Also, the gate terminals Gl of the light-emitting thyristors L are connected to the write signal line 74 via respective Schottky connection diodes SDz. The anode terminal of the Schottky connection diode SDz is connected to the gate terminal Gl, and the cathode terminal thereof is connected to the write signal line 74.

Figure 34A:
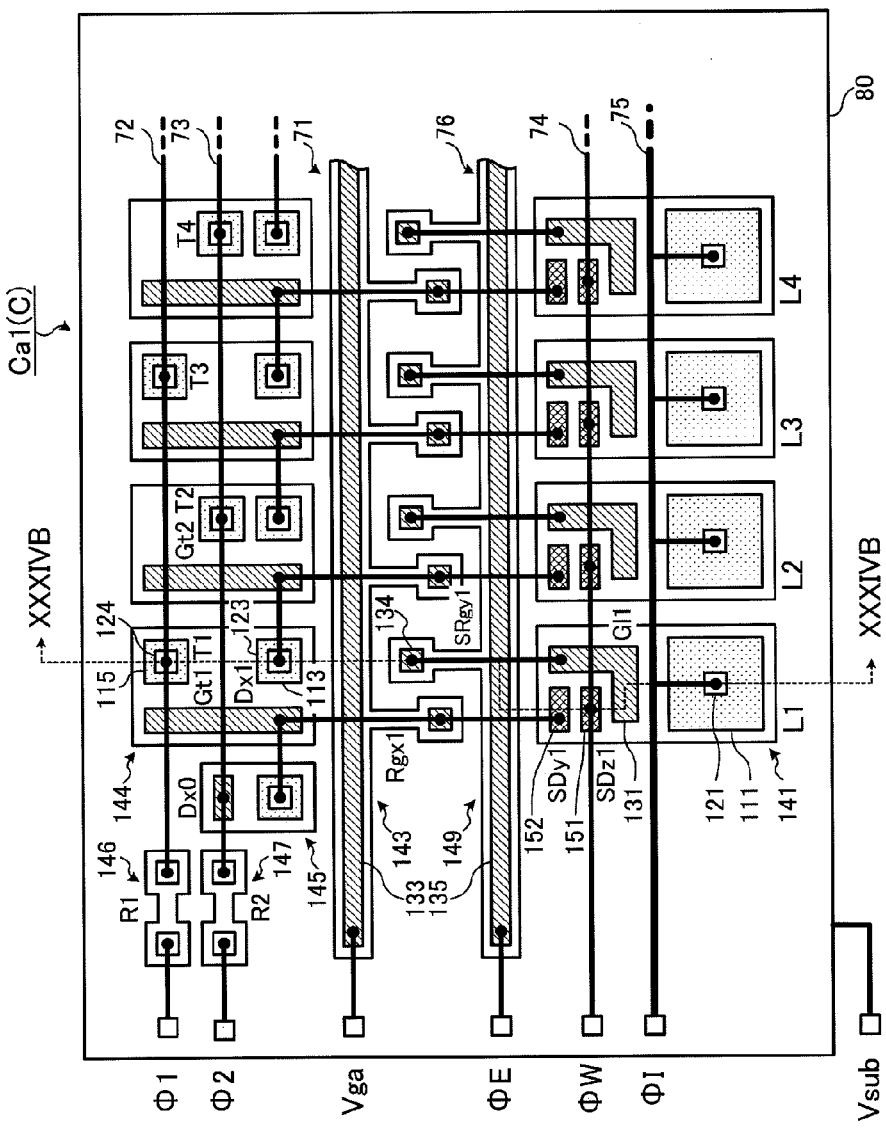
FIGS. 34A and 34B are a layout plan view and a cross-sectional view of the light-emitting chip according to the twelfth exemplary embodiment.
Figure 34B:
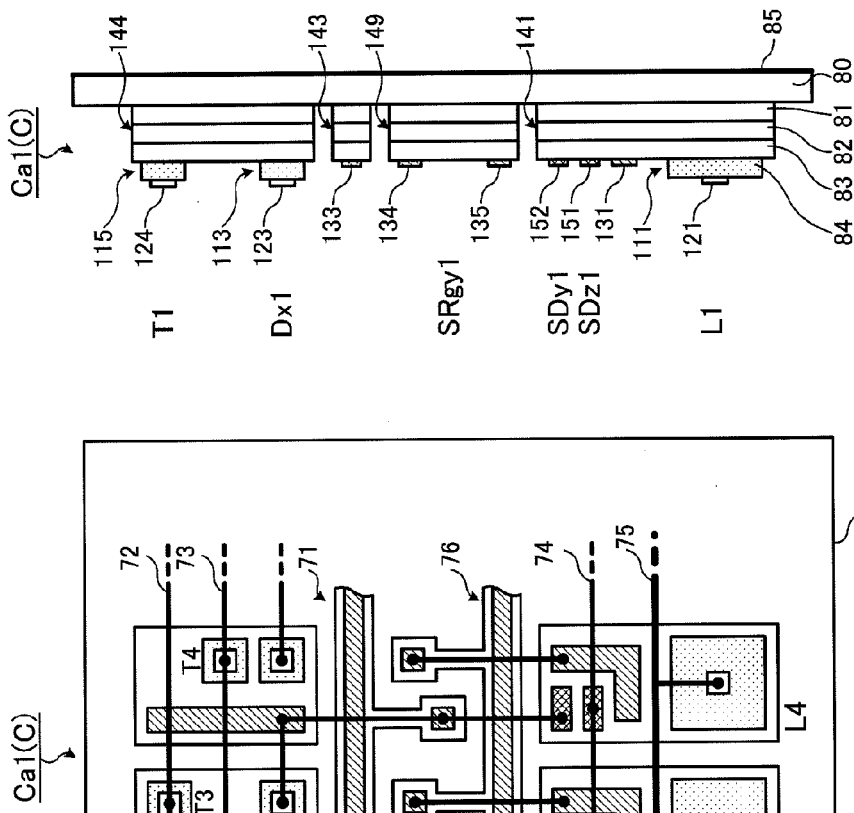

FIGS. 34A and 34 are a layout plan view and a cross-sectional view of the light-emitting chip Ca1 (C) according to the twelfth exemplary embodiment. FIG. 34A is a layout plan view of the light-emitting chip Ca1 (C), and shows the part centered on the light-emitting thyristors L1 to L4, and the transfer thyristors T1 to T4. FIG. 34B is a cross-sectional view taken along the line XXXIVB-XXXIVB shown in FIG. 34A. Thus, FIG. 34B shows the cross sections of the light-emitting thyristor L1, the Schottky connection diodes SDz1, SDy1, the write resistance SRgy1, the coupling diode Dx1, transfer thyristor T1 in the order from the bottom to the top of FIG. 34B. In FIGS. 34A and 34B, the elements and terminals are denoted by their names.

In FIG. 34A, wiring lines connecting between the elements are shown by solid lines except for the power supply line 71 and the write signal line 74. In FIG. 34B, the wiring lines connecting between the elements are omitted.

Similar components to those of the eighth exemplary embodiment shown in FIGS. 24A and 24B are labeled with the same reference numerals, and detailed description of the similar components is omitted. Thus, the second island 142, and the eighth island 148 in the eighth exemplary embodiment shown in FIGS. 24A and 24B are omitted. In the twelfth exemplary embodiment, the write resistance SRgy is formed on the ninth island 149.

As shown in FIG. 34A, the light-emitting thyristor L1 is included in the first island 141. The third island 143 includes a trunk extending from side to side in FIG. 34A and multiple branches arising from the trunk as shown in FIG. 34A. The trunk includes the power supply line 71, and the branches include the power supply line resistance Rgx. The fourth island 144 includes the transfer thyristor T1 and the coupling diode Dx1.

The fifth island 145 includes the start diode Dx0. The sixth island 146 includes the current limitation resistance R1, the seventh island 147 includes the current limitation resistance R2.

The ninth island 149 includes a trunk extending from side to side in FIG. 34A and multiple branches arising from the trunk similarly to the third island 143 as shown in FIG. 34A. The trunk includes the write signal line 74, and the branches include the write resistance SRgy.

In the light-emitting chip Ca1 (C), islands similar to the first island 141, the fourth island 144 are formed in parallel. These islands includes the light-emitting thyristors L2, L3, L4, . . . , the transfer thyristors T2, T3, T4, . . . , in a similar manner as the first island 141, and the fourth island 144. Description of these is omitted.

Also, the rear surface of the substrate 80 includes the back-side electrode 85 as the Vsub terminal.

The first island 141 and the ninth island 149 are further described in detail with reference to FIGS. 34A and 34B.

The light-emitting thyristor L1 included in the first island 141 has an anode terminal of the substrate 80, a cathode terminal of an n-type ohmic electrode 121 formed on a region 111 of the n-type fourth semiconductor layer 84, and a gate terminal Gl1 of p-type ohmic electrode 131 formed on the p-type third semiconductor layer 83 which has been exposed after etching to remove the n-type fourth semiconductor layer 84. Light is emitted from the surface of the region 111 of the n-type fourth semiconductor layer 84 except the portion of the n-type ohmic electrode 121.

The Schottky connection diodes SDy1 and SDz1 included in the first island 141 have respective cathode terminals of the Schottky electrodes 151 and 152 formed on the p-type third semiconductor layer 83 which has been exposed after etching to remove the n-type fourth semiconductor layer 84, and have respective anode terminals of the p-type third semiconductor layer 83. That is, when the potential of the p-type third semiconductor layer 83 is made higher than that of the Schottky electrodes 151 and 152, a forward bias is generated to cause a current flow, otherwise a reverse bias is generated to prevent current from flowing.

The write resistance SRgy included in the ninth island 149 is formed between the two p-type ohmic electrodes 134 and 135 formed on the p-type third semiconductor layer 83. The p-type third semiconductor layer 83 between the two p-type ohmic electrodes 134 and 135 is used as a resistance.

Connection relationship between the elements in FIG. 34A is described. Only the connection relationship that is different from that of the eighth exemplary embodiment shown in FIGS. 24A and 24B is described.

The p-type ohmic electrode 131 that is the gate terminal Gl1 of the light-emitting thyristor L1 of the first island 141 is connected to the p-type ohmic electrode 134 of the write resistance SRgy1 of the ninth island 149. The p-type ohmic electrode 135 of the write resistance SRgy1 defines the enable signal line 76, and is connected to the φE terminal.

The Schottky electrode 151 of the Schottky connection diode SDz1 of the first island 141 is connected to the write signal line 74. The write signal line 74 is connected to the φW terminal.

The Schottky electrode 152 of the Schottky connection diode SDy1 of the first island 141 is connected to a p-type ohmic electrode (with no reference numeral) of the power supply line resistance Rgx1, and to a p-type ohmic electrode (with no reference numeral) that is the gate terminal Gt1 of the transfer thyristor T1 included in the fourth island 144. The p-type ohmic electrode 133 of the power supply line resistance Rgx1 defines the power supply line 71, and is connected to the Vga terminal.

Other connection relationships are similar to those of the eighth exemplary embodiment described with FIGS. 24A and 24B.

In this manner, the circuit configuration of the light-emitting chip Ca1 (C) shown in FIG. 33 is formed.

Since the second island 142 (see FIGS. 24A and 24B) in the eighth exemplary embodiment is not used as shown in FIGS. 34A and 34B, the dimension (size) of the substrate 80 of the light-emitting chip C may be reduced.

Next, operations of the light-emitting device 65 are described.

Figure 35:
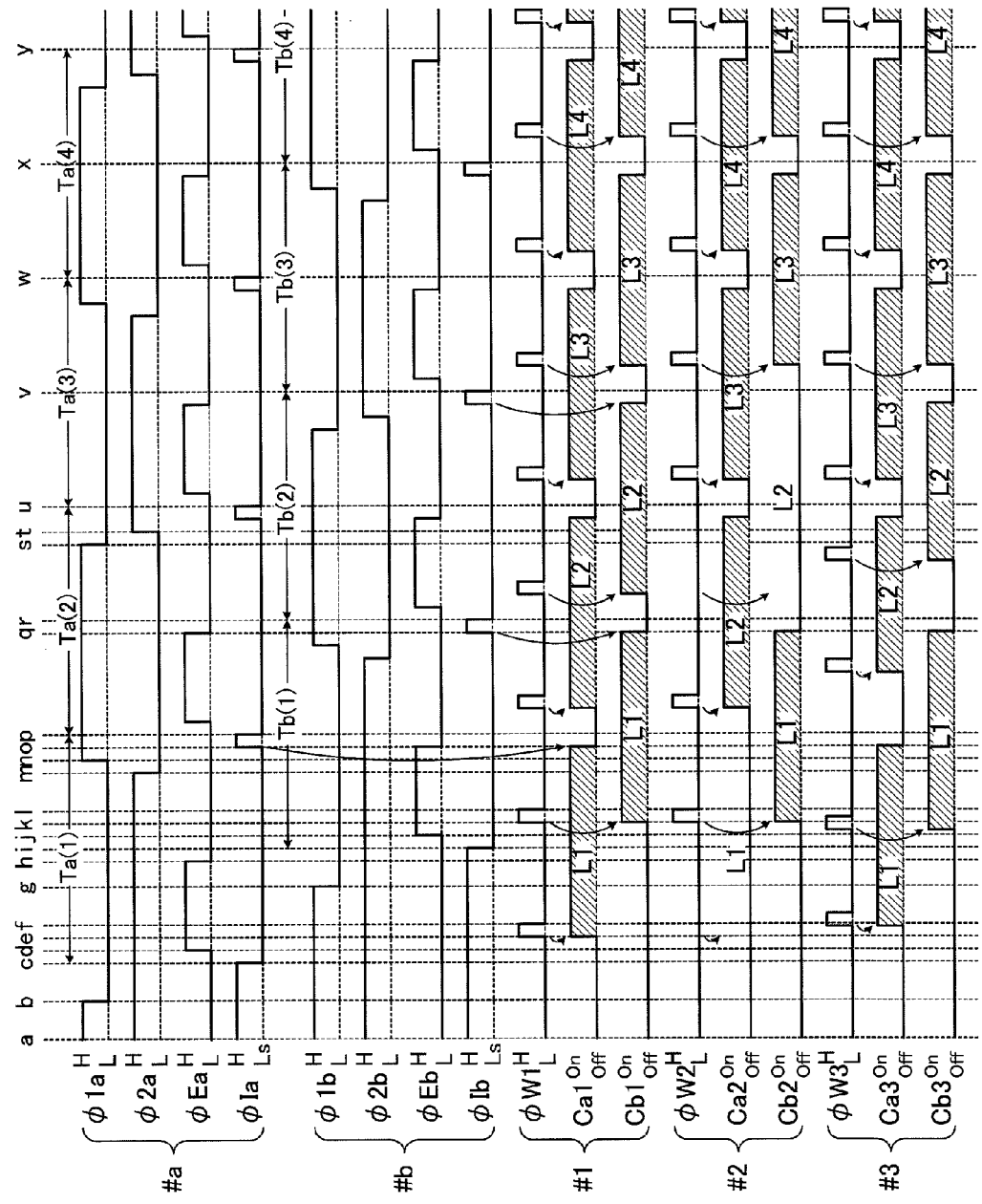
FIG. 35 is a timing chart for illustrating operations of the light-emitting chip in the twelfth exemplary embodiment.

FIG. 35 is a timing chart for illustrating operations of the light-emitting chip C in the twelfth exemplary embodiment. Again, the light-emitting chips C are divided into two light-emitting chip groups #a and #b, similarly to the eighth exemplary embodiment.

FIG. 35 shows a timing chart for illustrating operations of the light-emitting chip class #1 (the light-emitting chips Ca1 and Cb1), the light-emitting chip class #2 (the light-emitting chips Ca2 and Cb2), and the light-emitting chip class #3 (the light-emitting chips Ca3 and Cb3). FIG. 25 shows a timing chart of the operation to control whether or not to light up the four light-emitting thyristors L1 to L4 in each light-emitting chip C.

Similarly to the eighth exemplary embodiment shown in FIG. 25, for the light-emitting chip class #1 (the light-emitting chips Ca1 and Cb1), respective light-emitting thyristors L1 to L4 are assumed to be lighted up. For the light-emitting chip class #2 (the light-emitting chips Ca2 and Cb2), the light-emitting thyristors L2, L3, L4 of the light-emitting chip Ca2, and the light-emitting thyristors L1, L3, L4 of the light-emitting chip Cb2 are assumed to be lighted up. The light-emitting thyristor L1 of the light-emitting chip Ca2 and the light-emitting thyristor L2 of the light-emitting chip Cb2 are set to keep light-off. For the light-emitting chip class #3 (the light-emitting chips Ca3 and Cb3), respective light-emitting thyristors L1 to L4 are assumed to be lighted up, and the transmission timing of the write signal φW3 is shifted from that of the write signal φW1.

In the following, detailed description of similar portions to those of the eighth exemplary embodiment is omitted, and the operations related to the Schottky connection diode SDy1 and the Schottky connection diode SDz1 are described.

In the twelfth exemplary embodiment, "H" and "L" of the enable signals φE (φEa and φEb) and the write signals φW (φW1, φW2, φW3, . . . , ) have a reversed relationship with respect to the one in the eighth exemplary embodiment (see FIG. 25).

That is, at a time point a, the enable signal φEa is "L" (−3.3 V), and shifts from "L" to "H" (0 V) at a time point d. Then, at a time point h, the enable signal φEa shifts from "H" to "L." Similar pattern of operations follows.

The write signal φW1 is "L" (−3.3 V) at the time point a, and shifts from "L" to "H" (0 V) at a time point e. At a time point f, the write signal φW1 shifts from "H" to "L." Similar pattern of operations follows.

For the light-up signal φI (φIa and φIb), "L" (−3.3 V) in the eighth exemplary embodiment is set to "Ls" (−2.5 V<"Ls"≤−1.5 V).

Now, operations of the light-emitting chips Ca1 and Cb1 are described by the timing chart of FIG. 35 with reference to FIG. 33. Only the operations different from those in the eighth exemplary embodiment are described. The reference numeral labeled for each time point is the same as that of the eighth exemplary embodiment.

It is assumed that Schottky junction is formed in the p-type semiconductor layer 83 made of GaAs, GaAlAs, . . . , and the forward direction potential Vs of the Schottky junction is 0.5 V.

(1) Time Point a
<Light-Emitting Device 65>

At the time point a in the timing chart shown in FIG. 35, the enable signal generating part 130a of the signal generating circuit 110 sets the enable signal φEa to "L" (−3.3 V), and the enable signal generating part 130b thereof sets the enable signal φEb to "L" (−3.3 V). Then, the enable signal lines 203a and 203b are set to "L" (see FIG. 21B). Accordingly, the φE terminal of each light-emitting chip C is set to "L" (see FIG. 33).

The write signal generating part 150 of the signal generating circuit 110 sets the write signals φW1 to φW20 to "L." Then, the write signal lines 205 to 224 are set to "L" (see FIG. 21B). Accordingly, the φW terminal of each light-emitting chip C is set to "L" (see FIG. 33).

<Light-Emitting Chip Ca1>

Since φE is set to "L" (−3.3 V), the potential of the gate terminal Gl (the anode terminals of the Schottky connection diodes SDz and SDy) of the light-emitting thyristor L is set to "L."

Since φW1 is set to "L," the cathode terminal of the Schottky connection diode SDz is also set to "L." That is, both potentials of the anode and cathode terminals of the Schottky connection diode SDz are "L."

On the other hand, since the potential of the gate terminal Gt1 of transfer thyristor T1 is −1.5 V as described in the eighth exemplary embodiment, the cathode terminal of the Schottky connection diode SDy1 becomes −1.5 V. Thus, the Schottky connection diode SDy1 is reverse biased. Since the potential of the gate terminal Gt2 of the transfer thyristor T2 is −3 V, the Schottky connection diode SDy2 is also reverse biased. Since the potential of each gate terminal Gt of the thyristor Tn (n≥3) is "L," the cathode terminal of each Schottky connection diode SDyn (n≥3) is also "L." That is, both potentials of the anode and cathode terminals of each Schottky connection diode SDyn (n≥3) is "L."

That is, since the Schottky connection diodes SDy and SDz are in a reverse biased state or both anode and cathode terminals have the same potential, the potential of the gate terminal Gl is not affected. Thus, the gate terminal Gl becomes "L" (−3.3 V), and the threshold voltage of the light-emitting thyristor L becomes −4.8 V.

<Light-Emitting Chip Cb1>

Since the operation of the light-emitting chip Cb1 is the same as that of the light-emitting chip Ca1, its description is omitted.

(2) Time Point b

At a time point b, the first transfer signal φ1a transmitted to the light-emitting chip group #a shifts from "H" (0 V) to "L" (−3.3 V). Accordingly the light-emitting device 65 is placed in an operating state.

<Light-Emitting Chip Ca1>

The transfer thyristor T1 is turned on, and the potential of the gate terminal Gt1 (the cathode terminal of the Schottky connection diode SDy1) is set to "H" (0 V). Since the anode terminal (the gate terminal Gl1) of the Schottky connection diode SDy1 is already "L" (−3.3 V), a reverse bias state is maintained on the Schottky connection diode SDy1.

Although the potential of the gate terminal Gt2 (the cathode terminal of the Schottky connection diode SDy2)

becomes −1.5 V, the anode terminal (the gate terminal Gl2) is already "L" (−3.3 V) similarly to the Schottky connection diode SDy1, thus a reverse bias state is maintained on the Schottky connection diode SDy2. Thus, the potential of the gate terminal Gl1 is maintained at "L" (−3.3 V). Although the potential of the gate terminal Gt3 is changed, a reverse bias state is maintained on the Schottky connection diode SDy3 also. Thus, all the gate terminals Gl are maintained at "L" (−3.3 V). Thus, the threshold voltage of each light-emitting thyristor L is maintained at −4.8 V.

<Light-Emitting Chip Cb1>

Since the signal transmitted to the light-emitting chip group #b to which the light-emitting chip Cb1 belongs is not changed, the initial state of the light-emitting chip Cb1 is maintained.

(3) Time Point c

At a time point c, the light-up signal φIa transmitted to the light-emitting chip group #a shifts from "H" (0 V) to "Ls" (−2.5 V<"Ls"≤−1.5 V).

<Light-Emitting Chip Ca1>

Since the threshold voltage of the light-emitting thyristor L is −4.8 V, the light-emitting thyristor L is not lighted up (emits light). Thus, only the transfer thyristor T1 is in an ON state immediately after the time point c.

<Light-Emitting Chip Cb1>

Since the signal transmitted to the light-emitting chip group #b to which the light-emitting chip Cb1 belongs is not changed, the initial state of the light-emitting chip Cb1 is maintained.

(4) Time Point d

At the time point d, the enable signal φEa transmitted to the light-emitting chip group #a shifts from "L" (−3.3 V) to "H" (0 V).

<Light-Emitting Chip Ca1>

The potential of the gate terminal Gl starts to change from "L" to "H." On the other hand, the cathode terminal of the Schottky connection diode SDz is connected to the write signal line 74 at "L." Thus, the Schottky connection diode SDz shifts to a forward bias state along with a change of the potential of the gate terminal Gl. Then, the potential of the gate terminal Gl becomes −2.8 V, which is the potential "L" (−3.3 V) of the write signal line 74 minus the forward direction potential Vs (0.5 V) of the Schottky junction due to the Schottky connection diode SDz with a forward bias.

On the other hand, since the potential of the gate terminal Gt1 is 0 V, and the potential of the gate terminal Gt2 is −1.5 V, the Schottky connection diodes SDy1 and SDy2 are in a reverse bias state. Since the potential of the gate terminal Gt3 is −3 V, and the potential of each gate terminal Gtn (n≥3) is "L" (−3.3 V), the difference between the potential (−2.8 V) of each gate terminal Gln (n≥3) and "L" is less than the forward direction potential Vs (0.5 V) of the Schottky junction in its absolute value. Thus, the potential of the gate terminal Gl is not affected by the Schottky connection diode SDy.

As described above, the potential of the gate terminal Gl becomes −2.8 V at the time point d. However, the threshold voltage of the light-emitting thyristor L is −4.3 V. Therefore, even if the light-up signal φIa is "Ls" (−2.5 V<"Ls"≤−1.5 V), the light-emitting thyristor L may not be turned on and lighted up (emits light).

<Light-Emitting Chip Cb1>

Since the signal transmitted to the light-emitting chip group #b to which the light-emitting chip Cb1 belongs is not changed, the initial state of the light-emitting chip Cb1 is maintained.

(5) Time Point e

At the time point e, the write signal φW1 transmitted to the light-emitting chip class #1 to which the light-emitting chip Ca1 of the light-emitting chip group #a and the light-emitting chip Cb1 of the light-emitting chip group #b belong, shifts from "L" (−3.3 V) to "H" (0 V).

<Light-Emitting Chip Ca1>

When the write signal φW1 is set to "H" and the potential of the write signal line 74 is set to "H" (0 V), the cathode terminal of the Schottky connection diode SDz1 connected to the write signal line 74 is set to "H." At this point, the cathode terminal (Gt1) of the Schottky connection diode SDy1 is "H" (0 V). Also, the anode terminal of the Schottky connection diode SDz is connected to the enable signal line 76 at "H" via the write resistance SRgy1. Thus, the gate terminal Gl1 of the light-emitting thyristor L1 becomes "H" (0 V). Accordingly, the threshold voltage of the light-emitting thyristor L1 becomes −1.5 V, and the light-emitting thyristor L1 is turned on and lighted up (emits light) because the light-up signal line 75 is "Ls" (−2.5 V<"Ls"≤−1.5 V).

On the other hand, the potential of the gate terminal Gt2 is already −1.5 V. Thus, the potential of the write signal line 74 becomes "H" (0 V), and the gate terminal Gl2 starts to change from −2.8 V to "H" and upon reaching −1 V, the Schottky connection diode SDy2 becomes forward biased, thus the potential of the gate terminal Gl2 is set to −1 V. Thus, the threshold voltage of the light-emitting thyristor L2 is set to −2.5 V. Since the light-up signal line 75 is "Ls" (−2.5 V<"Ls"≤−1.5 V), the light-emitting thyristor L2 may not be turned on and lighted up (emits light).

Similarly, the potential of the gate terminal Gt3 is already −3 V. Thus, the potential of the write signal line 74 becomes "H" (0 V), and the gate terminal Gl3 starts to change from −2.8 V to "H" and upon reaching −2.5 V, the Schottky connection diode SDy3 becomes forward biased, thus the potential of the gate terminal Gl3 is maintained at −2.5 V. Thus, the threshold voltage of the light-emitting thyristor L3 is set to −4 V. Since the light-up signal line 75 is "Ls" (−2.5 V<"Ls"≤−1.5 V), the light-emitting thyristor L3 may not be turned on and lighted up (emits light).

Similarly, the potential of each gate terminal Gtn (n≥4) is already −3.3 V, the potential of each gate terminal Gln (n≥4), is maintained at −2.8 V. Thus, each light-emitting thyristor Ln (n≥4) may not be turned on and lighted up (emits light) because the threshold voltage of each light-emitting thyristor Ln (n≥4) is −4.3 V.

Thus, the transfer thyristor T1 and the light-emitting thyristor L1 are in an ON state immediately after the time point e.

<Light-Emitting Chip Cb1>

As described above, at the time point e, the write signal φW1 shifts from "L" (−3.3 V) to "H" (0 V). However, the enable signal φEb is maintained at "L" (−3.3 V).

The anode terminal of the Schottky connection diode SDz is connected to the enable signal line 76 at "L" via the write resistance SRgy1, and the cathode terminal of the Schottky connection diode SDz is connected to the write signal line 74 already set at "H." Thus, the Schottky connection diode SDz becomes reverse biased, and the gate terminal Gl is not affected by the event that the write signal φW1 (the write signal line 74) has shifted from "L" to "H".

Thus, the threshold voltage of the light-emitting thyristor L is maintained at −4.8 V.

At the time point e, the light-up signal φIb is maintained at "H" state. Thus, the light-emitting thyristor L is not turned on, and not lighted up (emits no light) regardless of its threshold voltage.

However, even if the light-up signal φIb is set to "Ls" (−2.5 V<"Ls"≤−1.5 V), the threshold voltage is maintained at −4.8 V as described above like a state of the light-emitting chip Ca1 at a time point k. Thus, the light-emitting thyristor L is not turned on, an lighted up (emits light) regardless of its threshold voltage.

Subsequent operations is a repetition of the operations according to the eighth exemplary embodiment as well as the operations of the Schottky connection diodes SDy and SDz described above. Thus, description of the subsequent operations is omitted.

As described above, in the twelfth exemplary embodiment, the light-emitting thyristor L connected to a transfer thyristor T in an ON state via the Schottky connection diode SDy may be turned on, lighted up (emits light) by setting both of the enable signal φE and the write signal φW to "H" state.

That is, in the light-emitting chip C for which the enable signal φE is "H," lighting (emitting light) of the light-emitting thyristor L is enabled by shifting the write signal φW from "L" of to "H." That is, the enable signal φE sets the light-emitting thyristor L in a half-selection state.

On the other hand, if the enable signal φE is "L," the light-emitting thyristor L is prevented from being lighted up (being made to emit light) even if the write signal φW shifts from "L" to "H."

Thus, multiple light-emitting chips C are divided into multiple light-emitting chip groups, while the light-emitting chips C belonging to each light-emitting chip group are made into multiple light-emitting chip classes. Then a set of signals (the first transfer signal φ1, the second transfer signal φ2, the enable signal φE and the light-up signal φI) are transmitted to each light-emitting chip class in common. Here, timing of setting the enable signal φE to "H" is shifted for each light-emitting chip group and transmitted thereto. The light-emitting device 65 may be driven by transmitting "H" time intervals of the write signal φW to the light-emitting chip class corresponding to the timing of "H" of the enable signal φE.

Thereby, the light-up signal lines 204 to flow a large current for lighting (emitting light) are provided to each light-emitting chip group in common so that the number of wiring lines may be suppressed. By reducing the number of wiring lines to flow a large current, the dimension (size) of the circuit board 62 of the light-emitting device 65 may be reduced.

Thirteenth Exemplary Embodiment

In the eighth exemplary embodiment, 40 light-emitting chips C are divided into the light-emitting chip group #a including 20 light-emitting chips Ca1 to Ca20 and the light-emitting chip group #b including 20 light-emitting chips Cb1 to Cb20, while 20 light-emitting chip classes (#1 to #20) each include one light-emitting chip C belonging to the light-emitting chip group #a with another light-emitting chip C belonging to the light-emitting chip group #b to form each light-emitting chip class.

In the thirteenth exemplary embodiment, 40 light-emitting chips C (the light-emitting chips C1 to C40) are divided into multiple light-emitting chip layers (#L1, #L2 and #L3 according to the thirteenth exemplary embodiment), and the eighth exemplary embodiment is applied to each light-emitting chip layer. That is, in each light-emitting chip layer, the light-emitting chip groups #a and #b are provided, while each light-emitting chip class includes two light-emitting chips C belonging to the light-emitting chip groups #a and #b, respectively (see FIG. 39 described below).

In the following, similar components to those of the eighth exemplary embodiment are labeled with the same reference numerals, and detailed description of the similar components is omitted.

Figure 36:
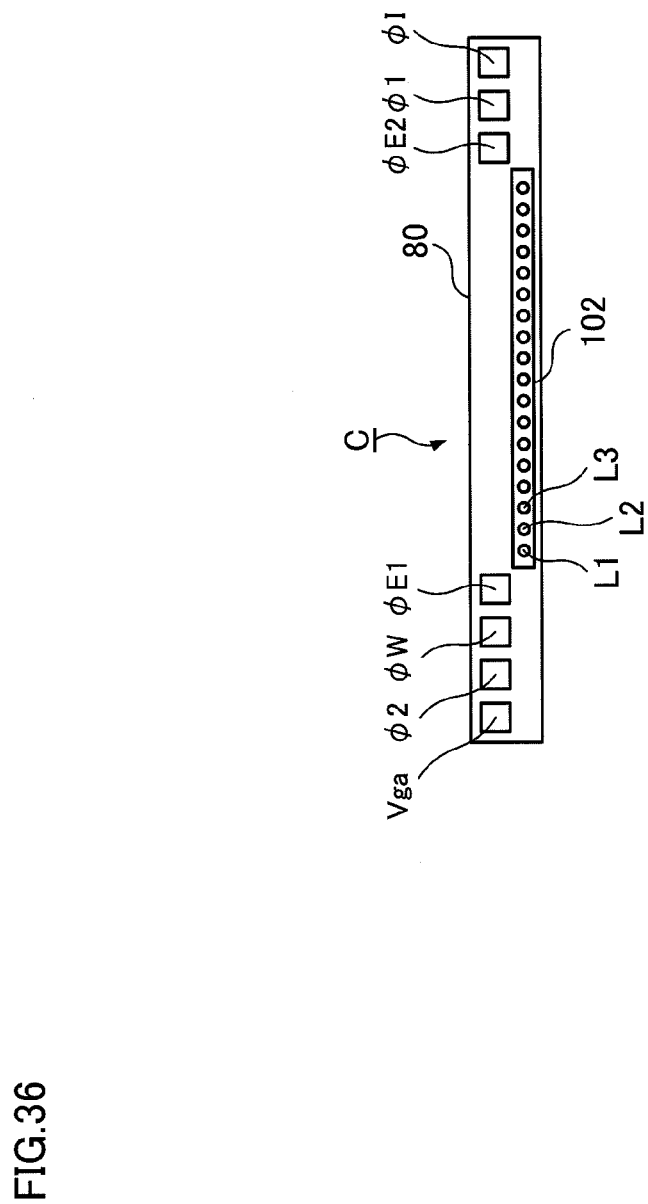
FIG. 36 is a diagram showing a configuration of a light-emitting chip according to the thirteenth exemplary embodiment.

FIG. 36 is a diagram showing a configuration of a light-emitting chip C according to the thirteenth exemplary embodiment.

The light-emitting chip C includes the input terminals (Vga terminal, φ2 terminal, φW terminal, φE1 terminal, φE2 terminal, φ1 terminal and φI terminal) that are multiple bonding pads for receiving various kinds of control signals into the both ends in the longitudinal direction of the substrate 80. These input terminals are provided from one end of the substrate 80 in the order of the Vga terminal, the φ2 terminal, the φW terminal and φE1 terminal, and are provided from the other end of the substrate 80 in the order of the φI terminal, the φ1 terminal, and the φE2 terminal. The light-emitting element array 102 is provided between the φE1 and φE2 terminals.

Figure 37:
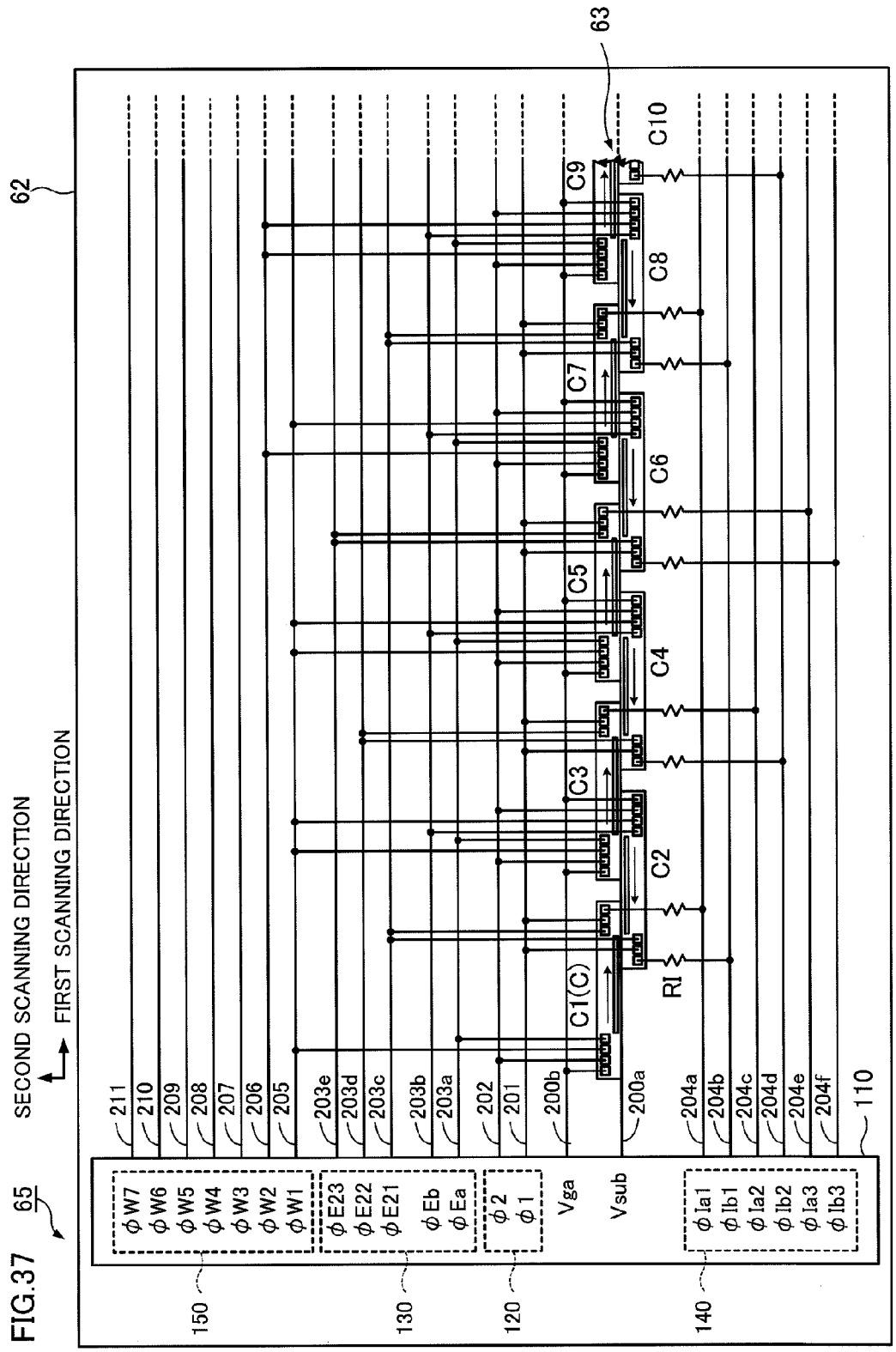
FIG. 37 is a diagram showing a configuration of the signal generating circuit of the light-emitting device and a wiring configuration on the circuit board according to the thirteenth exemplary embodiment.

FIG. 37 is a diagram showing a configuration of the signal generating circuit 110 of the light-emitting device 65 and a wiring configuration on the circuit board 62 according to the thirteenth exemplary embodiment. FIG. 37 shows a portion of the light-emitting chips C1 to C10.

The signal generating circuit 110 includes a transfer signal generating part 120 that transmits a first transfer signal φ1 and a second transfer signal φ2, an enable signal generating part 130 that transmits enable signals φEa, φEb and enable signals φE21, φE22, φE23, a light-up signal generating part 140 that transmits light-up signals φI1 to φI6, and a write signal generating part 150 that transmits write signals φW1 to φW7.

The light-emitting chips C (the light-emitting chips C1 to C40) are arranged in a staggered pattern so that odd numbered light-emitting chips C1, C3, C5, . . . , and even numbered light-emitting chips C2, C4, C6, . . . , are opposed to each other. The light-emitting chips C (the light-emitting chips C1 to C40) are arranged so that the light-emitting elements of the light-emitting chips C are aligned at predetermined intervals in the first scanning direction.

Wiring that connects the signal generating circuit 110 and the light-emitting chips C (the light-emitting chips C1 to C40) is described.

The circuit board 62 includes a first transfer signal line 201 and a second transfer signal line 202 to transmit the first transfer signal φ1 and the second transfer signal φ2 from the transfer signal generating part 120 of the signal generating circuit 110 to the φ1 and φ2 terminals of the light-emitting chips C (the light-emitting chips C1 to C40), respectively. The first transfer signal φ1 and the second transfer signal φ2 are transmitted to the light-emitting chips C (the light-emitting chips C1 to C40) in common (parallel).

The circuit board 62 includes enable signal lines 203a to 203e that transmit the enable signals φEa, φEb, φE21, φE22, φE23, respectively from the enable signal generating part 130 of the signal generating circuit 110 to the φE1 and φE2 terminals of the light-emitting chips C (the light-emitting chips C1 to C40). The enable signals φEa and φEb are transmitted to the φE1 terminal, and the enable signals φE21, φE22, φE23 are transmitted to the φE2 terminal.

The circuit board 62 includes light-up signal lines 204a to 204f to transmit the light-up signals φIa1, φIb 1, φIa2, φIb2, φIa3, φIb3 from the signal generating part 140 to the φI terminals of the light-emitting chips C (the light-emitting chips C1 to C40) via respective current limitation resistances RI.

The circuit board 62 includes write signal lines 205 to 211 to transmit write signals φW1 to φW7 from the write signal generating part 150 of the signal generating circuit 110 to the φW terminals of the light-emitting chips C (the light-emitting chips C1 to C40).

FIG. 38 is a diagram illustrating the relationship between the light-emitting chips C (the light-emitting chips C1 to C40), and the enable signals φEa, φEb, φE21, φE22, φE23, the write signals φW1 to φW7 and the light-up signals φIa1, φIb 1, φIa2, φIb2, φIa3, φIb3 to be transmitted. The wiring configuration on the circuit board 62 shown in FIG. 37 is provided according to the relationship shown in FIG. 38.

For example, the φE1 terminal of the light-emitting chip C1 is connected to the enable signal line 203a to transmit the enable signal φEa. The φE2 terminal is connected to the enable signal line 203c to transmit the enable signal φE21. The φW terminal is connected to the write signal line 205 to transmit the write signal φW1. The φI terminal is connected to the light-up signal line 224a to transmit the light-up signal φIa1. Other light-emitting chips C2 to C40 have a similar relationship with the signals.

Figure 39:
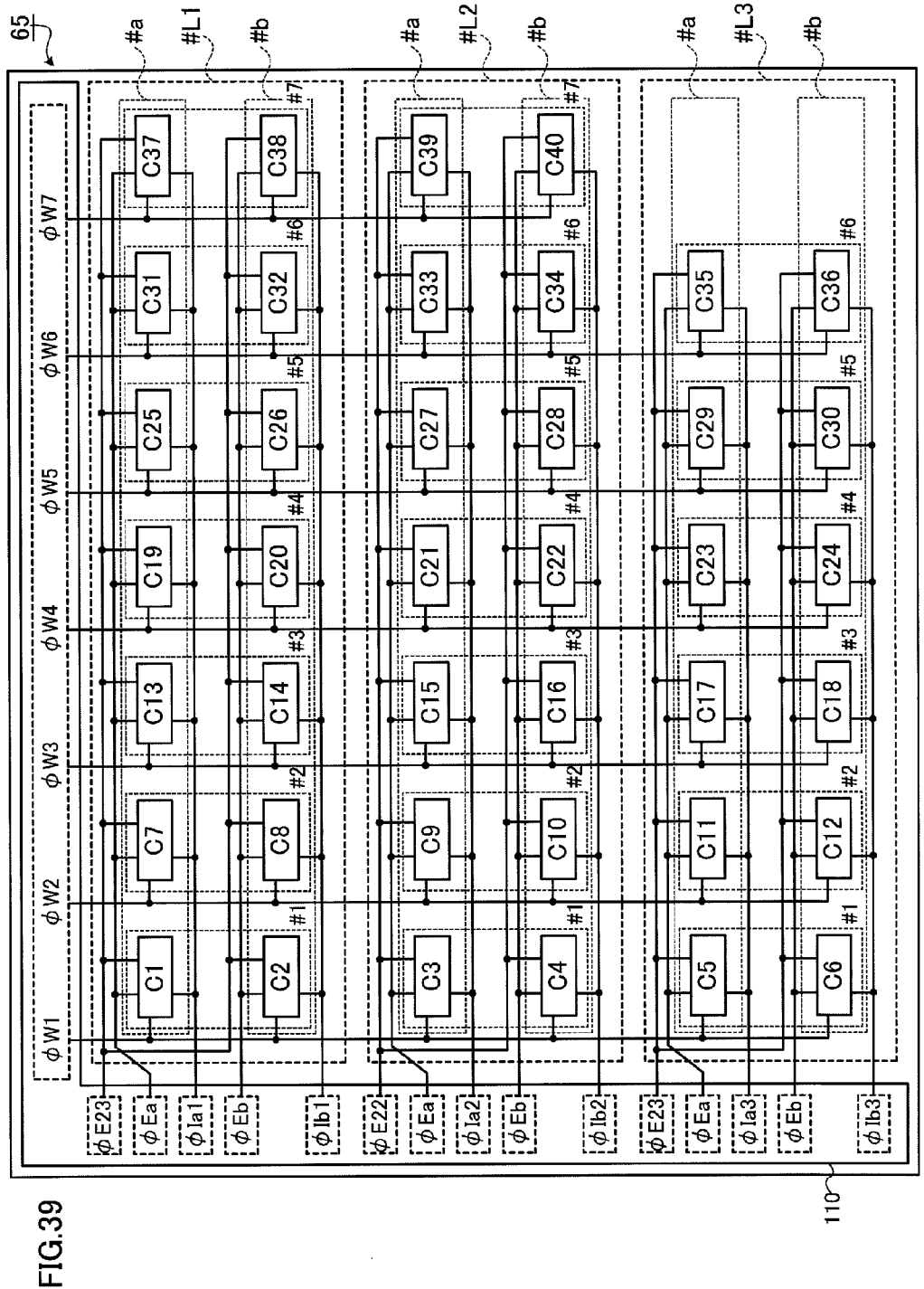
FIG. 39 is a diagram showing the light-emitting chips of the light-emitting device according to the thirteenth exemplary embodiment, being arranged as respective elements in a matrix form.

FIG. 39 is a diagram showing the light-emitting chips C of the light-emitting device 65 according to the thirteenth exemplary embodiment, being arranged as respective elements in a matrix form.

In FIG. 39, the light-emitting chips C (the light-emitting chips C1 to C40) are arranged as respective elements in a (2×7)×3 matrix form. FIG. 39 shows the relationship between the light-emitting chips C (the light-emitting chips C1 to C40) and the enable signals φEa, φEb, φE21, φE22, φE23, the write signals φW1 to φW7, the light-up signals φIa1, φIb 1, φIa2, φIb2, φIa3, φIb3.

Here, the light-emitting chip layer #L1 is defined by 14 light-emitting chips C1, C2, C7, C8, C13, C14, C19, C20, C25, C26, C31, C32, C37, C38, and the light-emitting chip group #a includes seven of the above light-emitting chips C1, C7, C13, C19, C25, C31, C37, and the light-emitting chip group #b includes seven remaining light-emitting chips C2, C8, C14, C20, C26, C32, C38. Each of light-emitting chip classes (#1 to #7) includes one light-emitting chip C belonging to the light-emitting chip group #a, and another light-emitting chip C belonging to the light-emitting chip group #b. For example, the light-emitting chip class #1 includes the light-emitting chips C1 and C2.

Also, the light-emitting chip layer #L2 is defined by 14 light-emitting chips C3, C4, C9, C10, C15, C16, C21, C22, C27, C28, C33, C34, C39, C40, and the light-emitting chip group #a includes seven of the above light-emitting chips C3, C9, C15, C21, C27, C33, C39, and the light-emitting chip group #b includes seven remaining light-emitting chips C4, C10, C16, C22, C28, C34, C40. Each of light-emitting chip classes (#1 to #7) includes one light-emitting chip C belonging to the light-emitting chip group #a, and another light-emitting chip C belonging to the light-emitting chip group #b.

Also, the light-emitting chip layer #L3 is defined by twelve light-emitting chips C5, C6, C11, C12, C17, C18, C23, C24, C29, C30, C35, C36, and the light-emitting chip group #a includes six of the above light-emitting chips C5, C11, C17, C23, C29, C35, and the light-emitting chip group #b includes six remaining light-emitting chips C6, C12, C18, C24, C30, C36. Each of light-emitting chip classes (#1 to #6) includes one light-emitting chip C belonging to the light-emitting chip group #a, and another light-emitting chip C belonging to the light-emitting chip group #b. The light-emitting chip layer #L3 does not include a light-emitting chip class #7.

That is, in the thirteenth exemplary embodiment, light-emitting chip layers #L1 to #L3 each include the light-emitting chip groups #a and #b shown in the eighth exemplary embodiment.

Similarly to the eighth exemplary embodiment, the enable signals φEa and φEb to be transmitted to the φE1 terminal of each of the light-emitting chips C (the light-emitting chips C1 to C40) are transmitted to the light-emitting chips C included in the light-emitting chip group #a as well as the light-emitting chips C included in the light-emitting chip group #b in common for all of the light-emitting chip layers #L1 to #L3.

Similarly to the eighth exemplary embodiment, the write signals φW1 to φW7 to be transmitted to the φW terminal of each of the light-emitting chips C (the light-emitting chips C1 to C40) are transmitted to the light-emitting chip classes (#1 to #7), respectively for all of the light-emitting chip layers #L1 to #L3 in common, each light-emitting chip class including one light-emitting chip C included in the light-emitting chip group #a, and another light-emitting chip C included in the light-emitting chip group #b.

The light-up signals φIa1, φIb1 are transmitted to the φI terminals of the light-emitting chip groups #a and #b of the light-emitting chip layer #L1, respectively, the light-up signals φIa2, φIb2 are transmitted to the φI terminals of the light-emitting chip groups #a and #b of the light-emitting chip layer #L2, respectively, and the light-up signals φIa3, φIb3 are transmitted to the φI terminals of the light-emitting chip groups #a and #b of the light-emitting chip layer #L3, respectively in common to all layers.

The enable signals φE21, φE22, φE23 are transmitted to the φE2 terminals of the light-emitting chips C included in the light-emitting chip layers #L1 to #L3, respectively in common. That is, the enable signals φE21, φE22, φE23 are the signals that select (identify) the light-emitting chip layers #L1 to #L3, respectively.

From the above-mentioned wiring configuration, the light-emitting chip groups #a and #b may not be distinguished for each of the light-emitting chip layers #L1 to #L3, but may be defined for all of the light-emitting chip layers #L1 to #L3. Similar discussion applied to the light-emitting chip classes #1 to #7.

Here, the number of wiring lines for the circuit board 62 of the light-emitting device 65 according to the thirteenth exemplary embodiment is described.

As shown in FIG. 37, the thirteenth exemplary embodiment includes the power supply lines 200a and 200b, the first transfer signal line 201, the second transfer signal line 202, the enable signal lines 203a to 203e, the write signal lines 205 to 211, and the light-up signal lines 224a to 204f, thus the total number of wiring lines is twenty-two. Thus, the number is ½ of the number forty-four as in the case where the thirteenth exemplary embodiment is not applied.

As described above, in the eighth exemplary embodiment, the light-emitting chip C may be considered to be arranged in a two dimensional wiring configuration as shown FIG. 22. In contrast to this, in the thirteenth exemplary embodiment, the light-emitting chip C may be considered to be arranged in a three dimensional wiring configuration.

Figure 40:
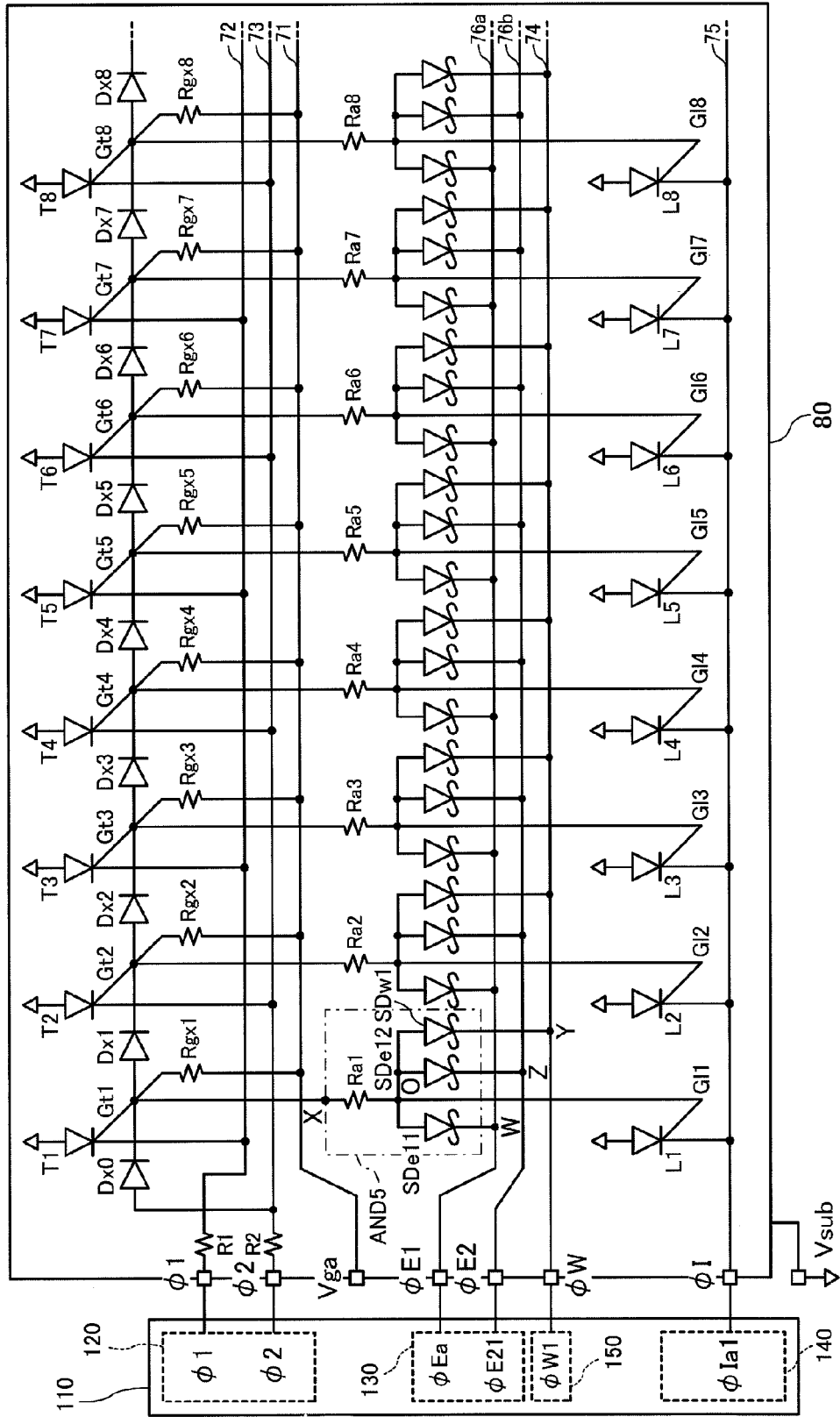
FIG. 40 is an equivalent circuit diagram for illustrating a circuit configuration of the light-emitting chip that is a self-scanning light-emitting device array (SLED) chip according to the thirteenth exemplary embodiment.

FIG. 40 is an equivalent circuit diagram for illustrating a circuit configuration of the light-emitting chip C that is a self-scanning light-emitting device array (SLED) chip according to the thirteenth exemplary embodiment. Here, the light-emitting chip C is described using the light-emitting chip C1 as an example. Now, in FIG. 40, the light-emitting chip C is denoted as the light-emitting chip C1 (C). Unlike FIG. 36, in FIG. 40, the input terminals (Vga, φ2, φW1, φW, φE1, φE2, φ1 and φI terminals) are shown at the left end of FIG. 40.

The light-emitting chip C1 (C) in FIG. 40 is equivalent to the light-emitting chip C1 (C) of the first exemplary embodiment shown in FIG. 6 with the Schottky enable diode SDe1 replaced by the Schottky enable diodes SDe11 and SDe12.

The cathode terminal of the Schottky enable diode SDe11 is connected to the enable signal line 76a, and the cathode terminal of the Schottky enable diode SDe12 is connected to the enable signal line 76b. The enable signal line 76a is connected to the φE1 terminal, and the enable signal line 76b is connected to the φE2 terminal.

According to the thirteenth exemplary embodiment, selection of a light-emitting chip C is made by the write signal φW, the enable signals φE1, φE2, and the gate terminal Gt. Therefore, each light-emitting chip C needs AND function with 4 inputs.

A 4-input AND circuit AND5 is described with a connection resistance Ra1, a Schottky write diode SDw1, a Schottky enable diode SDe11, and a Schottky enable diode SDe12 that are enclosed by the dashed dotted line shown in FIG. 40.

In the 4-input AND circuit AND5, one terminal O of the connection resistance Ra1 is connected to the anode terminal of the Schottky write diode SDw1, and to the anode terminals and the Schottky enable diode SDe11 and Schottky enable diode SDe12. The other terminal X of the connection resistance Ra1 is connected to the gate terminal Gt1 of the transfer thyristor T1. The cathode terminal Y of the Schottky write diode SDw1 is connected to the write signal line 74, the cathode terminal W of the Schottky enable diode SDe11 is connected to the enable signal line 76a, and the cathode terminal Z of the Schottky enable diode SDe21 is connected to the enable signal line 76b.

Similar 4-input AND circuits AND5 are provided between other gate terminals Gt2, Gt3, Gt4, . . . , and the gate terminals Gl2, Gl3, Gl4, . . . , respectively.

The terminal X, the terminal Y, and the terminal Z serve as an input terminal, and the terminal O serves an output terminal. The 4-input AND circuit AND5 outputs a potential Gl(O) of "H" (0 V) at the terminal O when the potential Gt(X) at the terminal X, potential φW(Y) at the terminal Y, potential φE1 (W) at the terminal W, and potential φE2(Z) of the terminal Z are all set to "H" (0 V). Thereby, when the threshold voltage of the light-emitting thyristor L is set to −1.5 V, and the light-up signal φI (φIa1 for the light-emitting chip C1) is "L" (−3.3 V), the light-emitting thyristor L is turned on and lighted up (emits light).

Thus, the 4-input AND circuit AND5 serves as an AND circuit with 4 inputs.

Since the light-emitting device 65 and light-emitting chip C1(C) operate similarly to the ones described in the first exemplary embodiment, detailed description is omitted.

Here, the light-emitting chips C are arranged in a three dimensional wiring configuration, but may be arranged in a higher dimensional wiring configuration.

Fourteenth Exemplary Embodiment

The fourteenth exemplary embodiment has a different configuration of the signal generating circuit 110 of the light-emitting device 65 and a different wiring configuration on the circuit board 62 from those of the eighth exemplary embodiment.

Figure 41:
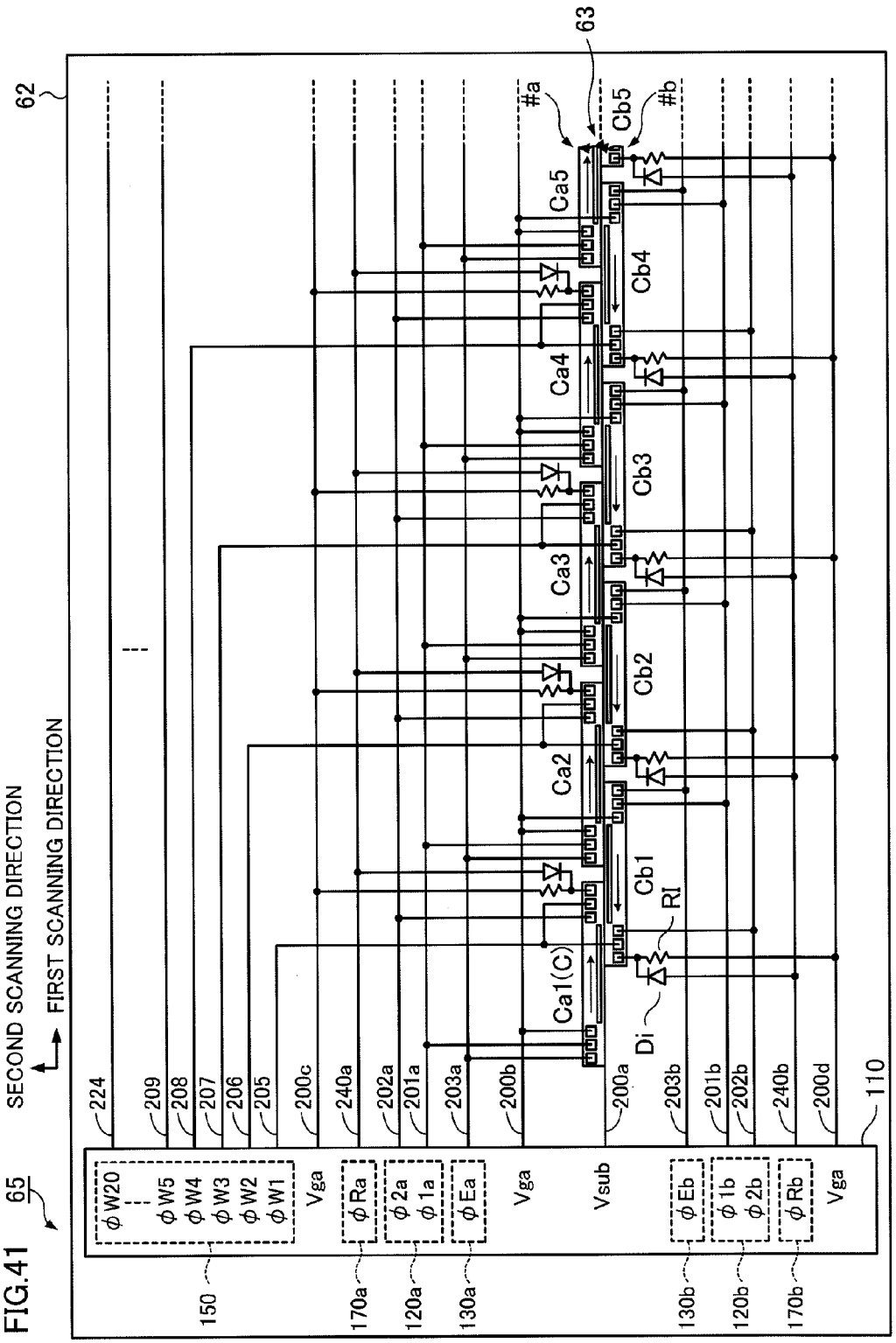
FIG. 41 is a diagram showing a configuration of the signal generating circuit of the light-emitting device and a wiring configuration on the circuit board according to the fourteenth exemplary embodiment.

FIG. 41 is a diagram showing a configuration of the signal generating circuit 110 of the light-emitting device 65 and a wiring configuration on the circuit board 62 according to the fourteenth exemplary embodiment. The configuration of the light-emitting chip C is the same as that of the eighth exemplary embodiment (see FIGS. 21A and 23). FIG. 41 shows the portion of the light-emitting chips Ca1 to Ca5 and the light-emitting chips Cb1 to Cb5.

In the following, the components of the fourteenth exemplary embodiment that are different from those of the eighth exemplary embodiment are mainly described, and similar components to those of the eighth exemplary embodiment are labeled with the same reference numerals, and detailed description of the similar components is omitted.

The signal generating circuit 110 includes an unlight signal generating part 170a which transmits an unlight signal φRa, and an unlight signal generating part 170b which transmits an unlight signal φRb that replace the light-up signal generating part 140 (see the light-up signal generating parts 140a and 140b in FIG. 21B) in the eighth exemplary embodiment. Here, the unlight signal generating parts 170a and 170b are collectively referred to as an unlight signal generating part 170. The unlight signals φRa and φRb, when not individually distinguished, are referred to as an unlight signal φR.

The circuit board 62 includes a power supply wire 200c that supplies the power supply potential Vga to the φI terminals of the light-emitting chips C of the light-emitting chip group #a (the light-emitting chips Ca1 to Ca20) via the current limitation resistances RI. Similarly, the circuit board 62 includes a power supply wire 200d that supplies the power supply potential Vga to the φI terminals of the light-emitting chips C of the light-emitting chip group #b (the light-emitting chips Cb1 to Cb20) via the current limitation resistances RI.

The circuit board 62 includes an unlight signal line 204a that supplies the unlight signal φRa from the unlight signal generating part 170a to the φI terminals of the light-emitting chips C included in the light-emitting chip group #a (the light-emitting chips Ca1 to Ca20). The circuit board 62 further includes an unlight signal line 204b that supplies the unlight signal φRb from the unlight signal generating part 170b to the φI terminals of the light-emitting chips C included in the light-emitting chip group #b (the light-emitting chips Cb1 to Cb20). The unlight signal lines 240a and 240b are connected to between the φI terminals of the light-emitting chips C (the light-emitting chips Ca1 to Ca20, Cb1 to Cb20) and the current limitation resistances RI via respective diodes Di. The cathode terminals of the diodes Di are connected to the φI terminals of the light-emitting chips C (the light-emitting chips Ca1 to Ca20, Cb1 to Cb20), respectively, and the anode terminals of the diodes Di are connected to the unlight signal generating parts 170a and 170b so that a current may flow from the unlight signal generating parts 170a and 170b to the φI terminals of the light-emitting chips C (the light-emitting chips Ca1 to Ca20, Cb1 to Cb20).

Figure 42:
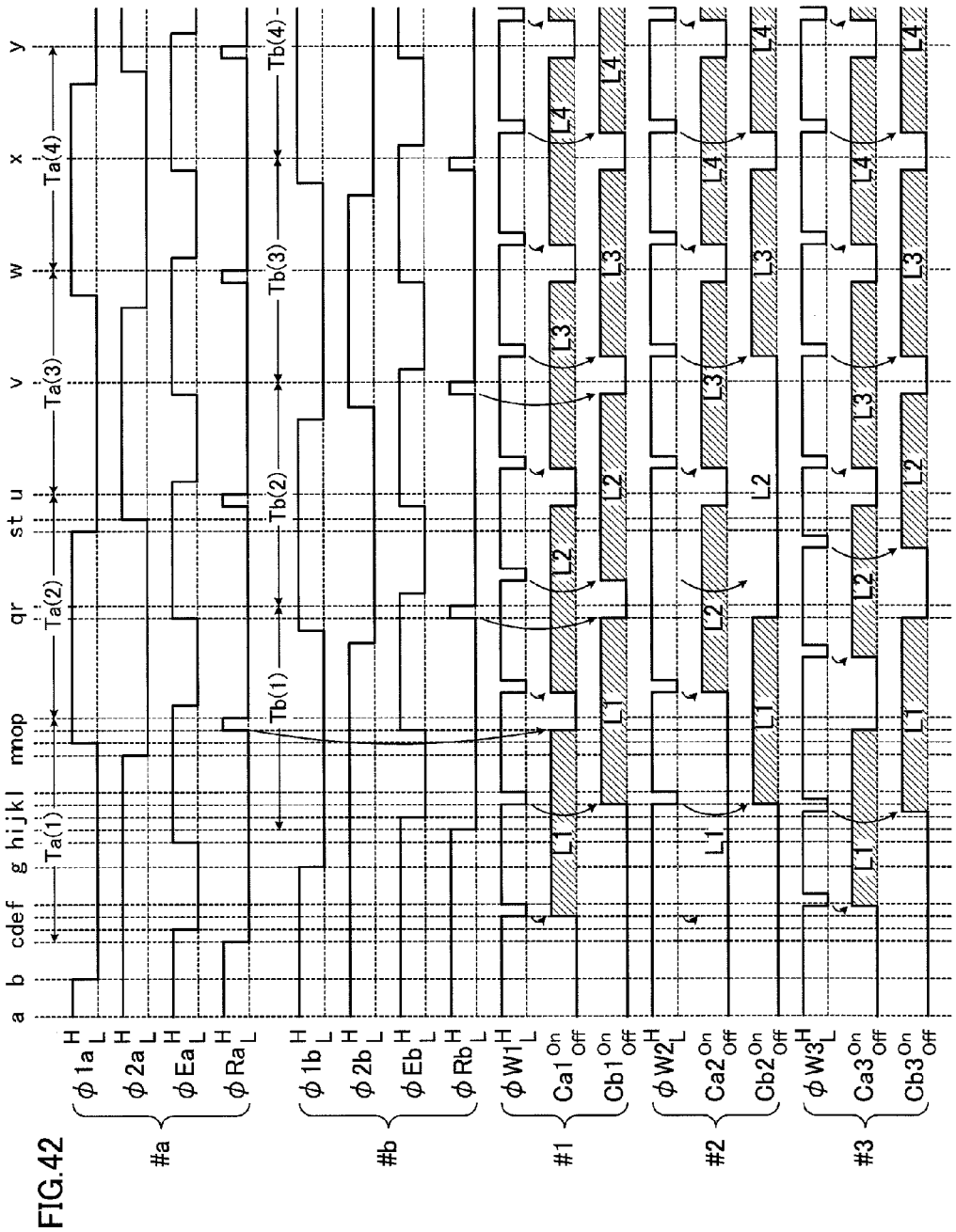
FIG. 42 is a timing chart for illustrating operations of the light-emitting chip according to the fourteenth exemplary embodiment.

FIG. 42 is a timing chart for illustrating operations of the light-emitting chip C according to the fourteenth exemplary embodiment.

The timing chart of the fourteenth exemplary embodiment is equivalent to the one in the eighth exemplary embodiment shown in FIG. 25 with the light-up signals φIa, φIb replaced by the unlight signals φRa, φRb, respectively. Others portions of the timing chart are the same as those of the eighth exemplary embodiment. Thus, the unlight signals φRa and φRb are described.

The φI terminals of the light-emitting chips C (the light-emitting chips Ca1 to Ca20) of the light-emitting chip group #a are connected to the power supply wire 200c that supplies the power supply potential Vga ("L" (−3.3 V)) via respective current limitation resistances RI. When the unlight signal φRa shifts from "H" (0 V) to "L" (−3.3 V) at a time point c in the timing chart of FIG. 42, the diode Di becomes reverse biased. Thus, the potential of the φI terminals of the light-emitting chips C (the light-emitting chips Ca1 to Ca20) of light-emitting chip group #a becomes power supply potential Vga ("L" (−3.3 V)).

When the write signal φW1 shifts from "H" (0 V) to "L" (−3.3 V) at a time point e similarly to the eighth exemplary embodiment, the write thyristor M1 in the light-emitting chip Ca1 of the light-emitting chip group #a is turned on. Accordingly, the gate terminal G11 is set to −1.5 V, and threshold voltage of the light-emitting thyristor L1 is set to −3 V, thus the light-emitting thyristor L1 is turned on and lighted up (emits light).

Subsequently, at a time point o, when the unlight signal φRa shifts from "L" (−3.3 V) to "H" (0 V), the diode Di becomes forward biases and the potential of the φI terminal of each of the light-emitting chips C (the light-emitting chips Ca1 to Ca20) of the light-emitting chip group #a is set to the diffusion potential of the diode Di. Assuming that the diode Di is made of a silicon, the diffusion potential is 0.6 V at this point. Thus, the potential of the φI terminal becomes −0.6 V. Since this potential is smaller in its absolute value than the potential to be maintained (−1.5 V) of the light-emitting thyristor L in an ON state, the light-emitting thyristor L1 may not be maintained at an ON state, thus is turned off, and unlighted.

Also, when the unlight signal φRa shifts from "H" (0 V) to "L" (−3.3 V) at a time point p, the diode Di becomes reverse biased. Accordingly, the potential of the φI terminals of the light-emitting chips C (the light-emitting chips Ca1 to Ca20) of the light-emitting chip group #a is set to the power supply potential Vga ("L" (−3.3 V)).

In this way, the unlight signal φRa operates in the same manner as the light-up signal φIa, so does the unlight signal φRb.

In the fourteenth exemplary embodiment, the unlight signals φRa and φRb are only needed to control the potentials of the φI terminals of the light-emitting chips C (the light-emitting chips Ca1 to Ca20, Cb1 to Cb20), and are not needed to supply a large current. Thus, it is not necessary to use a low resistance wiring for the unlight signal lines 240a and 240b.

Fifteenth Exemplary Embodiment

The fifteenth exemplary embodiment has a different wiring configuration on the circuit board 62 of the light-emitting device 65 from that of the fourteenth exemplary embodiment. In the fourteenth exemplary embodiment shown in FIG. 41, the diode Di is used between unlight signal lines 240a, 240b and the φI terminal of each of the light-emitting chips C (the light-emitting chips Ca1 to Ca20, Cb1 to Cb20). According to the fifteenth exemplary embodiment, a transistor Tr is used.

Figure 43:
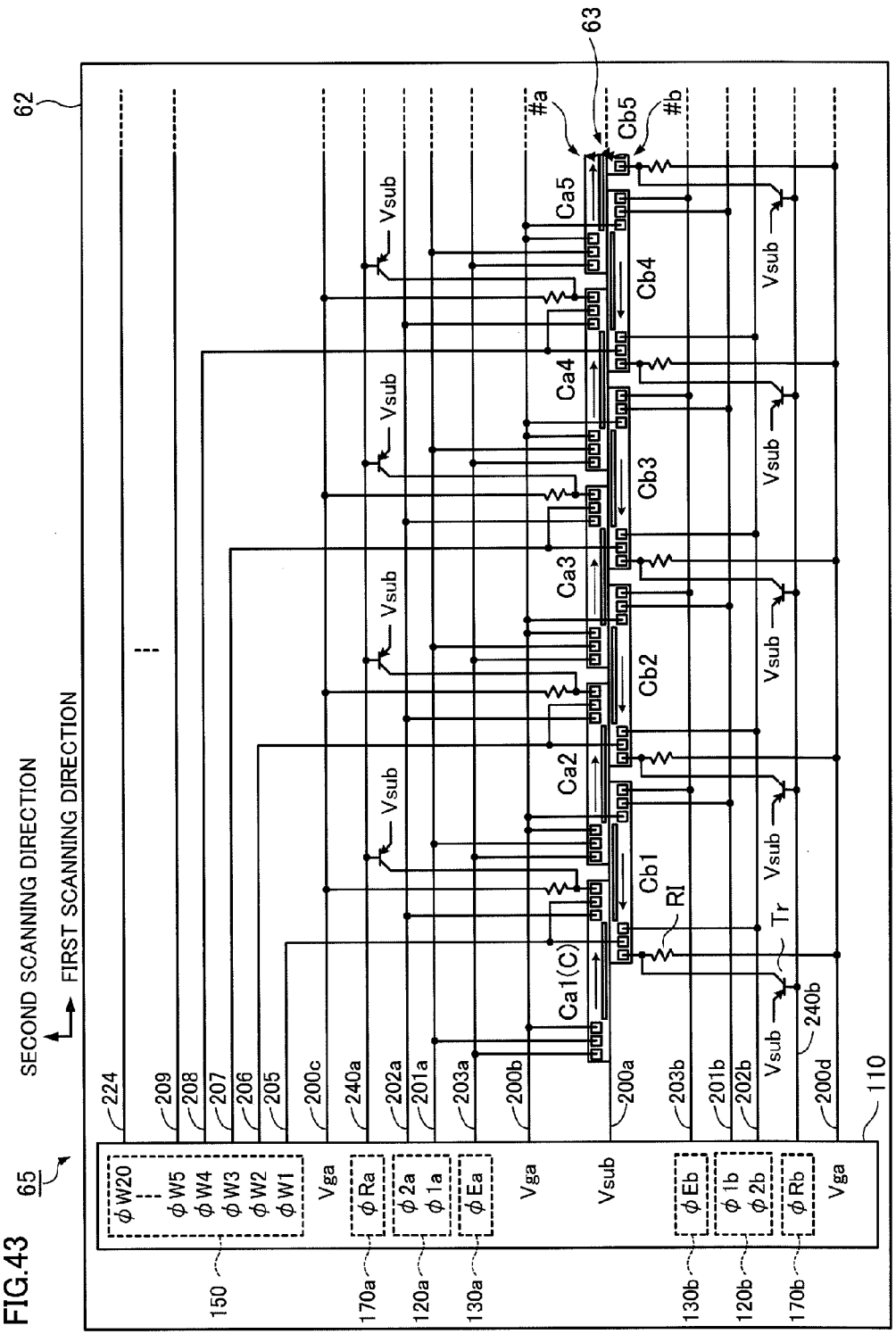
FIG. 43 is a diagram showing a wiring configuration on the circuit board of the light-emitting device according to the fifteenth exemplary embodiment.

FIG. 43 is a diagram showing a wiring configuration on the circuit board 62 of the light-emitting device 65 according to the fifteenth exemplary embodiment. The configuration of the light-emitting chip C is the same as that of the eighth exemplary embodiment (see FIGS. 21A and 23). FIG. 43 shows the portion of the light-emitting chips Ca1 to Ca5 and the light-emitting chips Cb1 to Cb5.

In the following, the components of the fifteenth exemplary embodiment that are different from those of the fourteenth exemplary embodiment are mainly described, and similar components to those of the fourteenth exemplary embodiment are labeled with the same reference numerals, and detailed description of the similar components is omitted.

The unlight signal lines 240a and 240b of the circuit board 62 are connected to between the φI terminals of the light-emitting chips C (the light-emitting chips Ca1 to Ca20, Cb1 to Cb20) and the current limitation resistances RI via respective transistors Tr. For example, transistor Tr is a pnp-type. The base terminal of the transistor Tr is connected to the unlight signal line 240a or 240b. The collector terminal of the transistor Tr is connected to the portion which connects between the current limitation resistance RI and the φI terminal of each of the light-emitting chips C (the light-emitting chips Ca1 to Ca20, Cb1 to Cb20). The reference potential Vsub of "H" (0 V) is supplied to the emitter terminal of transistor Tr.

Figure 44:
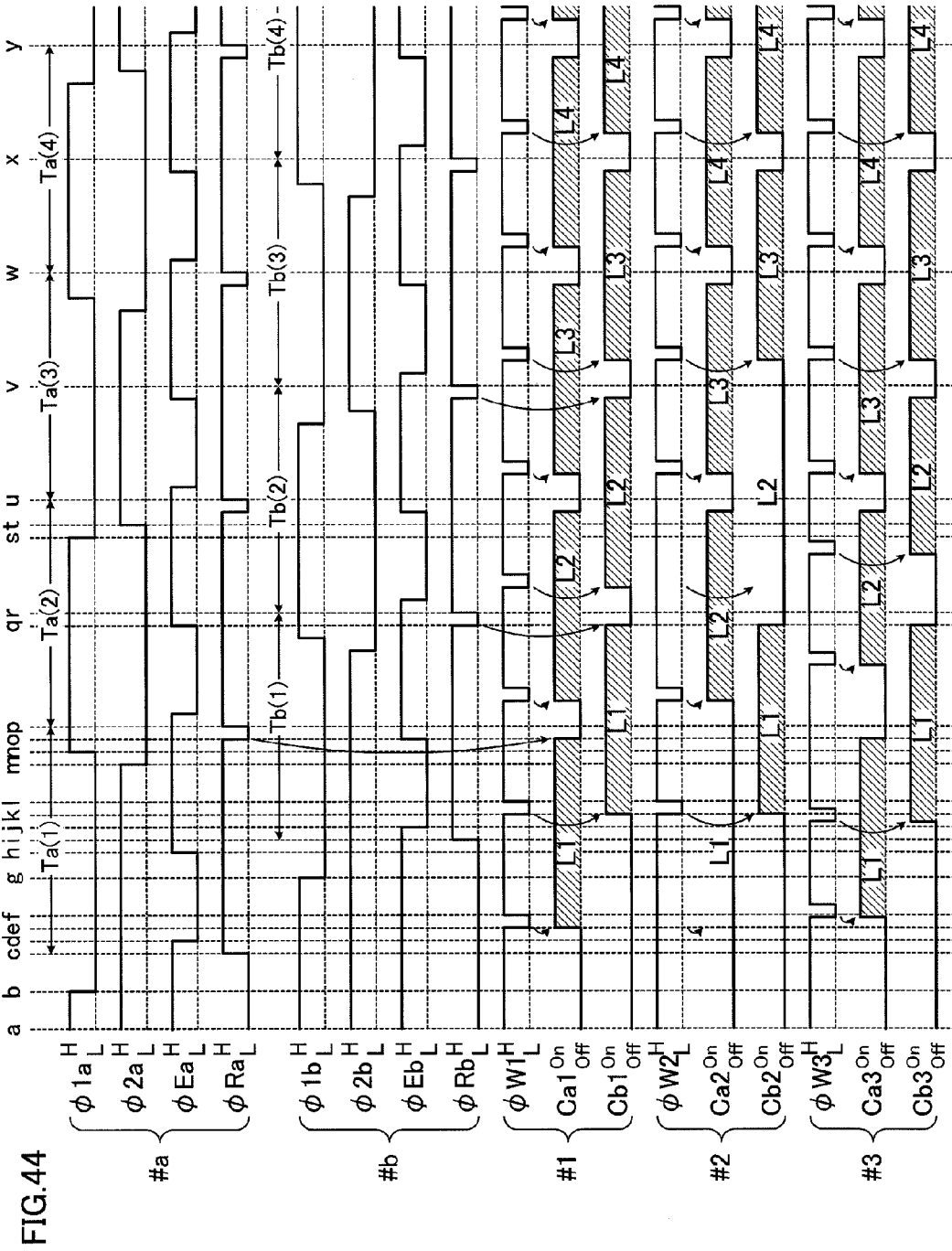
FIG. 44 is a timing chart for illustrating operations of the light-emitting chip according to the fifteenth exemplary embodiment.

FIG. 44 is a timing chart for illustrating operations of the light-emitting chip C according to the fifteenth exemplary embodiment.

The timing chart of the fifteenth exemplary embodiment is equivalent to the one in the fourteenth exemplary embodiment shown in FIG. 42 with "H" (0 V) and "L" (−3.3 V) of the unlight signals φRa, φRb reversed each other. Others portions of the timing chart are the same as those of the eighth exemplary embodiment. Thus, the unlight signals φRa and φRb are described.

The φI terminals of the light-emitting chips C (the light-emitting chips Ca1 to Ca20) of the light-emitting chip group #a are connected to the power supply wire 200c that supplies the power supply potential Vga ("L" (−3.3 V)) via respective current limitation resistances RI. When the unlight signal φRa shifts from "L" (−3.3 V) to "H" (0 V) at a time point c in the timing chart of FIG. 44, the transistor Tr becomes an OFF state because the emitter and base terminals (the potential of φRa) of the transistor Tr are at "H" (0 V). Thus, the potential of the φI terminals of the light-emitting chips C (the light-emitting chips Ca1 to Ca20) of the light-emitting chip group #a becomes the power supply potential Vga ("L" (−3.3 V)).

When the write signal φW1 shifts from "H" (0 V) to "L" (−3.3 V) at a time point e, the write thyristor M1 of the light-emitting chip Ca1 of light-emitting chip group #a is turned on. Accordingly, the gate terminal G11 of the light-emitting chip Ca1 of the light-emitting chip group #a is set to −1.5 V, and threshold voltage and the light-emitting thyristor L1 of the light-emitting chip Ca1 of the light-emitting chip group #a is set to −3 V, thus the light-emitting thyristor L1 is turned on and lighted up (emits light).

Subsequently, when the unlight signal φRa shifts from "H" (0 V) to "L" (−3.3 V) at the time point o, the portion between the emitter terminal and the base terminal of the transistor Tr becomes forward biased, thus the transistor Tr becomes an ON state. Accordingly, the potential of the collector terminal of the transistor Tr becomes the potential of the emitter terminal, i.e., the reference potential Vsub ("H" (0 V)). The potential of the φI terminal of each of the light-emitting chips C (the light-emitting chips Ca1 to Ca20) of the light-emitting chip group #a becomes "H" (0 V), and the light-emitting thyristor L1, which is already in an ON state, has the same potential at the cathode and anode terminals, thus is turned off, and unlighted.

When the unlight signal φRa shifts from "L" (−3.3 V) to "H" (0 V) at a time point p, the transistor Tr becomes an OFF state. Accordingly, the potential of the φI terminal of each of the light-emitting chips C (the light-emitting chips Ca1 to Ca20) of the light-emitting chip group #a becomes the power supply potential Vga ("L" (−3.3 V)).

In this way, the unlight signal φRa operates in the same manner as the light-up signal φIa, so does the unlight signal φRb.

In the fifteenth exemplary embodiment, the unlight signals φRa and φRb are transmitted to the base terminal of the transistor Tr, and the unlight signals are only needed to shift the transistor Tr from an ON state to an OFF state, and are not needed to supply a large current. Thus, it is not necessary to use a low resistance wiring for the unlight signal lines 240a and 240b.

Sixteenth Exemplary Embodiment

The sixteenth exemplary embodiment has a different wiring configuration on the circuit board 62 of the light-emitting device 65 and a different circuit configuration of the light-emitting chip C from those of the fifteenth exemplary embodiment.

The light-emitting chip C in the fifteenth exemplary embodiment is the same as that of the eighth exemplary embodiment (see FIG. 23). The light-emitting chip C according to the sixteenth exemplary embodiment is configured by including a light-off thyristor RT (see FIG. 46 described below) in the light-emitting chip C of the eighth exemplary embodiment.

Figure 45:
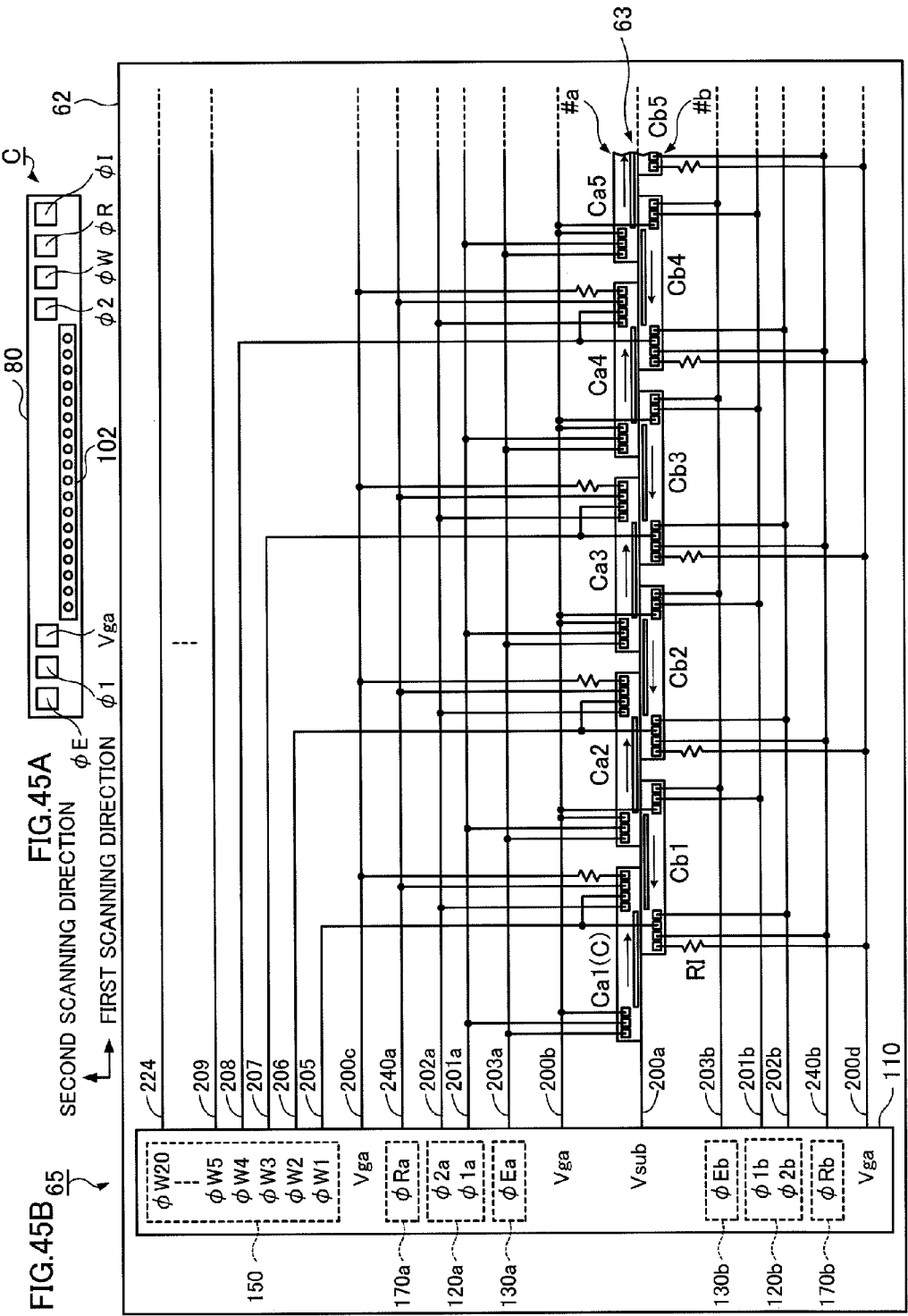
FIGS. 45A and 45B are a diagram showing a configuration of the light-emitting chip, a configuration of the signal generating circuit of the light-emitting device and a wiring configuration of the circuit board according to the sixteenth exemplary embodiment.

FIGS. 45A and 45B are a diagram showing a configuration of the light-emitting chip C, a configuration of the signal generating circuit 110 of the light-emitting device 65 and a wiring configuration of the circuit board 62 according to the sixteenth exemplary embodiment. FIG. 45A shows the configuration of the light-emitting chip C, and FIG. 45B shows the configuration of the signal generating circuit 110 of the light-emitting device 65, and the wiring configuration on the circuit board 62.

As shown in FIG. 45A, the light-emitting chips C includes input terminals (φE terminal, φ1 terminal, Vga terminal, φ2 terminal, φW terminal, φR terminal, φI terminal) that are multiple bonding pads. These input terminals are provided from one end of the substrate 80 in the order of the φE terminal, the φ1 terminal, and the Vga terminal, and are provided from the other end of the substrate 80 in the order of the φI terminal, the φR terminal, the φW terminal, and the φ2 terminal. The light-emitting element array 102 is provided between the Vga terminal and the φ2 terminal.

As shown in FIG. 45B, the configuration of the signal generating circuit 110 of the light-emitting device 65 is the same as that of the fourteenth exemplary embodiment (see FIG. 41). Thus, for the wiring configuration provided on the circuit board 62, the components that are different from those of the fourteenth exemplary embodiment are mainly described, and similar components to those of the fourteenth exemplary embodiment are labeled with the same reference numerals, and detailed description of the similar components is omitted.

The unlight signal line 240a provided on the circuit board 62 to transmit the unlight signal φRa is connected to the φI terminals of the light-emitting chips C (the light-emitting chips Ca1 to Ca20) that belong to the light-emitting chip group #a. The unlight signal line 240b to transmit the unlight signal Rb is connected to the φI terminals of the light-emitting chips C (the light-emitting chips Cb1 to Cb20) that belong to the light-emitting chip group #b.

Herein, the anode, cathode, and gate terminals of the light-off thyristor RT may be referred to as a fifth anode, a fifth cathode, and a fifth gate terminals, respectively.

Figure 46:
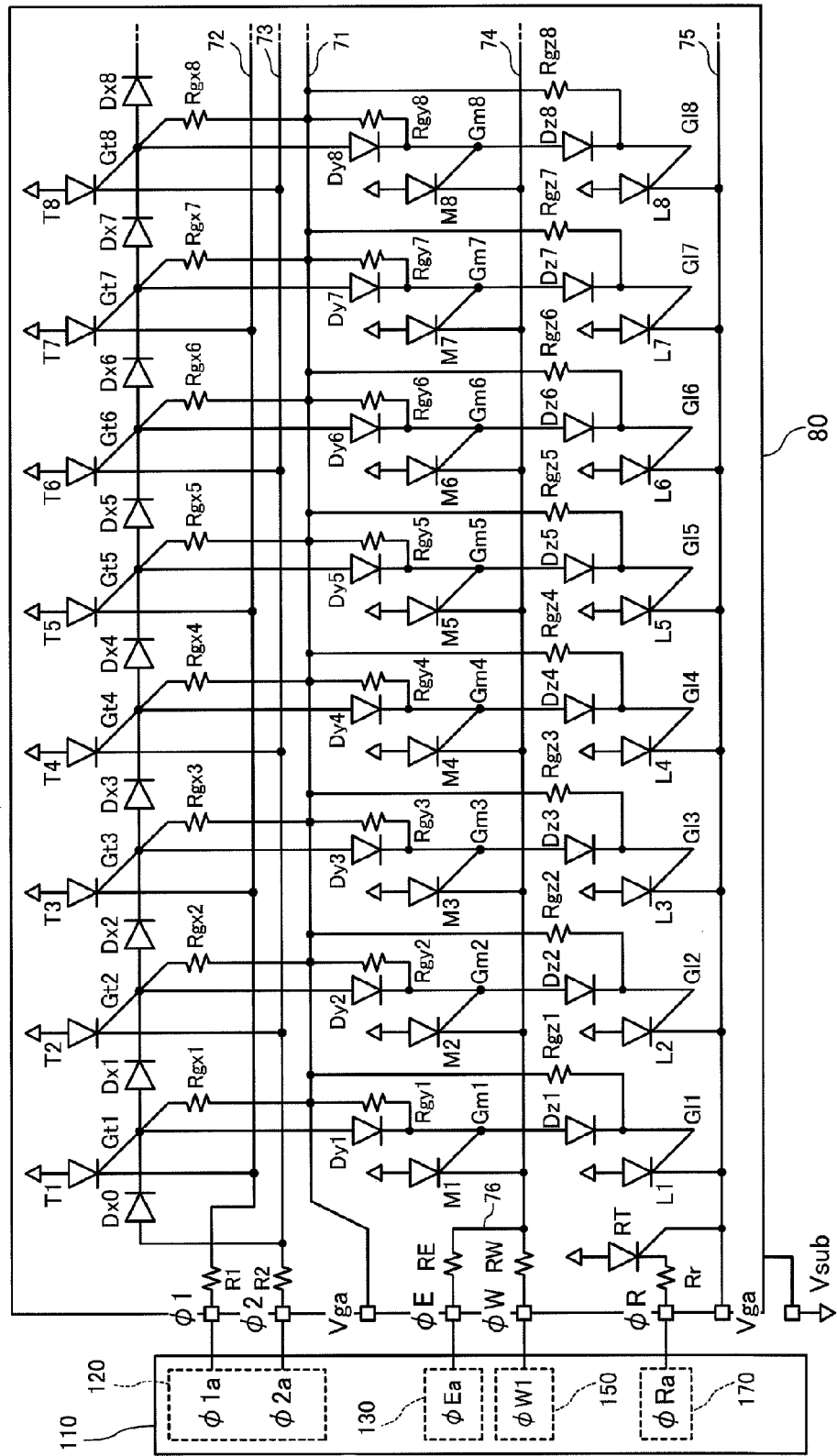
FIG. 46 is an equivalent circuit diagram for illustrating a circuit configuration of the light-emitting chip that is a self-scanning light-emitting device array (SLED) chip according to the sixteenth exemplary embodiment.

FIG. 46 is an equivalent circuit diagram for illustrating a circuit configuration of the light-emitting chip C that is a self-scanning light-emitting device array (SLED) chip according to the sixteenth exemplary embodiment. Here, the light-emitting chip C is described using the light-emitting chip Ca1 as an example. Now, in FIG. 46, the light-emitting chip C is denoted as the light-emitting chip Ca1 (C). The configuration of other light-emitting chips Ca2 to Ca20, Cb1 to Cb20 are the same as that of the light-emitting chip Ca1. In FIG. 46, the input terminals, although at different positions from those of the light-emitting chip C in FIG. 45B, are shown at the left end of FIG. 46 for convenience of description.

In the following, the components of the circuit configuration of the light-emitting chip Ca1 (C) in the sixteenth exemplary embodiment which are different from those of the light-emitting chip C in the eighth exemplary embodiment shown in FIG. 23 are mainly described, and similar components to those of the light-emitting chip C in the eighth exemplary embodiment are labeled with the same reference numerals, and detailed description of the similar components is omitted.

The light-up signal line 75 is connected to the Vga terminal in the light-emitting chip Ca1 (C) according to the sixteenth exemplary embodiment. Although two Vga terminals are shown in FIG. 46, the terminals form one common terminal.

The light-emitting chip Ca1 (C) includes the light-off thyristor RT. The anode terminal of the light-off thyristor RT is connected to the substrate 80 of the light-emitting chip Ca1 (C). The cathode terminal of the light-off thyristor RT is connected to the φR terminal from which the unlight signal φRa (φR) is supplied, via the light-off resistance Rr. The gate terminal of the light-off thyristor RT is connected to the light-up signal line 75 from which the power supply potential Vga ("L" (−3.3 V)) is supplied.

In the sixteenth exemplary embodiment, the light-emitting device 65 operates according to the timing chart shown in FIG. 44 of the fifteenth exemplary embodiment.

The φR terminal as an example of an unlight signal terminal from which the unlight signal φRa is transmitted, is connected to the gate terminal of the light-off thyristor RT.

When the unlight signal φRa is "H" (0 V) at a time point c, the threshold voltage of the light-off thyristor RT is −4.8 V. Although the cathode terminal of the light-off thyristor RT is connected to the light-up signal line 75 from which the power supply potential Vga ("L" (−3.3 V)) is supplied, the light-off thyristor RT is not turned on. Thus, the potential of the light-up signal line 75 is maintained at "L" (−3.3 V).

When the write signal φW1 shifts from "H" (0 V) to "L" (−3.3 V) at a time point e, the write thyristor M1 is turned on, then the light-emitting thyristor L1 is turned on and lighted up (emits light). Then, the light-up signal line 75 becomes −1.5 V which is the potential of the anode terminal of the light-emitting thyristor L1. Accordingly, the threshold voltage of the light-off thyristor RT becomes −3 V.

When the unlight signal φRa shifts from "H" (0 V) to "L" (−3.3 V) at a time point o, the light-off thyristor RT is turned on because the threshold voltage of the light-off thyristor RT is −3 V. Then the potential of the gate terminal connected to the light-up signal line 75 becomes "H" (0 V).

Accordingly, the light-emitting thyristor L1, which has been in an ON state and lighted up (emitting light), is turned off, and unlighted.

When the unlight signal φRa shifts from "L" (−3.3 V) to "H" (0 V) at a time point p, both the anode and cathode terminals of the light-off thyristor RT, which has been in an ON state, are set to "H" (0 V) and turned off. Then, the light-up signal line 75 is set to the power supply potential Vga ("L" (−3.3 V)). In order to make the potential of light-up signal line 75 "H" (0 V) by the gate terminal of the light-off thyristor RT, the resistance of the light-off resistance Rr is set to a value smaller than the resistance of the current limitation resistance RI provided between the power supply line 200c or 200d and the φI terminal of each of the light-emitting chips C (the light-emitting chips Ca1 to Ca20, Cb1 to Cb20).

In this way, the unlight signal φRa operates in the same manner as the light-up signal φIa, so does the unlight signal φRb.

In the sixteenth exemplary embodiment, the unlight signals φRa and φRb are only needed to turn on the transistor Tr connected to the φR terminal of each of the light-emitting chips C (the light-emitting chips Ca1 to Ca20, Cb1 to Cb20), and are not needed to supply a large current. Thus, it is not necessary to use a low resistance wiring for the unlight signal lines 240a and 240b.

In the sixteenth exemplary embodiment, the diode Di according to the fourteenth exemplary embodiment or the transistor Tr according to the fifteenth exemplary embodiment is not provided on the circuit board 62, thus the configuration of the circuit board 62 becomes simple.

Seventeenth Exemplary Embodiment

The seventeenth exemplary embodiment has a different wiring configuration on the circuit board 62 of the light-emitting device 65 and a different circuit configuration of the light-emitting chip C from those of the eighth exemplary embodiment.

The light-emitting chip C according to the eighth exemplary embodiment is configured by a single self-scanning light-emitting device array (SLED) provided on the substrate 80. The light-emitting chip C according to the seventeenth exemplary embodiment is configured by two self-scanning light-emitting device arrays (SLED) (SLED-1 and SLED-r) provided on the substrate 80.

Figure 47:
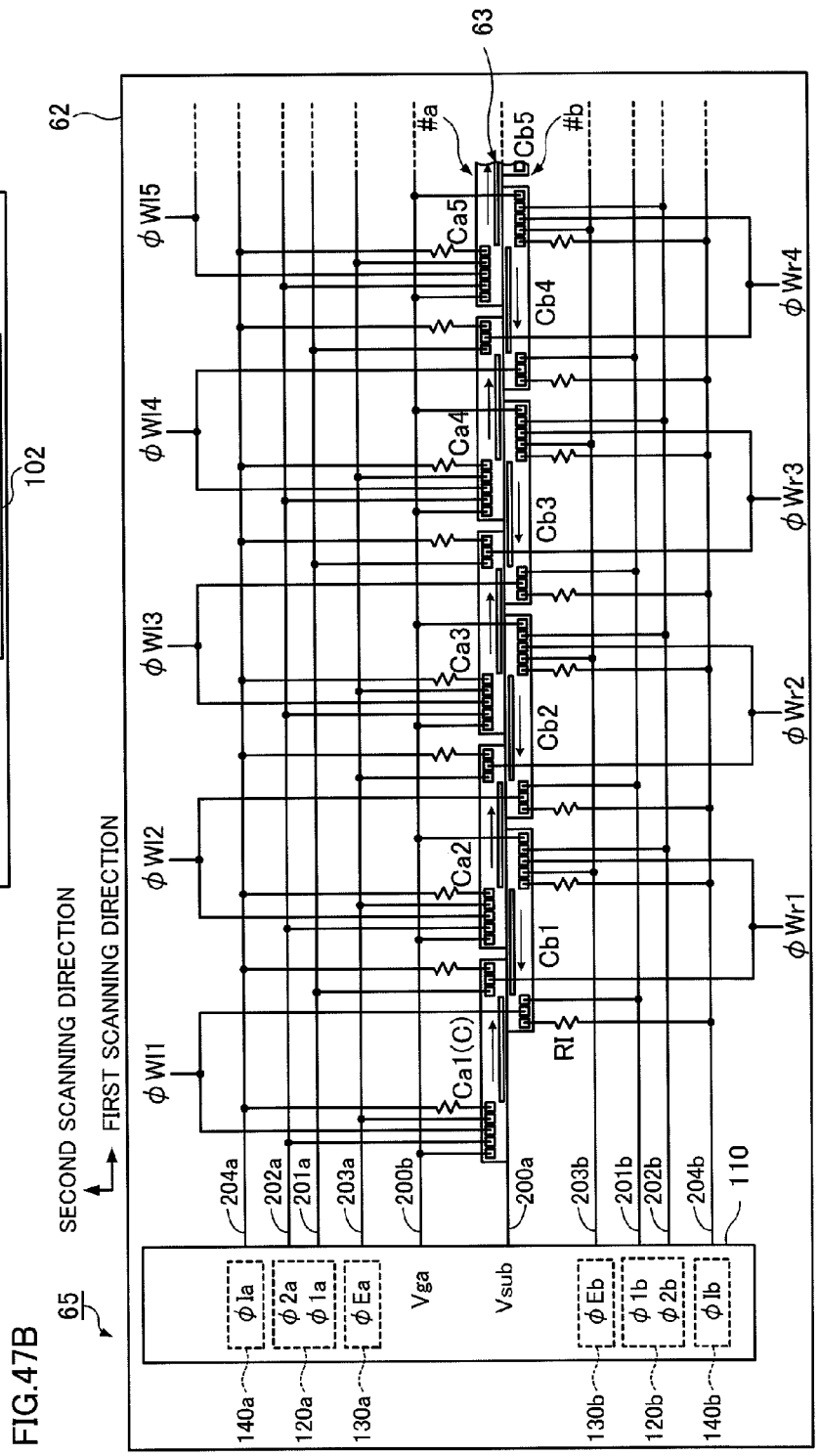
FIGS. 47A and 47B are a diagram showing a configuration of the light-emitting chip, a configuration of the signal generating circuit of the light-emitting device and a wiring configuration of the circuit board according to the seventeenth exemplary embodiment.

FIGS. 47A and 47B are a diagram showing a configuration of the light-emitting chip C, a configuration of the signal generating circuit 110 of the light-emitting device 65 and a wiring configuration of the circuit board 62 according to the seventeenth exemplary embodiment. FIG. 47A shows the configuration of the light-emitting chip C, and FIG. 47B shows the configuration of the signal generating circuit 110 of the light-emitting device 65, and the wiring configuration on the circuit board 62.

As shown in FIG. 47A, the light-emitting chips C includes input terminals (Vga terminal, φ2 terminal, φW1 terminal, φE terminal, φI1 terminal, φ1 terminal, φWr terminal and φIr terminal) that are multiple bonding pads. These input terminals are provided from one end of the substrate 80 in the order of the Vga terminal, the φ2 terminal, the φW1 terminal, the φE terminal, and the φI1 terminal, and are provided from the other end of the substrate 80 in the order of the φIr terminal, the φWr terminal, and the φ1 terminal. The light-emitting element array 102 is provided between the φI 1 and φ1 terminals.

In a similar manner to the eighth exemplary embodiment, the light-emitting portion 63 in the light-emitting device 65 according to the seventeenth exemplary embodiment is configured by arranging 20 light-emitting chips Ca1 to Ca20 (the light-emitting chip group #a), and 20 light-emitting chips Cb1 to Cb20 (the light-emitting chip group #b) in two lines in a staggered pattern in the first scanning direction on the circuit board 62 (see FIG. 20).

As shown in FIG. 47B, the configuration of the signal generating circuit 110 of the light-emitting device 65 is similar to that of the eighth exemplary embodiment (see FIG. 21B). Thus, for the wiring configuration provided on the circuit board 62, the components that are different from those of the eighth exemplary embodiment are mainly described, and similar components to those of the eighth exemplary embodiment are labeled with the same reference numerals, and detailed description of the similar components is omitted.

The light-up signal φIa is transmitted from the light-up signal generating part 140a to the cell terminal and φIr terminals of the light-emitting chips C (the light-emitting chips Ca1 to Ca20) of the light-emitting chip group #a in common. The enable signal φEa is transmitted from the enable signal generating part 130a to the φE terminals as an example of the control terminals of the light-emitting chips C (the light-emitting chips Ca1 to Ca20) of the light-emitting chip group #a in common.

The light-up signal φIb is transmitted from the light-up signal generating part 140b to the cell terminal and φIr terminals of the light-emitting chips C (the light-emitting chips Cb1 to Cb20) of the light-emitting chip group #b in common. The enable signal φEb is transmitted from the enable signal generating part 130b to the φE terminals as an example of the control terminals of the light-emitting chips C (the light-emitting chips Cb1 to Cb20) of the light-emitting chip group #b in common.

The write signal φW11 is transmitted to the φW1 terminal as an example of the control terminal of the light-emitting chips Ca1 and Cb1 included in the light-emitting chips class #1, in common, and the write signal φWr1 is transmitted to the φWr terminal as an example of the control terminal of the light-emitting chips Ca1 and Cb1 included in the light-emitting chips class #1, in common. The write signal φWl2 is transmitted to the φW1 terminal as an example of the control terminal of the light-emitting chips Ca2 and Cb2 included in the light-emitting chips class #2, in common, and the write signal φWr2 is transmitted to the φWr terminal as an example of the control terminal of the light-emitting chips Ca2 and Cb2 included in the light-emitting chips class #2, in common. In a similar manner, respective write signals are transmitted to other light-emitting chip classes #3 to #20.

The write signals φW11, φWl2, φWl3, . . . , when not individually distinguished, are referred to as a write signal φW1, and the write signals φWr1, φWr2, φWr3, . . . , when not individually distinguished, are referred to as a write signal φWr.

That is, similarly to the eighth exemplary embodiment, the first transfer signal φ1a, the second transfer signal φ2a, the enable signal φEa and the light-up signal φIa are transmitted to the light-emitting chips C of the light-emitting chip group #a (the light-emitting chips Ca1 to Ca20) in common. Similarly, the first transfer signal φ1b, the second transfer signal φ2b, the enable signal φEb, and the light-up signal φIb are transmitted to the light-emitting chips C of the light-emitting chip group #b (the light-emitting chips Cb1 to Cb20) in common.

On the other hand, the write signals φW1 and φWr are transmitted to each light-emitting chip class in common which includes one light-emitting chip C of the light-emitting chip group #a, and other light-emitting chips C of the light-emitting chip group #b.

Figure 48:
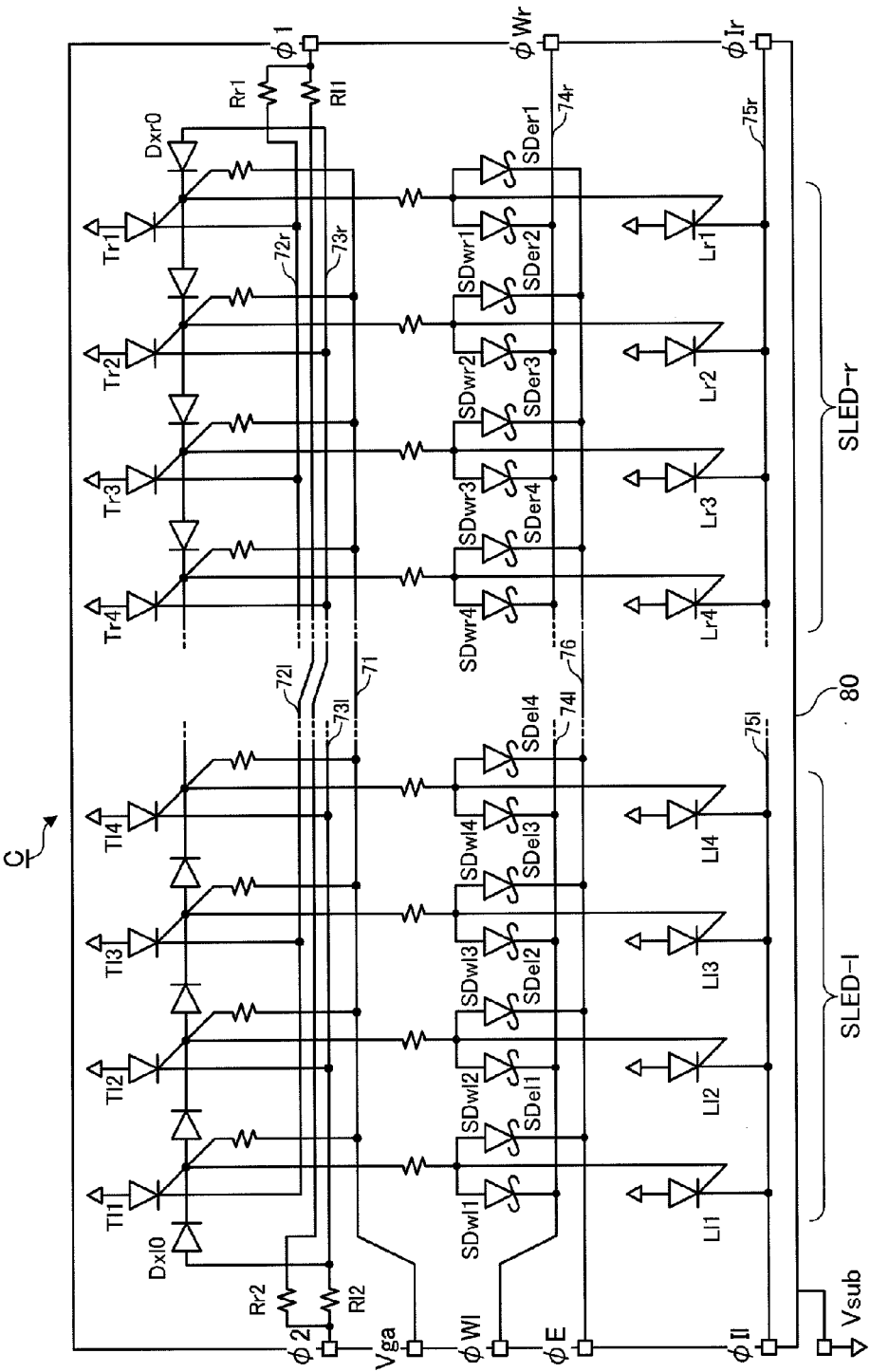
FIG. 48 is an equivalent circuit diagram for illustrating a circuit configuration of the light-emitting chip that is a self-scanning light-emitting device array (SLED) chip according to the seventeenth exemplary embodiment.

FIG. 48 is an equivalent circuit diagram for illustrating a circuit configuration of the light-emitting chip C that is a self-scanning light-emitting device array (SLED) chip according to the seventeenth exemplary embodiment. In FIG. 48, the input terminals, although at different positions from those of the light-emitting chip C in FIG. 47B, are shown at the left end of FIG. 48 for convenience of description.

The self-scanning light-emitting device array (SLED) in the seventeenth exemplary embodiment is the same as shown in FIG. 6 in the first exemplary embodiment.

As shown in FIG. 48, in the light-emitting chip C, transfer thyristors Tl1, Tl2, Tl3, . . . , and light-emitting thyristors Ll1, Ll2, Ll3, . . . , are provided in the ascending order of the index from the left side of FIG. 48. Although detailed description of other elements is omitted, other elements are provided similarly as shown in FIG. 6. SLED-1 is configured by these elements. Similarly, transfer thyristors Tr1, Tr2, Tr3, . . . , and light-emitting thyristors Lr1, Lr2, Lr3, . . . , are provided in the ascending order of the index from the right side of FIG. 48. Although detailed description of other elements is omitted, other elements are provided similarly as shown in FIG. 6. SLED-r is configured by these elements.

In the following, the transfer thyristors Tl1, Tl2, Tl3, ..., and the transfer thyristors Tr1, Tr2, Tr3, ..., when not individually distinguished, are referred to as a transfer thyristor T. Similarly, the light-emitting thyristors Ll1, Ll2, Ll3, ..., and the light-emitting thyristors Lr1, Lr2, Lr3, ..., when not individually distinguished, are referred to as a light-emitting thyristor L.

The number of the light-emitting thyristors L, may be a predetermined number, for example, 128 for each of SLED-1 and SLED-r.

The cathode terminal of each odd numbered transfer thyristor T in SLED-1 is connected to the first transfer signal line 72l, and to the φ1 terminal shown at the right end of FIG. 48 via the current-limiting-resistance Rl1. The cathode terminal of each even numbered transfer thyristor T in SLED-1 is connected to a second transfer signal line 73l, and to the φ2 terminal shown at the left end of FIG. 48 via a current limitation resistance Rl2.

The anode terminal of a start diode Dx10 of SLED-1 is connected to the second transfer signal line 73l, and the cathode terminal of the start diode Dx10 of SLED-1 is connected to the gate terminal (with no reference numeral) of the transfer thyristor Tl1.

On the other hand, the cathode terminal of each odd numbered transfer thyristor T in SLED-r is connected to a first transfer signal line 72r, and to the φ1 terminal shown at the right end of FIG. 48 via a current limitation resistance Rr1. The cathode terminal of each even numbered transfer thyristor T in SLED-r is connected to a second transfer signal line 73r, and to the φ2 terminal shown at the left end of FIG. 48 via a current limitation resistance Rr2.

The anode terminal of a start diode Dxr0 of SLED-r is connected to the second transfer signal line 73r, and the cathode terminal of the start diode Dxr0 of SLED-r is connected to the gate terminal (with no reference numeral) of the transfer thyristor Tr1.

The first transfer signal φ1 is transmitted to the φ1 terminal, and the second transfer signal φ2 is transmitted to the φ2 terminal. That is, the first transfer signal φ1 and the second transfer signal φ2 are transmitted to SLED-1 and SLED-r in common.

The cathode terminals of Schottky write diodes SDwl1, SDwl2, SDwl3, ..., of SLED-1 are connected to a write signal line 74l. The write signal line 74l is connected to φW1 terminal shown at the left end of FIG. 48. The cathode terminals of Schottky write diodes SDwr1, SDwr2, SDwr3, ..., of SLED-r are connected to a write signal line 74r. The write signal line 74l is connected to φWr terminal shown at the right end of FIG. 48.

The cathode terminals of Schottky enable diodes SDel1, SDel2, SDel3, ..., and Schottky enable diodes SDer1, SDer2, SDer3, ..., in SLED-1 are connected to the enable signal line 76. The enable signal line 76 is connected to the φE terminal shown at the left end of FIG. 48.

The write signal φW1 is transmitted to the φW1 terminal, and the write signal φWr is transmitted to the φWr terminal. That is, the write signals φW1 and φWr are transmitted to SLED-1 and SLED-r, respectively. On the other hand, the enable signal φE is transmitted to SLED-1 and SLED-r in common.

The φW1 and φWr terminals, when not individually distinguished, are referred to as a φW terminal.

The cathode terminals of light-emitting thyristors Ll1, Ll2, Ll3, ..., of SLED-1 are connected to a light-up signal line 75l. The light-up signal line 75l is connected to (pH terminal shown at the left end of FIG. 48.

The cathode terminals of light-emitting thyristors Lr1, Lr2, Lr3, ..., of SLED-r are connected to a light-up signal line 75r. The light-up signal line 75r is connected to φIr terminal shown at the right end of FIG. 48.

The light-up signal φIa is transmitted to the (pH and φIr terminals of the light-emitting chips C (the light-emitting chips Ca1 to Ca20) of the light-emitting chip group #a, and the light-up signal φIb is transmitted to the (pH and φIr terminals of the light-emitting chips C (the light-emitting chips Cb1 to Cb20) of the light-emitting chip group #b.

Figure 49:
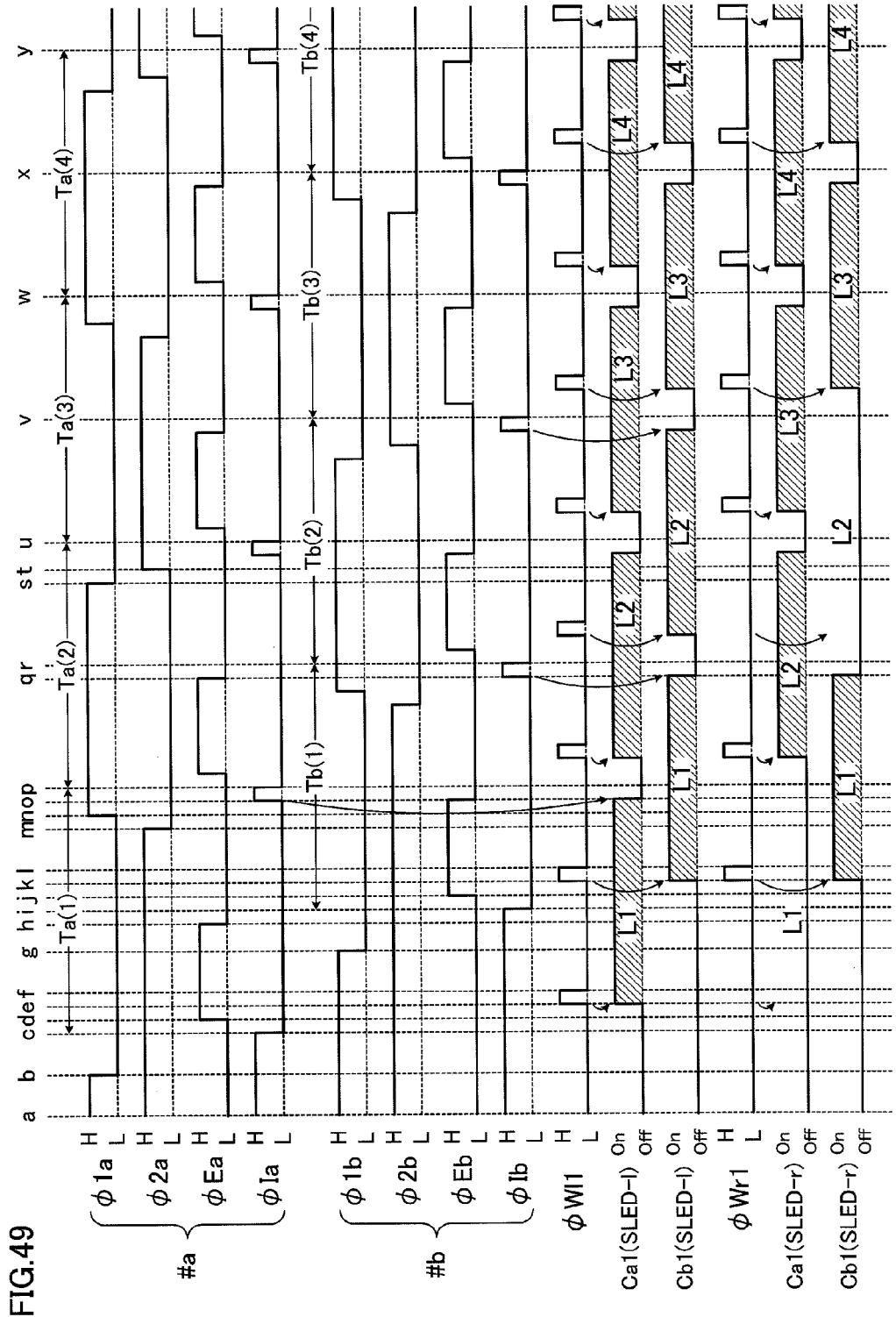
FIG. 49 is a timing chart for illustrating operations of the light-emitting chip according to the seventeenth exemplary embodiment.

FIG. 49 is a timing chart for illustrating operations of the light-emitting chip C according to the seventeenth exemplary embodiment. FIG. 49 shows the timing chart illustrating operations of the light-emitting chip class #1 (the light-emitting chips Ca1 and Cb1).

For SLED-1 of the light-emitting chip Ca1, the light-emitting thyristors L1 to L4 are all set to be lighted up, and for SLED-r of the light-emitting chip Ca1, the light-emitting thyristors L2, L3 and L4 are set to be lighted up. Also, for SLED-1 of the light-emitting chip Cb1, the light-emitting thyristors L1 to L4 are all set to be lighted up, and for SLED-r of the light-emitting chip Cb1, the light-emitting thyristors L1, L3 and L4 are set to be lighted up.

As a SLED of light-emitting chip C for the seventeenth exemplary embodiment, the SLED of the light-emitting chip C according to the first exemplary embodiment is used. Thus, as described for the selection signal φV in the first exemplary embodiment (see FIG. 8), "H" (0 V) and "L" (−3.3 V) of the enable signals φEa, φEb, and the write signals φW11, φWr 1 in the seventeenth exemplary embodiment have a reversed relationship to each other. Other operations of the light-emitting chip C are the same as those of the eighth exemplary embodiment (see FIG. 25). Thus, the operations of the light-emitting chip C of the seventeenth exemplary embodiment may be understood from the description for the first and eighth exemplary embodiments. Thus, detailed description is omitted.

Eighteenth Exemplary Embodiment

The eighteenth exemplary embodiment has a different wiring configuration on the circuit board 62 of the light-emitting device 65 and a different circuit configuration of the light-emitting chip C from those of the seventeenth exemplary embodiment.

The light-emitting chip C in the eighteenth exemplary embodiment is also configured by two self-scanning light-emitting device arrays (SLED) provided on the substrate 80.

Figure 50A:
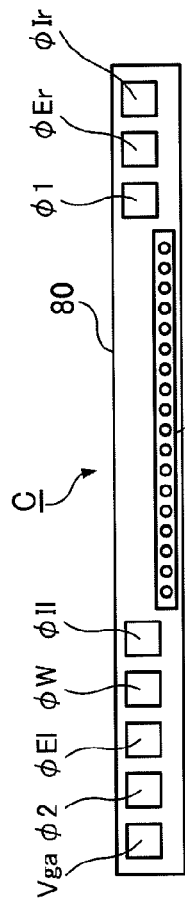
FIGS. 50A and 50B are a diagram showing a configuration of the light-emitting chip, a configuration of the signal generating circuit of the light-emitting device and a wiring configuration of the circuit board according to the eighteenth exemplary embodiment.
Figure 50B:
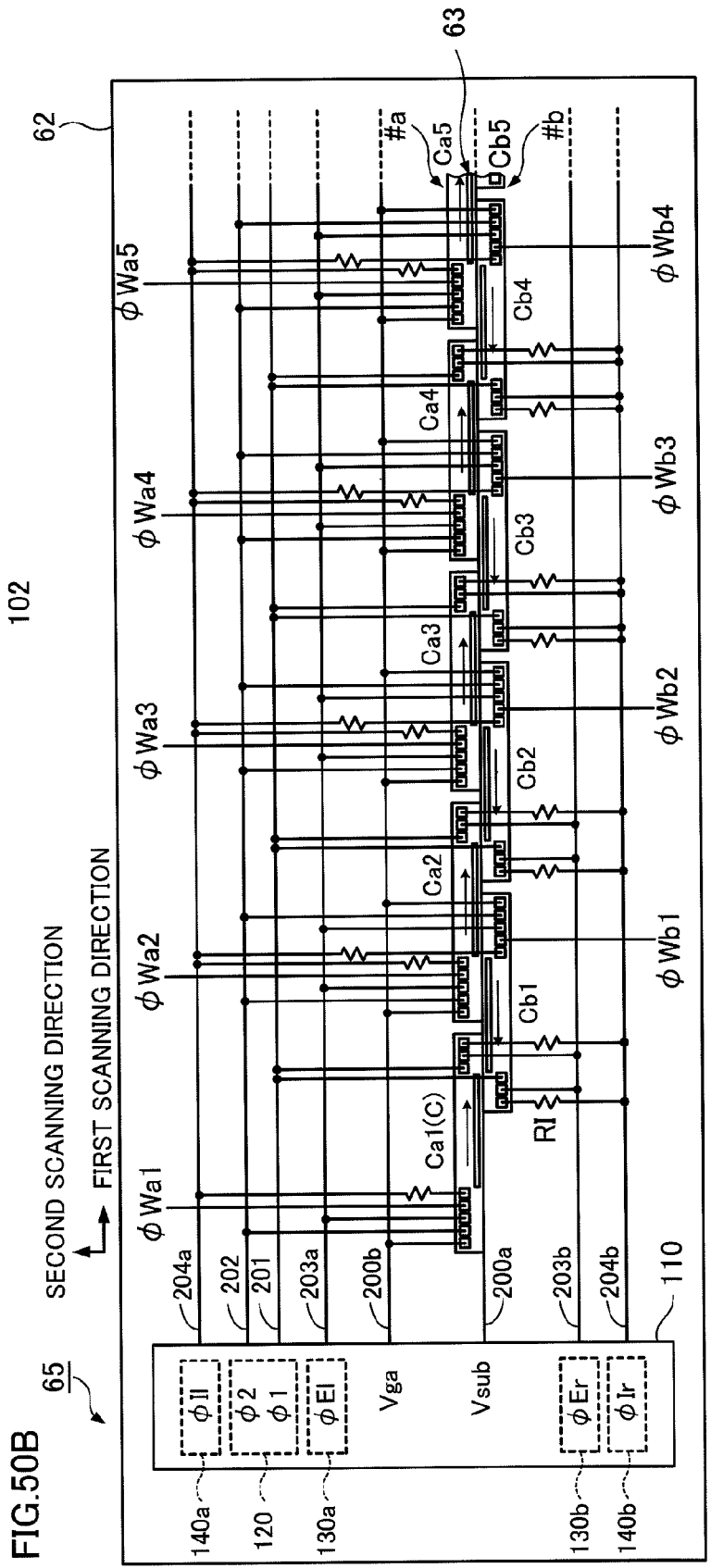

FIGS. 50A and 50B are a diagram showing a configuration of the light-emitting chip C, a configuration of the signal generating circuit 110 of the light-emitting device 65 and a wiring configuration of the circuit board 62 according to the eighteenth exemplary embodiment. FIG. 50A shows the configuration of the light-emitting chip C, and FIG. 50B shows the configuration of the signal generating circuit 110 of the light-emitting device 65, and the wiring configuration on the circuit board 62.

As shown in FIG. 50A, the light-emitting chips C includes input terminals (Vga terminal, φ2 terminal, φE1 terminal, φW terminal, φI1 terminal, φ1 terminal, φEr terminal and φIr terminal) that are multiple bonding pads. These input terminals are provided from one end of the substrate 80 in the order of the Vga terminal, the φ2 terminal, the φE1 terminal, the φW terminal, and the (pH terminal, and are provided from the other end of the substrate 80 in the order of the φIr terminal, the φEr terminal, and the φ1 terminal. The light-emitting element array 102 is provided between the (pH and φ1 terminals.

That is, although the φW1, φWr, φE terminals are provided in the seventeenth exemplary embodiment, the φE1, φEr, φW terminals as an example of the control terminals are provided in the eighteenth exemplary embodiment.

In a similar manner to the eighth exemplary embodiment, the light-emitting portion 63 in the light-emitting device 65 according to the eighteenth exemplary embodiment is configured by arranging 20 light-emitting chips Ca1 to Ca20 and 20 light-emitting chips Cb1 to Cb20 in two lines in a staggered pattern in the first scanning direction on the circuit board 62 (see FIG. 20).

As shown in FIG. 50B, unlike the eighteenth and seventeenth exemplary embodiments, the signal generating circuit 110 of the light-emitting device 65 is configured so that the transfer signal generating part 120 transmits the first transfer signal φ1 and the second transfer signal φ2 to the φ1 and φ2 terminals of all of the light-emitting chips C (the light-emitting chip Ca1 to Ca20, Cb1 to Cb20).

The enable signal generating part 130a transmits an enable signal φE1 to the φE1 terminals of the light-emitting chips C (the light-emitting chips Ca1 to Ca20, Cb1 to Cb20) in common. An enable signal generating part 130b transmits an enable signal φEr to the φEr terminals of the light-emitting chips C (the light-emitting chips Ca1 to Ca20, Cb1 to Cb20) in common. The enable signals φE1 and φEr, when not individually distinguished, are referred to as a φE.

The light-up signal generating part 140a transmits the light-up signal cell to the cell terminals of the light-emitting chips C (the light-emitting chips Ca1 to Ca20, Cb1 to Cb20), and transmits the light-up signal φIr to the φIr terminals of the light-emitting chips C (the light-emitting chips Ca1 to Ca20, Cb1 to Cb20).

The write signal φWa1 is transmitted to the φW terminal of the light-emitting chip Ca1. Similarly, the write signal φWb1 is transmitted to the φW terminal of the light-emitting chip Cb1. In a similar manner, the write signals φWa2 to φWa20, φWb2 to φWb20 are transmitted to the φW terminals of the light-emitting chips Ca2 to Ca20, Cb2 to Cb20, respectively.

Figure 51:
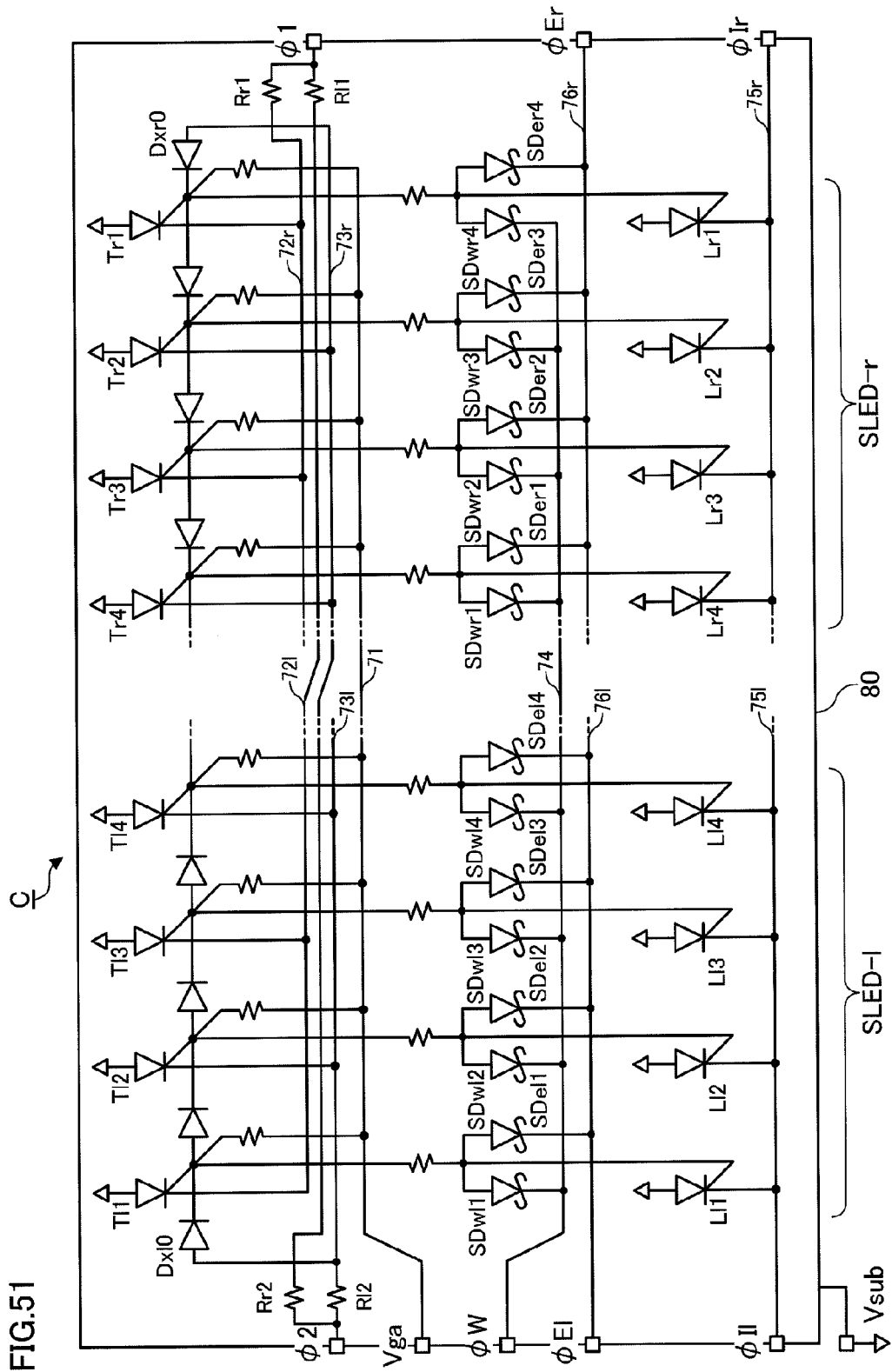
FIG. 51 is an equivalent circuit diagram for illustrating a circuit configuration of the light-emitting chip that is a self-scanning light-emitting device array (SLED) chip according to the eighteenth exemplary embodiment.

FIG. 51 is an equivalent circuit diagram for illustrating a circuit configuration of the light-emitting chip C that is a self-scanning light-emitting device array (SLED) chip according to the eighteenth exemplary embodiment. The input terminals are shown at different positions from those in the configuration of the light-emitting chip C shown in FIG. 50A for convenience of description.

The light-emitting chip C according to the eighteenth exemplary embodiment has a different wiring configuration from that of the light-emitting chip C according to the seventeenth exemplary embodiment.

That is, the cathode terminals of the Schottky write diodes SDwl1, SDwl2, SDwl3, ..., of SLED-1, and the Schottky write diode SDwr1, SDwr2, SDwr3, ..., of SLED-r are connected to the write signal line 74. The write signal line 74 is connected to the φW terminal as an example of the control terminal shown at the left end of FIG. 51.

The cathode terminals of the Schottky enable diodes SDe11, SDe12, SDe13, ..., of SLED-1 are connected to an enable signal line 76l. The enable signal line 76l is connected to the φE1 terminal as an example of the control terminal shown at the left end of FIG. 51.

The cathode terminals of the Schottky enable diodes SDer1, SDer2, SDer3, ..., of SLED-r are connected to an enable signal line 76r. The enable signal line 76r is connected to the φEr terminal as an example of the control terminal shown at the left end of FIG. 51.

Other configurations are the same as those of the seventeenth exemplary embodiment.

That is, in the eighteenth exemplary embodiment, SLED group #1 may be defined by all of SLED-1 in the light-emitting chips C (the light-emitting chips Ca1 to Ca20, Cb1 to Cb20) and SLED group #r may be defined by all of SLED-r in the light-emitting chips C (the light-emitting chips Ca1 to Ca20, Cb1 to Cb20).

SLED-1 and SLED-r in each of the light-emitting chips C (the light-emitting chips Ca1 to Ca20, Cb1 to Cb20) form a class.

Figure 52:
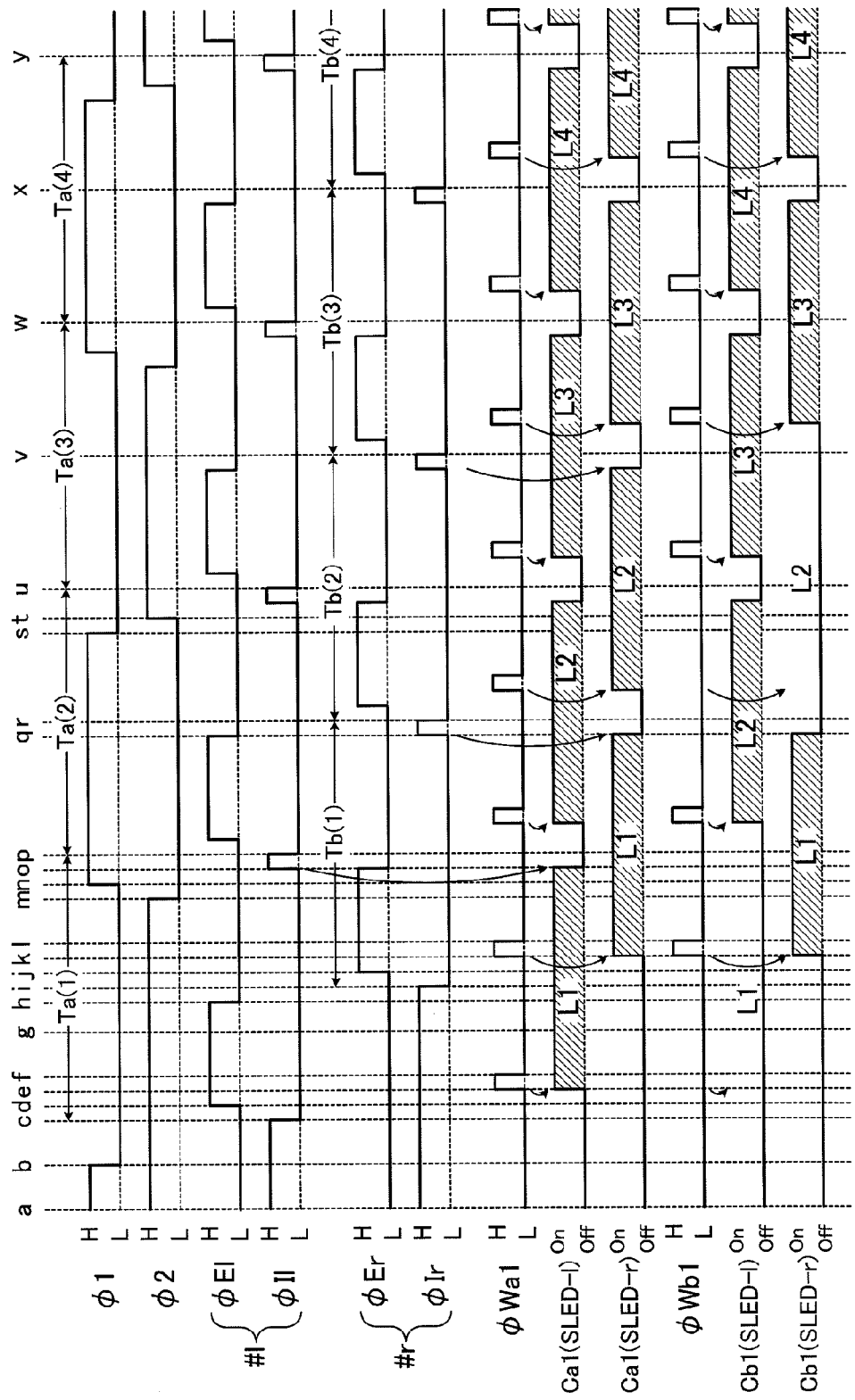
FIG. 52 is a timing chart for illustrating operations of the light-emitting chip according to the eighteenth exemplary embodiment.

FIG. 52 is a timing chart for illustrating operations of the light-emitting chip C according to the eighteenth exemplary embodiment. FIG. 52 shows the timing chart illustrating the operations of SLED-1 of the light-emitting chip Ca1 (Ca1 (SLED-1)) and SLED-1 of the light-emitting chip Cb1 (Cb1 (SLED-1)) that belong to the light-emitting chip class #1, and the operations of SLED-r of the light-emitting chip Ca1 (Ca1 (SLED-r)) and SLED-r of the light-emitting chip Cb1 (Cb1 (SLED-r)) that belong to the light-emitting chip class #r.

For SLED-1 of the light-emitting chip Ca1, the light-emitting thyristors L1 to L4 are all assumed to be lighted up, and for SLED-1 of the light-emitting chip Cb1, the light-emitting thyristors L2, L3 and L4 are assumed to be lighted up. Also, for SLED-r of the light-emitting chip Ca1, the light-emitting thyristors L1 to L4 are all assumed to be lighted up, and for SLED-r of the light-emitting chip Cb1, the light-emitting thyristors L1, L3 and L4 are assumed to be lighted up.

The light-emitting device 65 according to the eighteenth exemplary embodiment is equivalent to the one according to the eighth exemplary embodiment with the light-emitting chip groups #a and #b replaced by the light-emitting chip groups #1 and #r, respectively, and the light-emitting chip class replaced by the class including SLED-1 and SLED-r.

Thus, the operations of the light-emitting chip C of the eighteenth exemplary embodiment shown in FIG. 52 may be understood from the description for the first and eighth exemplary embodiments. Thus, detailed description is omitted.

Nineteenth Exemplary Embodiment

The nineteenth exemplary embodiment has a different circuit configuration of the light-emitting chip C from that of the eighteenth exemplary embodiment.

Figure 53:
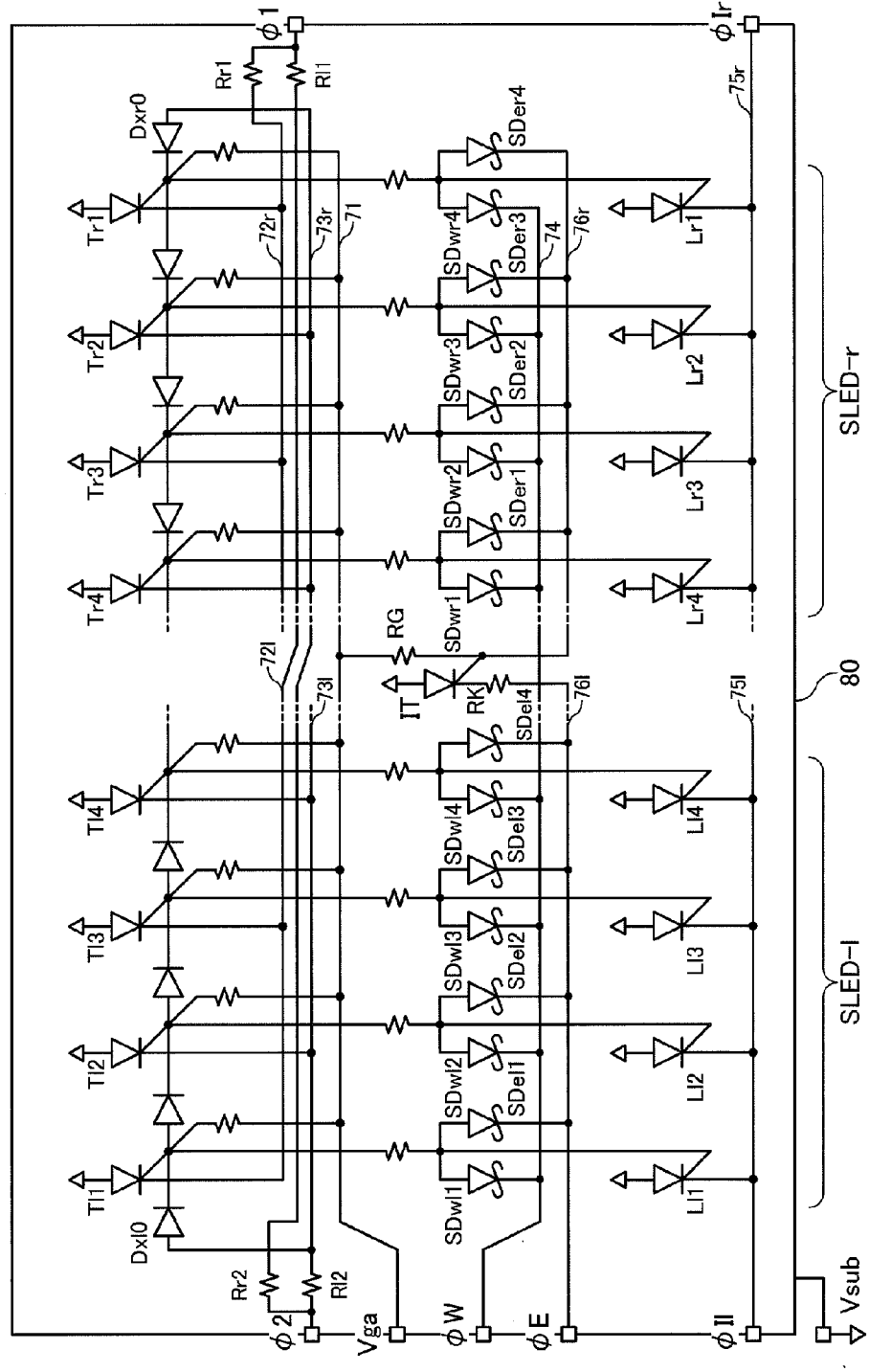
FIG. 53 is an equivalent circuit diagram for illustrating a circuit configuration of the light-emitting chip according to the nineteenth exemplary embodiment.

FIG. 53 is an equivalent circuit diagram for illustrating a circuit configuration of the light-emitting chip C according to the nineteenth exemplary embodiment.

According to the eighteenth exemplary embodiment, as shown in FIG. 52, the enable signal φE1 and φEr are not set to "H" (0 V) at the same time. Thus, in the nineteenth exemplary embodiment, the enable signal lines 76l and 76r are connected to each other via an inverting thyristor IT so that when one of the enable signal lines is at "H" (0 V), the other enable signal line is at "L" (−3.3 V). Thereby, either one of the enable signals φE1 or φEr is not used. Accordingly, either one of the φE1 or φEr terminals is not used.

In the following, the components in FIG. 53 that are different from those of the eighteenth exemplary embodiment shown in FIG. 51 are described, and similar components to those of the eighteenth exemplary embodiment are labeled with the same reference numerals, and detailed description of the similar components is omitted.

Herein, the anode, cathode and gate terminals of the inverting thyristor IT may be referred to as a sixth anode, a sixth cathode, and a sixth gate terminals, respectively.

One end of the enable signal line 76*l* as an example of a control signal line is connected to the φE terminal shown at the left end of FIG. 53. The other end of the enable signal line 76*l* is connected to the cathode terminal of the inverting thyristor IT via a resistance RK.

The anode terminal of the inverting thyristor IT is connected to the substrate 80.

The gate terminal of the inverting thyristor IT is connected to the power supply line 71 via a current limitation resistance RG, from which the power supply potential Vga ("L" (−3.3 V)) is supplied. The gate terminal of the inverting thyristor IT is connected to one end of the enable signal line 76*r* as an example of the control signal line. The other end of the enable signal line 76*l* is not provided with an input terminal.

When the enable signal φE is "H" (0 V), the enable signal line 76*l* is set to "H" (0 V). Since the potential of the cathode terminal of the inverting thyristor IT is the potential of the anode terminal of "H" (0 V), the inverting thyristor IT is in an OFF state. Then, since the enable signal line 76*r* is connected to the power supply line 71 via the current limitation resistance RG, the potential of the enable signal line 76*r* becomes the power supply potential Vga ("L" (−3.3 V)). When either one of the light-emitting thyristors Lr of SLED-r is in an ON state, the potential of the gate terminal of the inverting thyristor IT connected to the enable signal lines 76*r* and 76*r* via Schottky enable diode SDer with a forward bias shifts to −0.5 V. Accordingly, the threshold voltage of the inverting thyristor IT becomes −2 V.

Subsequently, when the enable signal φE is set to "L" (−3.3 V) to set the potential of the enable signal line 76*l* to "L" (−3.3 V), the inverting thyristor IT is turned on, and set in an ON state. Then, the potential of the gate terminal of the inverting thyristor IT is set to "H" (0 V), and the potential of the enable signal line 76*r* is set to "H" (0 V).

That is, the inverting thyristor IT serves as an inverter and sets the enable signal lines 76*l* and 76*r* to the potential of "H" (0 V) and "L" (−3.3 V) alternately according to the potential of the enable signal φE.

Accordingly, the enable signal φE1 shown in FIG. 52 may be used as the enable signal φE, and the enable signal φEr may be not be used.

In the first to nineteenth exemplary embodiments, the transfer thyristor T is driven by the first transfer signal φ1 and the second transfer signal φ2 in two phases; however, the transfer thyristor T may be driven by transmitting three transfer signals in three phases. Similarly, the transfer thyristor T may be driven by transmitting signals in four or more phases.

In the first to nineteenth exemplary embodiments, the coupling diode Dx is used as the first electrical part; however, the first electrical part may be the one that operates in such a manner that a change of the potential at one terminal of the unit causes a change of the potential at the other terminal of the unit, thus a resistance may be used as the unit.

In the first exemplary embodiment, the connection resistance Ra is used as the second electrical part, and in the eighth exemplary embodiment, the Schottky connection diode SDy is used as the second electrical part. The second electrical part may be a resistance, a diode, or a Schottky diode.

In the first exemplary embodiment, the Schottky write diode SDw and the Schottky enable diode SDe are used as the third electrical part, and in the fourth exemplary embodiment, the write resistance Rw and the enable resistance Re are used as the third electrical part. The third electrical part may be a diode, a Schottky diode, or a resistance.

Furthermore, in the eighth to eleventh exemplary embodiments, the connection diode Dy is used as the fourth electrical part, and the connection diode Dz is used as the fifth electrical part. The fourth electrical part and the fifth electrical part may be the one that causes a potential drop to shift potential, thus may be a resistance.

In the eighth exemplary embodiment, the write resistance RW and the enable resistance RE are used as the sixth electrical part, but a diode may be used.

Although the number of emission points (the light-emitting thyristors L) of the light-emitting element array 102 has been assumed to be 128 to describe the invention, this number may be set to any integer.

In the first to thirteenth exemplary embodiments, the light-emitting chip C is assumed to be mounted with one or two self-scanning light-emitting device arrays (SLED); however, the light-emitting chip C may be mounted with three or more SLED arrays.

The numbers of light-emitting chip C included in every light-emitting chip groups as well as the numbers of light-emitting chip C included in every light-emitting chip classes are each assumed to be the same; however the numbers may be different. The light-emitting chips C included in each light-emitting chip class are assumed to belong to respective different light-emitting chip groups; however, some of the light-emitting chips C may belong to the same light-emitting chip group. In this case, for those light-emitting chips C that belong to the same light-emitting chip group, light-on control is performed simultaneously.

Furthermore, in the first to nineteenth exemplary embodiments, the invention has been described by setting the anode terminals of the thyristors (the transfer thyristor T, the write thyristor M, the light-emitting thyristor L) as an anode common that is made in common to the substrate 80. The circuit of the substrate 80 may be used with changed polarity by making the cathode terminals an cathode common of the substrate 80.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A light-emitting device comprising:
a plurality of light-emitting chips each having a plurality of light-emitting elements;
an enable signal supply unit that transmits a plurality of enable signals, each enable signal being transmitted in common to the light-emitting chips belonging to each of M (M is an integer of two or more) groups into which the plurality of light-emitting chips are divided, each enable signal selecting a light-emitting chip in each group as a target for lighting up a light-emitting element selected from the light-emitting elements set as a control target;
a write signal supply unit that transmits a plurality of write signals, each write signal being transmitted in common to light-emitting chips belonging to each of N (N is an integer of two or more) classes into which the light-emitting chips in each of the M groups are classified, each write signal selecting the light-emitting chip in each class as the target for lighting up the light-emitting element selected from the light-emitting elements set as the control target; and a light-up signal supply unit that transmits a plurality of light-up signals, each light-up signal being transmitted in common to the light-emitting chips belonging to each of the M groups, each light-up signal supplying power for lighting up the light-emitting element in the light-emitting chip selected by the enable signal and selected by the write signal, wherein the light-up signal supply unit and the enable signal supply unit transmit the light-up signals and the enable signals to the M groups, respectively, at transmission time points shifted from each other among the M groups, and wherein the light-up signal supply unit and the enable signal supply unit transmit the light-up signals and the enable signals to the M groups, respectively, with phases being shifted by 360/M degrees from each other among the M groups.

2. The light-emitting device according to claim 1, wherein the write signal supply unit transmits the plurality of write signals to the light-emitting chips belonging to each of the N classes in a time sequence on a group-by-group basis of the M groups.

3. A light-emitting chip comprising:

a plurality of light-emitting elements;

a plurality of transfer elements that are provided corresponding to the plurality of light-emitting elements, respectively, and sequentially set the plurality of light-emitting elements one by one as a control target for lighting up or not lighting up, the plurality of transfer elements comprising a plurality of transfer thyristors each having a first gate terminal, a first anode terminal and a first cathode terminal, the plurality of light-emitting elements comprising a plurality of light-emitting thyristors each having a second gate terminal, a second anode terminal and a second cathode terminal;

a plurality of first electrical parts that each connect two of the first gate terminals of the plurality of transfer thyristors to each other;

N control terminals (N is an integer of two or more) that each receive a designation signal to control light-on or light-off of each of the plurality of light-emitting elements, separately;

a plurality of AND circuits that are each located between one of the plurality of light-emitting elements and one of the plurality of transfer elements, and that each receive input of N signals respectively transmitted to the N control terminals and a signal from the one of the plurality of transfer elements and output a signal to the one of the plurality of light-emitting elements, the one of the plurality of transfer elements being provided corresponding to the one of the light-emitting elements;

a plurality of fourth electrical parts each including one end connected to the first gate terminal of a corresponding one of the plurality of transfer thyristors;

a plurality of write thyristors that each have a third gate terminal, a third anode terminal and a third cathode terminal, the third gate terminal being connected to another end of a corresponding one of the plurality of fourth electrical parts;

a plurality of fifth electrical parts that are each connected to the third gate terminal of a corresponding one of the plurality of write thyristors and to the second gate terminal of a corresponding one of the plurality of light-emitting thyristors; and N sixth electrical parts that are each provided between a corresponding one of the N control terminals and one end of a write signal line connected to one of the third anode terminal and the third cathode terminal of each of the plurality of write thyristors, wherein each of the plurality of AND circuits includes one of the plurality of fourth electrical parts, one of the plurality of write thyristors and the N sixth electrical parts.

4. The light-emitting chip according to claim 3, wherein each of the plurality of AND circuits in the light-emitting chip includes:

a second electrical part whose one end is connected to the first gate terminal of a corresponding one of the transfer thyristors, and whose other end is connected to the second gate terminal of a corresponding one of the light-emitting thyristors; and N third electrical parts that are each provided between a corresponding one of the N control terminals and the second gate terminal of the corresponding one of the light-emitting thyristors.

5. The light-emitting chip according to claim 3, further comprising:

a plurality of second electrical parts that are provided corresponding to the plurality of transfer thyristors, respectively, and that each include one end connected to the first gate terminal and another end connected to the second gate terminal of a corresponding one of the light-emitting thyristors;

a plurality of third electrical parts that are provided corresponding to the plurality of light-emitting thyristors, respectively, and that each include one end connected to the second gate terminal; and N Schottky junction diodes each provided between a corresponding one of the N control terminals and a write signal line connected to other ends of the plurality of third electrical parts, wherein each of the plurality of AND circuits includes one of the plurality of second electrical parts, one of the plurality of third electrical parts and the N Schottky junction diodes.

6. The light-emitting chip according to claim 3, further comprising a write enable thyristor that has a fourth gate terminal, a fourth anode terminal and a fourth cathode terminal, and is provided between the N sixth electrical parts and the one of the third anode terminal and the third cathode terminal of one of the write thyristors in each of the plurality of AND circuits connected to the write signal line, one of the fourth anode terminal and the fourth cathode terminal being connected to the write signal line.

7. The light-emitting chip according to claim 3, further comprising a light-off thyristor having a fifth gate terminal, a fifth anode terminal and a fifth cathode terminal, the fifth gate terminal being connected to a light-up signal line that transmits a light-up signal to supply power for lighting up and is connected to one of the second anode terminal and the second cathode terminal of each of the plurality of light-emitting thyristors, one of the fifth anode terminal and the fifth cathode terminal being connected via a current limitation resistance to an unlight signal terminal to which an unlight signal for lighting off is transmitted.

* * * * *